United States Patent
Singh et al.

(10) Patent No.: US 11,901,088 B2
(45) Date of Patent: *Feb. 13, 2024

(54) METHOD OF HEATING PRIMARY COOLANT OUTSIDE OF PRIMARY COOLANT LOOP DURING A REACTOR STARTUP OPERATION

(71) Applicant: SMR Inventec, LLC, Camden, NJ (US)

(72) Inventors: Krishna P. Singh, Jupiter, FL (US); Joseph Gerald Leo Rajkumar, Cherry Hill, NJ (US)

(73) Assignee: SMR Inventec, LLC

( * ) Notice: Subject to any disclaimer, the term of this patent is extended or adjusted under 35 U.S.C. 154(b) by 574 days.

This patent is subject to a terminal disclaimer.

(21) Appl. No.: 17/088,815

(22) Filed: Nov. 4, 2020

(65) Prior Publication Data

US 2021/0142920 A1    May 13, 2021

Related U.S. Application Data

(60) Continuation-in-part of application No. 16/885,512, filed on May 28, 2020, now abandoned, and a
(Continued)

(51) Int. Cl.
*G21C 15/243* (2006.01)
*G21C 7/32* (2006.01)
(Continued)

(52) U.S. Cl.
CPC .............. *G21C 15/243* (2013.01); *G21C 7/32* (2013.01); *G21C 15/26* (2013.01); *G21C 13/073* (2013.01);
(Continued)

(58) Field of Classification Search
CPC ........ G21C 15/243; G21C 7/32; G21C 15/26; G21C 15/00; G21C 15/24; G21D 1/006; G21D 1/00; G21D 1/04
(Continued)

(56) References Cited

U.S. PATENT DOCUMENTS 2,621,492 A    12/1952 Beardsley et al.
2,640,686 A    6/1953 Brown, Jr.
(Continued)

FOREIGN PATENT DOCUMENTS

CN    87106445    4/1988
CN    101836262   9/2010
(Continued)

OTHER PUBLICATIONS

Basco U-Tube & Tank Immersion Heat Exchanges, API Heat Transfer, 2001.
(Continued)

*Primary Examiner* — Jack W Keith
*Assistant Examiner* — Daniel Wasil
(74) *Attorney, Agent, or Firm* — The Belles Group, P.C.

(57) ABSTRACT

A method for heating primary coolant in a nuclear reactor system during system start-up. A primary coolant loop fluidly couples together a reactor vessel and a steam generating vessel. The primary coolant loop is filled with primary coolant. A portion of the primary coolant is taken from the primary coolant loop and placed into a start-up sub-system. The portion is heated while in the sub-system to form a heated portion of the primary coolant. The heated portion is returned into the primary coolant loop. The method allows for the primary coolant to be heated to a no-load operating temperature.

18 Claims, 82 Drawing Sheets

Related U.S. Application Data continuation-in-part of application No. 16/880,947, filed on May 21, 2020, now abandoned, and a continuation-in-part of application No. 16/710,048, filed on Dec. 11, 2019, now abandoned, and a continuation-in-part of application No. 16/682,495, filed on Nov. 13, 2019, now Pat. No. 11,120,920, which is a continuation of application No. 16/507,637, filed on Jul. 10, 2019, now Pat. No. 10,510,452, and a continuation-in-part of application No. 16/126,100, filed on Sep. 10, 2018, now Pat. No. 11,031,146, and a continuation-in-part of application No. 15/996,868, filed on Jun. 4, 2018, now abandoned, and a continuation-in-part of application No. 15/883,612, filed on Jan. 30, 2018, now abandoned, said application No. 16/880,947 is a continuation of application No. 15/859,934, filed on Jan. 2, 2018, now Pat. No. 10,665,357, which is a continuation of application No. 14/398,946, filed as application No. PCT/US2013/039743 on May 6, 2013, now Pat. No. 9,892,806, said application No. 16/885,512 is a continuation of application No. 15/729,376, filed on Oct. 10, 2017, now Pat. No. 10,672,523, which is a continuation of application No. 14/423,149, filed as application No. PCT/US2013/056023 on Aug. 21, 2013, now Pat. No. 9,786,394, said application No. 16/710,048 is a division of application No. 15/419,227, filed on Jan. 30, 2017, now Pat. No. 10,720,249, said application No. 16/507,637 is a division of application No. 14/910,433, filed as application No. PCT/US2014/062094 on Oct. 24, 2014, now Pat. No. 10,395,783, said application No. 15/996,868 is a division of application No. 14/713,093, filed on May 15, 2015, now Pat. No. 10,008,296, which is a continuation-in-part of application No. 14/403,082, filed as application No. PCT/US2013/042070 on May 21, 2013, now Pat. No. 9,786,393, said application No. 16/126,100 is a division of application No. 14/620,390, filed on Feb. 12, 2015, now Pat. No. 10,102,936, said application No. 15/883,612 is a continuation of application No. 14/620,465, filed on Feb. 12, 2015, now Pat. No. 9,916,910, said application No. 14/620,465 is a continuation-in-part of application No. PCT/US2013/054973, filed on Aug. 14, 2013, and a continuation-in-part of application No. PCT/US2013/054973, filed on Aug. 14, 2013, and a continuation-in-part of application No. PCT/US2013/054973, filed on Aug. 14, 2013, said application No. PCT/US2013/056023 is a continuation-in-part of application No. PCT/US2013/042070, filed on May 21, 2013, said application No. 14/289,525 is a continuation-in-part of application No. PCT/US2013/042070, filed on May 21, 2013.

(60) Provisional application No. 61/993,857, filed on May 15, 2014, provisional application No. 61/895,267, provisional application No. 61/827,943, filed on May 28, 2013, provisional application No. 61/691,533, filed on Aug. 21, 2012, provisional application No. 61/683,021, filed on Aug. 14, 2012, provisional application No. 61/683,030, filed on Aug. 14, 2012, provisional application No. 61/649,593, filed on May 21, 2012, provisional application No. 61/642,614, filed on May 4, 2012.

(51) Int. Cl.
*G21C 15/26* (2006.01)
*G21D 1/00* (2006.01)
*G21C 13/073* (2006.01)

(52) U.S. Cl.
CPC .............. *G21D 1/00* (2013.01); *G21D 1/006* (2013.01); *Y02E 30/30* (2013.01)

(58) Field of Classification Search
USPC .......................................................... 376/214
See application file for complete search history.

(56) References Cited

U.S. PATENT DOCUMENTS

| | | |
|---|---|---|
| 2,890,009 A | 6/1959 | Chapellier |
| 3,244,598 A | 4/1966 | David et al. |
| 3,320,969 A | 5/1967 | Marko |
| 3,367,839 A | 2/1968 | Leopoldo |
| 3,395,076 A | 7/1968 | Ruppen |
| 3,563,855 A | 2/1971 | Oliver |
| 3,575,807 A | 4/1971 | Ripley |
| 3,621,926 A | 11/1971 | Townsend |
| 3,718,353 A | 2/1973 | Charcharos |
| 3,718,539 A | 2/1973 | West et al. |
| 3,888,730 A | 6/1975 | Braun |
| 3,916,841 A | 11/1975 | Schroder et al. |
| 3,920,513 A | 11/1975 | Loose et al. |
| 3,929,567 A | 12/1975 | Schabert et al. |
| 3,966,549 A | 6/1976 | Michel |
| 4,033,814 A | 7/1977 | Bregeon |
| 4,039,377 A | 8/1977 | Andrieu et al. |
| 4,057,163 A | 11/1977 | Widart et al. |
| 4,080,256 A | 3/1978 | Braun et al. |
| 4,082,608 A | 4/1978 | Curet |
| 4,175,005 A | 11/1979 | Harstead |
| 4,235,672 A * | 11/1980 | Harand ................... G21D 1/04 376/461 |
| 4,236,970 A | 12/1980 | Harand et al. |
| 4,239,596 A | 12/1980 | Bevilacqua et al. |
| 4,404,165 A | 9/1983 | Hesky et al. |
| 4,478,784 A | 10/1984 | Burelbach |
| 4,508,677 A | 4/1985 | Craig et al. |
| 4,511,532 A | 4/1985 | Pierart |
| 4,656,335 A | 4/1987 | Durrant et al. |
| 4,660,510 A | 4/1987 | Draper |
| 4,678,626 A | 7/1987 | Germer |
| 4,683,112 A | 7/1987 | Badoux et al. |
| 4,696,791 A | 9/1987 | Straub |
| 4,746,485 A | 5/1988 | Commander |
| 4,747,993 A | 5/1988 | Hankinson et al. |
| 4,752,439 A | 6/1988 | Elter et al. |
| 4,753,771 A | 6/1988 | Conway et al. |
| 4,765,946 A | 8/1988 | Dagard et al. |
| 4,767,594 A | 8/1988 | Hunsbedt |
| 4,769,209 A | 9/1988 | Tower et al. |
| 4,818,476 A | 4/1989 | Gasparro |
| 4,950,448 A | 8/1990 | Gou et al. |
| 5,011,652 A | 4/1991 | Tominaga et al. |
| 5,043,135 A | 8/1991 | Hunsbedt et al. |
| 5,049,353 A | 9/1991 | Conway et al. |
| 5,053,190 A | 10/1991 | Gardner et al. |
| 5,075,070 A | 12/1991 | Costes |
| 5,076,999 A | 12/1991 | Forsberg |
| 5,087,408 A | 2/1992 | Tominaga et al. |
| 5,089,218 A | 2/1992 | Gardner et al. |
| 5,091,143 A | 2/1992 | Tate et al. |
| 5,096,659 A | 3/1992 | Hidaka et al. |
| 5,102,616 A | 4/1992 | Gardner et al. |
| 5,154,877 A | 10/1992 | Schultz et al. |
| 5,158,741 A | 10/1992 | Boardman et al. |
| 5,158,742 A | 10/1992 | Dillmann |
| 5,167,905 A | 12/1992 | Mentz et al. |
| 5,207,977 A | 5/1993 | Desai |
| 5,217,682 A | 6/1993 | Spinks et al. |
| 5,272,737 A | 12/1993 | Fujii et al. |
| 5,282,230 A | 1/1994 | Billig et al. |

(56) References Cited

U.S. PATENT DOCUMENTS

| | | |
|---|---|---|
| 5,309,626 A | 5/1994 | Tolino |
| 5,345,481 A | 9/1994 | Oosterkamp |
| 5,345,482 A | 9/1994 | Conway et al. |
| 5,349,616 A | 9/1994 | Nakayama et al. |
| 5,398,267 A | 3/1995 | Resinsch |
| 5,426,681 A | 6/1995 | Aburomia |
| 5,442,668 A | 8/1995 | Todreas et al. |
| 5,491,731 A | 2/1996 | Corpora |
| 5,492,169 A | 2/1996 | Valadon |
| 5,499,277 A | 3/1996 | Hunsbedt et al. |
| 5,555,280 A | 9/1996 | Cartry |
| 5,570,401 A | 10/1996 | Gluntz |
| 5,612,982 A | 3/1997 | Woodcock et al. |
| 5,642,389 A | 6/1997 | Mattern et al. |
| 5,930,320 A | 7/1999 | Challberg et al. |
| 6,718,001 B2 | 4/2004 | Hidaka et al. |
| 6,763,570 B2 | 7/2004 | Abbott et al. |
| 7,245,689 B2 | 7/2007 | Nakayama et al. |
| 7,389,669 B2 | 6/2008 | Badlani et al. |
| 8,687,759 B2 | 4/2014 | Reyes, Jr. et al. |
| 8,721,982 B2 | 5/2014 | Yamazumi et al. |
| 11,031,146 B2 * | 6/2021 | Singh .................. G21D 1/04 |
| 2002/0044623 A1 | 4/2002 | Manabe et al. |
| 2002/0101951 A1 | 8/2002 | Nakamaru et al. |
| 2003/0010481 A1 | 1/2003 | Northrop |
| 2006/0008045 A1 | 1/2006 | Forsyth et al. |
| 2007/0076835 A1 | 4/2007 | Tobimatsu et al. |
| 2009/0129530 A1 | 5/2009 | Reyes, Jr. et al. |
| 2009/0129531 A1 | 5/2009 | Reyes, Jr. et al. |
| 2009/0129532 A1 | 5/2009 | Reyes, Jr. et al. |
| 2009/0323884 A1 | 12/2009 | Sato et al. |
| 2010/0067644 A1 | 3/2010 | D'Auvergne |
| 2010/0260302 A1 | 10/2010 | Pelisson |
| 2010/0272223 A1 * | 10/2010 | Fushimi ................. G21C 7/36 376/214 |
| 2011/0096890 A1 | 1/2011 | Lee et al. |
| 2011/0158371 A1 | 6/2011 | Sato et al. |
| 2011/0314858 A1 | 12/2011 | Tahara et al. |
| 2012/0051484 A1 | 3/2012 | Schmidt et al. |
| 2012/0076254 A1 | 3/2012 | Malloy et al. |
| 2012/0076255 A1 | 3/2012 | Jain et al. |
| 2012/0106692 A1 | 5/2012 | Keenan |
| 2012/0121056 A1 | 5/2012 | Sato et al. |
| 2012/0155594 A1 | 6/2012 | Malloy et al. |
| 2012/0170702 A1 | 7/2012 | Song et al. |
| 2012/0207260 A1 | 8/2012 | Houghton et al. |
| 2012/0307956 A1 | 12/2012 | Singh et al. |
| 2012/0307957 A1 | 12/2012 | Sedlacek et al. |
| 2013/0051511 A1 | 2/2013 | Watson et al. |
| 2013/0170601 A1 * | 7/2013 | Varrin .................. G21C 5/02 376/313 |
| 2013/0182813 A1 * | 7/2013 | Bingham ............... G21C 15/26 376/373 |
| 2013/0272474 A1 | 10/2013 | Conway et al. |
| 2014/0177772 A1 | 6/2014 | Jeong et al. |
| 2015/0113988 A1 | 4/2015 | Ichinose et al. |

FOREIGN PATENT DOCUMENTS

| | | |
|---|---|---|
| CN | 102194533 | 9/2011 |
| CN | 102568622 | 1/2012 |
| CN | 103000233 | 3/2013 |
| CN | 202948738 | 5/2013 |
| DE | 2642352 | 3/1978 |
| DE | 3517632 | 11/1986 |
| DE | 19703441 | 8/1998 |
| EP | 0232186 | 8/1987 |
| EP | 0528672 | 2/1993 |
| EP | 0734028 | 9/1996 |
| GB | 2251117 | 6/1992 |
| JP | 36-001188 | 3/1961 |
| JP | S5813159 | 1/1983 |
| JP | S62187291 | 8/1987 |
| JP | S63-217296 | 9/1988 |
| JP | H02-176496 | 7/1990 |
| JP | H02223896 | 9/1990 |
| JP | H02296196 | 12/1990 |
| JP | H0318793 | 1/1991 |
| JP | H04125495 | 4/1992 |
| JP | H05087967 | 4/1993 |
| JP | H07181279 | 7/1995 |
| JP | H07198885 | 8/1995 |
| JP | H1090468 | 4/1998 |
| JP | 2004245763 | 9/2004 |
| JP | 2006510117 | 3/2006 |
| JP | 2006138744 | 6/2006 |
| JP | 2007297854 | 11/2007 |
| JP | 2009150846 | 7/2009 |
| JP | 2010203858 | 9/2010 |
| JP | 2010236885 | 10/2010 |
| JP | 2011501811 | 1/2011 |
| JP | 2011503614 | 1/2011 |
| JP | 2011232179 | 11/2011 |
| JP | 2012198168 | 10/2012 |
| RU | 2073920 | 2/1997 |
| RU | 2084025 | 7/1997 |
| RU | 2271585 | 3/2006 |
| RU | 2403633 | 11/2010 |
| WO | WO 2009/064654 | 5/2009 |
| WO | WO 2010/136108 | 12/2010 |
| WO | WO 2011/097597 | 8/2011 |
| WO | WO 2013/096966 | 6/2013 |
| WO | WO 2013/163475 | 10/2013 |
| WO | WO 2013/177196 | 11/2013 |
| WO | WO 2014/028634 | 2/2014 |

OTHER PUBLICATIONS

Chung, Young-Jong et al., "Passive cooldown performance of a 65 MW integral reactor," Nuclear Engineering and Design 238. 7(2008):1681-1689 (Year: 2008).

Component and Closed Cooling Water Systems, Nuclear Tourist, 2006.

Corresponding International Search Report and Written Opinion for PCT/US2013/056023 dated Feb. 10, 2014.

Corresponding International Search Report for PCT/US2013/039743 dated Sep. 24, 2013.

Corresponding Partial Supplementary European Search Report issued by the EPO for PCT/US2013/042070 dated Mar. 2, 2016.

Corresponding PCT/US13/54961 Search Report and Written Opinion dated Jan. 13, 2014.

Corresponding Supplementary European Search Report for EP 13793498 dated Jun. 16, 2016.

Corresponding Supplementary European Search Report for EP14803488 dated Feb. 17, 2017.

International Search Report and Written Opinion for corresponding application PCT/2013/042070 dated Oct. 22, 2013, pp. 1-13.

International Search Report and Written Opinion of PCT/US2014/039842 dated Oct. 9, 2014.

International Search Report from corresponding PCT Application No. PCT/US2014/062094, dated Feb. 6, 2015, pp. 1-16.

Ito, T. et al. Development of an Advanced Startup Procedure for a PIUS-type Reactor. < URL: http://www.tandfonline.com/dio/abs/10.1080/18811248.1998.9733909#.UqgCS-IUZ0k>, Journal of Nuclear Science and Technology, vol. 35, No. 8., Mar. 15, 2012, pp. 554-563 [Online].

Shell and Tube Heat Exchanger, Wikipedia, 2010.

Supplemental European International Search Report for corresponding Application No. EP 13793498.0-1556 dated Jun. 27, 2016, pp. 1-14.

Supplemental Search Report for corresponding European Application No. 14856573.2 dated Aug. 18, 2017, pp. 1-9.

* cited by examiner

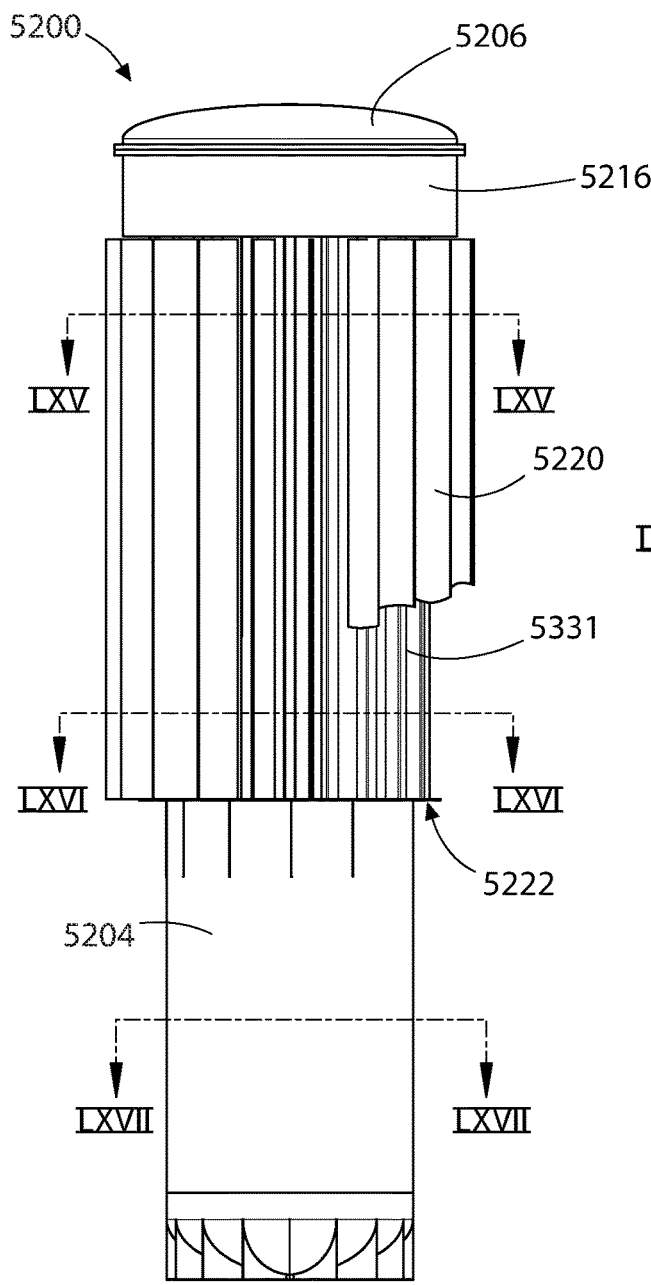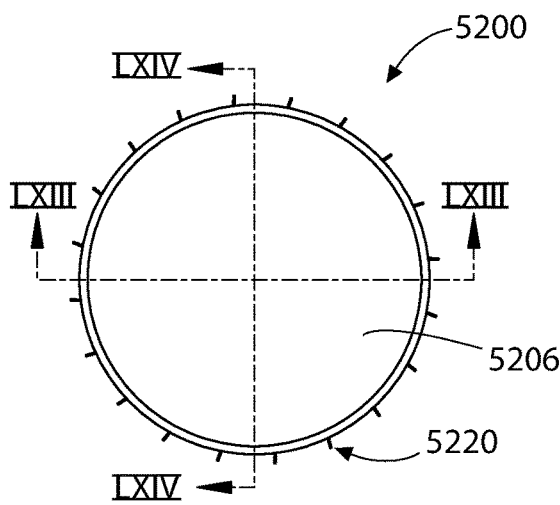
FIG. 62
FIG. 61

METHOD OF HEATING PRIMARY COOLANT OUTSIDE OF PRIMARY COOLANT LOOP DURING A REACTOR STARTUP OPERATION

CROSS-REFERENCE TO RELATED APPLICATIONS

The present application is a continuation-in-part of U.S. patent application Ser. No. 16/880,947 filed May 21, 2020, which is a continuation of U.S. patent application Ser. No. 15/859,934 filed Jan. 2, 2018 (now U.S. Pat. No. 10,665,357), which is a continuation of U.S. patent application Ser. No. 14/398,946 filed Nov. 4, 2014 (now U.S. Pat. No. 9,892,806), which is a national stage application under 35 U.S.C. § 371 to International Application No. PCT/US2013/039743 filed May 6, 2013, which claims priority to U.S. Provisional Patent Application No. 61/642,614, filed May 4, 2012; the disclosures of which are incorporated herein by reference in their entireties.

The present application is also a continuation-in-part of U.S. patent application Ser. No. 16/126,100 filed Sep. 10, 2018, which is a divisional of U.S. patent application Ser. No. 14/620,390 filed Feb. 12, 2015 (now U.S. Pat. No. 10,102,936), which is a continuation-in-part of International Patent Application No. PCT/US2013/054961 filed Aug. 14, 2013, which claims the benefit of U.S. Provisional Patent Application Ser. No. 61/683,021, filed Aug. 14, 2012; the entireties of which are incorporated herein by reference.

The present application is also a continuation-in-part of U.S. patent application Ser. No. 15/996,868 filed Jun. 4, 2018, which is a divisional of U.S. patent application Ser. No. 14/713,093 filed May 15, 2015 (now U.S. Pat. No. 10,008,296), which claims the benefit of U.S. Provisional Patent Application No. 61/993,857 filed May 15, 2014.

U.S. patent application Ser. No. 14/713,093 is also a continuation-in-part of U.S. patent application Ser. No. 14/620,465 filed Feb. 12, 2015 (now U.S. Pat. No. 9,916,910), which in turn is a continuation-in-part of PCT/US2013/054973 filed Aug. 14, 2013, which in turn claims the benefit of U.S. Provisional Patent Application No. 61/683,030 filed Aug. 14, 2012.

U.S. patent application Ser. No. 14/713,093 is also a continuation-in-part of U.S. patent application Ser. No. 14/403,082 filed Nov. 21, 2014, (now U.S. Pat. No. 9,786,393), which in turn is a national stage entry under 35 U.S.C. 371 of PCT/US2013/042070 filed May 21, 2013, which in turn claims the benefit of U.S. Provisional Patent Application No. 61/649,593 filed May 21, 2012. The entireties of the aforementioned applications are all incorporated herein by reference.

The present application is also a continuation-in-part of U.S. patent application Ser. No. 15/883,612 filed Jan. 30, 2018, which is a continuation of U.S. patent application Ser. No. 14/620,465 filed Feb. 12, 2015 (now U.S. Pat. No. 9,916,910), which is a continuation-in-part of PCT/US2013/054973 filed Aug. 14, 2013, which claims the benefit of U.S. Provisional Patent Application Ser. No. 61/683,030, filed Aug. 14, 2012; the entireties of which are incorporated herein by reference.

The present application is also a continuation-in-part of U.S. patent application Ser. No. 16/885,512 filed May 28, 2020, which is a continuation of U.S. patent application Ser. No. 15/729,376 filed Oct. 10, 2017 (now U.S. Pat. No. 10,672,523), which is a continuation of U.S. patent application Ser. No. 14/423,149 filed Feb. 23, 2015 (now U.S. Pat. No. 9,786,394), which is a U.S. national stage application under 35 U.S.C. § 371 of PCT/US2013/056023 filed Aug. 21, 2013, which claims the benefit of U.S. Provisional Patent Application Ser. No. 61/691,533 filed Aug. 21, 2012; and PCT/US2013/056023 is a continuation-in-part of PCT International Patent Application Serial No. PCT/US2013/042070 filed May 21, 2013, which claims the benefit of U.S. Provisional Patent Application Ser. No. 61/649,593 filed May 21, 2012; the entireties of which are all incorporated herein by reference.

The present application is also a continuation-in-part of U.S. patent application Ser. No. 16/710,048 filed Dec. 11, 2019, which is a divisional of U.S. patent application Ser. No. 15/419,227 filed Jan. 30, 2017, which is a divisional of U.S. patent application Ser. No. 14/289,525 filed May 28, 2014 which claims the benefit of U.S. Provisional Patent Application No. 61/827,943 filed May 28, 2013. U.S. patent application Ser. No. 14/289,525 is further a continuation-in-part of International Patent Application No. PCT/US2013/042070 filed May 21, 2013, which claims the benefit of U.S. Provisional Patent Application No. 61/649,593 filed May 21, 2012. The entireties of all of the foregoing applications are hereby incorporated herein by reference.

The present application is also a continuation-in-part of U.S. patent application Ser. No. 16/682,495 filed Nov. 13, 2019, which is a continuation of U.S. patent application Ser. No. 16/507,637 filed Jul. 10, 2019, which is a divisional of U.S. patent application Ser. No. 14/910,433 filed Feb. 5, 2016, which is a U.S. national stage application under 35 U.S.C. § 371 of PCT Application No. PCT/US2014/062094, filed Oct. 24, 2014, which claims the benefit of U.S. Provisional Patent Application Ser. No. 61/895,267 filed Oct. 24, 2013. The entireties of foregoing applications are incorporated herein by reference.

BACKGROUND

The field of the present invention in one aspect relates to nuclear steam supply systems, and more particularly to a steam supply system for small modular reactors.

Pressurized water reactors (PWRs) for nuclear power generation facilities utilize both pumped and natural circulation of the primary coolant to both cool the reactor core and heat the secondary coolant to produce steam which may be working fluid for a Rankine power generation cycle. The existing natural circulation PWRs suffer from the drawback that the heat exchange equipment is integrated with and located within the reactor pressure vessel. Such an arrangement not only makes the heat exchange equipment difficult to repair and/or service, but also subjects the equipment to corrosive conditions and results in increased complexity and a potential increase in the number of penetrations into the reactor pressure vessel. In addition, locating the heat exchange equipment within the reactor pressure vessel creates problems with respect to radiation levels encountered for crews to repair the heat exchange equipment in proximity to the radioactively hot components of the reactor vessel. The general view has also been that the heat exchangers should be located in the reactor vessel to achieve natural circulation in those systems which may utilize this type of flow circulation.

The reduction of vulnerabilities within nuclear power generation facilities is always an ongoing issue. For example, large pipes are seen as creating the potential for a "large break" Loss of Coolant Accident (LOCA) event, and thus it is desirable to remove large pipes where possible.

The present invention in another aspect relates to a nuclear steam supply system, and more particularly to a start-up sub-system for heating a primary coolant in a nuclear steam supply system.

For starting up a nuclear steam supply system in a typical pressurized water reactor, it is necessary to heat the reactor coolant water to an operating temperature, which is known in the art as the no-load operating temperature of the reactor coolant water. Furthermore, in conventional nuclear steam supply systems it is necessary to ensure full flow through the coolant loop and the core. This is necessary to ensure that a completely turbulated flow across the fuel core exists as the control rods are being withdrawn in order to avoid localized heating and boiling, and to ensure that the reactivity of water is in the optimal range during start-up and during normal operation.

In the present state of the art, the desired start-up condition is achieved by the use of the reactor coolant pump whose primary function is to circulate coolant through the reactor core during normal operating conditions. In normal operation, the substantial frictional heat produced by the reactor coolant pumps is removed by external cooling equipment (heat exchangers) to maintain safe operating temperature. However, during start-up external cooling is disabled so that the frictional heat can be directly transferred to the reactor coolant water, enabling it to reach no-load operating temperature. As the reactor coolant water is being heated, the pressure in the reactor coolant loop is increased using a bank of internal heaters which evaporates some reactor coolant water and increases the pressure in the reactor coolant system by maintaining a two-phase equilibrium.

The above process for heating the reactor water inventory during start-up is not available in a passively safe nuclear steam supply system. This is because such a passively safe nuclear steam supply system does not include or require any pumps, and thus the use of the frictional heat is unavailable for heating the reactor water inventory. Thus, a need exists for a start-up system for heating the reactor water inventory in a passively safe nuclear steam supply system.

The present invention in another aspect relates to a passive system for cooling a spent nuclear fuel pool and a method of passively cooling a spent nuclear fuel pool.

A spent fuel pool is a body of water inside a nuclear power plant's fuel storage building which is typically about forty feet deep and which is equipped with fuel racks to store spent nuclear fuel that is discharged from the reactor during refueling outages. The pool keeps the fuel in a safe underwater configuration absorbing the fuel's radiation and its decay heat. The decay heat deposited by the fuel into the pool's water must be removed to prevent uncontrolled heat-up of the pool's water, which would result in undesirable evaporation of the fuel pool water. In existing nuclear plant design practice, the pool's water is cooled by pumping it though a heat exchanger, which is typically served by the plant's component cooling water, a closed loop purified water stream that cools a variety of equipment in the plant and is in turn cooled by a natural source of water such as a lake, a river, or an ocean.

This conventional spent fuel pool cooling system has several drawbacks, the most notable of which is the dependence of the pool cooling on pumps and motors to circulate water through both sides of the heat exchanger. During a power outage or some other event that disables the pumps and motors, the water in the spent fuel pool will boil and evaporate which can lead to the fuel being exposed above the surface level of the pool water. Another drawback is the continuous release of water vapor inside the plant's fuel storage building which adds to the building's humidity and temperature affecting its habitability and increasing its HVAC burden. The open pool also attracts dust and particulates from the ambient air turning them into radioactive material which must be suctioned from the pool, filtered, and collected for disposal as contaminated waste.

Thus, a need exists for a system and method for cooling a spent nuclear fuel pool that does not rely on pumps and motors. A need also exists for a system and method for reducing the humidity inside of a nuclear power plant fuel storage building. Furthermore, a need exists for a system and method for preventing dust and particulates from collecting in the spent fuel pool.

The present invention in another aspect relates nuclear reactors, and more particularly to a reactor containment system with passive thermal energy release control.

The containment for a nuclear reactor is defined as the enclosure that provides environmental isolation to the nuclear steam supply system (NSSS) of the plant in which nuclear fission is harnessed to produce pressurized steam. A commercial nuclear reactor is required to be enclosed in a pressure retaining structure which can withstand the temperature and pressure resulting from the most severe accident that can be postulated for the facility. The most severe energy release accidents that can be postulated for a reactor and its containment can be of two types.

First, an event that follows a loss-of-coolant accident (LOCA) and involve a rapid large release of thermal energy from the plant's nuclear steam supply system (NSSS) due to a sudden release of reactor's coolant in the containment space. The reactor coolant, suddenly depressurized, would violently flash resulting in a rapid rise of pressure and temperature in the containment space. The in-containment space is rendered into a mixture of air and steam. LOCA can be credibly postulated by assuming a sudden failure in a pipe carrying the reactor coolant.

Another second thermal event of potential risk to the integrity of the containment is the scenario wherein all heat rejection paths from the plant's nuclear steam supply system (NSSS) are lost, forcing the reactor into a "scram." A station black-out is such an event. The decay heat generated in the reactor must be removed to protect it from an uncontrolled pressure rise.

More recently, the containment structure has also been called upon by the regulators to withstand the impact from a crashing aircraft. Containment structures have typically been built as massive reinforced concrete domes to withstand the internal pressure from LOCA. Although its thick concrete wall could be capable of withstanding an aircraft impact, it is also a good insulator of heat, requiring pumped heat rejection systems (employ heat exchangers and pumps) to reject its unwanted heat to the external environment (to minimize the pressure rise or to remove decay heat). Such heat rejection systems, however, rely on a robust power source (off-site or local diesel generator, for example) to power the pumps. The station black out at Fukushima in the wake of the tsunami is a sobering reminder of the folly of relying on pumps.

Present day containment structures with their monolithic reinforced concrete construction make it extremely difficult and expensive to remove and install a large capital requirement such as a steam generator in the NSSS enclosed by them. To make a major equipment change out, a hatch opening in the thick concrete dome has to be made at great expense and down time for the reactor. Unfortunately, far too many steam generators have had to be changed out at numerous reactors in the past 25 years by cutting through the containment dome at billions of dollars in cost to the nuclear power industry.

In a nuclear plant, the component cooling water (CCW) system is a closed loop of purified water that serves to cool a variety of equipment in the plant. Among its important auxiliary roles is extracting the decay heat from the reactor water after the reactor is shutdown, which is typically performed inside a tubular heat exchanger known variously as the "decay heat cooler" or "residual heat removal heat exchanger." The heat transferred to component cooling water in the decay heat cooler and other heat exchangers that are used to cool electrical and mechanical machinery occurs across the walls of tubes which sequesters or isolates the component cooling water from the radioactive contamination that may be associated with the reactor water. Thus, the component cooling system essentially serves to provide the means to remove waste heat from all equipment in the plant that requires cooling as well as to serve as a barrier against release of radiation to the environment.

The heat collected by the component cooling water from plant equipment, however, raises its temperature. The heated component cooling water is typically cooled in a once-through flow system by rejecting its heat to the environment in a shell-and-tube heat exchanger using a natural body of water such a lake, river, or sea. The component cooling water system draws cool raw water from the natural body of water, which is pumped through the component cooling water heat exchanger and then returns the now heated water back to the natural body of water. Such a CCW system, however, suffers from several operational problems such as intrusion of debris carried over by the raw cooling water, biological fouling of heat exchanger tubes by raw water, and corrosion of pipes carrying the raw water into the heat exchanger. Operating nuclear plants often report significant accumulation of sediments and other foulants in the headers of CCW heat exchangers requiring frequent maintenance and degrading thermal performance.

The above weaknesses in the state-of-the-art call for an improved nuclear reactor containment system and component cooling water system.

The present invention in another aspect relates nuclear reactors, and more particularly to a reactor and reactor containment system with passive reactor cooling system for reactor shutdown operation.

The containment for a nuclear reactor is defined as the enclosure that provides environmental isolation to the nuclear steam supply system (NSSS) of the plant in which nuclear fission is harnessed to produce pressurized steam. A commercial nuclear reactor is required to be enclosed in a pressure retaining structure which can withstand the temperature and pressure resulting from the most severe accident that can be postulated for the facility. The most severe energy release accidents that can be postulated for a reactor and its containment can be of two types.

First, an event that follows a loss-of-coolant accident (LOCA) and involve a rapid large release of thermal energy from the plant's nuclear steam supply system (NSSS) due to a sudden release of reactor's coolant in the containment space. The reactor coolant, suddenly depressurized, would violently flash resulting in a rapid rise of pressure and temperature in the containment space. The in-containment space is rendered into a mixture of air and steam. LOCAs can be credibly postulated by assuming a sudden failure in a pipe carrying the reactor coolant.

Another second thermal event of potential risk to the integrity of the containment is the scenario wherein all heat rejection paths from the plant's nuclear steam supply system (NSSS) are lost, forcing the reactor into a "scram." A station black-out is such an event. The decay heat generated in the reactor must be removed to protect it from an uncontrolled pressure rise.

More recently, the containment structure has also been called upon by the regulators to withstand the impact from a crashing aircraft. Containment structures have typically been built as massive reinforced concrete domes to withstand the internal pressure from LOCA. Although its thick concrete wall could be capable of withstanding an aircraft impact, it is also unfortunately a good insulator of heat, requiring pumped heat rejection systems (employ heat exchangers and pumps) to reject its unwanted heat to the external environment (to minimize the pressure rise or to remove decay heat). Such heat rejection systems, however, rely on a robust power source (off-site or local diesel generator, for example) to power the pumps. The station black out at Fukushima in the wake of the tsunami is a sobering reminder of the folly of relying on pumps. The above weaknesses in the state-of-the-art call for an improved nuclear reactor containment system.

Besides the foregoing containment cooling issues, a nuclear reactor continues to produce a substantial quantity of heat energy after it has been shut down. FIG. 20 shows a typical heat generation curve of a light water reactor subsequent to a scram (i.e., a sudden cessation of chain reaction by a rapid insertion of control rods or other means). In the current reactor designs, as noted above, the reactor's decay heat is removed by the plant's residual heat removal (RHR) system which utilizes a system of pumps and heat exchangers to convey the heat energy to a suitable source of cooling water maintained by the plant. As can be seen from FIG. 20, the reactor's decay heat begins to attenuate exponentially with time but is still quite significant to threaten the reactor's safety if the generated heat were not removed (as was the case at Fukushima where the pumps needed to extract the reactors' heat failed because of submergence of their electric motors in the tsunami driven water surge). The Fukushima disaster provided a stark lesson in the vulnerability of forced flow (pump dependent) systems under extreme environmental conditions.

An improved reactor cooling system is desired.

The present invention in another aspect relates nuclear steam supply systems, and more particularly to a steam generator used in a modular reactor system having natural gravity driven coolant flow circulation.

Pressurized water reactors (PWRs) for nuclear power generation facilities utilize both pumped and natural circulation of the primary coolant (water) to both cool the reactor core and heat the secondary coolant (water) to produce steam which may be working fluid for a Rankine power generation cycle. The existing natural circulation PWRs suffer from the drawback that the heat exchange equipment is integrated with and located within the reactor pressure vessel. Such an arrangement not only makes the heat exchange equipment difficult to repair and/or service, but also subjects the equipment to corrosive conditions and results in increased complexity and a potential increase in the number of penetrations into the reactor pressure vessel. In addition, locating the heat exchange equipment within the reactor pressure vessel creates problems with respect to radiation levels encountered for crews to repair the heat exchange equipment in proximity to the radioactively hot components of the reactor vessel. The general view has also been that the heat exchangers should be located in the reactor vessel to achieve natural circulation in those systems which may utilize this type of flow circulation.

The steam generator (SG) is a vitally important tubular heat exchanger in a pressurized water reactor (PWR). It serves to boil the purified Rankine cycle secondary coolant water (also called the "secondary" side water or feedwater) into steam using the heat energy from the reactor primary coolant heated by its circulation through the reactor's core (called the "primary" side). Because of the high operating pressure (typically over 2200 psi) of the reactor coolant, the steam generator is a massive piece of vertically arrayed equipment. The transfer of heat energy occurs from the primary fluid flowing inside the tubes to the secondary water located in the space outside the tubes.

Improvements in nuclear steam generators are desired.

SUMMARY

A nuclear reactor vessel includes a shell and a head affixed to the upper end of the shell. The shell has an internal cavity with a central axis and an upper flange portion, wherein the internal cavity is configured to receive a reactor core. The head has a head flange portion, with the upper annular flange portion is coupled to the head annular flange portion, and the flanges are configured to minimize outward extension from the cavity while still providing desired leak protection at the interface between the shell and the head.

In a first separate aspect of the present invention, the upper flange portion of the shell is annular and extends into the internal cavity, and the head flange portion of the head is also annular and extends outward from the internal cavity.

In a second separate aspect of the present invention, a reactor core including nuclear fuel is disposed within the internal cavity of the nuclear reactor vessel, and a steam generating vessel including at least one heat exchanger section is fluidicly coupled to the reactor vessel. The upper flange portion of the shell extends into the internal cavity, and the head flange portion of the head extends outward from the internal cavity.

In a third separate aspect of the present invention, a reactor core including nuclear fuel is disposed within the internal cavity of the nuclear reactor vessel, and a steam generating vessel including at least one heat exchanger section is fluidicly coupled to the reactor vessel. The upper flange portion of the shell extends into the internal cavity, and the head flange portion of the head extends outward from the internal cavity. An inner surface of the first head portion is disposed closer to the central axis than an inner surface of the first shell portion along respective parallel radial lines extending from the central axis.

In a fourth separate aspect of the present invention, a method for generating steam utilizes the nuclear reactor vessel. The reactor vessel is capped with a head, and a reactor core is disposed within the reactor vessel. The upper flange portion extends into the internal cavity, and the head flange portion extends outward from the internal cavity. A liquid primary coolant is heated in the nuclear reactor core, and the heated primary coolant is discharged from a top portion of the reactor vessel into a steam generating vessel. The primary coolant is flowed through the reactor vessel and steam generating vessel in a closed circulation loop.

In a fifth separate aspect of the present invention, one or more of the preceding separate aspects may be employed in combination.

Advantages of the improvements will be apparent from the drawings and the description of the embodiments below.

The present disclosure also provides an improved nuclear steam supply system and start-up sub-system therefor that overcomes the deficiencies of the foregoing existing arrangements. The present invention also provides an improved method of heating a primary coolant in a nuclear steam supply system to a no load operating temperature.

In one aspect, the invention can be a nuclear steam supply system comprising: a reactor vessel having an internal cavity, a reactor core comprising nuclear fuel disposed within the internal cavity; a steam generating vessel fluidly coupled to the reactor vessel; a riser pipe positioned within the steam generating vessel and fluidly coupled to the reactor vessel; a primary coolant at least partially filling a primary coolant loop formed within the reactor vessel and the steam generating vessel; and a start-up sub-system comprising: an intake conduit having an inlet located in the primary coolant loop; a pump fluidly coupled to the intake conduit for pumping a portion of the primary coolant from the primary coolant loop through the intake conduit and into an injection conduit; at least one heating element for heating the portion of the primary coolant to form a heated portion of the primary coolant; and an injection nozzle fluidly coupled to the injection conduit and positioned within the riser pipe for injecting the heated portion of the primary coolant into the riser pipe.

In another aspect, the invention can be a nuclear steam supply system comprising: a reactor vessel having an internal cavity, a reactor core comprising nuclear fuel disposed within the internal cavity; a steam generating vessel fluidly coupled to the reactor vessel; a primary coolant loop formed within the reactor vessel and the steam generating vessel, a primary coolant in the primary coolant loop; and a start-up sub-system fluidly coupled to the primary coolant loop, the start-up sub-system configured to: (1) receive a portion of the primary coolant from the primary coolant loop; (2) heat the portion of the primary coolant to form a heated portion of the primary coolant; and (3) inject the heated portion of the primary coolant into the primary coolant loop.

In yet another aspect, the invention can be a method of heating a primary coolant to a no-load operating temperature in a nuclear steam supply system, the method comprising: a) filling a primary coolant loop within a reactor vessel and a steam generating vessel that are fluidly coupled together with a primary coolant; b) drawing a portion of the primary coolant from the primary coolant loop and into a start-up sub-system; c) heating the portion of the primary coolant within the start-up sub-system to form a heated portion of the primary coolant; and d) injecting the heated portion of the primary coolant into the primary coolant loop.

In a further aspect, the invention can be a method of starting up a nuclear steam supply system, the method comprising: a) at least partially filling a primary coolant loop within a reactor vessel and a steam generating vessel that are fluidly coupled together with a primary coolant, wherein the primary coolant loop comprises a riser pipe in the steam generating vessel; b) drawing a portion of the primary coolant from the primary coolant loop and into a start-up sub-system; c) heating the portion of the primary coolant within the start-up sub-system to form a heated portion of the primary coolant; and d) introducing the heated portion of the primary coolant into the riser pipe of the steam generating vessel.

The present disclosure also provides a passively-cooled spent nuclear fuel pool system and method therefor that overcomes the deficiencies of the foregoing existing arrangements. The approaches disclosed herein cool the body of water in the spent fuel pool, which is heated by radioactive fuel decay via evaporation, and also convection-conduction using an external heat sink relying on natural gravity-driven flow circulation patterns as further described herein. These approaches do not rely on pumps or available electric power to effectively cool the spent fuel pool. The method of heat rejection therefore does not need any active components or even any passive actuating devices to initiate the cooling processes. The heat rejection will automatically start and continue as long as there is a heat source in the pool (i.e. spent fuel assemblies).

In one aspect of spent fuel pool cooling, a containment vessel is circumscribed by an annular reservoir containing a liquid coolant such as water. A portion of the cylindrical wall of the vessel is shared with and forms a common thermally-conductive wall with the spent fuel pool between the reservoir and spent fuel pool. In one embodiment, this shared common wall is made of a high conductivity metal, such as without limitation carbon or low alloy steel. This defines a conductive heat transfer wall between the spent fuel pool and the reservoir. The inner surface of the heat transfer wall (i.e. containment vessel) is in direct contact with and wetted by the spent fuel pool water. The coolant water outside the containment vessel in the annular reservoir is in contact with the external surface of the heat transfer wall containment vessel. This configuration enables direct heat transfer from the heated spent fuel pool water to the lower temperature coolant reservoir via conductive heat transfer through the metal heat transfer wall of the containment vessel to enhance cooling of the fuel pool. Other features are disclosed herein which further aid direct cooling of the body of water in the spent fuel pool via gravity driven thermal gradient induced flow patterns.

In one form, a passively-cooled spent nuclear fuel pool system includes: a containment vessel comprising a thermally conductive cylindrical shell formed of metal; an annular reservoir surrounding the cylindrical shell of the containment vessel, the annular reservoir holding a liquid coolant to form a heat sink; and a spent nuclear fuel pool disposed inside the containment vessel, the fuel pool comprising: a floor and a first peripheral sidewall extending upwards from the floor that collectively define an interior cavity; a body of water disposed in the interior cavity and having a surface level, the water being in contact with the first peripheral sidewall; and at least one spent nuclear fuel rod submerged in the body of water that heats the body of water; wherein the first peripheral sidewall of the fuel pool is formed by a portion of the cylindrical shell of the containment vessel adjacent to the spent fuel pool which defines a shared common heat transfer wall, the heat transfer wall operable to transfer heat from the body of water in the spent fuel pool to the heat sink for cooling the body of water.

In another form, a passively-cooled nuclear spent fuel pool system includes: a containment vessel comprising a thermally-conductive cylindrical shell formed of metal; an annular reservoir surrounding the cylindrical shell of the containment vessel, the annular reservoir holding a coolant that defines a heat sink; a spent nuclear fuel pool disposed in the containment vessel, the fuel pool comprising: a floor and a first peripheral sidewall extending upwards from the floor that collectively define an interior cavity; a body of water disposed in the interior cavity and having a surface level, at least one spent nuclear fuel rod submerged in the body of water that heats the water to form water vapor via evaporation; a removable lid covering the spent nuclear fuel pool and configured to form a hermetically sealed vapor space between the surface level of the body of water and the lid; a passive heat exchange sub-system comprising an assembly of: a primary riser section fluidly coupled to the vapor space; at least one downcomer fluidly coupled to the primary riser section for receiving the water vapor from the primary riser section, the water vapor condensing within the at least one downcomer to form a condensed water vapor; and at least one return conduit fluidly coupled to the at least one downcomer, the at least one return conduit having an outlet located within the body of liquid water for returning the condensed water vapor to the body of liquid water; wherein the first peripheral sidewall of the fuel pool is formed by a portion of the cylindrical shell of the containment vessel adjacent to the spent fuel pool that defines a shared heat transfer wall, the heat transfer wall operable to transfer heat from the body of water in the spent fuel pool to the heat sink for cooling the body of water.

A method for cooling a nuclear spent fuel pool is provided. The method includes: providing a spent fuel pool arranged inside a containment vessel and an annular reservoir surrounding the containment vessel at least partially filled with coolant water at a first temperature, the spent fuel pool and containment vessel sharing a thermally-conductive common wall disposed between the spent fuel pool and the annular reservoir; at least partially filing the spent nuclear fuel pool with a body of water having a surface level; submerging a spent fuel rack containing at least one nuclear spent fuel rod in the body of water in the spent fuel pool; heating the water in the spent fuel pool with the at least one spent fuel rod to a second temperature higher than first temperature; contacting the common wall with the heated water in the spent fuel pool; transferring heat from the heated water in the spent fuel pool through the common wall to the coolant water in the annular reservoir thereby cooling the heated water in the spent fuel pool.

In another aspect, the invention can also be a passively-cooled spent nuclear fuel pool system comprising: a spent nuclear fuel pool comprising: a body of liquid water having a surface level, at least one spent nuclear fuel rod submerged in the body of liquid water that heats the body of liquid water; a lid covering the spent nuclear fuel pool to form a hermetically sealed vapor space between the surface level of the body of liquid water and the lid, the lid comprising a first lid section and a second lid section; and a first divider extending from the lid a partial distance into the body of liquid water to divide the vapor space into a first vapor space section located between the first lid section and the body of liquid water and a second vapor space section located between the second lid section and the body of liquid water; and a passive heat exchange sub-system comprising: a riser conduit comprising a first riser inlet section having a first inlet positioned within the first vapor space section, a second riser inlet section having a second inlet positioned within the second vapor space section and a primary riser section, wherein the riser conduit receives water vapor from the first and second vapor space sections; at least one downcomer fluidly coupled to the primary riser section for receiving the water vapor from the primary riser section, the water vapor condensing within the at least one downcomer to form a condensed water vapor; and at least one return conduit fluidly coupled to the at least one downcomer, the at least one return conduit having an outlet located within the body of liquid water for returning the condensed water vapor to the body of liquid water.

In another aspect, the invention can be a passively-cooled spent nuclear fuel pool system comprising: a spent nuclear fuel pool comprising: a body of liquid water having a surface level, at least one spent nuclear fuel rod submerged in the body of liquid water that heats the body of liquid water; and a lid covering the spent nuclear fuel pool to create a vapor space between the surface level of the body of liquid water and the lid; and a passive heat exchange sub-system comprising: at least one riser conduit having an inlet located within the vapor space for receiving water vapor from the vapor space; at least one downcomer conduit fluidly coupled to the riser conduit for receiving the water vapor from the riser conduit, the water vapor condensing within the downcomer conduit to form a condensed water vapor; and at least one return conduit fluidly coupled to the at least one downcomer conduit, the return conduit having an outlet located within the body of liquid water for returning the condensed water vapor to the body of liquid water.

In yet another aspect, the invention can be a passively-cooled spent nuclear fuel pool system comprising: a spent nuclear fuel pool comprising a body of liquid water having a surface level, at least one spent nuclear fuel rod submerged in the body of liquid water that heats the body of liquid water; a lid covering the spent nuclear fuel pool to create a hermetically sealed vapor space between the surface level of the body of liquid water and the lid; and a passive heat exchange sub-system fluidly coupled to the vapor space, the passive heat exchange sub-system configured to: (1) receive water vapor from the vapor space; (2) remove thermal energy from the received water vapor, thereby condensing the water vapor to form a condensed water vapor; and (3) return the condensed water vapor to the body of liquid water.

In a further aspect, the invention can be a method of passively cooling a spent nuclear fuel pool comprising: a) covering the spent nuclear fuel pool with a lid thereby forming a vapor space having water vapor between the lid and a surface level of a body of liquid water located within the spent fuel pool; b) passively flowing the water vapor from the vapor space through a heat exchange sub-system that removes thermal energy from the water vapor to form a condensed water vapor; and c) passively flowing the condensed water vapor from the heat exchange sub-system to the body of liquid water.

In a still further aspect, the invention can be a method of passively cooling a spent nuclear fuel pool comprising: a) at least partially filing the spent nuclear fuel pool with a body of liquid water having a surface level; b) submerging at least one nuclear fuel rod in the body of liquid water, the at least one nuclear fuel rod heating the body of liquid water; c) covering the body of a liquid water with a lid to form a hermetically sealed vapor space between the surface level of the body of liquid water and the lid, the lid comprising a first lid section and a second lid section; d) dividing the vapor space into a first vapor space section located between the first lid section and the body of liquid water and a second vapor space section located between the second lid section and the body of liquid water, the first and second vapor space sections being hermetically isolated from one another by a divider; e) fluidly coupling a heat exchange sub-system to the spent nuclear fuel pool, the heat exchange sub-system having a riser conduit, a downcomer conduit and a return conduit that are fluidly coupled together, the riser conduit having an inlet positioned within each of the first and second vapor space sections and the return conduit having an outlet positioned within the body of liquid water; and wherein water vapor flows from the first and second water vapor space sections to the riser conduit and from the riser conduit into the downcomer conduit, wherein the water vapor condenses within the downcomer conduit to form a condensed water vapor, and wherein the condensed water vapor flows from the downcomer conduit and into the return conduit and from the return conduit into the body of liquid water.

The present disclosure also provides a passively-cooled spent nuclear fuel pool system and method therefor that overcomes the deficiencies of the foregoing existing arrangements.

In one aspect, the invention can be a passively-cooled spent nuclear fuel pool system comprising: a spent nuclear fuel pool comprising: a body of liquid water having a surface level, at least one spent nuclear fuel rod submerged in the body of liquid water that heats the body of liquid water; a lid covering the spent nuclear fuel pool to form a hermetically sealed vapor space between the surface level of the body of liquid water and the lid, the lid comprising a first lid section and a second lid section; and a first divider extending from the lid a partial distance into the body of liquid water to divide the vapor space into a first vapor space section located between the first lid section and the body of liquid water and a second vapor space section located between the second lid section and the body of liquid water; and a passive heat exchange sub-system comprising: a riser conduit comprising a first riser inlet section having a first inlet positioned within the first vapor space section, a second riser inlet section having a second inlet positioned within the second vapor space section and a primary riser section, wherein the riser conduit receives water vapor from the first and second vapor space sections; at least one downcomer fluidly coupled to the primary riser section for receiving the water vapor from the primary riser section, the water vapor condensing within the at least one downcomer to form a condensed water vapor; and at least one return conduit fluidly coupled to the at least one downcomer, the at least one return conduit having an outlet located within the body of liquid water for returning the condensed water vapor to the body of liquid water.

In another aspect, the invention can be a passively-cooled spent nuclear fuel pool system comprising: a spent nuclear fuel pool comprising: a body of liquid water having a surface level, at least one spent nuclear fuel rod submerged in the body of liquid water that heats the body of liquid water; and a lid covering the spent nuclear fuel pool to create a vapor space between the surface level of the body of liquid water and the lid; and a passive heat exchange sub-system comprising: at least one riser conduit having an inlet located within the vapor space for receiving water vapor from the vapor space; at least one downcomer conduit fluidly coupled to the riser conduit for receiving the water vapor from the riser conduit, the water vapor condensing within the downcomer conduit to form a condensed water vapor; and at least one return conduit fluidly coupled to the at least one downcomer conduit, the return conduit having an outlet located within the body of liquid water for returning the condensed water vapor to the body of liquid water.

In yet another aspect, the invention can be a passively-cooled spent nuclear fuel pool system comprising: a spent nuclear fuel pool comprising a body of liquid water having a surface level, at least one spent nuclear fuel rod submerged in the body of liquid water that heats the body of liquid water; a lid covering the spent nuclear fuel pool to create a hermetically sealed vapor space between the surface level of the body of liquid water and the lid; and a passive heat exchange sub-system fluidly coupled to the vapor space, the passive heat exchange sub-system configured to: (1) receive water vapor from the vapor space; (2) remove thermal energy from the received water vapor, thereby condensing the water vapor to form a condensed water vapor; and (3) return the condensed water vapor to the body of liquid water.

In a further aspect, the invention can be a method of passively cooling a spent nuclear fuel pool comprising: a)

covering the spent nuclear fuel pool with a lid thereby forming a vapor space having water vapor between the lid and a surface level of a body of liquid water located within the spent fuel pool; b) passively flowing the water vapor from the vapor space through a heat exchange sub-system that removes thermal energy from the water vapor to form a condensed water vapor; and c) passively flowing the condensed water vapor from the heat exchange sub-system to the body of liquid water.

In a still further aspect, the invention can be a method of passively cooling a spent nuclear fuel pool comprising: a) at least partially filing the spent nuclear fuel pool with a body of liquid water having a surface level; b) submerging at least one nuclear fuel rod in the body of liquid water, the at least one nuclear fuel rod heating the body of liquid water; c) covering the body of a liquid water with a lid to form a hermetically sealed vapor space between the surface level of the body of liquid water and the lid, the lid comprising a first lid section and a second lid section; d) dividing the vapor space into a first vapor space section located between the first lid section and the body of liquid water and a second vapor space section located between the second lid section and the body of liquid water, the first and second vapor space sections being hermetically isolated from one another by a divider; e) fluidly coupling a heat exchange sub-system to the spent nuclear fuel pool, the heat exchange sub-system having a riser conduit, a downcomer conduit and a return conduit that are fluidly coupled together, the riser conduit having an inlet positioned within each of the first and second vapor space sections and the return conduit having an outlet positioned within the body of liquid water; and wherein water vapor flows from the first and second water vapor space sections to the riser conduit and from the riser conduit into the downcomer conduit, wherein the water vapor condenses within the downcomer conduit to form a condensed water vapor, and wherein the condensed water vapor flows from the downcomer conduit and into the return conduit and from the return conduit into the body of liquid water.

The present disclosure also provides a component cooling water system that overcomes the deficiencies of the foregoing system.

In one embodiment, a component cooling water system for a nuclear power plant includes a containment vessel defining containment space configured for housing a nuclear reactor, a containment enclosure structure surrounding the containment vessel, an annular water reservoir formed between the containment vessel and containment enclosure structure, the annular water reservoir configured to provide a heat sink for dissipating thermal energy, and a shell-less heat exchanger having an exposed heat transfer tube bundle immersed in water held within the annular water reservoir. Component cooling water from the plant flows through the tube bundle and is cooled by transferring heat to the annular water reservoir. The tube bundle is comprised of a plurality of heat transfer tubes. In one embodiment, the tube bundle is U-shaped.

In another embodiment, a component cooling water system for a nuclear power plant includes a containment vessel defining containment space configured for housing a nuclear reactor, a containment enclosure structure surrounding the containment vessel, an annular water reservoir formed between the containment vessel and containment enclosure structure, the annular water reservoir configured to provide a heat sink for dissipating thermal energy, a shell-less heat exchanger having an exposed heat transfer tube bundle comprised of a plurality of tubes immersed in water held within the annular water reservoir, and a discharge sparger positioned below the exposed tube bundle in the annular water reservoir. The sparger is configured and arranged to discharge water recirculated from the annular water reservoir through the tube bundle for cooling the tubes. Component cooling water from the plant flows through the tubes of the tube bundle and is cooled by transferring heat to the annular water reservoir.

According to another embodiment, a component cooling water system for a nuclear power plant includes a containment vessel defining containment space housing a nuclear reactor, a containment enclosure structure surrounding the containment vessel, an annular water reservoir formed between the containment vessel and containment enclosure structure, the annular water reservoir configured to provide a heat sink for dissipating thermal energy, a shell-less heat exchanger having an exposed heat transfer tube bundle comprised of a plurality of tubes immersed in water held within the annular water reservoir, and a plurality of substantially radial fins protruding outwards from the containment vessel towards the containment enclosure structure and located in the annular water reservoir. In this embodiment, the heat exchanger is located in a circumferentially-extending bay formed in the annular water reservoir between a pair of spaced apart adjacent fins. Component cooling water from the plant flows through the tubes of the tube bundle and is cooled by transferring heat to the annular water reservoir.

The present invention according to another aspect provides nuclear reactor containment system that overcomes the deficiencies of the foregoing containment system arrangements. The containment system generally includes an inner containment vessel which may be formed of steel or another ductile material and an outer containment enclosure structure (CES) thereby forming a double walled containment system. In one embodiment, a water-filled annulus may be provided between the containment vessel and the containment enclosure structure providing an annular cooling reservoir. The containment vessel may include a plurality of longitudinal heat transfer fins which extend (substantially) radial outwards from the vessel in the manner of "fin". The containment vessel thus serves not only as the primary structural containment for the reactor, but is configured and operable to function as a heat exchanger with the annular water reservoir acting as the heat sink. Accordingly, as further described herein, the containment vessel advantageously provides a passive (i.e. non-pumped) heat rejection system when needed during a thermal energy release accident such as a LOCA or reactor scram to dissipate heat and cool the reactor.

The present invention further provides a component cooling water system which overcomes the deficiencies of the foregoing cooling water system arrangements. As further described herein, the component cooling water system includes a heat exchanger which may be arranged and incorporated into the water-filled annulus (i.e. annular water reservoir). The water in the annulus may therefore serve as an active heat transfer medium which rejects heat from the cooling system via evaporation rather than utilizing a natural body of water.

In one embodiment according to the present disclosure, a nuclear reactor containment system includes a containment vessel configured for housing a nuclear reactor, a containment enclosure structure (CES) surrounding the containment vessel, and an annular reservoir formed between the containment vessel and containment enclosure structure (CES) for extracting heat energy from the containment space. In the event of a thermal energy release incident inside the containment vessel, heat generated by the containment vessel is transferred to the annular reservoir which operates to cool the containment vessel. In one embodiment, the annular reservoir contains water for cooling the containment vessel. A portion of the containment vessel may include substantially radial heat transfer fins disposed in the annular reservoir and extending between the containment vessel and containment enclosure structure (CES) to improve the dissipation of heat to the water-filled annular reservoir. When a thermal energy release incident occurs inside the containment vessel, a portion of the water in the annulus is evaporated and vented to atmosphere through the containment enclosure structure (CES) annular reservoir in the form of water vapor.

Embodiments of the system may further include an auxiliary air cooling system including a plurality of vertical inlet air conduits spaced circumferentially around the containment vessel in the annular reservoir. The air conduits are in fluid communication with the annular reservoir and outside ambient air external to the containment enclosure structure (CES). When a thermal energy release incident occurs inside the containment vessel and water in the annular reservoir is substantially depleted by evaporation, the air cooling system becomes operable by providing a ventilation path from the reservoir space to the external ambient. The ventilation system can thus be viewed as a secondary system that can continue to cool the containment ad infinitum.

According to another embodiment, a nuclear reactor containment system includes a containment vessel configured for housing a nuclear reactor, a containment enclosure structure (CES) surrounding the containment vessel, a water filled annulus formed between the containment vessel and containment enclosure structure (CES) for cooling the containment vessel, and a plurality of substantially radial fins protruding outwards from the containment vessel and located in the annulus. In the event of a thermal energy release incident inside the containment vessel, heat generated by the containment vessel is transferred to the water filled reservoir in the annulus through direct contact with the external surface of the containment vessel and its fins substantially radial thus cooling the containment vessel. In one embodiment, when a thermal energy release incident occurs inside the containment vessel and water in the annulus is substantially depleted by evaporation, the air cooling system is operable to draw outside ambient air into the annulus through the air conduits to cool the heat generated in the containment (which decreases exponentially with time) by natural convection. The existence of water in the annular region completely surrounding the containment vessel will maintain a consistent temperature distribution in the containment vessel to prevent warping of the containment vessel during the thermal energy release incident or accident.

In another embodiment, a nuclear reactor containment system includes a containment vessel including a cylindrical shell configured for housing a nuclear reactor, a containment enclosure structure (CES) surrounding the containment vessel, an annular reservoir containing water formed between the shell of the containment vessel and containment enclosure structure (CES) for cooling the containment vessel, a plurality of external (substantially) radial fins protruding outwards from the containment vessel into the annulus, and an air cooling system including a plurality of vertical inlet air conduits spaced circumferentially around the containment vessel in the annular reservoir. The air conduits are in fluid communication with the annular reservoir and outside ambient air external to the containment enclosure structure (CES). In the event of a thermal energy release incident inside the containment vessel, heat generated by the containment vessel is transferred to the annular reservoir via the (substantially) radial containment wall along with its internal and external fins which operates to cool the containment vessel.

Advantages and aspects of a nuclear reactor containment system according to the present disclosure include the following:

Containment structures and systems configured so that a severe energy release event as described above can be contained passively (e.g. without relying on active components such as pumps, valves, heat exchangers and motors);

Containment structures and systems that continue to work autonomously for an unlimited duration (e.g. no time limit for human intervention);

Containment structures fortified with internal and external ribs (fins) configured to withstand a projectile impact such as a crashing aircraft without losing its primary function (i.e. pressure & radionuclide (if any) retention and heat rejection); and Containment vessel equipped with provisions that allow for the ready removal (or installation) of major equipment through the containment structure.

A reactor cooling system according to the present disclosure provides a completely passive means to reject the reactor's decay heat without any reliance on and drawbacks of pumps and motors requiring an available electric power supply, as described above. In one embodiment, the cooling system relies entirely on gravity and varying fluid densities to induce flow through the cooling system. In one embodiment, this gravity driven system may be configured and referred to as a submerged bundled cooling system (SBCS) for convenience (this arbitrary nomenclature not being limiting in any respect). The cooling system is engineered to passively extract heat from the reactor primary coolant in the event of a station black out or another postulated accident scenario wherein the normal heat rejection path from the fuel core via the power plant's Rankine cycle is lost.

In one embodiment, a passive nuclear reactor shutdown cooling system includes a reactor vessel housing a nuclear fuel core inside, the reactor vessel containing a primary coolant heated by the fuel core, and a steam generator fluidly coupled to the reactor vessel and containing a liquid secondary coolant. The primary coolant circulates in a first closed flow loop between the reactor vessel and steam generator, the primary coolant transferring heat to the secondary coolant in the steam generator and producing secondary coolant steam. A heat exchanger includes an inventory of a liquid third coolant and a tube bundle, the tube bundle being submerged in the third coolant. The secondary coolant circulates via gravity flow in a second closed flow loop between the submerged tube bundle and the steam generator. The secondary coolant steam is extracted from the steam generator and flows in the second closed flow loop to the tube bundle, condenses forming condensate, and the condensate flows back to the steam generator.

In another embodiment, a passive nuclear reactor shutdown cooling system includes a reactor vessel housing a nuclear fuel core inside, the reactor vessel containing a primary coolant heated by the fuel core, and a heat exchanger including an inventory of cooling water and a tube bundle, the tube bundle being submerged in the cooling water. The primary coolant circulates via gravity flow in a first closed flow loop between the submerged tube bundle and the reactor vessel, wherein the primary coolant transfers heat to the inventory of cooling water in the heat exchanger and is cooled before flowing back to the reactor vessel.

In another embodiment, a method for passively cooling a nuclear reactor after shutdown is provided. The method includes: heating a primary coolant in a reactor vessel with a nuclear fuel core; heating a secondary coolant in a steam generator with the heated primary coolant to produce secondary coolant steam; extracting the secondary coolant steam from the steam generator; flowing the extracted secondary coolant steam through a tube bundle submerged in an inventory of cooling water in a pressure vessel; condensing the secondary coolant steam forming a secondary coolant condensate; and returning the secondary coolant condensate to the steam generator, wherein the secondary coolant steam and condensate circulates through a first closed flow loop between the tube bundle and steam generator. In one embodiment, the method further includes: heating of the cooling water in the pressure vessel by the secondary coolant steam; converting a portion of the cooling water into steam phase; extracting the cooling water steam from the pressure vessel; flowing the extracted cooling water steam through heat dissipater ducts attached to a reactor containment vessel in thermal communication with a heat sink; condensing the cooling water steam; and returning the condensed cooling water to the pressure vessel to replenish the inventory of cooling water.

Another method for passively cooling a nuclear reactor after shutdown is provided. The method includes: heating a primary coolant in a reactor vessel with a nuclear fuel core; extracting the heated primary coolant from the reactor vessel; flowing the heated primary coolant through a tube bundle submerged in an inventory of cooling water in a pressure vessel; cooling the heated primary coolant to lower its temperature; and returning the cooled primary coolant to the reactor vessel, wherein the primary coolant circulates through a first closed flow loop between the tube bundle and reactor vessel. In one embodiment, the method further includes: heating of the cooling water in the pressure vessel by the secondary coolant steam; converting a portion of the cooling water into steam phase; extracting the cooling water steam from the pressure vessel; flowing the extracted cooling water steam through heat dissipater ducts attached to a reactor containment vessel in thermal communication with a heat sink; condensing the cooling water steam; and returning the condensed cooling water to the pressure vessel to replenish the inventory of cooling water.

According to other aspects, the present invention further provides nuclear reactor containment system that overcomes the deficiencies of the foregoing arrangements for rejecting heat released into the environment within the containment by a thermal event. The containment system generally includes an inner containment vessel which may be formed of steel or another ductile material and an outer containment enclosure structure (CES) thereby forming a double walled containment system. In one embodiment, a water-filled annulus may be provided between the containment vessel and the containment enclosure structure providing an annular cooling reservoir. The containment vessel may include a plurality of longitudinal heat transfer fins which extend (substantially) radial outwards from the vessel in the manner of "fin". The containment vessel thus serves not only as the primary structural containment for the reactor, but is configured and operable to function as a heat exchanger with the annular water reservoir acting as the heat sink. Accordingly, as further described herein, the containment vessel advantageously provides a passive (i.e. non-pumped) heat rejection system when needed during a thermal energy release accident such as a LOCA or reactor scram to dissipate heat and cool the reactor.

In one embodiment according to the present disclosure, a nuclear reactor containment system includes a containment vessel configured for housing a nuclear reactor, a containment enclosure structure (CES) surrounding the containment vessel, and an annular reservoir formed between the containment vessel and containment enclosure structure (CES) for extracting heat energy from the containment space. In the event of a thermal energy release incident inside the containment vessel, heat generated by the containment vessel is transferred to the annular reservoir which operates to cool the containment vessel. In one embodiment, the annular reservoir contains water for cooling the containment vessel. A portion of the containment vessel may include substantially radial heat transfer fins disposed in the annular reservoir and extending between the containment vessel and containment enclosure structure (CES) to improve the dissipation of heat to the water-filled annular reservoir. When a thermal energy release incident occurs inside the containment vessel, a portion of the water in the annulus is evaporated and vented to atmosphere through the containment enclosure structure (CES) annular reservoir in the form of water vapor.

Embodiments of the system may further include an auxiliary air cooling system including a plurality of vertical inlet air conduits spaced circumferentially around the containment vessel in the annular reservoir. The air conduits are in fluid communication with the annular reservoir and outside ambient air external to the containment enclosure structure (CES). When a thermal energy release incident occurs inside the containment vessel and water in the annular reservoir is substantially depleted by evaporation, the air cooling system becomes operable by providing a ventilation path from the reservoir space to the external ambient. The ventilation system can thus be viewed as a secondary system that can continue to cool the containment ad infinitum.

According to another embodiment, a nuclear reactor containment system includes a containment vessel configured for housing a nuclear reactor, a containment enclosure structure (CES) surrounding the containment vessel, a water filled annulus formed between the containment vessel and containment enclosure structure (CES) for cooling the containment vessel, and a plurality of substantially radial fins protruding outwards from the containment vessel and located in the annulus. In the event of a thermal energy release incident inside the containment vessel, heat generated by the containment vessel is transferred to the water filled reservoir in the annulus through direct contact with the external surface of the containment vessel and its fins substantially radial thus cooling the containment vessel. In one embodiment, when a thermal energy release incident occurs inside the containment vessel and water in the annulus is substantially depleted by evaporation, the air cooling system is operable to draw outside ambient air into the annulus through the air conduits to cool the heat generated in the containment (which decreases exponentially with time) by natural convection. The existence of water in the annular region completely surrounding the containment vessel will maintain a consistent temperature distribution in the containment vessel to prevent warping of the containment vessel during the thermal energy release incident or accident.

In another embodiment, a nuclear reactor containment system includes a containment vessel including a cylindrical shell configured for housing a nuclear reactor, a containment enclosure structure (CES) surrounding the containment vessel, an annular reservoir containing water formed between the shell of the containment vessel and containment enclosure structure (CES) for cooling the containment vessel, a plurality of external (substantially) radial fins protruding outwards from the containment vessel into the annulus, and an air cooling system including a plurality of vertical inlet air conduits spaced circumferentially around the containment vessel in the annular reservoir. The air conduits are in fluid communication with the annular reservoir and outside ambient air external to the containment enclosure structure (CES). In the event of a thermal energy release incident inside the containment vessel, heat generated by the containment vessel is transferred to the annular reservoir via the (substantially) radial containment wall along with its internal and external fins which operates to cool the containment vessel.

Advantages and aspects of a nuclear reactor containment system according to the present disclosure include the following:

Containment structures and systems configured so that a severe energy release event as described above can be contained passively (e.g. without relying on active components such as pumps, valves, heat exchangers and motors);

Containment structures and systems that continue to work autonomously for an unlimited duration (e.g. no time limit for human intervention);

Containment structures fortified with internal and external ribs (fins) configured to withstand a projectile impact such as a crashing aircraft without losing its primary function (i.e. pressure & radionuclide (if any) retention and heat rejection); and Containment vessel equipped with provisions that allow for the ready removal (or installation) of major equipment through the containment structure.

The present disclosure also provides an improved steam generator for a nuclear steam supply system.

According to one embodiment, a nuclear steam supply system with natural gravity-driven coolant circulation includes: a vertically-oriented reactor vessel comprising an elongated cylindrical shell forming an internal cavity configured for containing primary coolant and a nuclear reactor fuel core; a vertically-oriented steam generating vessel comprising an elongated cylindrical shell defining an internal cavity, a top tubesheet, and a bottom tubesheet; a vertical riser pipe extending vertically between the top and bottom tubesheets, the riser pipe fluidly connected to the reactor vessel; a plurality of heat transfer tubes extending vertically between the top and bottom tubesheets; and a fluid coupling comprising an eccentric cone section forming a flow conduit for exchanging primary coolant between the steam generating vessel and reactor vessel. A closed primary coolant loop is formed in which primary coolant flows from the reactor vessel through the eccentric cone into the steam generator vessel and returns from the steam generating vessel to the reactor vessel through the eccentric cone.

According to another embodiment, a nuclear steam supply system with natural gravity-driven coolant circulation includes: a vertically-oriented reactor vessel comprising an elongated cylindrical shell forming an internal cavity configured for containing primary coolant and a nuclear reactor fuel core; a vertically-oriented steam generating vessel comprising an elongated cylindrical shell defining an internal cavity configured for containing secondary coolant, a top tubesheet, and a bottom tubesheet; a plurality of heat transfer tubes extending vertically between the top and bottom tubesheets, the tubes including a preheater section, a steam generator section, and a superheater section, wherein secondary coolant in a liquid state enters a shell side of the preheater section at a bottom of the steam generating vessel and flows upward to the steam generator section where a portion of the secondary coolant boils to produce steam which in turn flows upward into the superheater section at a top of the steam generating vessel; a vertical riser pipe extending vertically between the top and bottom tubesheets, the riser pipe fluidly connected to the reactor vessel; a fluid coupling forming a flow conduit for exchanging primary coolant between the steam generating vessel and reactor vessel; and a tubular recirculation shroud surrounding the tubes in the steam generator section, the shroud configured to recirculate a portion of the liquid secondary coolant in the steam generator section to the preheater section. The primary coolant flows upward through the riser pipe and downward through the tubes on the tube side of the steam generating vessel to heat the secondary coolant.

According to one embodiment, a steam generator for a nuclear steam supply system includes: a vertically-oriented steam generating vessel comprising an elongated cylindrical shell defining an internal cavity configured for containing secondary coolant, a top tubesheet, a secondary coolant outlet nozzle below the top tubesheet, a bottom tubesheet, and a secondary coolant inlet nozzle above the bottom tubesheet; a plurality of heat transfer tubes extending vertically between the top and bottom tubesheets, the tubes including a preheater section, a steam generator section, and a superheater section, wherein secondary coolant in a liquid state enters a shell side of the preheater section via the inlet nozzle and flows upward to the steam generator section where a portion of the secondary coolant boils to produce steam which in turn flows upward into the superheater section and exits the steam generating vessel through the outlet nozzle; a vertical riser pipe extending vertically between the top and bottom tubesheets, the riser pipe in fluid communication with the tubes and configured for fluid coupling to a reactor vessel containing primary coolant; a double-walled fluid coupling forming a flow conduit for exchanging primary coolant between the steam generating vessel and reactor vessel, the fluid coupling configured so that primary coolant from the reactor vessel flows through the fluid coupling into the steam generator vessel and returns from the steam generating vessel to the reactor vessel through the fluid coupling; a bottom collection plenum formed below the bottom tubesheet by the fluid coupling and configured for fluid coupling to the reactor vessel, the collection plenum in fluid communication with the tubes; a top distribution plenum formed above the top tubesheet, the distribution plenum in fluid communication with the riser pipe and tubes; and a tubular recirculation shroud surrounding the tubes in the steam generator section, the shroud configured to recirculate a portion of the liquid secondary coolant in the steam generator section to the preheater section.

Advantages and aspects of the present invention include the following:

Core deep underground: The reactor core resides deep underground in a thick-walled Reactor Vessel (RV) made of an ASME Code material that has decades of proven efficacy in maintaining reactor integrity in large PWR and BWR reactors. All surfaces wetted by the reactor coolant are made of stainless steel or Inconel, which eliminates a major source of corrosion and crud accumulation in the RV.

Gravity-driven circulation of the reactor coolant: The nuclear steam supply system according to the present disclosure does not rely on any active components (viz., a Reactor Coolant pump) for circulating the reactor coolant through the core. Instead, the flow of the reactor coolant through the RV, the steam generator heat exchangers, and other miscellaneous equipment occurs by the pressure head created by density differences in the flowing water between the hot and cold segments of the primary loop. The reliability of gravity as a motive force underpins its inherent safety. The movement of the reactor coolant requires no pumps, valves, or moving machinery of any kind.

Black-start capable (no reliance on off-site power): Off-site power is not essential for starting up or shutting down the nuclear steam supply system. The rejection of reactor residual heat during the shutdown also occurs by gravity-driven circulation. Thus, the need for an emergency shutdown power supply at the site—a major concern for nuclear plants—is eliminated. Indeed, the nuclear steam supply system uses gravity (and only gravity) as the motive force to meet its operational imperatives under both normal and accident conditions.

Assurance of a large inventory of water around and over the reactor core: The present nuclear steam supply system reactor vessel (RV) has no penetrations except at its very top, which means that the core will remain submerged in a large inventory of water even under the hypothetical postulated event under which all normal heat rejection paths are lost.

No large penetrations in the Reactor Vessel (RV): All penetrations in the RV are located in the top region of the RV and are small in size. The absence of large piping in the reactor coolant system precludes the potential of a "large break" Loss of Coolant Accident (LOCA) event.

Easy accessibility to all critical components: In contrast to the so-called "integral" reactor systems, the steam generator and the control rod drive system are located outside the RV at a level that facilitates easy access, making their preventive maintenance and repair a conveniently executed activity. The steam generator consists of a single loop that includes in some embodiments a preheater, steam generator, and a superheater topped off by a pressurizer. The heat exchangers in the loop, namely the preheater, the steam generator, and the superheater have built-in design features to conveniently access and plug tubes such as appropriate placed manholes that provide access to the heat exchanger tubesheets and/or tube bundles. The decision to deploy the heat exchange equipment outside of the harsh environment of the reactor cavity in the nuclear steam supply system has been informed by the poor reliability of PWR steam generators over the past 3 decades and the colossal costs borne by the industry to replace them.

The RV flange features a reverse joint to minimize its projection beyond the perimeter of the RV cylinder. This design innovation makes it possible to connect the Stack directly to the RV nozzle—gorging to forging connection-eliminating any piping run between them. This design features eliminates the risk of a large pipe break LOCA.

Demineralized water as the reactor coolant: The reactor coolant is demineralized water, which promotes critical safety because of its strong negative reactivity gradient with rise in temperature. Elimination of borated water also simplifies the nuclear steam supply system (NSSS) by eliminating the systems and equipment needed to maintain and control boron levels in the primary coolant. Pure water and a corrosion-resistant primary coolant loop help minimize crud buildup in the RV.

Improved steam cycle reliability: The reliability of the steam cycle is improved by dispensing with the high pressure turbine altogether. Rather, the cycle steam is superheated before it is delivered to the low pressure turbine. The loss in the Rankine efficiency is less than 0.5 percent; the rewards in terms of enhanced reliability and simplification of the power cycle are quite substantial.

Pressure Control: The pressurizer contains a conventional heating/quenching element (water/steam for pressure control). A bank of electric heaters are installed in the pressurizer section which serve to increase the pressure by boiling some of the primary coolant and creating a steam bubble that resides at the top of the pressurizer near the head. A spray column is located near the top head of the pressurizer which sprays water into the steam bubble thereby condensing the steam and reducing the steam bubble. The increase/decrease in size of the steam bubble serves to increase/decrease the pressure of the primary coolant inside the reactor coolant system. In one exemplary embodiment, the primary coolant pressure maintained by the pressurizer may be without limitation about 2,250 psi.

In alternative embodiments, a nitrogen type pressurizer system may be used. In this embodiment, the pressurizer serves to control the pressure in the reactor vessel by the application of controlled nitrogen pressure from external high pressure nitrogen tanks fluidly coupled to the pressurizer. Nitrogen pressure controlled reactors have been used in other reactor types and have years of successful operating experience with a quick response profile.

Preventing fuel failures in the reactor: Over 70 percent of all fuel failures in operation are known to occur from fretting (erosion from repetitive impact) damage, which is the result of "pinging" of the fuel rods by the grid straps. The vibration of the grid straps is directly related to the level of turbulence around the fuel. In the present nuclear steam supply system, the Reynolds number is approximately 20 percent of that in a typical operating PWR today. A lower Reynolds number translates into an enfeebled pinging action (erosion rate varies approximately as 4.8 power of velocity of impact!) on the rods and thus a drastically reduced fretting damage rate. Lower burn-up levels selected for present nuclear steam supply system (in the 45 GWD per MTU range) in comparison to around 60 in the presently operating reactors) will also help ameliorate embrittlement of the fuel cladding and thus prevent rod wastage.

Increased Self-shielding: The gravity-driven circulation of the primary fluid in the present nuclear steam supply system (NSSS) accrues another significant dividend in the form of a dramatically reduced radiation dose emanating from the NSSS. This is because the Nitrogen (N-16) isotope, produced by the neutron bombardment of oxygen in the reactor water in the core, generates high gamma energy emitting N-16 isotope which is largely responsible for the radiation emanating from the Containment. N-16, however, has a half-life of only 7.4 seconds which is less than one-fourth of the time needed for the primary water to travel to the top of the steam generators. Therefore, the quantity of N-16 is attenuated by over 7 half-lives, which means it is in effect depopulated down to minuscule values. Scoping calculations suggest that the radiation dose from the top of the steam generator in the NSSS can be 3 or more orders of magnitude less than that in a pumped-water PWR of a similar size. Thus, it is not necessary to build a thick concrete containment for present NSSS for radiation shielding. In lieu of building and in situ reinforced concrete containment, a shop fabricated steel containment capable of withstanding a crashing airplane is deployed which is more suitable, and more economical.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures:

FIG. 61 is side elevation view of the primary reactor containment vessel showing various cross-section cuts to reveal equipment housed in and additional details of the containment vessel;

FIG. 62 is a top plan view thereof;

All drawings are schematic and not necessarily to scale. Parts appearing number in some figures which appear un-numbered in other figures are the same parts unless noted otherwise herein.

DETAILED DESCRIPTION

Figure 1:
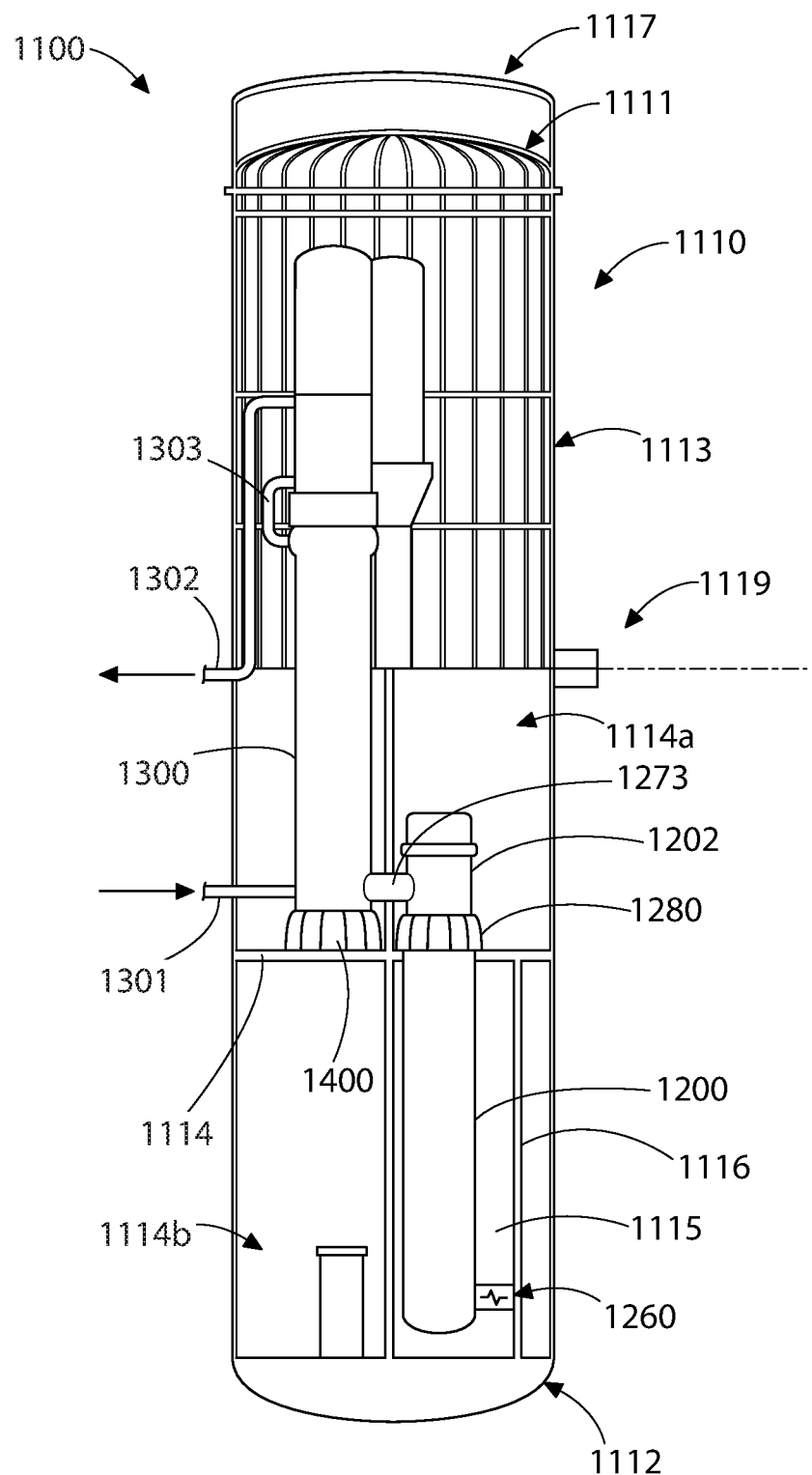
FIG. 1 is cross section of a containment vessel including a nuclear steam supply system.

The description of illustrative exemplary ("example") embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

As used throughout, any ranges disclosed herein are used as shorthand for describing each and every value that is within the range. Any value within the range can be selected as the terminus of the range.

Multiple Inventive Concept Roadmap

Multiple broad inventive concepts are described herein and are distinguished from one another using different sections each having an appropriately descriptive header in the description and discussion that follows. Specifically, FIGS. 1-6 are relevant to a broad first Inventive Concept #1, FIGS. 7-14 are relevant to a broad second Inventive Concept #2, FIGS. 15-27 are relevant to a broad third Inventive Concept #3, FIGS. 28-52 are relevant to a fourth Inventive Concept #4, FIGS. 53-76 are relevant to a broad fifth Inventive Concept #5, and FIGS. 77-88 are relevant to a broad sixth Inventive Concept #6. The broad inventive concepts should each be considered in isolation from one another. Each broad inventive concept may comprise multiple inventive concepts and embodiments within which may be designated by descriptive sub-headers in some instances. It is possible that there may be conflicting language or terms used in the description of the first through sixth inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed which should be used and is controlling for interpreting the language of the description of that particular relevant inventive concept. Similarly, the section of the description describing a particular relevant inventive concept being claimed should be used and is controlling to interpret the respective claim language when necessary.

Inventive Concept #1

Reference is made generally to FIGS. 1-6 which are relevant to Inventive Concept #1 described below.

Referring to FIGS. 1-6, a steam supply system for a nuclear pressurized water reactor (PWR) according to the present disclosure is shown. From the thermal-hydraulic standpoint, the system includes a steam generator assembly 1100 generally including a reactor vessel 1200 and a steam generating vessel 1300 fluidly coupled to the reactor vessel. The steam generating vessel and reactor vessel are vertically elongated and separate components which hydraulically are closely coupled, but discrete vessels in themselves that are thermally isolated except for the exchange of primary loop coolant (i.e. reactor coolant) flowing between the vessels. As further described herein, the steam generating vessel 1300 in one embodiment includes a preheater 1320, main steam generator 1330, and a superheater 1350 which converts a fluid such as water flowing in a secondary coolant loop from a liquid entering the steam generating vessel 1300 at an inlet 1301 to superheated steam leaving the steam generating vessel at an outlet 1302. The secondary coolant loop water may be a Rankine cycle fluid used to drive a turbine-generator set for producing electric power in some embodiments.

The steam generating vessel 1300 further includes a pressurizer 1380 which maintains a predetermined pressure of the primary coolant fluid. The pressurizer is a pressure vessel mounted atop the steam generating vessel 1300 and engineered to maintain a liquid/gas interface (i.e. primary coolant water/inert gas) that operates to enable control of the primary coolant pressure in the steam generator. In one embodiment, as shown, the pressurizer 1380 may be mounted directly on top of the steam generating vessel 1300 and forms an integral unitary structural part of the vessel to hydraulically close the vessel at the top end. The assemblage of the foregoing three heat exchangers and the pressurizer may be referred to as a "stack."

Referring to FIG. 1, the reactor vessel 1200 and the steam generating vessel 1300 are housed in a steam generator containment vessel 1110. The containment vessel 1110 may be formed of a suitable shop-fabricated steel comprised of a top 1111, a bottom 1112, and a cylindrical sidewall 1113 extending therebetween. In some embodiments, portions of the containment vessel which are located above ground level may be made of ductile ribbed steel to help withstand aircraft impact. A missile shield 1117 which is spaced above the top 1111 of the containment vessel 1110 may be provided as part of the containment vessel or a separate containment enclosure structure (not shown) which encloses the containment vessel 1110. A horizontal partition wall 1114 divides the containment vessel into an upper portion 1114a and a lower portion 1114b. The partition wall 1114 defines a floor in the containment vessel. In one embodiment, a majority of the reactor vessel 1200 may be disposed in the lower portion 1114b and the steam generating vessel 1300 may be disposed in the upper portion 1114a as shown.

In various embodiments, the containment vessel 1110 may be mounted above ground, partially below ground, or completely below ground. In certain embodiments, the containment vessel 1110 may be positioned so that at least part or all of the lower portion 1114b that contains the nuclear fuel reactor core (e.g., a fuel cartridge 1230) is located below ground level. In one embodiment, the entire reactor vessel 1200 and a portion of the steam generating vessel 1300 are located entirely below ground level for maximum security. The cylindrical shell or sidewall 1113 of the containment vessel 1110 may be horizontally split into an upper section and a lower section, which are joined together by a circumferential welded or bolted flanged joint 1119 as shown in FIG. 1 to provide a demarcation for portions of the containment vessel which are located above and below ground level. In other embodiments, the upper and lower sections may be welded together without use of a flange.

In one embodiment, for example without limitation, the containment vessel 1110 may have a representative height of approximately 1200 feet or more for a 1160 MW (megawatt) modular nuclear electric generation facility. A non-limiting representative diameter for this power generation facility is about 45 feet. Any suitable height and diameter for the containment vessel may be provided depending on system component configuration and dimensions.

The containment vessel 1110 further includes a wet reactor well 1115 defined in one embodiment by a cylindrical circumscribing walled enclosure 1116 which is flooded with water to provide enhanced radiation shielding and a back-up reserve of readily accessible coolant for the reactor core. In one embodiment, the walled enclosure 1116 may be formed of stainless steel cylindrical walls which extend circumferentially around the reactor vessel 1200 as shown. Other suitable materials may be used to construct the enclosure 1116. The wet reactor well 1115 is disposed in the lower portion 1114b of the containment vessel 1110. The lower portion 1114b may further include a flooded (i.e. water) used fuel pool 1118 adjacent to the enclosure 1116. In one embodiment, as shown in FIG. 1, both the used fuel pool 1118 and the walled enclosure 1116 are disposed below the horizontal partition wall 1114 as shown in FIG. 1.

In one embodiment, as shown in FIG. 1, the walled enclosure 1116 may extend above the partition wall 1114 and the inlet/outlet nozzle connection between the reactor and steam generating vessels may be made by a penetration through the walled enclosure.

As further shown in FIG. 1, both the reactor vessel 1200 and the steam generating vessel 1300 preferably may be vertically oriented as shown to reduce the footprint and diameter of the containment vessel 1110. The containment vessel 1110 has a diameter large enough to house both the reactor vessel, steam generating vessel, and any other appurtenances. The containment vessel 1110 preferably has a height large enough to completely house the reactor vessel and steam generating vessel to provide a fully contained steam generator with exception of the water and steam inlet and outlet penetrations for second coolant loop fluid flow associated with the Rankine cycle for driving the turbine-generator set for producing electric power.

Figure 2:
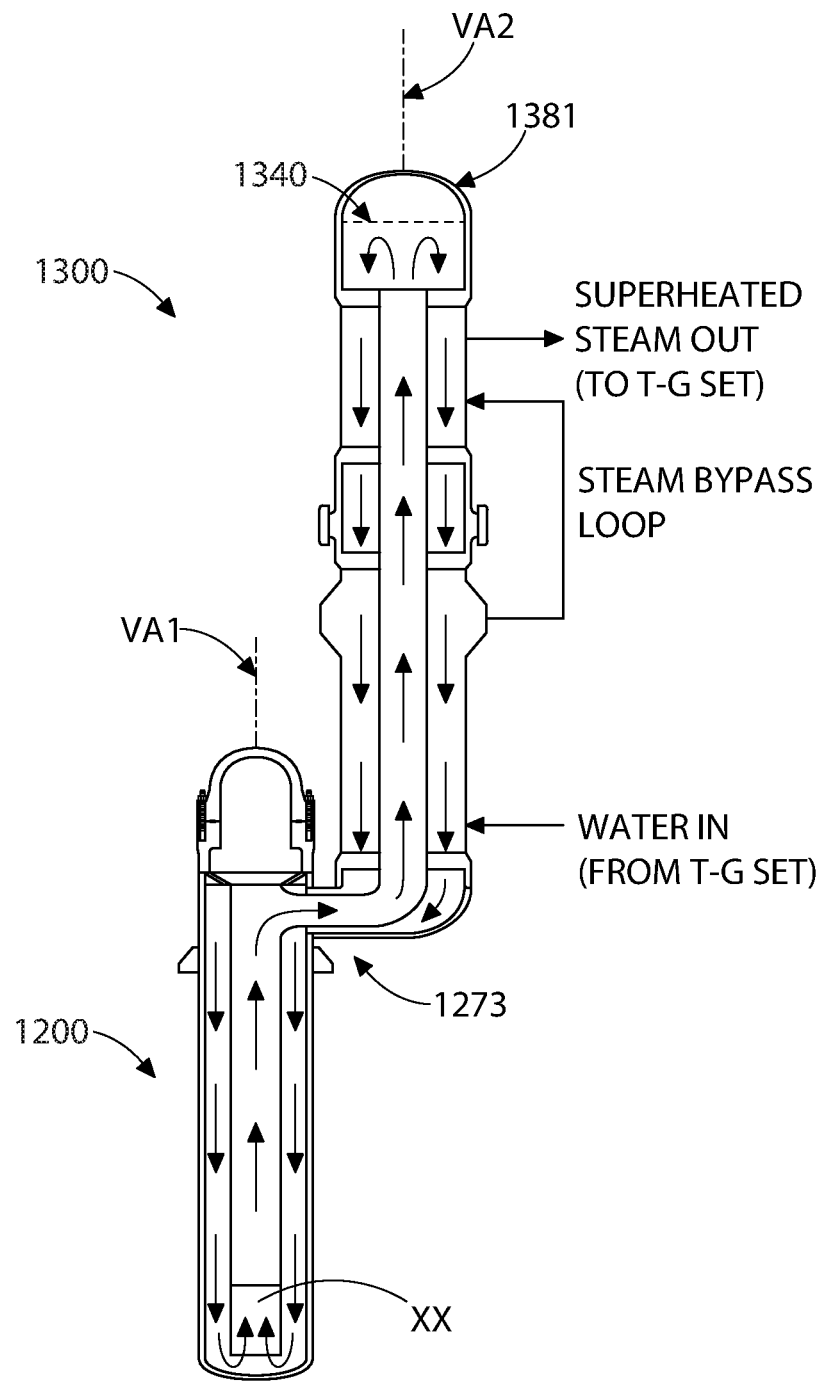
FIG. 2 is a schematic flow diagram of the nuclear steam supply system of FIG. 1 showing the flow path or circulation flow loop of primary coolant represented by the flow arrows.

FIG. 2 shows the flow or circulation of primary coolant (e.g. water) in the primary coolant loop. In one embodiment, the primary coolant flow is gravity-driven relying on the change in temperature and corresponding density of the coolant as it is heated in the reactor vessel 1200, and then cooled in the steam generating vessel 1300 as heat is transferred to the secondary coolant loop of the Rankine cycle which drives the turbine-generator (T-G) set. The pressure head created by the changing different densities of the coolant (i.e. hot—lower density and cold—higher density) induces flow or circulation through the reactor vessel-steam generating vessel system as shown by the directional flow arrows. Advantage, the gravity-driven primary coolant circulation requires no coolant pumps or machinery thereby resulting in cost (capital, operating, and maintenance) savings, reduced system power consumption thereby increasing energy conversion efficiency of the PWR system, in addition to other advantages as described herein.

The reactor vessel 1200 may be similar to the reactor vessel with gravity-driven circulation system disclosed in commonly-owned U.S. patent application Ser. No. 13/577,163 filed Aug. 3, 2012, the disclosure of which is incorporated herein by reference in its entirety.

Figure 3A:
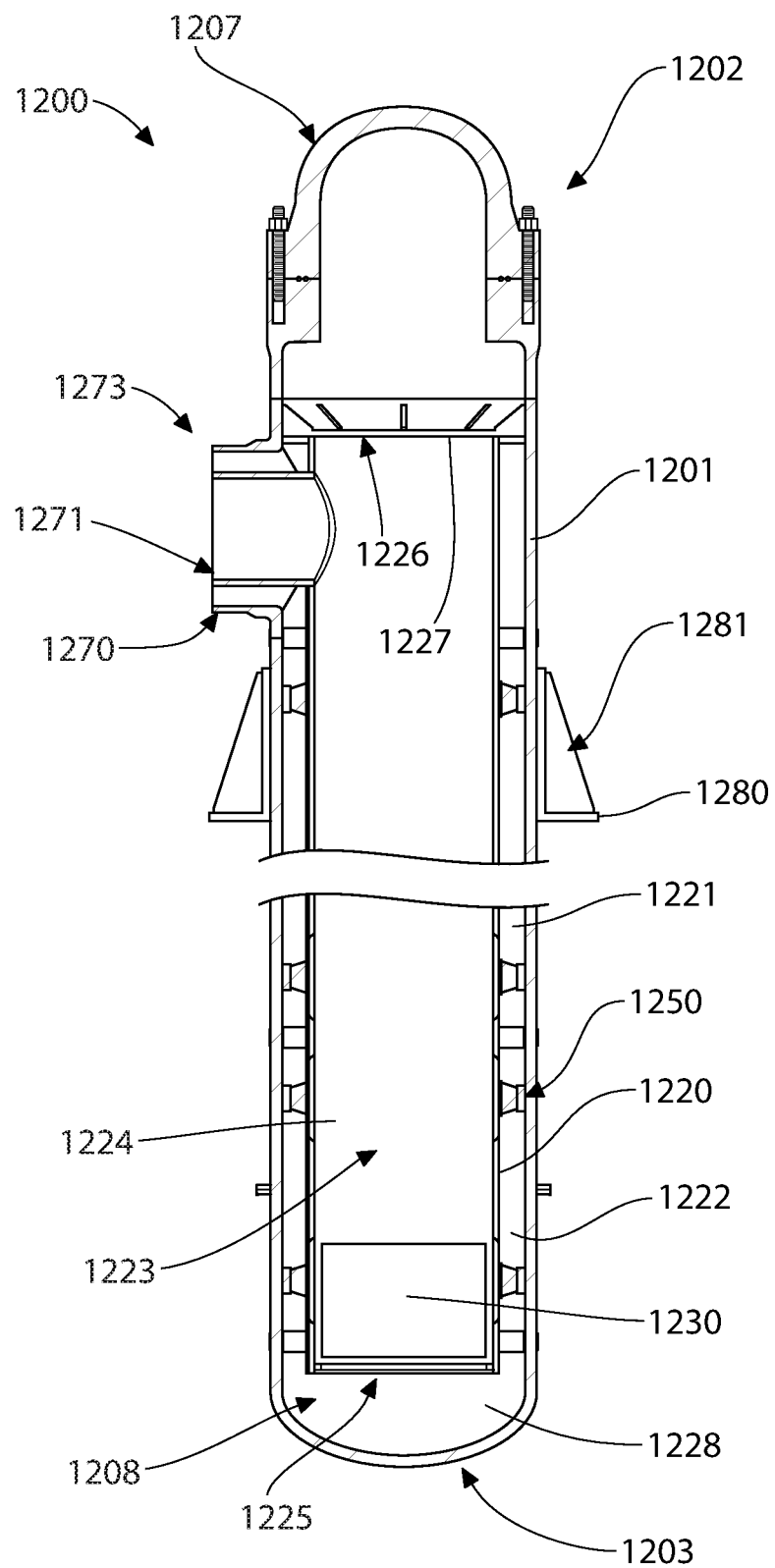
FIG. 3A is an elevation cross-sectional view of the reactor vessel of FIG. 1.
Figure 3B:
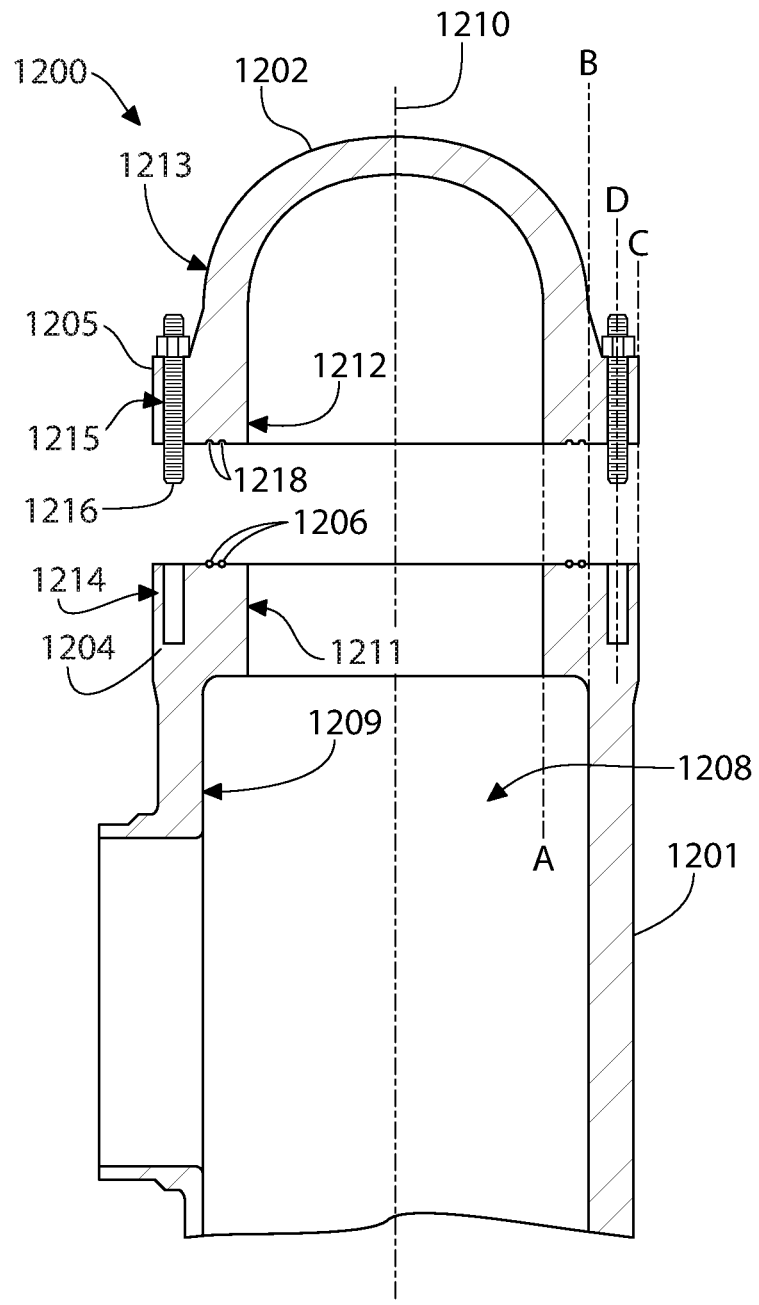
FIG. 3B is a detailed cross-sectional view of the reactor vessel of FIG. 3A.

Referring to FIGS. 3A and 3B, the reactor vessel 1200 in one embodiment is an ASME code Section III, Class 1 thick-walled cylindrical pressure vessel includes a cylindrical sidewall shell 1201, an integrally welded hemispherical bottom head 1203 and, a removable hemispherical top head 1202. The shell 1201 primarily defines an internal cavity 1208 configured for holding the reactor core, reactor shroud, and other appurtenances as described herein. In one embodiment, the upper extremity of the reactor vessel shell 1201 is equipped with a tapered hub flange 1204 (also known as "welding neck" flange in the art) which is bolted to a similar flange 1205 welded to the top head 1202. Commonly-owned PCT patent application No. PCT/US2013/0038289, filed Apr. 25, 2013, the disclosure of which is incorporated herein by reference in its entirety, discloses known prior-art for the design and coupling of the top head to the shell using two flanges.

Each flange 1204, 1205 may be annular, so that each extends completely around the shell 1201 and the head 1202, respectively. Each flange may also be integrally formed as part of the shell 1201 and the top head 1202. The flange 1204 extends into and toward the central axis 1209 of the cavity 1208, with the flange 1204 forming at about the point where the sidewalls of the shell 1201 begin to widen. In the case that the flange 1204 is annular, it extends radially into the cavity around the entire cavity, and similarly, in the case that the flange 1205 is annular, it extends radially outward from the cavity all around. As can be seen in the embodiment depicted, the inner sidewall surfaces 1209 of the shell 1201, excluding the flange 1204, are defined by a first inner radius, measured from the central axis 1210 of the cavity 1208, and the inner sidewall surfaces 1211 of the flange 1204 are defined by a second inner radius, with the second inner radius being smaller than the first inner radius. The outward-extending head flange 1205, which is formed at about the point where the sidewalls of the top head 1202 begin to widen, has an inner surface 1212 that may be at about the same distance from the central axis 1210 as the inner sidewall surfaces 1211 of the shell flange 1204, as can be seen by line A. Thus, the inner surfaces 1211, 1212 of the two flanges 1204, 1205 have about the same radius from the central axis 1210, and the inner surfaces 1212 of the flange 1205 have a smaller radius than the inner sidewall surfaces 1209 of the shell 1201. Also, the outer surfaces 1213 of the hemispherical wall of the top head 1202, at a point just above the flange 1205, may be at about the same distance from, or even closer to, the central axis 1210 as the inner sidewall surfaces 1211 of the shell flange 1204, as can be seen by line B. This results in the radius of the outer surfaces 1213 having about the same radius from the central axis 1210 as the inner sidewall surfaces 1211, although the outer surfaces 1213 could also have a radius less than that of the inner sidewall surfaces 1211. So that the coupled flanges 1204, 1205 may each still serve as a "welding neck" flange, the outer surfaces 1214, 1215 of each flange may be at about the same distance from the central axis 1210, as can be seen by line C. All distance and measurement comparisons between the shell 1201 and the top head 1210 are being made along parallel radial lines having the central axis 1210 as a center.

The top head 1202 may be fastened to the shell 1201 by coupling the flanges 1204, 1205 via a set of alloy bolts 1216, which are pre-tensioned to establish a high integrity double gasket seal under all operation modes. The bolted connection of the top head 1202 provides ready access to the reactor vessel internals such as the reactor core. The centerline, line D, of the bolts 1216 may be at a distance greater than the internal surfaces 1209 of the shell 1201, but at a lesser distance than the outer surfaces 1214 of the shell flange 1204.

Two concentric self-energizing gaskets 1206 are placed in a pair of annular grooves 1218, the grooves being formed in both flanges 1204, 1205, between the bolts 1216 and the inner surfaces 1211, 1212, and compressed between the interfacing surfaces of two flanges 1204, 1205, when coupled together, to provide leak tightness of the reactor vessel 1200 at the connection between the top head 1202 and the shell 1201. The leak tightness under operating conditions is assured by an axisymmetric heating of the flanged joint that is provided by the fluid flow arrangement of the primary coolant in the system, as further described herein. The top head 1202 contains the vertical penetrations 1207 for insertion of the control rods and further may serve as a base for mounting the associated control rod drives, both of which are not depicted but well known in the art without further elaboration.

With continuing reference to FIG. 3A, the reactor vessel 1200 includes a cylindrical reactor shroud 1220 which contains the reactor core defined by a fuel cartridge 1230. The reactor shroud 1220 transversely divides the shell portion of the reactor vessel into two concentrically arranged spaces: (1) an outer annulus 1221 defining an annular downcomer 1222 for primary coolant entering the reactor vessel which is formed between the outer surface of the reactor shroud and the inner surface of the shell 1201; and (2) a passageway 1223 defining a riser column 1224 for the primary coolant leaving the reactor vessel heated by fission in the reactor core. The reactor shroud 1220 is elongated and extends in an axial direction along vertical axis VA1 of the reactor vessel which defines a height and includes an open bottom 1225 and a closed top 1226. In one embodiment, the top 1226 may be closed by a top flow isolation plate 1227 which directs primary coolant flowing up the riser column 1224 to the steam generating vessel 1300, as further described herein. In one embodiment, the bottom 1225 of the reactor shroud 1220 is vertically spaced apart by a distance from the bottom head 1203 of the reactor vessel 1200 and defines a bottom flow plenum 1228. The bottom flow plenum 1228 collects primary coolant from the annular downcomer 1222 and directs the coolant flow into the inlet of the riser column 1224 formed by the open bottom 1225 of the reactor shroud 1220 (see, e.g. FIG. 2).

Both the fuel cartridge 1230 and the reactor shroud 1220 are supported by a core support structure ("CSS"), which in one embodiment includes a plurality of lateral support members 1250 that span between and are attached to the reactor shroud and the shell 1201 of the reactor vessel 1200. A suitable number of supports members space both circumferentially and vertically apart are provided as needed to support the combined weight of the fuel cartridge 1230 and the reactor shroud 1220. In one embodiment, the bottom of the reactor shroud 1220 is not attached to the reactor vessel 1200 to allow the shroud to grow thermally in a vertical axial direction (i.e. parallel to vertical axis VA1) without undue constraint.

The reactor shroud 1220 is a double-walled cylinder in one embodiment which may be made of a corrosion resistant material, such as without limitation stainless steel. This double-wall construction of the reactor shroud 1220 forms an insulated structure designed to retard the flow of heat across it and forms a smooth vertical riser column 1224 for upward flow of the primary coolant (i.e. water) heated by fission in the fuel cartridge 1230 ("core"), which is preferably located at the bottom extremity of the shroud in one embodiment as shown in FIGS. 1-3. The vertical space above the fuel cartridge 1230 in the reactor shroud 1220 may also contain interconnected control rod segments along with a set of "non-segmental baffles" that serve to protect them from flow induced vibration during reactor operations. The reactor shroud 1220 is laterally supported by the reactor vessel by support members 1250 to prevent damage from mechanical vibrations that may induce failure from metal fatigue.

The fuel cartridge 1230 in one embodiment is a unitary autonomous structure containing upright fuel assemblies, and is situated in a region of the reactor vessel 1200 that is spaced above the bottom head 1203 so that a relatively deep plenum of water lies underneath the fuel cartridge. The fuel cartridge 1230 is insulated by the reactor shroud 1220 so that a majority of the heat generated by the fission reaction in the nuclear fuel core is used in heating the primary coolant flowing through the fuel cartridge and adjoining upper portions of the riser column 1224. The fuel cartridge 1230 is an open cylindrical structure including cylindrically shaped sidewalls 1231, an open top 1233, and an open bottom 1234 to allow the primary coolant to flow upward completely through the cartridge (see directional flow arrows). In one embodiment, the sidewalls 1231 may be formed by multiple arcuate segments of reflectors which are joined together by suitable means. The open interior of the fuel cartridge 1230 is filled with a support grid 1232 for holding the nuclear fuel rods and for insertion of control rods into the core to control the fission reaction as needed.

Briefly, in operation, the hot reactor primary coolant exits the reactor vessel 1200 through a low flow resistance outlet nozzle 1270 to be cooled in the adjacent steam generating vessel 1300, as shown in FIGS. 2 and 3. The cooled reactor primary coolant leaves the steam generating vessel 1300 and enters the reactor vessel 1200 through the inlet nozzle 1271. The internal plumbing and arrangement in the reactor vessel directs the cooled reactor coolant down through to the annular downcomer 1222. The height of the reactor vessel 1200 is preferably selected to support an adequate level of turbulence in the recirculating reactor primary coolant by virtue of the density differences in the hot and cold water columns which is commonly known as the thermo-siphon action (density difference driven flow) actuated by gravity. In one embodiment, the circulation of the reactor primary coolant is driven by over 8 psi pressure generated by the thermo-siphon action, which has been determined to ensure (with adequate margin) a thoroughly turbulent flow and stable hydraulic performance.

Referring to FIGS. 1 and 3, the top of the reactor vessel shell 1201 is welded to a massive upper support forging which may be referred to as a reactor support flange 1280. The support flange 1280 supports the weight of the reactor vessel 1200 and internal components above the wet reactor well 1115. In one embodiment, the support flange is structurally stiffened and reinforced by a plurality of lugs 1281 which are spaced circumferentially apart around the reactor vessel and welded to both the reactor vessel and flange, as shown. Support flange contacts and engages the horizontal partition wall 1114, which transfers the dead weight of the reactor vessel 1200 to the containment vessel 1110. The reactor vessel's radial and axial thermal expansion (i.e. a majority of growth being primarily downwards from the horizontal partition wall 1114) as the reactor heats up during operation is unconstrained. However, the portion of the containment vessel 1110 which projects above the partition wall 1114 is free to grow upwards in unison with the upwards growth of the steam generating vessel 1300 to minimize axial differential expansion between the steam generating vessel and reactor vessel. Because the reactor vessel and steam generating vessel are configured and structured to thermally grow in height at substantially the same rate when heated, this arrangement helps minimize potential thermal expansions stress in the primary coolant fluid coupling 1273 between the reactor vessel and steam generating vessel.

The support flange 1280 is spaced vertically downwards on the reactor vessel shell 1201 by a distance from the top head 1202 of the reactor vessel 1200 sufficient to allow a fluid connection to be made to the steam generating vessel 1300 which is above the partition wall 1114, as shown in FIGS. 1 and 2. When the reactor vessel 1200 is mounted inside the containment vessel 1110, the top head 1202 of the reactor vessel and the primary coolant fluid coupling 1273 (collectively formed by combined the inlet-outlet flow nozzle 1270/1271 and the inlet-outlet flow nozzle 1371/1370 of the steam generating vessel 1300, shown in FIG. 4) are located above the reactor well 1115. This provides a location for connection to the steam generator headers and for the engineered safety systems (e.g. control rods, etc.) to deal with various postulated accident scenarios. A majority of the reactor vessel shell 1201, however, may be disposed below the partition wall 1114 and immersed in the wet reactor well 1115 as shown in FIG. 1.

The bottom region of the reactor vessel 1200 is restrained by a lateral seismic restraint system 1260 (shown schematically in FIG. 1) that spans the space between the reactor shell 1201 and the reactor well 1115 inside surface of the cylindrical enclosure 1116 to withstand seismic events. The seismic restraint design is configured to allow for free axial (i.e. longitudinal along vertical axis VA1) and diametrical thermal expansion of the reactor vessel 1200. The reactor well 1115 is flooded during power operations to provide defense-in-depth against a (hypothetical, non-mechanistic) accident that is assumed to produce a rapid rise in the enthalpy of the reactor's contents. Because the reactor is designed to prevent loss of core water by leaks or breaks and the reactor well is flooded, burn-through of the reactor vessel by molten fuel (corium) is not likely.

Figure 4:
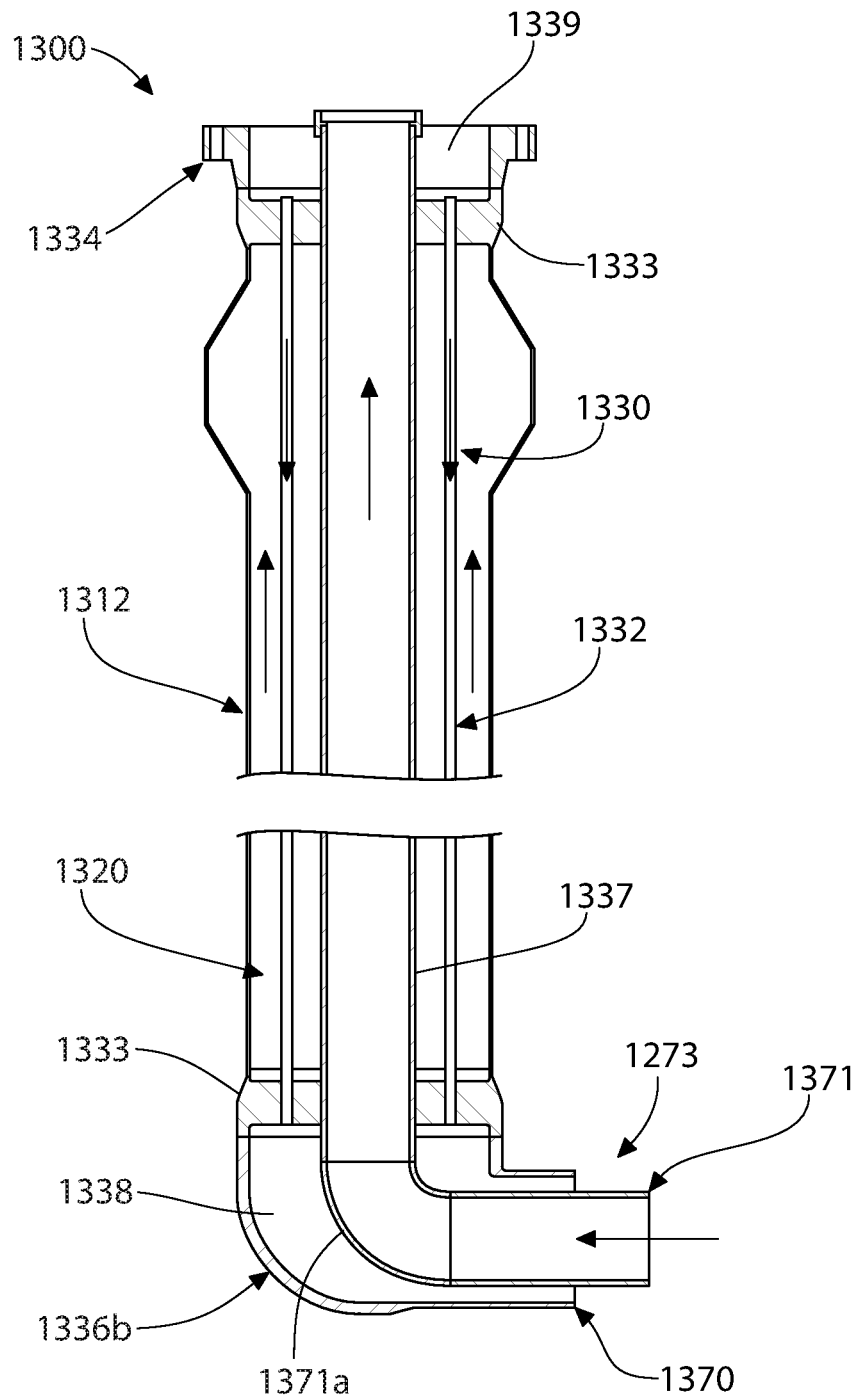
FIG. 4 is an elevation cross-sectional view of the bottom portion of the steam generating vessel reactor vessel of FIG. 1 showing the preheater section and steam generator section.
Figure 5:
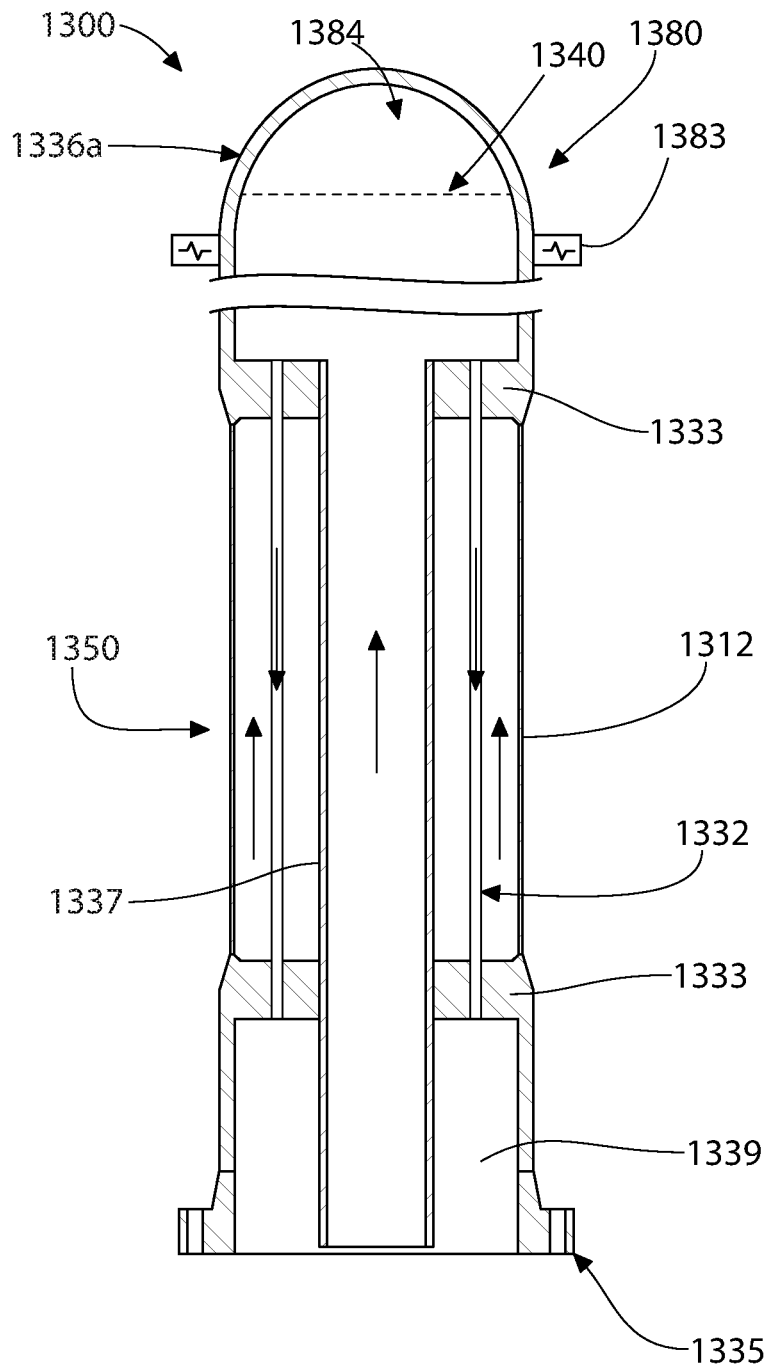
FIG. 5 is an elevation cross-sectional view of the top portion of the steam generating vessel of FIG. 1 showing the superheater section and pressurizer mounted atop the steam generating vessel.
Figure 6:
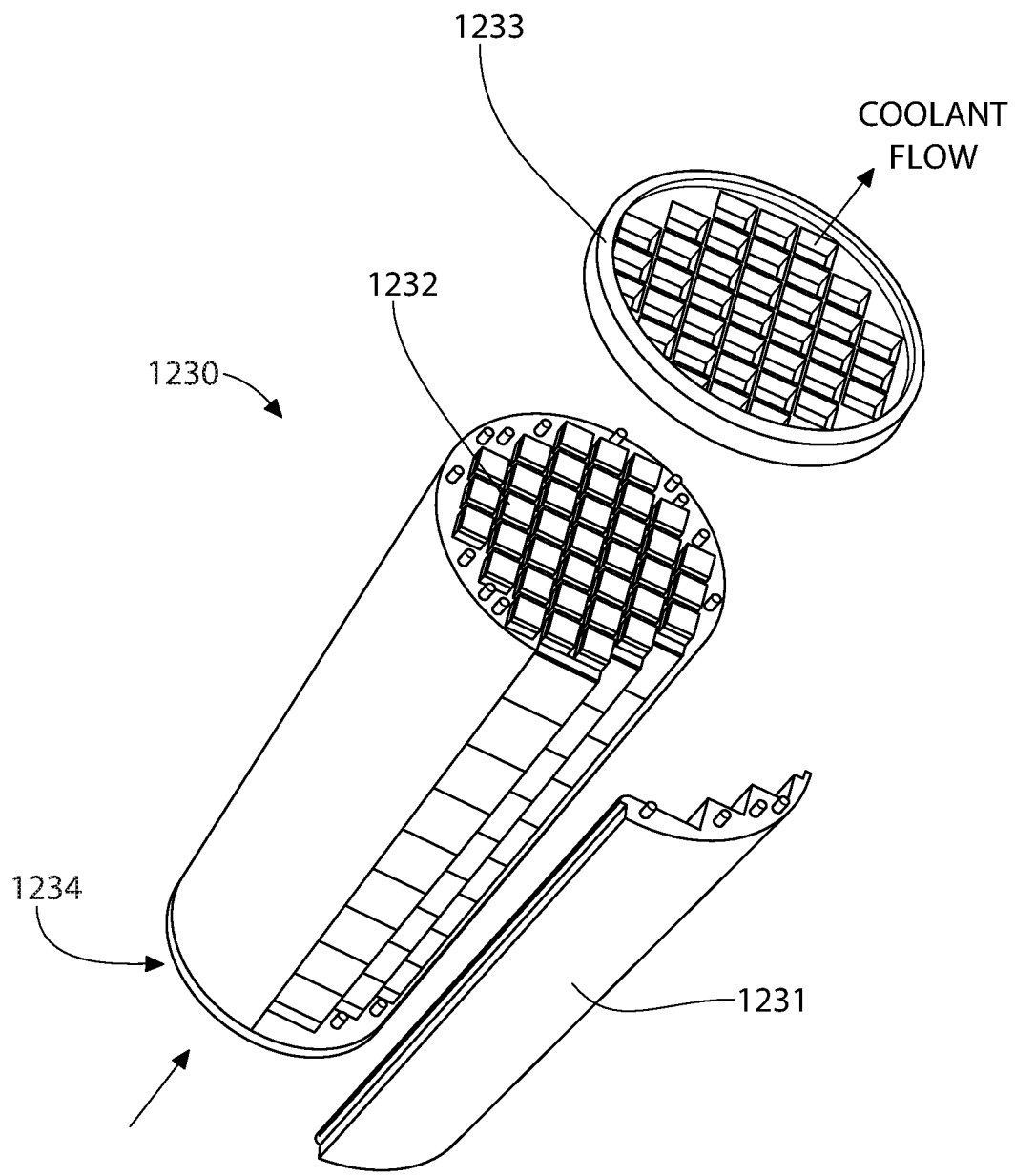
FIG. 6 is an exploded perspective view of the fuel cartridge positioned in the reactor vessel of FIG. 1.

Referring to FIGS. 3 and 4, the combined inlet-outlet flow nozzle 1270/1271 has two concentric hollow forgings including an outer inlet nozzle 1270 and an inner outlet nozzle 1271. The outlet nozzle 1271 has one end welded to the reactor shroud 1220 (internal to the reactor vessel shell 1201) and an opposite end welded to the inlet nozzle 1371 of the steam generating vessel 1300. The inlet nozzle 1270 has one end welded to the reactor vessel shell 1201 and an opposite end welded to the outlet nozzle 1370 of the steam generating vessel 1300. The flow isolation plate 1227 helps ensure that the hot primary coolant water exiting the reactor vessel cannot flow back into the annulus 1221. In the present embodiment, the outlet nozzle 1271 of the reactor vessel and the inlet nozzle 1371 of the steam generating vessel each have a smaller diameter than the inlet nozzle 1270 of the reactor vessel and the outlet nozzle 1270 of the steam generating vessel. The combined inlet-outlet flow nozzle 1270/1271 is located above the partition wall 1114 of the containment vessel 1110. The inlet nozzle 1371 and the outlet nozzle 1370 of the steam generating vessel 1300 collectively define a mating concentrically arranged combined inlet/outlet nozzle 1371/1370 for the steam generating vessel.

In order to avoid long loops of large piping in the reactor primary coolant system which creates the potential for a "large break" LOCA event, both the combined inlet-outlet flow nozzle 1270/1271 of the reactor vessel 1200 and the combined inlet/outlet nozzle 1371/1370 for the steam generating vessel are intentionally very closely coupled to the shells of their respective vessels having a minimal radial projection beyond the shells. The design of the top of the reactor vessel, with the flanged connection between the head and the shell of the reactor vessel, helps to minimize this radial projection beyond the shell. This is accomplished by reducing the extent to which the flanges extend out from the shell, as compared to the prior art. In addition, cost advantages may be realized in having the inlet-outlet flow nozzle 1270/1271 shortened, in that different manufacturing techniques may be used to create the shorter inlet-outlet flow nozzle 1270/1271 as compared to if a longer flow nozzle is required.

This permits the reactor vessel 1200 to be directly coupled to the steam generating vessel 1300 via the inlet/outlet nozzles as shown in FIGS. 1 and 2. As shown in FIG. 3A, the combined inlet-outlet flow nozzle 1270/1271 of the reactor vessel preferably protrudes radially beyond the shell 1201 by a distance that is no more than the radial projection of the support flange 1280. The total length of the inlet/outlet nozzle connection between the reactor vessel 1200 and steam generating vessel 1300 in certain embodiment is less than or equal to the diameter of the reactor vessel 1200, and/or the steam generating vessel 1300 to eliminate long runs of large coolant piping between the reactor and steam generating vessels. In one embodiment, the nozzle connections between the reactor vessel 1200 and the steam generating vessel 1300 is straight without any elbows or bends.

Inventive Concept #2

Reference is made generally to FIGS. 7-14 which are relevant to Inventive Concept #2 described below.

Figure 7:
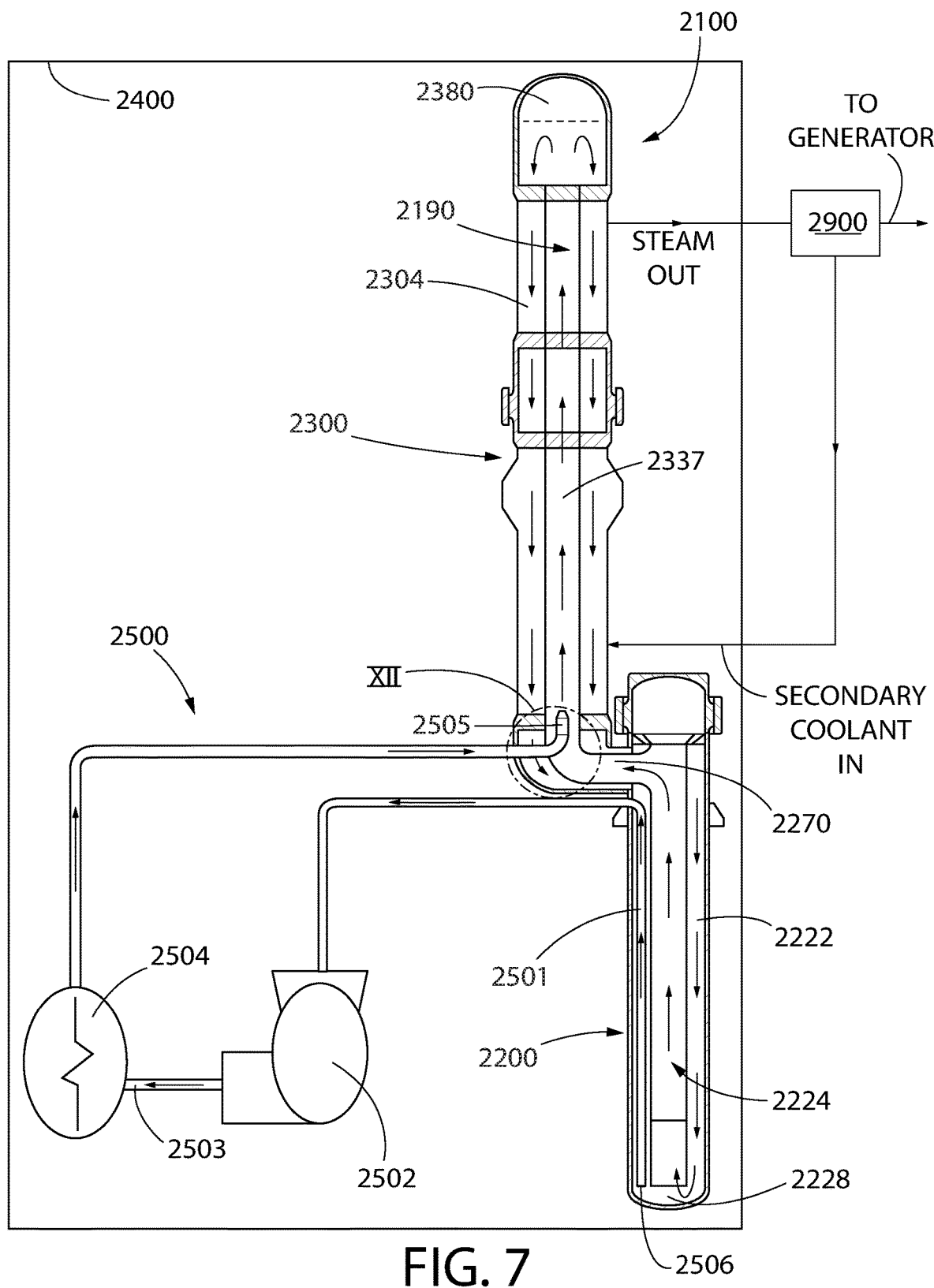
FIG. 7 is front view of a nuclear steam supply system including a reactor vessel, a steam generating vessel and a start-up sub-system in accordance with an embodiment of the present invention.

Referring first to FIG. 7, a nuclear steam supply system 2100 is illustrated in accordance with an embodiment of the present invention. Although described herein as being a nuclear steam supply system, in certain embodiments the system may be generally referred to herein as a steam supply system. The inventive nuclear steam supply system 2100 is typically used in a nuclear pressurized water reactor and generally comprises a reactor vessel 2200, a steam generating vessel 2300 and a start-up sub-system 2500. Of course, the nuclear steam supply system 2100 can have uses other than for nuclear pressurized water reactors as can be appreciated.

During normal operation of the nuclear steam supply system 2100, a primary coolant flows through a primary coolant loop 2190 within the reactor vessel 2200 and the steam generating vessel 2300. This primary coolant loop 2190 is depicted with arrows in FIG. 7. Specifically, the primary coolant flows upwardly through a riser column 2224 in the reactor vessel 2200, from the reactor vessel 2200 to the steam generating vessel 2300 through a fluid coupling 2270, upwardly through a riser pipe 2337 in the steam generating vessel 2300 to a top of the steam generating vessel 2300 (i.e., to a pressurizer 2380), and then downwardly through tubes 2332 (see FIGS. 9 and 10) in a tube side 2304 of the steam generating vessel 2300, from the steam generating vessel 2300 to the reactor vessel 2200 through the fluid coupling 2270, downwardly through a downcomer 2222 of the reactor vessel 2200, and then back from the downcomer 2222 of the reactor vessel 2200 to the riser column 2224 of the reactor vessel 2200. The primary coolant continues to flow along this primary coolant loop 2190 as desired without the use of any pumps during normal operation of the nuclear steam supply system 2100.

It should be appreciated that in certain embodiments the primary coolant loop 2190 is filled or partially filled with the primary coolant when the nuclear steam supply system 2100 is shut down and not operating. By filled it may mean that the entire primary coolant loop 2190 is completely filled with the primary coolant, or that the primary coolant loop 2190 is almost entirely filled with the primary coolant with some room for air which leaves space for the addition of more primary coolant if desired or the expansion of the primary coolant as it heats up during the start-up procedures discussed below. In certain embodiments, before start-up the primary coolant is static in the primary coolant loop 2190 in that there is no flow of the primary coolant along the primary coolant loop. However, during a start-up procedure utilizing the start-up sub-system 2500 discussed in detail below, the primary coolant is heated and caused to flow through the primary coolant loop 2190 and eventually is able to flow through the primary coolant loop 2190 passively and unaided by any pumps due to the physics concept of thermosiphon flow.

Before nuclear fuel within the reactor core engages in a fission chain reaction to produce heat, a start-up process using the start-up sub-system 2500 takes place to heat the primary coolant to a no-load operating temperature, as discussed in more detail below. During normal operation of the nuclear steam supply system 2100, the primary coolant has an extremely high temperature due to its flowing through the reactor core. Specifically, nuclear fuel in the reactor vessel 2200 engages in the fission chain reaction, which produces heat and heats the primary coolant as the primary coolant flows through the reactor core of the reactor vessel 2200. This heated primary coolant is used to phase-change a secondary coolant from a liquid into steam as discussed below.

While the primary coolant is flowing through the primary coolant loop 2190 during normal operation, the secondary coolant is flowing through a second coolant loop. Specifically, the secondary coolant is introduced into the shell side 2305 (FIGS. 9 and 10) of the steam generating vessel 2300 at the secondary coolant in location indicated in FIG. 7. The secondary coolant then flows through the shell side 2305 (FIGS. 9 and 10) of the steam generating vessel 2300 where it is heated by heat transfer from the primary coolant. The secondary coolant is converted into steam due to the heat transfer, and the steam flows from the steam generating vessel 2300 to a turbine 2900 as indicated in FIG. 7. The turbine 2900 drives an electric generator which is connected to the electrical grid for power distribution. The steam then travels from the turbine 2900 to a condenser (not illustrated) whereby the steam is cooled down and condensed. Thus, the condenser converts the steam back to a liquid (i.e., the secondary coolant) so that it can be pumped back into the steam generator 2300 at the secondary coolant in location and repeat its flow through the flow path discussed above.

In certain embodiments both the primary coolant and the secondary coolant may be water, such as demineralized water. However, the invention is not to be so limited and other liquids or fluids can be used in certain other embodiments, the invention not being limited to the material of the primary and secondary coolants unless so claimed.

The primary coolant continues to flow through the primary coolant loop and the secondary coolant continues to flow in the second coolant loop during normal operation of the nuclear steam supply system 2100. The general operation of the nuclear steam supply system 2100 and details of the components is described in detail in International Application No. PCT/US13/38289, filed on Apr. 25, 2013, the entirety of which is incorporated herein by reference.

Referring to FIGS. 7-10, the general details of the components and the operation of the nuclear steam supply system 2100, and specifically of the reactor vessel 2200 and the steam generating vessel 2300, will be described. In the exemplified embodiment, the reactor vessel 2200 and the steam generating vessel 2300 are vertically elongated and separate components which hydraulically are closely coupled, but are discrete vessels in themselves that are thermally isolated except for the exchange of primary coolant (i.e. reactor coolant) flowing between the vessels in the fluid coupling 2270 of the primary coolant loop 2190 as discussed above. In one non-limiting embodiment, each of the reactor vessel 2200 and the steam generating vessel 2300 may be made of a corrosion resistant metal such as stainless steel, although other materials of construction are possible.

Figure 8:
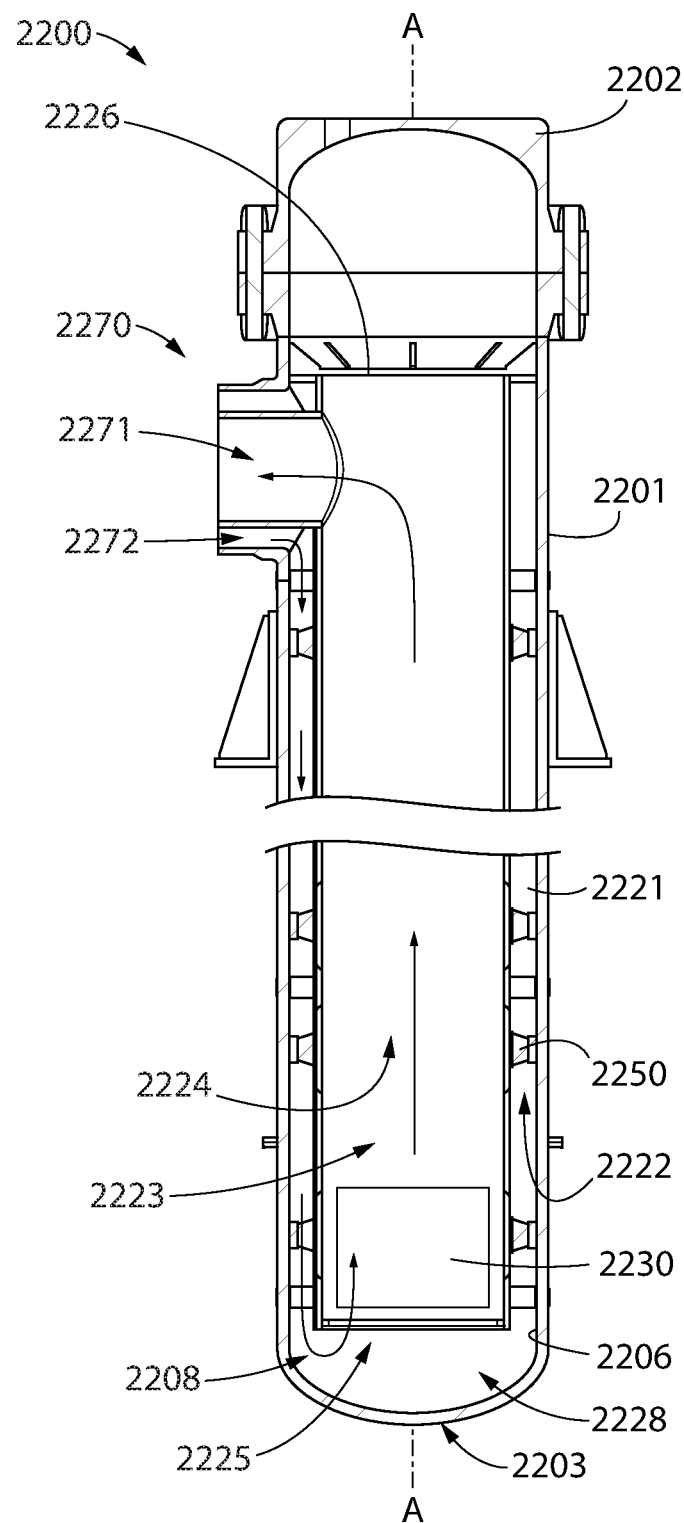
FIG. 8 is an elevation cross-sectional view of the reactor vessel of FIG. 7.

Referring to FIGS. 7 and 8 concurrently, the reactor vessel 2200 will be further described. The reactor vessel 2200 in one non-limiting embodiment is an ASME code Section III, Class 1 thick-walled cylindrical pressure vessel comprised of a cylindrical sidewall shell 2201 with an integrally welded hemispherical bottom head 2203 and a removable hemispherical top head 2202. The shell 2201 defines an internal cavity 2208 configured for holding the reactor core which comprises the nuclear fuel. Specifically, the reactor vessel 2200 includes a cylindrical reactor shroud 2220 which contains the reactor core defined by a fuel cartridge 2230 (i.e., nuclear fuel). The reactor shroud 2220 transversely divides the shell portion of the reactor vessel into two concentrically arranged spaces: (1) an outer annulus 2221 defining the annular downcomer 2222 for primary coolant entering the reactor vessel which is formed between the outer surface of the reactor shroud 2220 and an inner surface 2206 of the shell 2201; and (2) a passageway 2223 defining the riser column 2224 for the primary coolant leaving the reactor vessel 2200 heated by fission in the reactor core.

The reactor shroud 2220 is elongated and extends in an axial direction along a vertical axis A-A of the reactor vessel 2200. The reactor shroud 2220 includes an open bottom end 2225 and a closed top end 2226. In one embodiment, the open bottom end 2225 of the reactor shroud 2220 is vertically spaced apart by a distance from the bottom head 2203 of the reactor vessel 2200 thereby forming a bottom flow plenum 2228 between the bottom end 2225 of the reactor shroud 2220 and the bottom head 2203 of the reactor vessel 2200. As will be discussed in more detail below, during flow of the primary coolant through the primary coolant loop 2190, the bottom flow plenum 2228 collects the primary coolant from the annular downcomer 2222 and directs the primary coolant flow into the inlet of the riser column 2224 formed by the open bottom end 2225 of the reactor shroud 2220.

In certain embodiments, the reactor shroud 2220 is a double-walled cylinder which may be made of a corrosion resistant material, such as without limitation stainless steel. This double-wall construction of the reactor shroud 2220 forms an insulated structure designed to retard the flow of heat across it and forms a smooth vertical riser column 2224 for upward flow of the primary coolant heated by the fission in the fuel cartridge 2230 ("core"), which is preferably located at the bottom extremity of the shroud 2220 in one embodiment as shown in FIG. 8. In certain embodiments, shroud 2220 may be a multi-walled cylinder having more than two walls to further decrease the heat transfer across the shroud from the hot riser to the cold downcomer. The vertical space above the fuel cartridge 2230 in the reactor shroud 2220 may also contain interconnected control rod segments along with a set of "non-segmental baffles" that serve to protect them from flow induced vibration during reactor operations. The reactor shroud 2220 is laterally supported by the reactor vessel by support members 2250 to prevent damage from mechanical vibrations that may induce failure from metal fatigue.

In certain embodiments, the fuel cartridge 2230 is a unitary autonomous structure containing upright fuel assemblies, and is situated in a region of the reactor vessel 2200 that is spaced above the bottom head 2203 so that a relatively deep plenum of water lies underneath the fuel cartridge 2230. The fuel cartridge 2230 is insulated by the reactor shroud 2220 so that a majority of the heat generated by the fission reaction in the nuclear fuel core is used in heating the primary coolant flowing through the fuel cartridge 2230 and adjoining upper portions of the riser column 2224. In certain embodiments, the fuel cartridge 2230 is an open cylindrical structure including cylindrically shaped sidewalls, an open top, and an open bottom to allow the primary coolant to flow upward completely through the cartridge (see directional flow arrows, described in detail above with specific reference to FIG. 7). In one embodiment, the sidewalls of the fuel cartridge 2230 may be formed by multiple arcuate segments of reflectors which are joined together by suitable means. The open interior of the fuel cartridge 2230 may be filled with a support grid for holding the nuclear fuel rods and for insertion of control rods into the core to control the fission reaction as needed.

In the interconnecting space between the reactor vessel 2200 and the steam generating vessel 2300 there is a fluid coupling 2270 that comprises an inner flow path 2271 and an outer flow path 2272 that concentrically surrounds the inner flow path 2271. As will be discussed in more detail below, during flow of the primary coolant the primary coolant flows upwardly within the riser column 2224 and through the inner flow path 2271 of the fluid coupling 2270 to flow from the reactor vessel 2200 to the steam generating vessel 2300. After the primary coolant gets to the top of the steam generating vessel 2300, the primary coolant begins a downward flow through the steam generating vessel 2300 and then flows through the outer flow path 2272 from the steam generating vessel 2300 and into the downcomer 2222 of the reactor vessel 2200. Again, this flow path will be described in more detail below.

Figure 9:
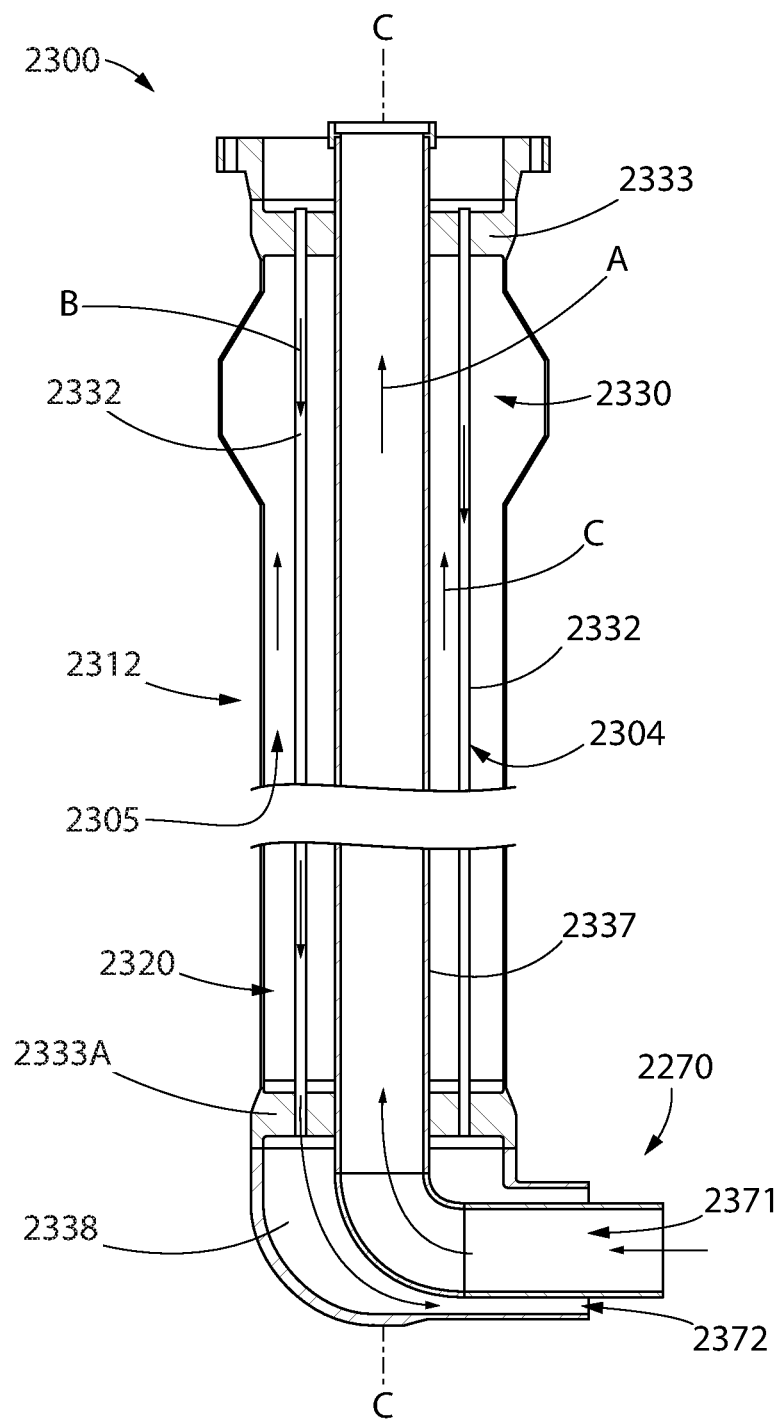
FIG. 9 is an elevation cross-sectional view of the bottom portion of the steam generating vessel of FIG. 7.
Figure 10:
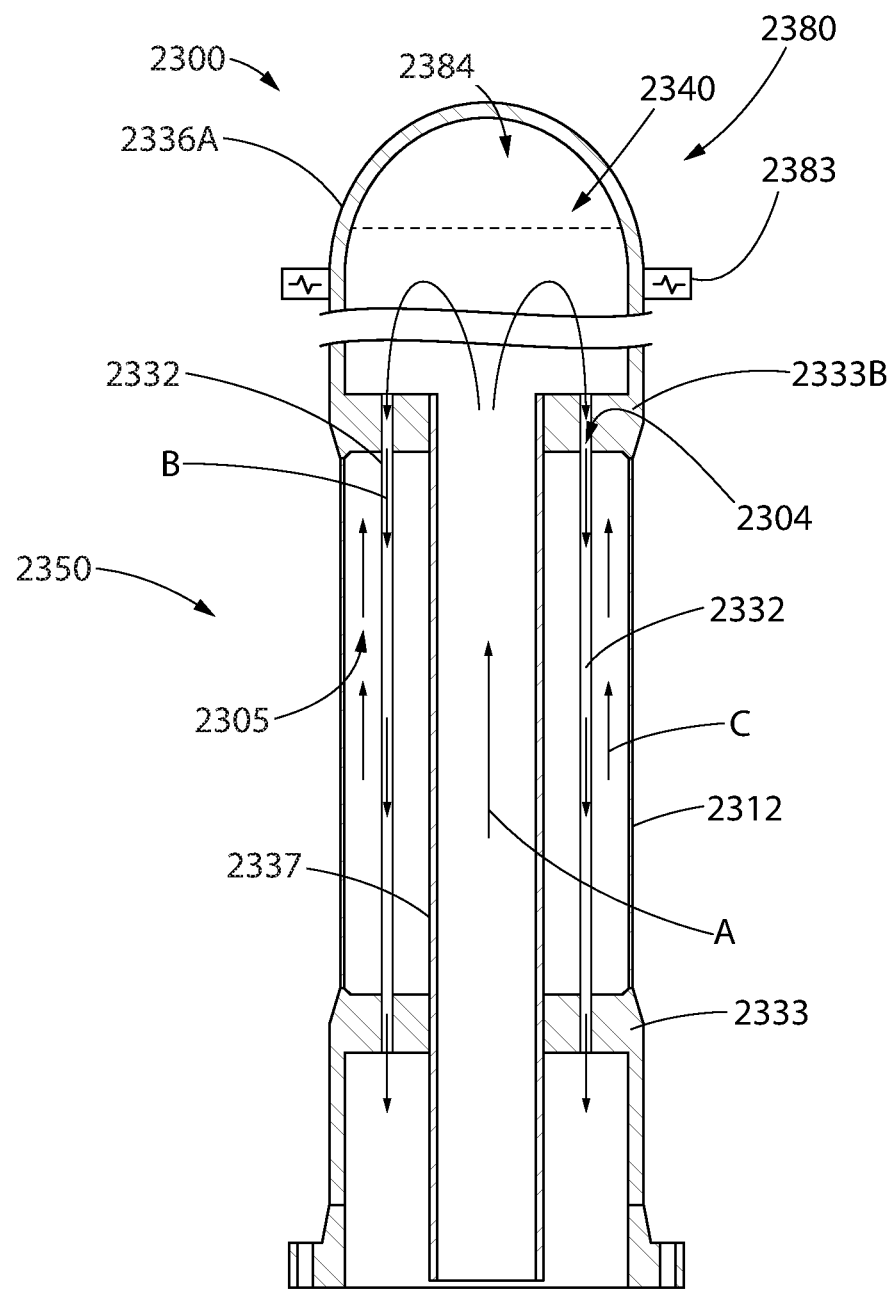
FIG. 10 is an elevation cross-sectional view of the top portion of the steam generating vessel of FIG. 7.

Turning now to FIGS. 7, 9, and 10 concurrently, the details of the steam generating vessel 2300 will be described in more detail. In certain embodiments, the steam generating vessel 2300 includes a preheater section 2320, a steam generator section 2330, a superheater section 2340 and a pressurizer 2380. However, the invention is not to be so limited and one or more of the sections of the steam generating vessel 2300 may be omitted in certain other embodiments. Specifically, in certain embodiments the preheater section 2320 may be omitted, or may itself be considered a part of the steam generator section 2330. As discussed above, it is within the steam generator vessel 2300 that the secondary coolant that is flowing through the shell side 2305 of the steam generator vessel 2300 is converted from a liquid (i.e., secondary coolant inlet illustrated in FIG. 7) to a superheated steam that is sent to the turbine 2900 (FIG. 7) for electricity generation. The secondary coolant flows in the second coolant loop through the shell side of the steam generating vessel 2300, out to the turbine 2900, from the turbine 2900 to a condenser, and then back into the shell side of the steam generating vessel 2300.

In the exemplified embodiment, each of the preheater 2320, the steam generator 2330, and the superheater 2350 are tubular heat exchangers having a tube side 2304 and a shell side 2305. The tube side 2304 of the tubular heat exchangers include a tube bundle comprising a plurality of parallel straight tubes 2332 and tubesheets 2333 disposed at the extremities or ends of each tube bundle that support the tubes. In the exemplified embodiment, only two tubes 2332 are illustrated to avoid clutter. However, in actual use tens, hundreds, or thousands of tubes 2332 can be positioned within each of the sections of the steam generating vessel 2300. In certain embodiments, a bottom-most one of the tubesheets 2333A is located in the preheater section 2320 or in the steam generator section 2330. This bottom-most tubesheet 2333A will be discussed in more detail below with regard to a location of injection from the start-up sub-system 2500 in one exemplified embodiment.

As noted above, in one embodiment the preheater section 2320 can be considered as a part of the steam generator section 2330. In such embodiments the steam generator section 2330 and the superheater section 2350 can be considered as stacked heat exchangers such that the superheater section 2350 is disposed above the steam generator section 2330. In certain embodiments, the preheater section 2320, steam generator section 2330, and superheater section 2350 are positioned to form a parallel counter-flow type heat exchanger arrangement in which the secondary coolant (Rankine cycle) flows in an opposite, but parallel direction to the primary coolant (see FIGS. 9 and 10). Specifically, the arrows labeled A indicate the flow direction of the primary coolant through the riser pipe 2337 that is positioned within the steam generating vessel 2300, the arrows labeled B indicate the flow direction of the primary coolant through the tubes 2332 of the steam generating vessel 2300, and the arrows labeled C indicate the flow direction of the secondary coolant through the shell side 2305 of the steam generating vessel 2300. The trio of the foregoing tubular heat exchangers (i.e. preheater, steam generator, and superheater) are hydraulically connected in series on both the tube side 2304 (primary coolant) and the shell side 2305 (the secondary coolant forming the working fluid of the Rankine Cycle which changes phase from liquid to superheated gas).

In the exemplified embodiment, the steam generating vessel 2300 includes a top 2310, a bottom 2311, an axially extending cylindrical shell 2312, and the internal riser pipe 2337 which is concentrically aligned with the shell 2312 and in the exemplified embodiment lies on a centerline C-C of the steam generating vessel 2300. The tubes 2332 are circumferentially arranged around the outside of the riser pipe 2337 between the riser pipe 2337 and the shell 2312 in sections of the steam generating vessel 2300 which include the preheater 2320, the steam generator 2330, and the superheater 2350. In one embodiment, the riser pipe 2337 extends completely through all of the tubesheets 2333 associated with the preheater 2320, the steam generator 2330, and the superheater 2350 from the top of the steam generating vessel 2300 to the bottom to form a part of the continuous primary coolant loop 2190 between the reactor vessel 2200 and the steam generating vessel 2300 all the way to the pressurizer 2380.

The fluid coupling 2270 includes an inner flowpath 2371 and an outer flowpath 2372 on the steam generating vessel 2300 side of the fluid coupling 2270. The inner flowpath 2371 is fluidly coupled to the inner flow path 2271 and the outer flowpath 2372 is fluidly coupled to the outer flowpath 2272. Thus, via these operable couplings the steam generating vessel 2300 is fluidly coupled to the reactor vessel 2200 to complete the primary coolant loop 2190 for flow of the primary coolant through both the reactor vessel 2200 and the steam generating vessel 2300. An annular space is formed between the riser pipe 2337 and the shell 2312, which forms a bottom plenum 2338. The bottom plenum 2338 collects and channels the primary coolant from the steam generating vessel 2300 back to the reactor vessel 2200 via the outer flow paths 2272, 2372. Thus, in the exemplified embodiment the primary coolant flows from the reactor vessel 2200 to the steam generating vessel 2300 through the inner flow paths 2271, 2371 and the primary coolant flows from the steam generating vessel 2300 to the reactor vessel 2200 through the outer flow paths 2272, 2372. However, the invention is not to be so limited and in other embodiments the use of the flow paths 2271, 2272, 2371, 2372 can be reversed The superheater 2350 is topped by a pressurizer 2380 as shown in FIGS. 7 and 10, which is in fluid communication with both the top or outlet of the riser pipe 2337 and the inlet to the tubes 2332 of the superheater 2350. In one embodiment, the pressurizer 2380 is mounted directly to the shell 2312 of the steam generating vessel 2300 and forms a top head 2336a on the shell. In one embodiment, the pressurizer has a domed or hemispherical head and may be welded to the shell 2312, or alternatively bolted in other possible embodiments. The pressurizer 2380 forms an upper plenum which collects reactor primary coolant rising through riser pipe 2337 and distributes the primary coolant from the riser pipe 2337 to the superheater tubes 2332. In certain embodiments, the pressurizer 2380 includes a heating/quenching element 38. (i.e. water/steam) for pressure control of the reactor primary coolant.

Shown schematically in FIG. 10, the heating/quenching element 2383 is comprised of a bank of electric heaters which are installed in the pressurizer section that serve to increase the pressure by boiling some of the primary coolant and creating a steam bubble that resides at the top of the pressurizer near the head (above the liquid/gas interface 2340 represented by the dashed line). A water spray column 2384 is located near the top head 2336a of the pressurizer 2380 which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 2380 and the heating/quenching element 2383 may be without limitation about 2,250 psi. In alternative embodiments, as noted above, the liquid/gas interface 2340 is formed between an inert gas, such as nitrogen (N2) supplied by supply tanks (not shown) connected to the pressurizer 2380, and the liquid primary coolant.

In one embodiment, the external surfaces of the tubes 2332 may include integral fins to compensate for the reduced heat transfer rates in the gaseous superheated steam media. The superheater tube bundle is protected from erosion (i.e. by tiny water droplets that may remain entrained in the up-flowing steam) by ensuring that the steam flow is counter-flow being parallel along, rather than across, the tubes 2332 in the tube bundle.

Figure 11A:
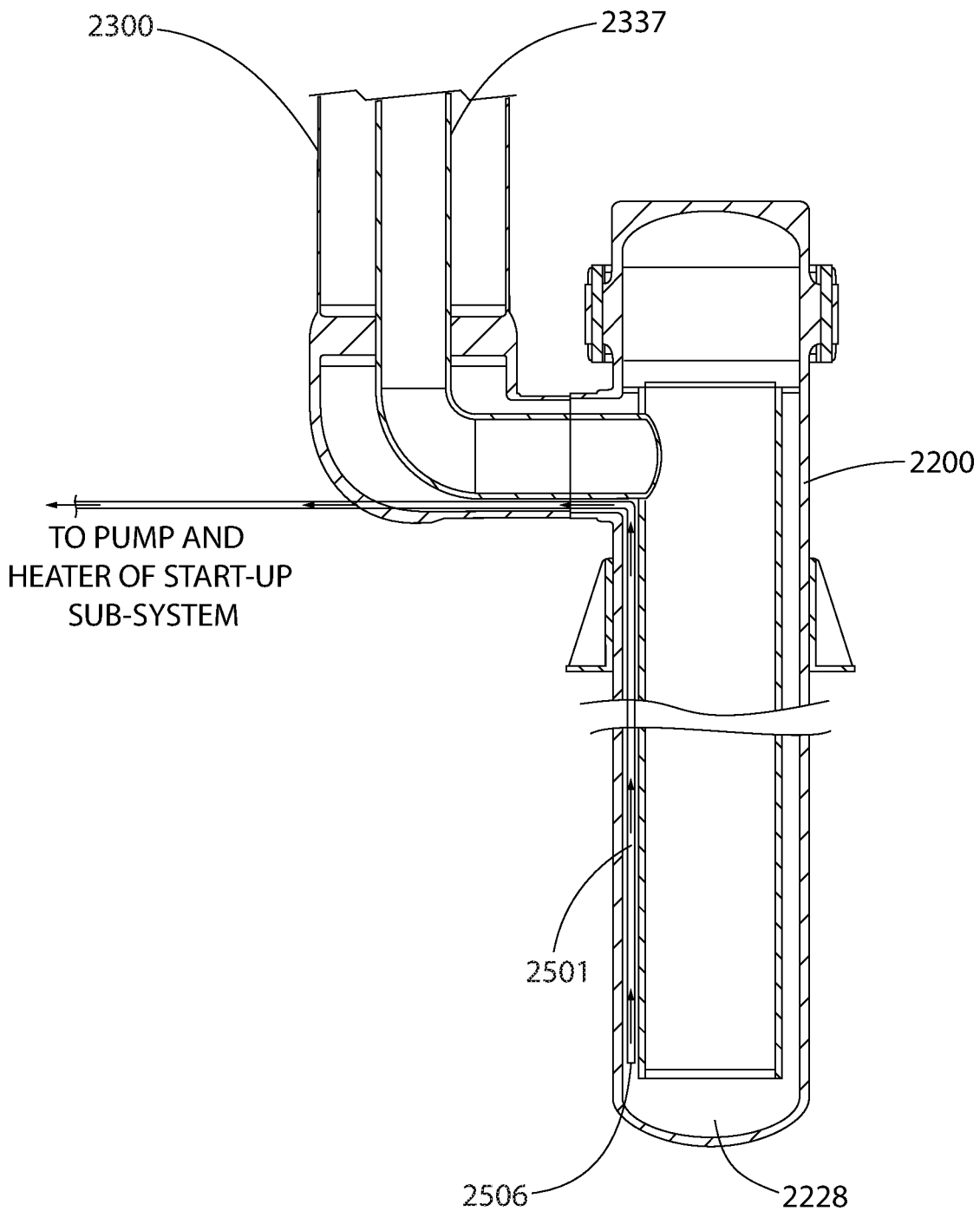
FIG. 11A is a close-up view of the reactor vessel and a portion of the steam generating vessel of FIG. 7 illustrating the location of an intake conduit of the start-up sub-system in accordance with a first embodiment of the present invention.

Referring now to FIGS. 7 and 11A, the start-up sub-system 2500 of the nuclear steam supply system 2100 will be described in accordance with one embodiment of the present invention. In addition to discussing the components of the start-up sub-system 2500 below, the operation of the start-up sub-system 2500 in conjunction with the operation of the nuclear steam supply system 2100 as a whole will be discussed below. Prior to the start-up processes taking place as will be discussed in more detail below, the primary coolant loop 2190 is filled with the primary coolant, but the primary coolant is at ambient temperature and is not flowing through the primary coolant loop 2190. Utilizing the start-up sub-system 2500 of the present invention, the primary coolant is heated, made to flow through the primary coolant loop 2190, and then able to continue passively flowing through the primary coolant loop 2190 without the use of any pumps after disconnecting the start-up sub-system 2500 from the primary coolant loop 2190. It will be appreciated that in certain embodiments, nuclear heat from the reactor may be used to heat the primary coolant and the start-up system to provide circulation up to a certain fraction of full natural circulation flow.

In order to start up the nuclear steam supply system 2100 and begin withdrawing the control rods to initiate a fission chain reaction by the nuclear fuel in the reactor vessel 2200, the primary coolant should be heated to a no load operating temperature, which in certain embodiments can be between 500° F. and 700° F., more specifically between 550° F. and 650° F., and more specifically approximately 600° F. Ensuring that the primary coolant is at the no load operating temperature before normal operation (i.e., before flowing the steam to the turbine and before withdrawing the control rods) is beneficial for several reasons. First, it ensures that the primary coolant has a completely turbulated flow across the fuel core while the control rods are being withdrawn, which avoids localized heating and boiling. Second, it ensures that the reactivity of the water is in the optimal range during start-up and normal operation. Because the nuclear steam supply system 2100 does not utilize any pumps to flow the primary fluid through the primary coolant loop 2190 during normal operation but rather relies on thermo-siphon flow as discussed above, conventional means of using frictional heat from the pumps to heat up the primary coolant is unavailable. Thus, the inventive nuclear steam supply system 2100 uses the start-up sub-system 2500 to heat the primary coolant up to the no load operating temperature during start up procedures.

The start-up sub-system 2500 is designed to have a high margin of safety. The start-up sub-system 2500 also ensures a fully turbulent flow across the fuel core in the reactor vessel 2200 and heats the water to no-load operating temperature prior to any withdrawal of the control rods. As discussed in detail above, during start-up of the nuclear steam supply system 2100, the primary coolant is located within the primary coolant loop 2190 in the reactor vessel 2200 and in the steam generating vessel 2300, but it does not flow through the primary coolant loop 2190 initially. While the primary fluid is positioned in the primary coolant loop 2190, the start-up sub-system 2500 draws or receives a portion of the primary coolant from the primary coolant loop 2190, heats up the portion of the primary coolant to form a heated portion of the primary coolant, and injects the heated portion of the primary coolant back into the primary coolant loop 2190. Thus, the start-up sub-system 2500 forms a fluid flow circuit that withdraws some of the primary coolant from the primary coolant loop 2190 and heats the primary coolant prior to re-injecting that portion of the primary coolant into the primary coolant loop 2190.

When the start-up sub-system 2500 injects the heated portion of the primary coolant into the primary coolant loop 2190, this initiates a venturi effect that creates fluid flow of the entire body of the primary coolant within the primary coolant loop 2190. Specifically, the injected heated portion of the primary coolant flows within the primary coolant loop and pulls the initially static primary coolant within the primary coolant loop 2190 with it as it flows, thereby creating an entire turbulent flow of the primary coolant (including the original static primary coolant and the heated portion of the primary coolant) through the primary coolant loop 2190. Furthermore, because the primary coolant injected from the start-up sub-system is heated relative to the temperature of the primary coolant within the primary coolant loop 2190, this injection begins to heat up the primary coolant inventory within the primary coolant loop 2190. When the primary coolant within the primary coolant loop 2190 reaches the no-load operating temperature, the start-up sub-system 2500 can be fluidly disconnected from the reactor vessel 2200 and the steam generating vessel 2300 and flow of the primary coolant through the primary coolant loop 2190 will continue due to thermosiphon properties.

In the exemplified embodiment, the start-up sub-system 2500 comprises an intake conduit 2501, a pump 2502, an injection conduit 2503, a heating element 2504 and an injection nozzle 2505. The intake conduit 2501, the pump 2502, the injection conduit 2503 and the injection nozzle 2505 are all fluidly coupled together so that a portion of the primary coolant that is received by the start-up sub-system 2500 will flow through each of the intake conduit 2501, the pump 2502, the injection conduit 2503 and the injection nozzle 2505.

In the exemplified embodiment, the entire nuclear steam supply system 2100 including the reactor vessel 2200, the steam generating vessel 2300 and the start-up sub-system 2500 are housed within a containment vessel 2400. This ensures that in the event of a loss-of-coolant accident during start-up, all of the high energy fluids are contained within the containment boundary of the containment vessel 2400. The details of the containment vessel 2400 can be found in PCT/US13/42070, filed on May 21, 2013, the entirety of which is incorporated herein by reference. Furthermore, the start-up sub-system 2500 is at least partially positioned external to the reactor vessel 2200 and to the steam generating vessel 2300. Specifically, in the exemplified embodiment while the intake conduit 2501 is at least partially positioned within one of the reactor vessel 2200 or the steam generating vessel 2300 to draw a portion of the primary coolant into the start-up sub-system 2500 and the injection nozzle 2505 is at least partially positioned within one of the reactor vessel 2200 or the steam generating vessel 2300 to inject the heated portion of the primary coolant back into one of the reactor vessel 2200 or the steam generating vessel 2300, the pump 2502 and the heating element 2504 are positioned entirety external to the reactor vessel 2200 and to the steam generating vessel 2300.

The portion of the primary coolant that is introduced into the start-up sub-system 2500 flows in a single direction through the start-up sub-system 2500 from the intake conduit 2501 to the injection nozzle 2505. The intake conduit 2501 and the injection conduit 2503 can be a single pipe or conduit or can be multiple pipes or conduits that are fluidly coupled together. In some embodiments, the intake conduit 2501 and the injection conduit 2503 comprise heavy wall pipes that are sized to be between five and seven inches in diameter, and more specifically approximately six inches in diameter. Furthermore, the injection nozzle 2505 has a smaller diameter than the diameter of the intake conduit 2501 and the injection conduit 2503, and can be between two and four inches, or approximately three inches. However, the invention is not to be so limited and the sizing of the intake conduit 2501, the injection conduit 2503 and the injection nozzle 2505 can be greater than or less than the noted ranges in other embodiments.

In the exemplified embodiment, the pump 2502 is a centrifugal pump designed to pump a sufficiently large flow of the primary coolant to develop turbulent conditions in the reactor core. Specifically, in certain embodiments the pump 2502 can pump approximately 10% of the normal flow through the primary coolant loop 2190 and is able to overcome any pressure differential through the riser pipe 2337. Of course, the invention is not to be so limited and the pump 2502 can be any type of pump and can pump any amount of the primary coolant through the start-up sub-system 2500 as desired or needed for start-up procedures to be successful.

The heating element 2504 can be any mechanism that is capable of transferring heat into the portion of the primary coolant that is flowing through the start-up sub-system 2500. The heating element 2504 can be a single heater or a bank of heaters. The heating element can take on any form, including being a resistance wire, molybdenum disilicide, etched foil, a heat lamp, PTC ceramic, a heat exchanger or any other element that can provide heat to a liquid that is flowing through a conduit. In certain embodiments the heating element 2504 can be powered by electrically powered resistance rods. In other embodiments, the heating element 2504 can be powered by tubular heat exchangers supplied with steam by an auxiliary steam boiler. Any mechanism can be used as the heating element 2504 so long as the heating element 2504 can transfer heat into the primary coolant in order to heat up the portion of the primary coolant that is flowing through the start-up sub-system 2500.

In the exemplified embodiment, the intake conduit 2501 comprises an inlet 2506 that is located within the primary coolant loop 2190. More specifically, in the embodiment of FIG. 7 the inlet 2506 of the intake conduit 2501 is positioned at a bottom of the reactor vessel 2200. This may include positioning the inlet 2506 of the intake conduit 2501 within the bottom flow plenum 2228 of the reactor vessel 2200. However, the invention is not to be so limited and the bottom of the reactor vessel 2200 may include positioning the inlet 2506 of the intake conduit 2501 adjacent to the bottom end 2225 of the shroud 2220. Furthermore, in other embodiments the inlet 2506 of the intake conduit 2501 can be located in a central vertical region of the reactor vessel 2200 or in a top vertical region of the reactor vessel 2200 or within the steam generating vessel 2300 as discussed in more detail below with reference to FIGS. 11A-11C. Positioning the inlet 2506 of the intake conduit 2501 at the bottom of the reactor vessel 2200 ensures that the portion of the primary coolant that is removed from the primary coolant loop and received by the start-up sub-system 2500 is the coolest or coldest primary coolant available in the primary coolant loop. Such positioning of the inlet 2506 of the intake conduit 2501 can reduce start-up time. However, the invention is not to be limited by positioning the inlet 2506 of the intake conduit 2501 at the bottom of the reactor vessel 2200, and other positions are possible as discussed above and again below with regard to FIGS. 11A-11C.

Figure 11B:
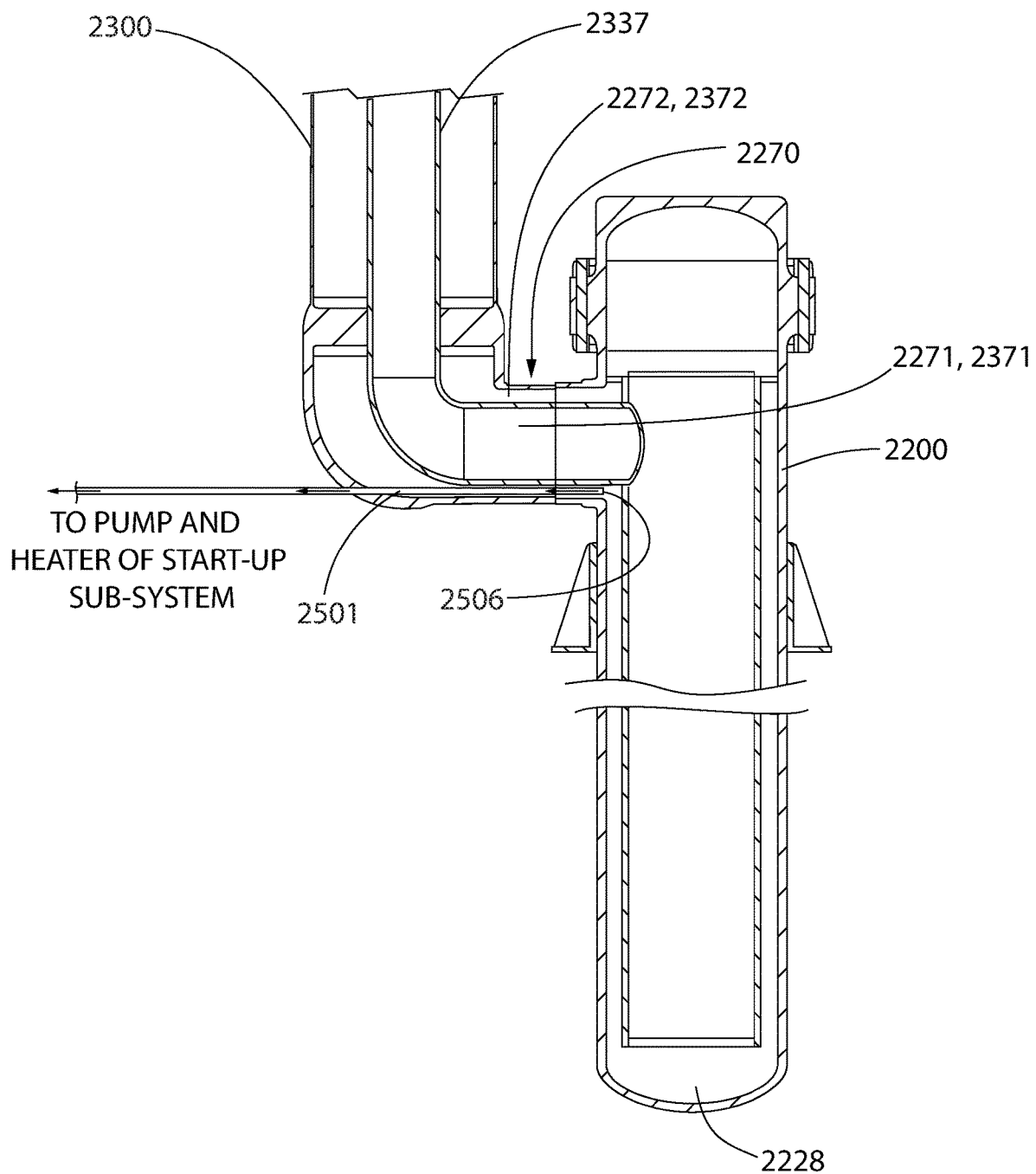
FIG. 11B is the close-up view of FIG. 11A illustrating the location of the intake conduit of the start-up sub-system in accordance with a second embodiment of the present invention.
Figure 11C:
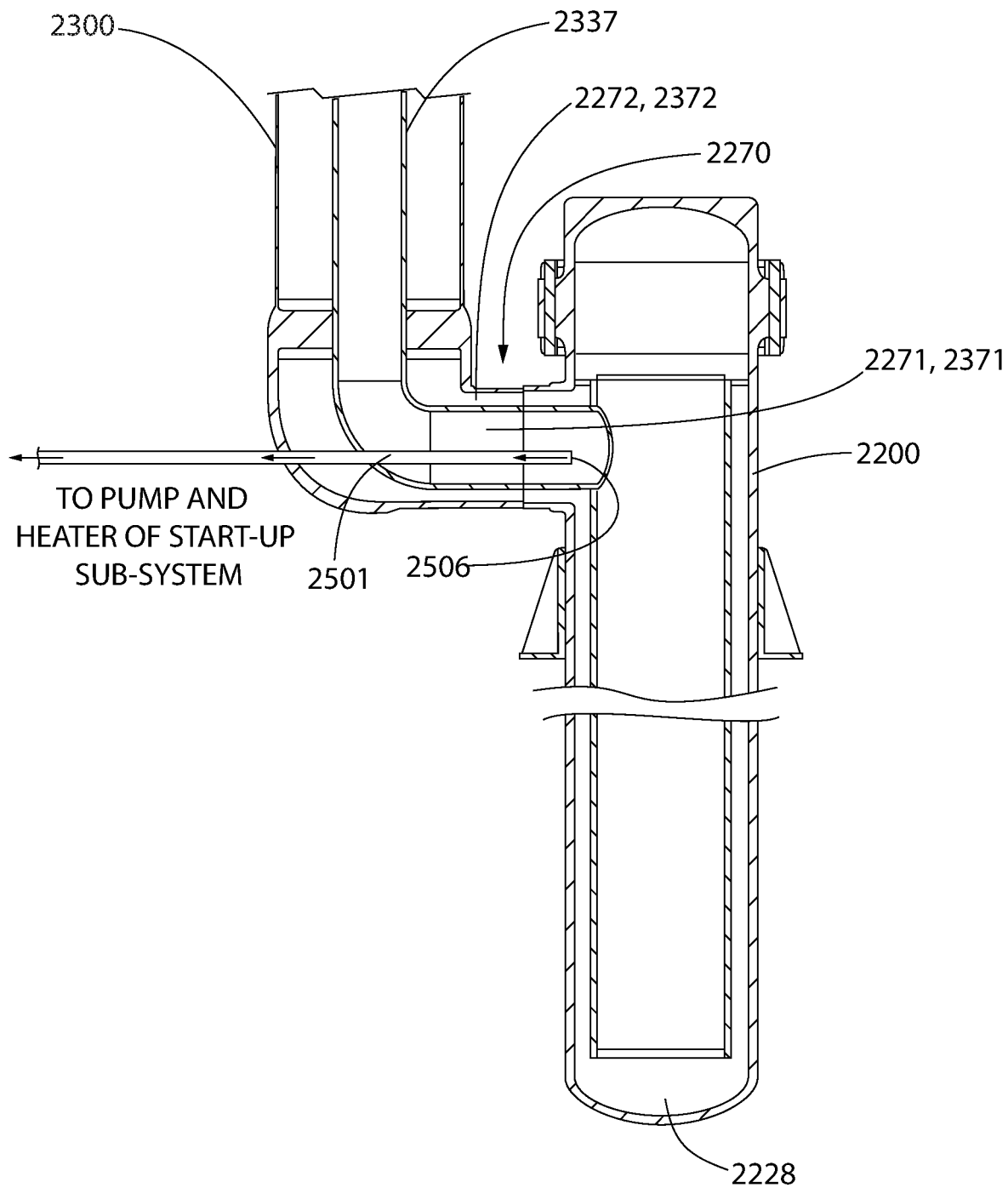
FIG. 11C is the close-up view of FIG. 11A illustrating the location of the intake conduit of the start-up sub-system in accordance with a third embodiment of the present invention.

Specifically, FIGS. 11A-11C show different places that the inlet 2506 of the intake conduit 2501 can be positioned in different embodiments. The positioning of the inlet 2506 of the intake conduit 2501 illustrated in FIGS. 11A-11C are merely exemplary and are not intended to be limiting of the present invention. Therefore, it should be understood that the inlet 2506 of the intake conduit 2501 can be located at any other desired location along the primary coolant loop. In FIG. 11A, the inlet 2506 of the intake conduit 2501 is positioned at the bottom of the reactor vessel 2200. In FIG. 11B, the inlet 2506 of the intake conduit 2501 is positioned at the bottom of the steam generating vessel 2300 or within the outer flow path 2272, 2372 of the fluid coupling 2270 between the steam generating vessel 2300 and the reactor vessel 2200. In FIG. 11C, the inlet 2506 of the intake conduit 2501 is positioned within the riser pipe 2337 or within the inner flow path 2271, 2371 of the fluid coupling 2270 between the steam generating vessel 2300 and the reactor vessel 2200. The inlet 2506 of the intake conduit 2501 can also be positioned within the riser pipe 2337 upstream of the fluid coupling 2270 or at any other desired location within the primary coolant loop 2190. Regardless of its exact positioning, the location of the inlet 2506 of the intake conduit 2501 is the location from which the portion of the primary coolant is withdrawn for introduction into the start-up sub-system 2500.

In certain embodiments, the pump 2502 may be fluidly coupled to more than one intake conduit or more than one inlet so that the primary coolant can be drawn from the primary coolant loop 2190 and introduced into the start-up sub-system 2500 from more than one location simultaneously, or so that an operator can determine the location from which the primary coolant can be taken based on desired applications and start-up time requirements. Specifically, there may be multiple intake conduits that are connected to the injection conduit such that there are valves associated within each intake conduit. One of the intake conduits can have an inlet located at a bottom of the reactor vessel 2200 and another one of the intake conduits can have an inlet located at a bottom of the steam generating vessel 2300. Thus, an operator can open one or more of the valves while leaving the other valves closed to determine the location(s) within the primary coolant loop 2190 from which the primary coolant will be drawn for introduction into the start-up sub-system 2500.

Referring back to FIG. 7, regardless of the exact positioning of the inlet 2506 of the intake conduit 2501, a portion of the primary coolant is drawn from the primary coolant loop 2190 into the intake conduit 2501 of the start-up sub-system 2500 when it is desired to start the nuclear steam supply system 2100. More specifically, in the exemplified embodiment the primary coolant is drawn from the primary coolant loop 2190 by the operation of the pump 2502. Specifically, in the exemplified embodiment when the pump 2502 is turned on, the portion of the primary coolant is drawn from the primary coolant loop 2190 and into the start-up sub-system 2500. When the pump is turned off, none of the primary coolant is drawn from the primary coolant loop 2190 and into the start-up sub-system 2500.

Although the use of the pump 2502 for drawing the portion of the primary coolant into the start-up sub-system 2500 is described above, the invention is not to be so limited. In certain other embodiments, the start-up sub-system 2500 may include a valve positioned at some point along the intake conduit 2501. In some embodiments, the start-up sub-system 2500 may also or alternatively include another valve positioned at some point along the injection conduit 2503. The use of valves enables the start-up sub-system to be cut off from the reactor vessel 2200 and the steam generating vessel 2300 from a fluid flow standpoint. Specifically, by closing the valves the primary coolant will be unable to enter into the start-up sub-system 2500, and the primary coolant loop will form a closed-loop path. One embodiment of the use of valves in the start-up sub system 2500 and the connection/placement of those valves will be described in more detail below with reference to FIG. 13.

Where valves are used, the valves can be alterable between an open state whereby a portion of the primary coolant flows from the primary coolant loop and into the start-up sub-system 2500 and a closed state whereby the primary coolant is prevented from flowing into the start-up sub-system 2500. In some embodiments, both the pump 2502 and one or more valves may be used in conjunction with one another to facilitate the flow of the portion of the primary coolant into the start-up sub-system 2500.

Still referring to FIG. 7, when the pump 2502 is operating (and any valves positioned between the reactor vessel 2200 and the start-up sub-system 2500 and between the steam generating vessel 2300 and the start-up sub-system 2500 are open), the portion of the primary coolant flows from the primary coolant loop 2190 and into the intake conduit 2501 through the inlet 2506. In FIG. 7, this portion of the primary coolant is taken from the bottom of the reactor vessel 2200 where the primary coolant is at its coldest. However, as discussed above the primary coolant can be taken from any location along the primary coolant loop 2190, including from within the steam generating vessel 2300 and within the riser pipe 2337. The portion of the primary coolant flows through the intake conduit 2501, passes through the pump 2502 and flows into the injection conduit 2503 whereby the portion of the primary coolant passes through the heating element 2504. As the portion of the primary coolant passes through or by the heating element 2504, the portion of the primary coolant is heated and becomes a heated portion of the primary coolant. The heated portion of the primary coolant then continues to flow along the injection conduit 2503 and into the injection nozzle 2505 where the heated portion of the primary coolant is injected back into the primary coolant loop 2190.

Figure 12:
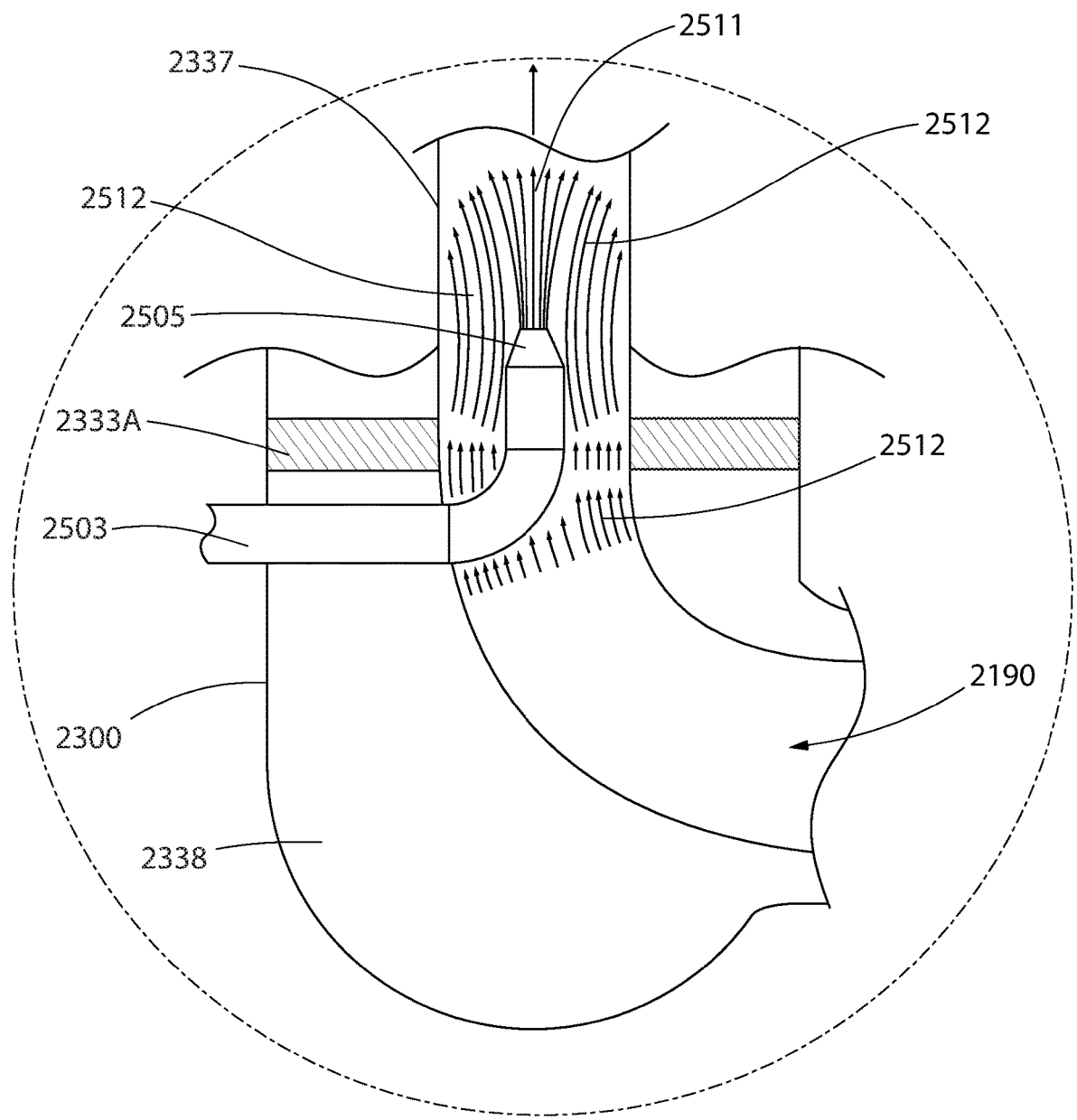
FIG. 12 is a close-up view of area XII of FIG. 7.

Referring to FIGS. 7 and 12 concurrently, the injection of the heated portion of the primary coolant into the primary coolant loop 2190 will be discussed in more detail. In the exemplified embodiment, the injection nozzle 2505 is positioned within the riser pipe 2337 of the steam generating vessel 2300. Of course, the invention is not to be so limited and the injection nozzle 2505 can be positioned at other locations within either the reactor vessel 2200 or the steam generating vessel 2300 as desired. Specifically, the injection conduit 2505 can be located within the riser column 2224 of the reactor vessel 2200, within the downcomer 2222 of the reactor vessel 2200, within the pressurizer 2380 of the steam generating vessel 2300 or at any other desired location.

In the exemplified embodiment the injection nozzle 2505 is centrally located within the riser pipe 2337 so as to be circumferentially equidistant from the inner surface of the riser pipe 2337. Furthermore, the injection nozzle 2505 faces in an upwards direction so that the heated portion of the primary coolant injected from the injection nozzle 2505 is made to flow in a vertical upward direction. In the exemplified embodiment, the injection conduit 2503 enters into the steam generating vessel 2300 at the bottom-most tubesheet 2333A elevation, and the injection nozzle 2505 is positioned near or at the elevation of the bottom-most tubesheet 2333A. More specifically, the injection conduit 2503 extends horizontally into the riser 2337 just below the bottom-most tubesheet 2333A, an elbow connects the injection conduit 2503 to the injection nozzle 2505, and the injection nozzle 2505 extends vertically from the elbow within the riser pipe 2337. Specifically, the injection nozzle 2505 in one embodiment is located so as to inject the heated portion of the primary coolant just above the bottom-most tubesheet 2333A. Thus, in the exemplified embodiment the injection nozzle 2505 is located at and injects the heated portion of the primary coolant to a location above the bottom plenum 2338 of the steam generating vessel 2300. Of course, the invention is not to be so limited in all embodiments and as discussed above the location at which the heated portion of the primary coolant is injected can be modified as desired.

In the exemplified embodiment, the injection nozzle 2505 of the start-up sub-system 2500 injects a heated portion of the primary coolant (indicated with arrows as 2511) into the riser pipe 2337 in a first vertical direction. At the time of the initial injection of the heated portion of the primary coolant 2511 into the riser pipe 2337, the primary coolant (indicated with arrows as 2512) is positioned in the primary coolant loop 2190 including within the riser pipe 2337 but is static or non-moving. After the start-up sub-system 2500 begins injecting the heated portion of the primary coolant 2511 into the riser pipe 2337 in the first vertical direction, the entire body of the primary coolant 2512 within the primary coolant loop 2190 begins to flow in the first vertical direction due to the venturi effect, as discussed below. In certain embodiments, once the primary coolant 2512 within the primary coolant loop 2190 begins to flow, it flows at a first flow rate. Furthermore, the heated portion of the primary coolant 2511 is injected at a second flow rate, the second flow rate being greater than the first flow rate.

In the exemplified embodiment, the injection of the heated portion of the primary coolant 2511 creates a venturi effect in the closed loop path 2190, and more specifically in the riser pipe 2337. Specifically, introducing a jet of high velocity heated primary coolant 2511 into the riser pipe 2337 creates a venturi effect in the riser pipe 2337 that creates a low pressure in the vicinity of the injection nozzle 2505. This low pressure pulls the primary coolant 2512 from the bottom of the riser pipe 2337 upwardly in the direction of the flow of the heated portion of the primary coolant 2511 to the top of the steam generating vessel 2300 and facilitates the flow of the primary coolant through the primary coolant loop 2190. Thus, the injection of the heated portion of the primary coolant 2511 from the start-up sub-system 2500 initiates start-up of the nuclear steam supply system 2100 by facilitating the flow of the primary coolant 2512 through the primary coolant loop 2190. Specifically, due to the venturi effect the mixture of the heated portion of the primary coolant 2511 and the primary coolant 2512 flows upwardly within the riser pipe 2337, and due to gravity the mixed primary coolant 2511/2512 flows downwardly through the tubes 2332 in the steam generating vessel 2300 and downwardly through the downcomer 2222 in the reactor vessel 2200 due to thermosiphon flow. When the heated portion of the primary coolant 2511 mixes with the primary coolant 2512 in the riser pipe 2337, this heated mixture expands and becomes less dense and more buoyant than the cooler primary coolant below it in the primary coolant loop. Convection moves this heated liquid upwards in the primary coolant loop as it is simultaneously replaced by cooler liquid returning by gravity.

Once the primary coolant gets heated up to the no-load operating temperature, the flow of the primary coolant in the primary coolant loop 2190 is continuous without the use of an external pump. The start-up sub-system 2500 and the pump 2502 associated therewith merely operate to heat up the temperature of the primary coolant and to begin the flow of the primary coolant in the primary coolant loop 2190 and to heat up the primary coolant in the primary coolant loop 2190. However, the start-up sub-system 2500 can be disconnected from the primary coolant loop 2190 once no-load operating temperature of the primary coolant is reached and thermosiphon flow of the primary coolant in the primary coolant loop is achieved.

As discussed above, as the primary coolant in the primary coolant loop 2190 heats up, the primary coolant expands. Thus, in certain embodiments the system 2100 may be fluidly coupled to a chemical and volume control system which can remove the additional volume of the primary coolant as needed. Furthermore, such a chemical and volume control system can also remove dissolved gases in the primary coolant. Thus, the chemical and volume control system can be used to control the liquid level by draining and adding additional primary coolant into the primary coolant loop 2190 as needed. In certain embodiments, the chemical and volume control system may be capable of adding and/or removing the primary coolant at a desired rate, such as at a rate of sixty gallons per minute in some embodiments. When used, the chemical and volume control system can be fluidly coupled to the nuclear steam supply system 2100 at any desired location along the primary coolant loop 2190.

During start-up of the nuclear steam supply system 2100, the start-up sub-system 2500 continues to take a portion of the primary coolant from the primary coolant loop 2190, heat the portion of the primary coolant to form a heated portion of the primary coolant, and inject the heated portion of the primary coolant into the primary coolant loop 2190. The flow of the heated portion of the primary coolant into the primary coolant loop 2190 serves to heat up the primary coolant (which is actually a mixture of original primary coolant and the heated portion of the primary coolant) during the start-up process. Once the primary coolant in the primary coolant loop 2190 reaches the no load operating temperature, the pump 2502 is turned off or the start-up sub-system 2500 is otherwise isolated/disconnected/valved off from the primary coolant loop 2190. In certain embodiments, only after the primary coolant reaches the no load operating temperature do the control rods begin to be withdrawn.

During the start-up procedures discussed above, the secondary coolant (i.e., feedwater) continues to be circulated on the shellside 2305 of the steam generating vessel 2300. Thus, as the primary coolant heats up due to the start-up procedures and begins to flow through the primary coolant loop 2190 including through the tubes 2332 of the steam generating vessel, the secondary coolant flowing through the shellside 2305 of the steam generating vessel 2300 boils to produce steam. This steam is held inside of the steam generating vessel 2300 until a desired pressure is reached. Once the desired pressure is reached, a steam isolation valve (i.e., a valve between the steam generating vessel 2300 and the turbine 2900) is opened and a portion of the steam is sent to the turbine 2900 for turbine heat-up and the remainder of the steam is sent to the condenser in a bypass operation.

In certain embodiments, the steam is sent to the turbine 2900 for power production only when all of the control rods are fully withdrawn and the nuclear steam supply system 2100 is at full power. Furthermore, as noted above the control rods are only fully withdrawn in some embodiments after the primary coolant reaches the no-load operating temperature. Thus, in those embodiments, during the start-up process no steam is sent to the turbine 2900 for power production (although it may be sent to the turbine 2900 for turbine heat-up). Power production begins in such embodiments only when the start-up process is complete and the primary coolant flows through the primary coolant loop 2190 passively without the operation of a pump.

In addition to heating the primary coolant within the primary coolant loop 2190, the start-up sub-system 2500 can also be used for draining the primary coolant from the primary coolant loop 2190 if the need arises. In certain embodiments, such as the embodiment depicted in FIGS. 7 and 11A whereby the inlet 2506 of the intake conduit 2501 is positioned at a bottom of the reactor vessel 2300, this can include draining primary coolant from the reactor vessel 2200. Furthermore, the start-up supply system 2500 can be used to remove debris that may accumulate at the bottom of the reactor vessel 2200 or at the bottom of the steam generating vessel 2300, depending on the location of the inlet 2506 of the intake conduit 2501.

Figure 14:
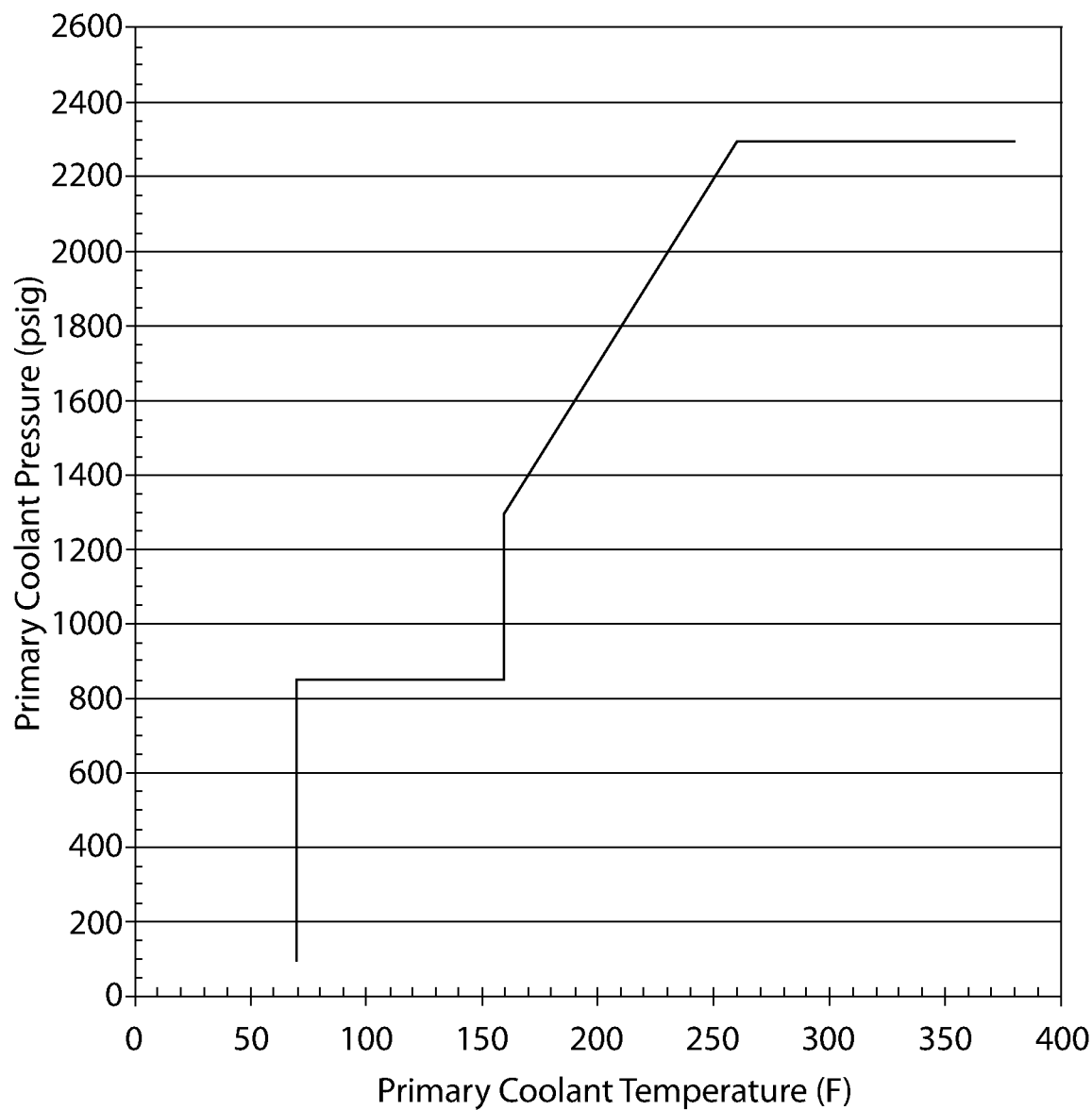
FIG. 14 is a graph illustrating the primary coolant pressure vs. the primary coolant temperature.

In certain embodiments, as the primary coolant is being heated by injecting the heated portion of the primary coolant into the primary coolant loop 2190 using the start-up subsystem 2500, pressure in the primary coolant loop 2190 is increased in stages by introducing high pressure inert gas into the pressurizer 2380 volume. The two-phase (inert gas—water vapor with liquid water) equilibrium maintains the liquid level in the pressurizer 2380 volume. The staged increase in pressure follows the typical heat-up curve as shown in FIG. 14, which is based on a brittle toughness curve specific to the primary coolant loop 2190, reactor vessel 2200 and steam generating vessel 2300 material of construction.

Figure 13:
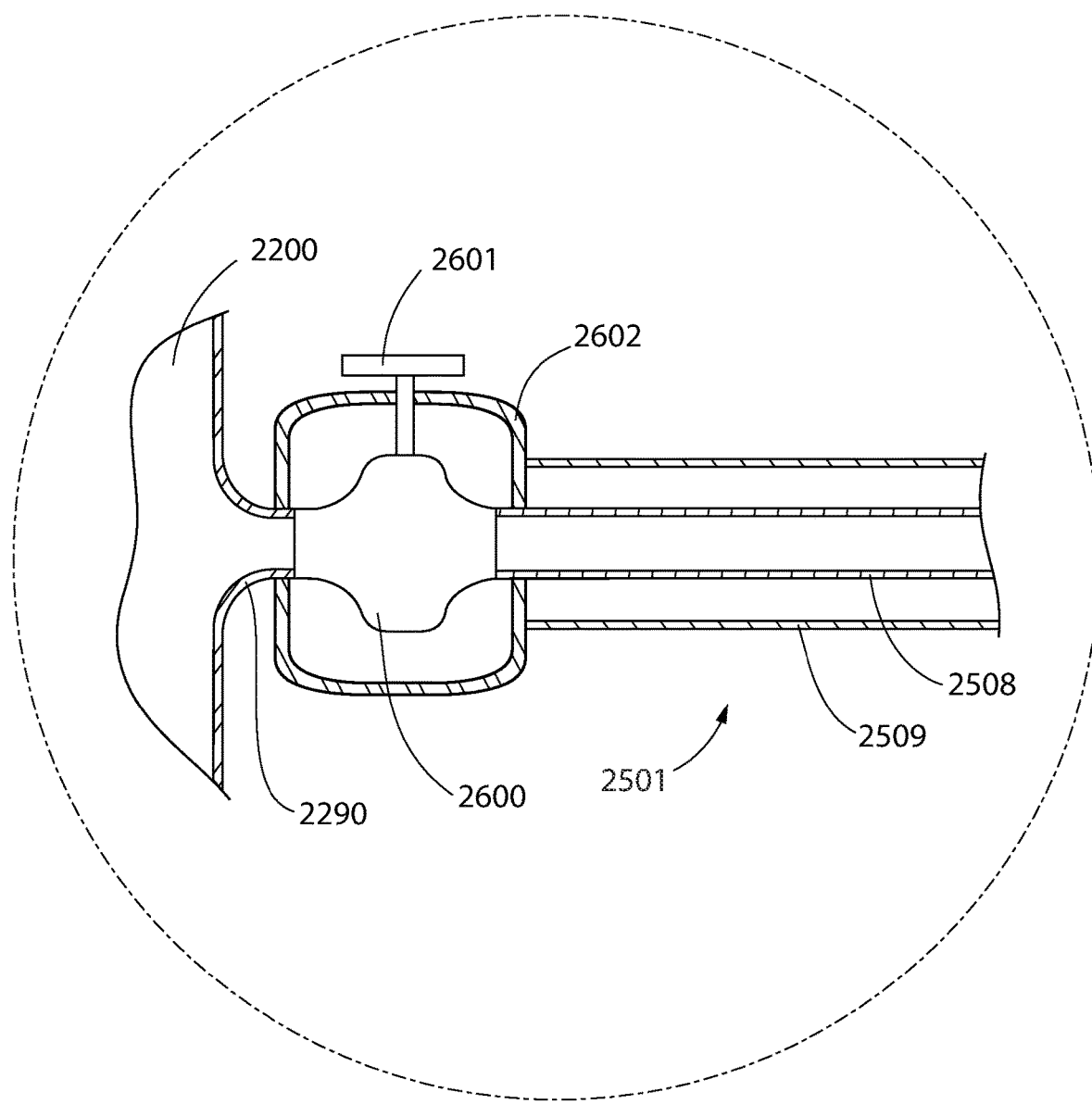
FIG. 13 is a schematic illustrating the connection between the start-up sub-system and the reactor vessel.

Referring now to FIG. 13, the interconnection between the start-up sub-system 2500 and the reactor vessel 2200 will be described. Although FIG. 13 only depicts the connection between the start-up sub-system 2500 and the reactor vessel 2200, it should be appreciated that an identical connection can be used for connecting the start-up sub-system 2500 to the steam generating vessel 2300. Stated another way, FIG. 13 illustrates the manner in which the intake conduit 2501 is connected to the reactor vessel 2200 in a manner that prevents or eliminates or substantially reduces the likelihood of a loss-of-coolant accident. Of course, certain embodiments may omit the valves discussed below, and in certain embodiments the connection between the start-up sub-system 2500 and the reactor vessel 2200 and the steam generating vessel 2300 may be achieved in other manners than that discussed directly below.

As illustrated in FIG. 13, the intake conduit 2501 comprises a concentric pipe construction including an inner pipe 2508 that carries the portion of the primary fluid from the primary coolant loop 2190 and an outer pipe 2509 that concentrically surrounds the inner pipe 2508. The outer pipe serves as a redundant pressure boundary to contain the portion of the primary coolant within the piping in case the inner pipe 2508 were to develop a leak. Two independent pressure enclosures (i.e., the inner pipe 2508 and the outer pipe 2509) serve to render the potential of a pipe break loss-of-coolant accident non-credible.

The inner pipe 2508 is directly connected to a valve 2600. Furthermore, the valve 2600 is enclosed in a pressure vessel 2602 which encloses the entirety of the valve 2600 except for the valve stem 2601. Thus, the valve stem 2601 extends from the pressure vessel 2602 so that manual opening and closing of the valve 2600 is still possible while the pressure vessel 2602 remains enclosing the valve 2600. The inner pipe 2509 connects to the valve 2600 within the pressure vessel 2602. Thus, the pressure vessel 2602 prevents any loss-of-coolant accident event initiating at the weldment between the valve 2600 and the inner/outer pipe 2508, 2509 arrangement. Specifically, if there was a breakage at the weldment between the valve 2600 and the inner pipe 2508, any coolant leakage would occur within the pressure vessel 2602 and would not escape into the environment or elsewhere where it could cause harm.

Furthermore, the reactor vessel 2200 comprises a forging 2290 extending from the sidewall thereof. The valve 2600 is directly welded to the forging 2290. This eliminates the possibility of pipe breakage between the reactor vessel 2200 and the valve 2600. Furthermore, the connection between the forging 2290 and the valve 2600 occurs within the pressure vessel 2602 so that a break at the weldment between the forging 2290 and the valve 2600 would result in coolant leakage occurring within the pressure vessel 2602.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

Inventive Concept #3

Reference is made generally to FIGS. 15-27 which are relevant to Inventive Concept #3 described below.

Figure 15:
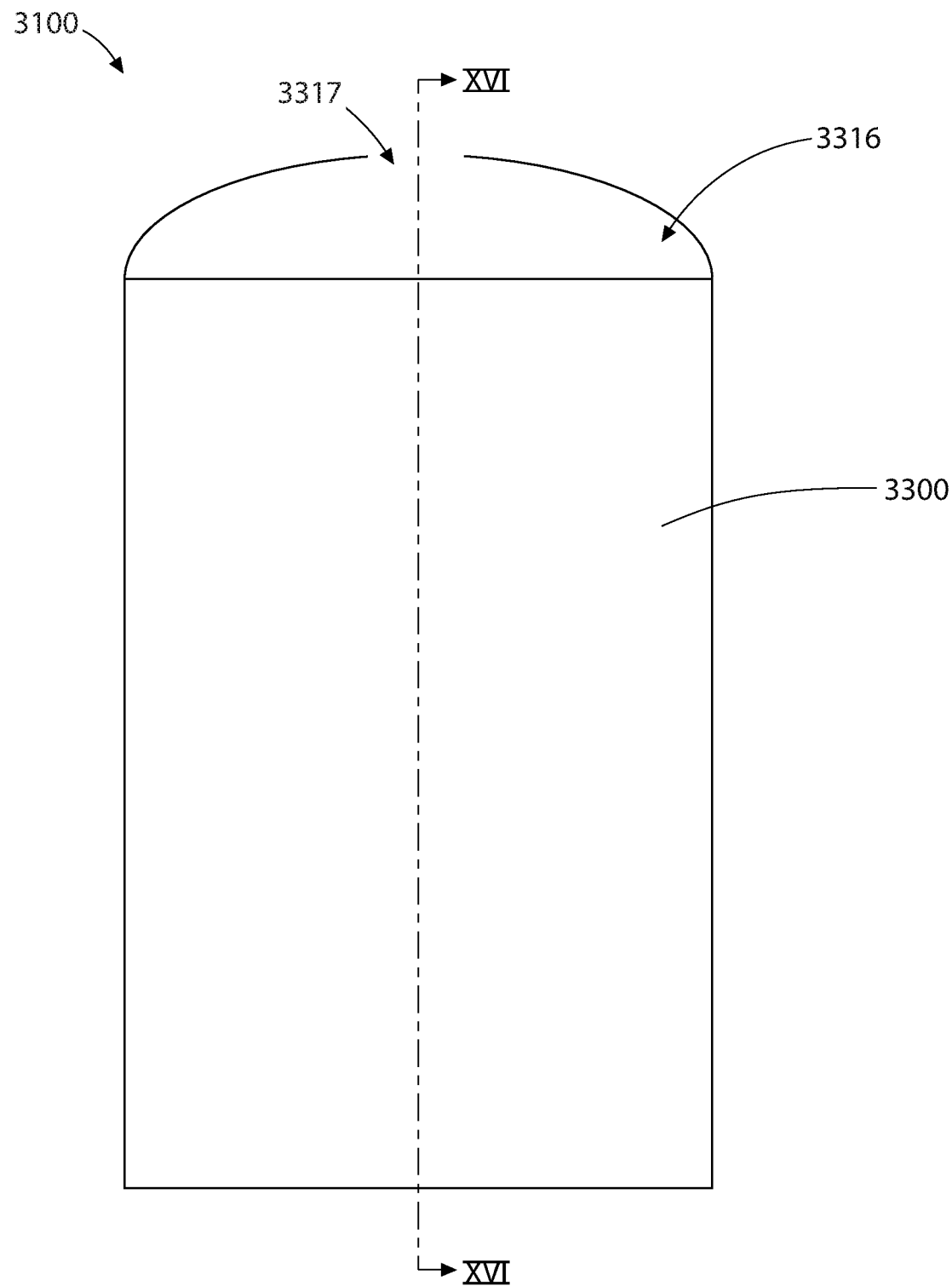
FIG. 15 is a front view of a containment enclosure for a nuclear reactor in accordance with an embodiment of the present invention.
Figure 16:
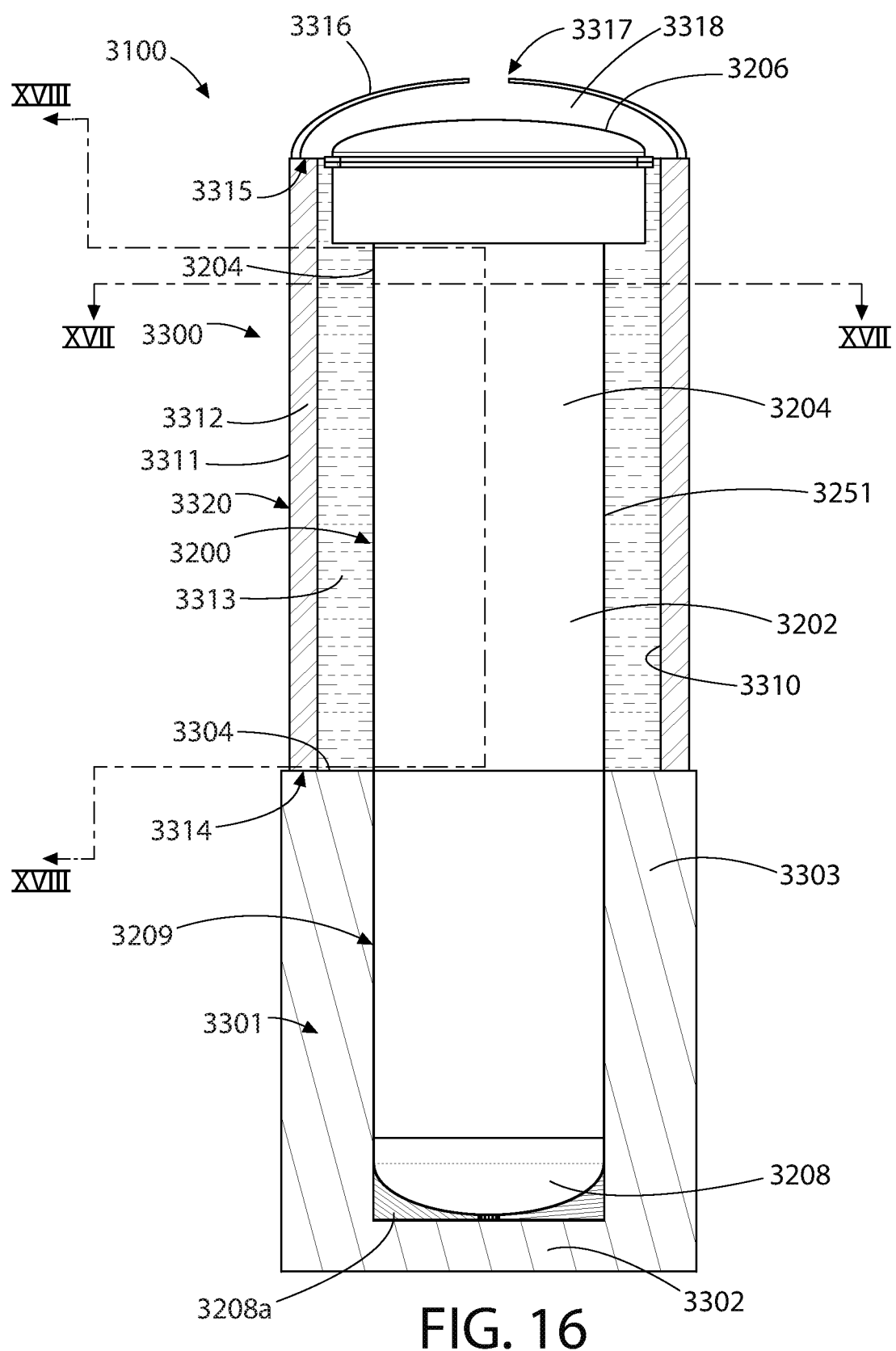
FIG. 16 is a cross-sectional view through the containment enclosure taken along line XVI of FIG. 15 illustrating a containment vessel at least partially surrounded by the containment enclosure.

Referring first to FIGS. 15 and 16 concurrently, a nuclear reactor containment system 3100 is illustrated in accordance with an embodiment of the present invention. The system 3100 generally includes an inner containment structure such as a containment vessel 3200 and an outer containment enclosure 3300. The containment vessel 3200 and the containment enclosure 3300 are vertically elongated structures that house certain components of a nuclear power plant such as a nuclear reactor and a spent nuclear fuel pool. The containment vessel 3200 and the containment enclosure 3300 collectively form a containment vessel-enclosure assembly 3200-3300. In certain embodiments, the containment enclosure 3300 and the containment vessel 3200 may be partially buried in the subgrade. The details of the containment vessel 3200 and the containment enclosure 3300 are described in detail below and in International Application No. PCT/US13/42070, filed on May 21, 2013, the entirety of which is incorporated herein by reference.

In certain embodiments, the containment vessel-enclosure assembly 3200-3300 may be supported by a concrete foundation 3301 comprised of a bottom slab 3302 and vertically extending sidewalls 3303 rising from the bottom slab 3302 and forming a top base mat 3304. The sidewalls 3303 may circumferentially enclose a lower portion 3209 of the containment vessel 3200 as shown in FIG. 16 wherein the lower portion 3209 of the containment vessel 3200 is positioned inside the sidewalls 3303. In some embodiments, the sidewalls 3303 may be poured after placement of the containment vessel 3200 on the bottom slab 3302 (which may be poured and set first) thereby completely embedding the lower portion 3209 of the containment vessel 3200 within the foundation 3301. The foundation sidewalls 3303 may terminate below grade in some embodiments to provide additional protection for the containment vessel-enclosure assembly 3200-3300 from projectile impacts (e.g. crashing plane, etc.). The foundation 3301 may have any suitable configuration in a top plan view, including without limitation polygonal (e.g. rectangular, hexagon, circular, etc.).

The containment enclosure 3300 may be a double-walled structure in some embodiments having sidewalls 3320 formed by two substantially radially spaced and interconnected concentric shells 3310 (inner) and 3311 (outer) with plain or reinforced concrete 3312 installed in the annular space between the inner and outer shells 3310, 3311. In such embodiments, the inner and outer shells 3310, 3311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure 3300 may have a concrete 3312 thickness of six feet or more which ensures adequate ability to withstand high energy projectile impacts such as that from an airliner.

The containment enclosure 3300 circumscribes the containment vessel 3200 and is spaced substantially radially apart from the containment vessel 3200, thereby creating a heat sink space 3313 between an outer surface 3251 of the containment vessel 3200 and the inner shell 3310 of the containment enclosure 3300. The heat sink space 3313 may be a liquid reservoir in one embodiment such that the heat sink space 3313 is filled with a liquid such as water to create a heat sink for receiving and dissipating heat from the containment vessel 3200 in the case of a thermal energy release incident inside the containment vessel 3200. The heat sink can also be used to remove thermal energy from a spent nuclear fuel pool located within the containment vessel 3200 as discussed in more detail below with reference to FIGS. 21 and 23. This water-filled heat sink space 3313 extends circumferentially for a full 360 degrees in one embodiment such that the heat sink space 3313 is an annular space circumferentially surrounding the containment vessel 3200. In one embodiment, the heat sink space 3313 is filled with liquid from the base mat 3304 at the bottom end 3314 of the concentric shells 3310, 3311 of the containment enclosure 3300 to approximately the top end 3315 of the concentric shells 3310, 3311 of the containment enclosure 3300 to form an annular cooling water reservoir between the containment vessel 3200 and the inner shell 3310 of the containment enclosure 3300. This annular reservoir may be coated or lined in some embodiments with a suitable corrosion resistant material such as aluminum, stainless steel, or a suitable preservative for corrosion protection. In one representative example, without limitation, the heat sink space 3313 may be about 10 feet wide and about 100 feet high.

In one embodiment, the containment enclosure 3300 includes a steel dome 3316 that is suitably thick and reinforced to harden it against crashing aircraft and other incident projectiles. The dome 3316 may be removably fastened to the shells 3310, 3311 by a robust flanged joint. In one embodiment, the containment vessel 3200 is entirely surrounded on all exposed above grade portions by the containment enclosure 3300, which preferably is sufficiently tall to provide protection for the containment vessel 3200 against aircraft hazard or comparable projectile to preserve the structural integrity of the water mass in the heat sink space 3313 surrounding the containment vessel 3200. In one embodiment, the containment enclosure 3300 extends vertically below grade to the top base mat 3304.

The containment enclosure 3300 may further include at least one rain-protected vent 3317 which is in fluid communication with the heat sink space 3313 and a head space 3318 located between the dome 3316 and the containment vessel 3200 to allow water vapor to flow, escape, and vent to the atmosphere. Thus, in certain embodiments due to the vent 3317 the containment enclosure 3300 may be considered to have an open top end. In one embodiment, the vent 3317 may be located at the center of the dome 3316, although the invention is not to be so limited and the vent 3317 can be otherwise located. In other embodiments, a plurality of vents may be provided spaced substantially radially around the dome 3316. The vent 3317 may be formed by a short section of piping in some embodiments which is covered by a rain hood of any suitable configuration that allows steam to escape from the containment enclosure 3300 but minimizes the ingress of water.

In some embodiments, the head space 3318 between the dome 3316 and the containment vessel 3200 may be filled with an energy absorbing material or structure to minimize the impact load on the dome 3316 of the containment enclosure 3300 from a crashing or falling projectile such as, for example without limitation, an airliner, a meteor or the like. In one example, a plurality of tightly-packed undulating or corrugated deformable aluminum plates may be disposed in part or all of the head space 3318 to form a crumple zone which will help absorb and dissipate the impact forces on the dome 3316.

In the exemplified embodiment, the containment structure 3200 is an elongated vessel 3202 including a hollow cylindrical shell 3204 having a circular transverse cross-section, a top head 3206, and a bottom head 3208. In certain embodiments the containment vessel 3200 may be considered a thermally conductive containment vessel in that the containment vessel 3200 is formed of a thermally conductive material (i.e., metal or the like as discussed below) and can be used to transfer heat from the interior of the containment vessel 3200 to the heat sink space 3313. In one embodiment, the containment vessel 3200 may be made from a suitably strong and ductile metallic plate and bar stock that is readily weldable, such as, for example without limitation, a low carbon steel. In one embodiment, the cylindrical shell 3204 of the containment vessel 3200 may be formed of a low carbon steel having a thickness of at least one inch. Other suitable metallic materials that can be used for the containment vessel 3200 include without limitation various metallic alloys and the like.

In one embodiment, the weight of the containment vessel 3200 may be primarily supported by the bottom slab 3302 on which the containment vessel 3200 rests and the containment enclosure 3300 may be supported by the base mat 3304 formed atop the sidewalls 3303 of the foundation 3301. Other suitable containment vessel 3200 and containment enclosure 3300 support arrangements may be used. In one embodiment, the bottom of the containment vessel 3200 may include a ribbed support stand 3208a or similar structure attached to the bottom head 3208 to help stabilize and provide level support for the containment vessel on the slab 3302 of the foundation 3301.

Figure 17:
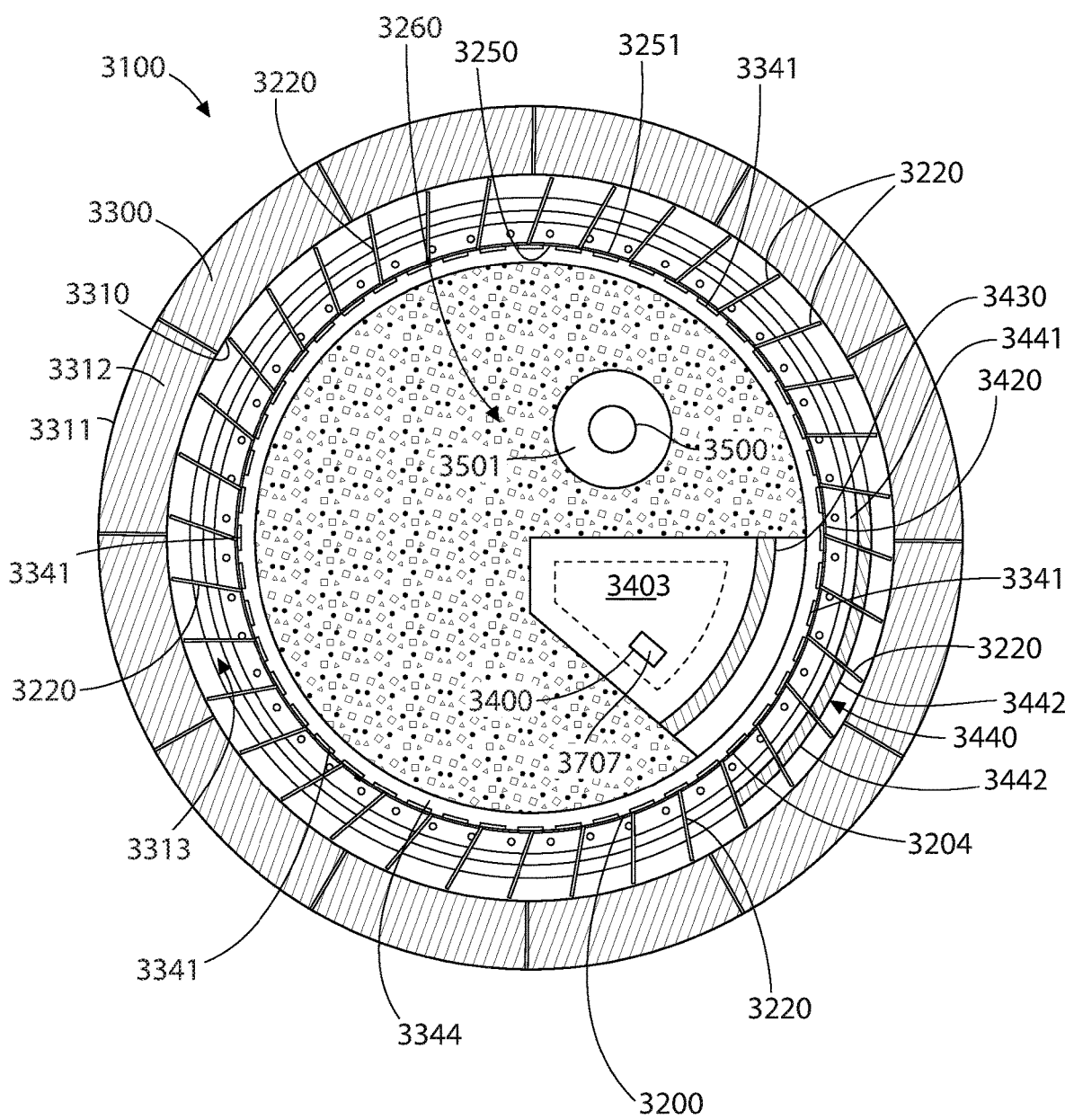
FIG. 17 is a cross-sectional view taken along line XVII of FIG. 16.
Figure 18:
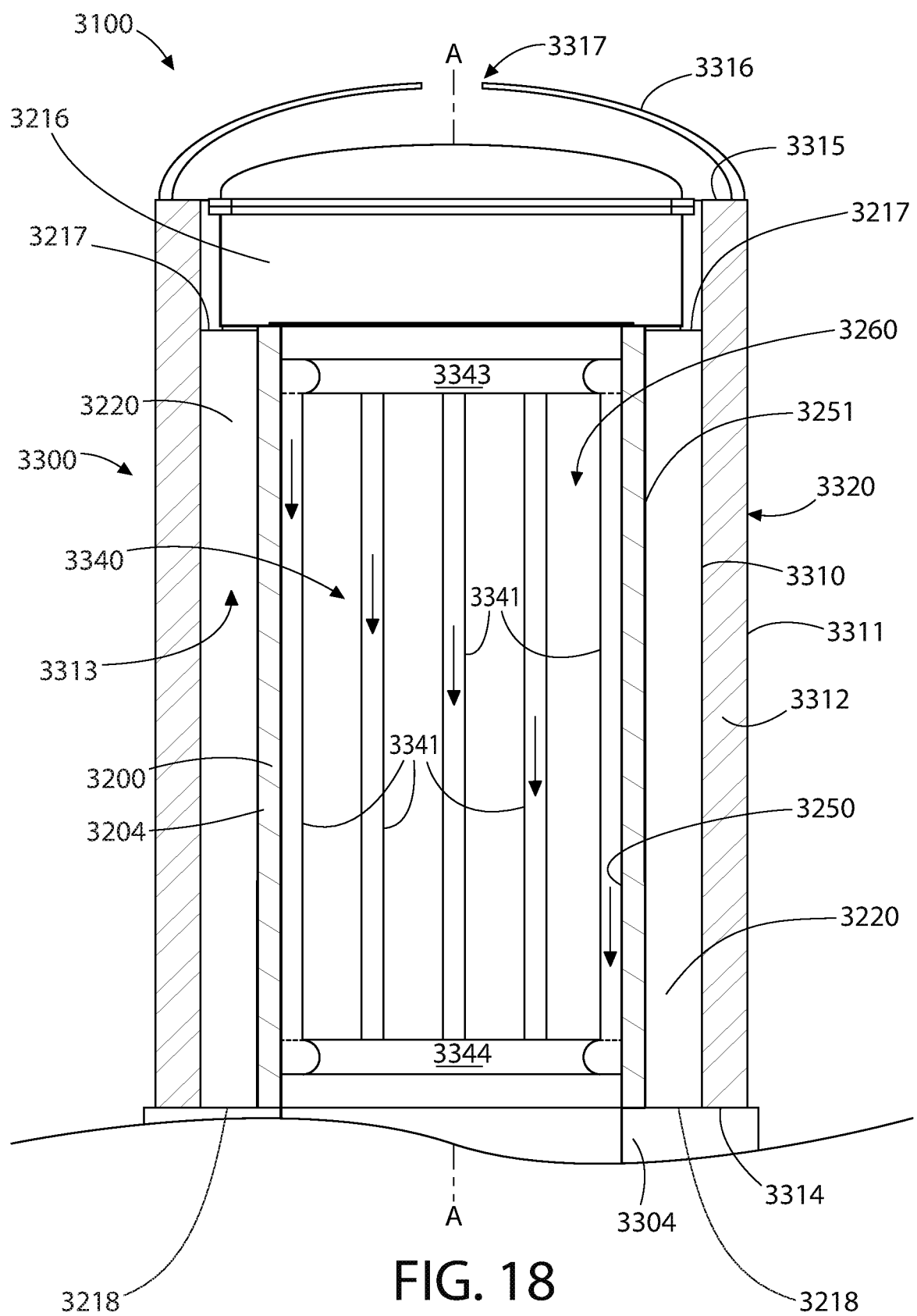
FIG. 18 is a cross-sectional view taken along line XVIII of FIG. 16.

Referring now to FIGS. 17 and 18 concurrently, the invention will be further described. FIG. 17 illustrates a top cross-sectional view of the containment enclosure 3300 and the containment vessel 3200 and the heat sink space 3313 therebetween and FIG. 18 illustrates a longitudinal cross-sectional view thereof. As noted above, the containment vessel 3200 has an inner surface 3250 and an outer surface 3251, the inner surface 3250 defining an interior cavity 3260 of the containment vessel 3200. In the exemplified embodiment, the containment vessel 3200 has a plurality of heat exchange fins 3220 extending from the outer surface 3251 of the containment vessel 3200 and into the liquid reservoir in the heat sink space 3313. However, the invention is not to be so limited in all embodiments and in certain other embodiments the heat exchange fins 3220 may be omitted. In the exemplified embodiment, the heat exchange fins 3220 are spaced circumferentially around the perimeter of the shell 3204 of the containment vessel 3200 and extend substantially radially outwards from the containment vessel 3200 into the heat sink space 3313.

Referring solely to FIG. 17, the heat exchange fins 3220 will be further described. The heat exchange fins 3220, when used, serve multiple advantageous functions including without limitation: (1) stiffening the containment vessel 3200; (2) preventing excessive "sloshing" of water in heat sink space 3313 in the occurrence of a seismic event; and (3) acting as heat transfer "fins" to dissipate heat absorbed by conduction through the containment vessel 3200 to the environment of the heat sink space 3313.

Accordingly, in one embodiment to maximize the heat transfer effectiveness, the heat exchange fins 3220 extend vertically for substantially the entire height of the heat sink space 3313 covering the effective heat transfer surfaces of the containment vessel 3200 (i.e. portions not buried in concrete foundation) to transfer heat from the containment vessel 3200 to the liquid reservoir in the heat sink space 3313. In one embodiment, the heat exchange fins 3220 have upper horizontal ends 3217 which terminate at or proximate to the underside or bottom of a top portion 3216 of the containment vessel 3200, and lower horizontal ends 3218 which terminate at or proximate to the base mat 3304 of the concrete foundation 3301. In one embodiment, the heat exchange fins 3220 may have a height which is equal to or greater than one half of a total height of the shell 3204 of the containment vessel 3200.

The heat exchange fins 3220 may be made of steel (e.g. low carbon steel) or other suitable metallic materials including alloys which are each welded on one of the longitudinally-extending sides to the outer surface 3251 of the containment vessel 3200. The opposing longitudinally-extending side of each heat exchange fin 3220 lies proximate to, but is not permanently affixed to the interior of the inner shell 3310 of the containment enclosure 3300 to maximize the heat transfer surface of the ribs acting as heat dissipation fins. Thus, the non-welded side of the heat exchange fins 3220 is spaced from the inner shell 3310 of the containment enclosure 3300 by a small gap. In one embodiment, the heat exchange fins 3220 extend substantially radially outwards beyond the top portion 3216 of the containment vessel 3200. In one representative example, without limitation, steel heat exchange fins 3220 may have a thickness of about one inch. Other suitable thickness of fins may be used as appropriate. Accordingly, in some embodiments, the heat exchange fins 3220 have a radial width that is more than 10 times the thickness of the heat exchange fins 3220.

In one embodiment, the heat exchange fins 3220 are oriented at an oblique angle to the containment vessel 3200. This orientation forms a crumple zone extending 3360 degrees around the circumference of the containment vessel 3200 to better resist projectile impacts functioning in cooperation with the outer containment enclosure 3300. Accordingly, an impact causing inward deformation of the inner and outer shells 3310, 3311 of the containment enclosure 3300 will bend the heat exchange fins 3220, which in the process will distribute the impact forces without direct transfer to and rupturing of the inner containment vessel 3200 as might possibly occur with fins oriented 90 degrees to the containment vessel 3200. In other possible embodiments, depending on the construction of the containment enclosure 3300 and other factors, a perpendicular arrangement of the heat exchange fins 3220 to the containment vessel 3200 may be appropriate.

Referring to FIGS. 17-20 concurrently, the invention will be further described. The invention includes a passive heat exchange sub-system 3340 that is fluidly coupled to a spent nuclear fuel pool 3600 (see FIGS. 21 and 23, discussed in more detail below) that is housed within and enclosed by the containment vessel 3200. The details of the operation of the passive heat exchange sub-system 3340 will be discussed in more detail below with reference to FIGS. 21 and 23.

In the exemplified embodiment, the passive heat exchange sub-system 3340 comprises, in part, at least one downcomer conduit 3341, an inlet manifold 3343 and an outlet manifold 3344. In certain embodiments the inlet manifold 3343 and the outlet manifold 3344 may be omitted. In the exemplified embodiment, a plurality of the downcomer conduits 3341 are illustrated being in intimate surface contact and therefore directly coupled to the inner surface 3250 of the containment vessel 3200. Furthermore, in certain embodiments the inlet and outlet manifolds 3343, 3344 may also be in intimate surface contact and directly coupled to the inner surface 3250 of the containment vessel 3200.

Figure 19:
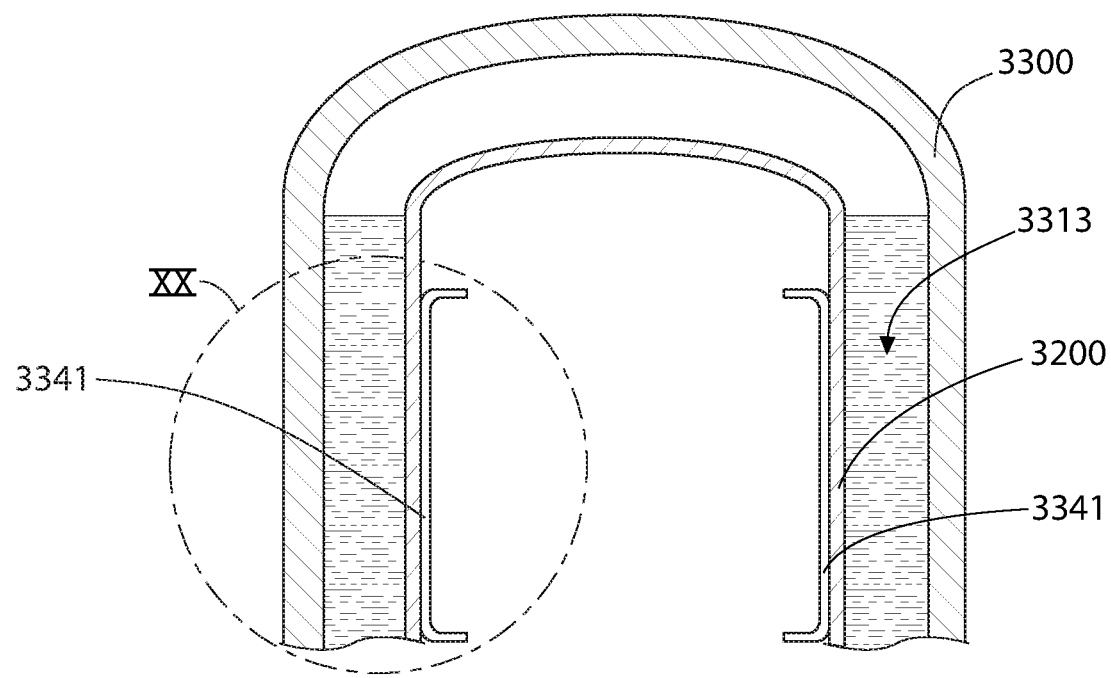
FIG. 19 is a schematic cross-sectional view through the containment enclosure and the containment vessel.
Figure 20:
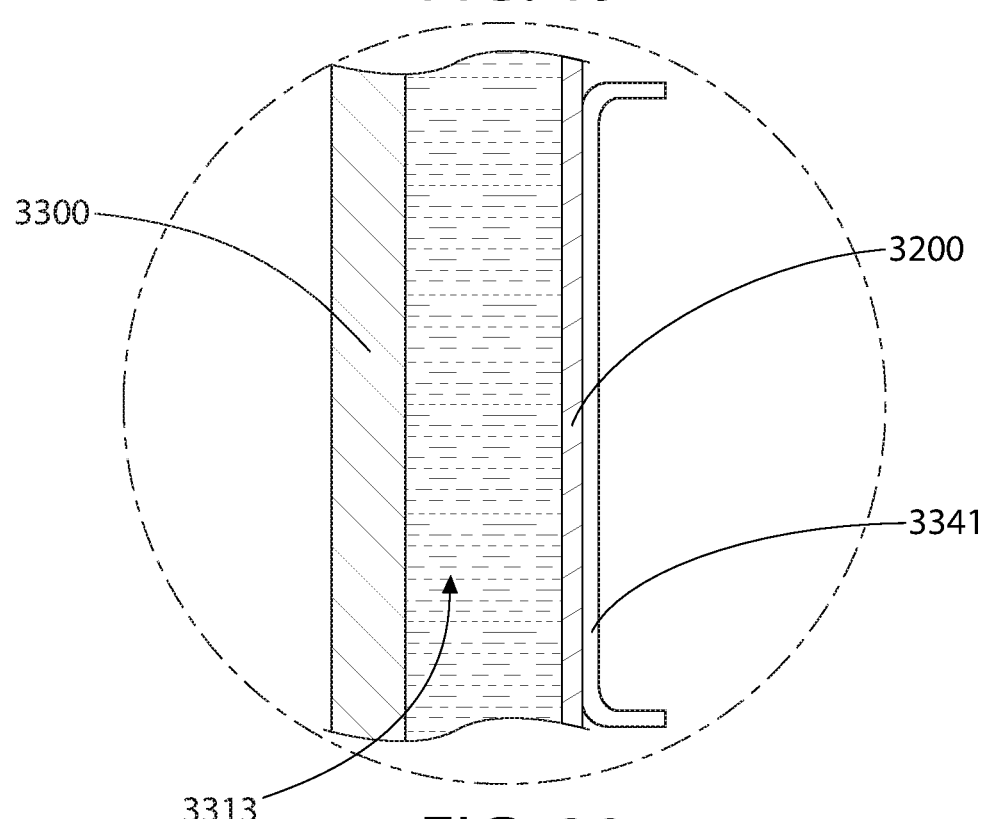
FIG. 20 is a close-up view of area XX of FIG. 19.

The downcomer conduits 3341 may in certain embodiments be made of metal such as steel and be welded to the inner surface 3250 of the containment vessel 3200. In the exemplified embodiment, the plurality of downcomer conduits 3341 are circumferentially spaced around the circumference of the containment vessel 3200 and extend parallel to a longitudinal axis A-A of the containment vessel 3200. As illustrated in FIGS. 19 and 20, in one embodiment the downcomer conduits 3341 may be comprised of vertically oriented C-shaped structural channels (in cross section) positioned so that the parallel legs of the channels are each seam welded to the containment vessel 3200 for their entire height to define a sealed vertical flow conduit. Other suitably shaped and configured downcomer conduits may be provided so long as the fluid conveyed in the downcomer conduits is in thermal cooperation with the heat sink space 3313 to transfer heat to the heat sink space 3313 as discussed in more detail below.

Although illustrated and described whereby the downcomer conduits 3341 are coupled directly to the inner surface 3250 of the containment vessel 3200, the invention is not to be so limited in all embodiments. In certain embodiments the downcomer conduits 3341 may be formed, partially or entirely, directly into the containment vessel 3200 in between the inner and outer surfaces 3250, 3251 of the containment vessel 3200. In such embodiments, the containment vessel 3200 may have a thickness that is sufficient to support the downcomer conduits 3341 between the inner and outer surfaces 3250, 3251 thereof. Thus, the downcomer conduits 3341 may be ducts or passageways that extend vertically through the body of the containment vessel 3200 in between the inner and outer surfaces 3250, 3251 thereof.

In the exemplified embodiment, each of the downcomer conduits 3341 is fluidly coupled to both the inlet manifold 3343 and the outlet manifold 3344 and extends between the inlet manifold 3343 and the outlet manifold 3344. In the exemplified embodiment, each of the inlet and outlet manifolds 3343, 3344 is an annular structure that is fluidly connected to each of the downcomer conduits 3341. In the exemplified embodiment, the inlet and outlet manifolds 3343, 3344 are vertically spaced apart and positioned at suitable elevations on the inner surface 3250 of the containment vessel 3200 to maximize the transfer of heat between fluid flowing vertically inside the downcomer conduits 3341 and the containment vessel 3200 in the active heat transfer zone defined by portions of the containment vessel 3200 having the external longitudinal fins 3220 and/or surrounded by the heat sink space 3313. To take advantage of the liquid reservoir in the heat sink space 3313 for heat transfer, the inlet and outlet manifolds 3343, 3344 may each respectively be located on the inner surface 3250 of the containment vessel 3200 adjacent and near to the top and bottom of the heat sink space 3313.

In one embodiment, the inlet and outlet manifolds 3343, 3344 may each be formed of half-sections of steel pipe which are welded directly to the inner surface 3250 of the containment vessel 3200. In other embodiments, the inlet and outlet manifolds 3343, 3344 may be formed of complete sections of arcuately curved piping supported by and attached to the inner surface 3250 of the containment vessel 3200 by any suitable means. In still other embodiments, the inlet and outlet manifolds 3343, 3344 may be formed directly into the containment vessel 3200 in the space between the inner and outer surfaces 3250, 3251 of the containment vessel 3200. In further embodiments, the inlet and outlet manifolds 3343, 3344 may be directly coupled to the downcomers 3341 but may be spaced from the inner surface 3250 of the containment vessel 3200.

In certain embodiments, some of the downcomer conduits 3341 may be connected to the inlet and outlet manifolds 3343, 3344 while others of the downcomer conduits 3341 may not be connected to the inlet and outlet manifolds 3343, 3344 so that various downcomer conduits 3341 can play different roles in the passive cooling of the interior of the containment vessel 3200. Due to the coupling of the downcomer conduits 3341 to the inlet and outlet manifolds 3343, 3344 in the exemplified embodiment, any air, liquid or fluid that enters into the inlet manifold 3343 (as discussed in detail below with reference to FIGS. 21 and 23) will flow downwardly through the downcomer conduits 3341, and heat will be transferred from the air, liquid or fluid flowing through the downcomer conduits 3341 into the heat sink space 3313 to thereby cool the air, liquid or fluid flowing through the downcomer conduits 3341. Thus, the downward pointing arrows in each of the downcomer conduits 3341 depicted in FIG. 18 illustrate the direction of flow of air, liquid or fluid that flows through the downcomer conduits 3341 during passive spent nuclear fuel pool cooling operations, as discussed in more detail below with reference to FIGS. 21 and 23.

Any suitable number and arrangement of downcomer conduits 3341 may be provided depending on the heat transfer surface area required for cooling the fluid flowing through the downcomer conduits 3341. The downcomer conduits 3341 may be uniformly or non-uniformly spaced on the inner surface 3250 of the containment vessel 3200, and in some embodiments grouped clusters of downcomer conduits 3341 may be circumferentially distributed around the containment vessel 3200. The downcomer conduits 3341 may have any suitable cross-sectional dimensions depending on the flow rate of fluid carried by the ducts and heat transfer considerations.

Figure 21:
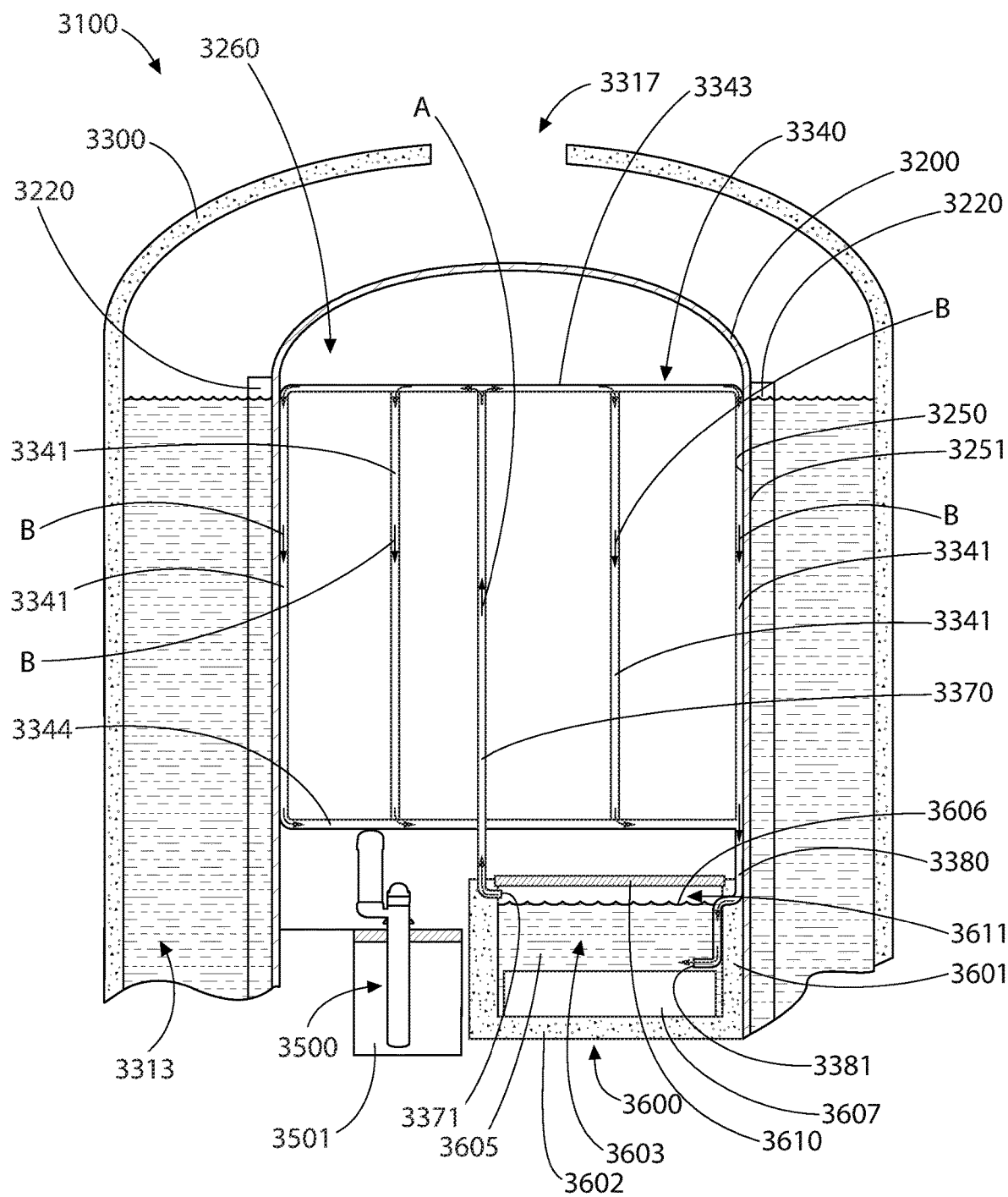
FIG. 21 is a schematic view of a generalized cross-section of a portion of the nuclear reactor containment enclosure and the containment vessel of FIG. 16 depicting a spent nuclear fuel pool and a nuclear reactor therein.

Referring now to FIG. 21, one embodiment of the interior of the containment enclosure 3300 and the containment vessel 3200 will be described. The containment vessel 3200 encloses and houses a nuclear reactor 3500 and a spent nuclear fuel pool 3600. The reactor comprising a reactor vessel is disposed in a water-filled hotwell 3501, whose use and design are well known in the art without further elaboration. The passive heat exchange sub-system 3340 is coupled to the inner surface 3250 of the containment vessel 3200 in the manner described above, although certain conduits of the passive heat exchange sub-system 3340 can be formed directly into the containment vessel 3200 as discussed above. The passive heat exchange sub-system 3340 is also fluidly coupled to the spent nuclear fuel pool 3600 to passively cool the spent nuclear fuel pool 3600 as discussed in detail below.

The spent nuclear fuel pool 3600 comprises a peripheral sidewall 3601 and a floor 3602 that collectively define an interior cavity 3603. In the exemplified embodiment, the peripheral sidewall 3601 and the floor 3602 of the spent nuclear fuel pool 3600 are formed of concrete, although other materials commonly used for spent nuclear fuel pool construction can be used in other embodiments. A body of liquid water 3605 having a surface level 3606 is positioned within the spent nuclear fuel pool 3600, and more specifically the body of liquid water 3605 fills the interior cavity 3603 of the spent nuclear fuel pool 3600. Furthermore, at last one spent nuclear fuel rod 3607 is submerged in the body of liquid water 3605. The at least one spent nuclear fuel rod 3607 has a high heat and therefore heats the body of liquid water 3605 within the spent nuclear fuel pool 3600. The passive heat exchange sub-system 3340 is used to passively cool the body of liquid water 3605 within the spent nuclear fuel pool 3600 to prevent the body of liquid water 3605 from boiling and evaporating, which would result in an undesirable situation whereby the spent nuclear fuel rod(s) 3607 are exposed above the surface level 3606 of the body of liquid water 3605.

In the exemplified embodiment, the spent nuclear fuel pool 3600 is covered with a lid 3610. Covering the spent nuclear fuel pool 3600 with the lid 3610 forms a hermetically sealed vapor space 3611 between the surface level 3606 of the body of liquid water 3605 and the lid 3610. The vapor space 3611 is an air-filled space between the surface level 3606 of the body of liquid water 3605 and the lid 3610. The vapor space 3611 becomes filled with vapor or evaporated water from the body of liquid water 3605 as the body of liquid water 3605 becomes heated by the spent nuclear fuel rod(s) 3607 submerged therein. The use of the lid 3610 prevents the deposition of dirt and debris into the body of liquid water 3605 thereby reducing the need for or frequency of using a pool clean-up system. Furthermore, the lid 3610 prevents humidity from the spent nuclear fuel pool 3600 (i.e., the water vapor in the vapor space 3611) from entering into the interior cavity 3260 of the containment vessel 3200 and thereby reduces the HVAC burden in the interior cavity 3260 of the containment vessel 3200 and increases habitability of the interior cavity 3260 of the containment vessel 3200 by operators/workers. Furthermore, in certain embodiments the lid 3610 can be designed having a flat top to enable the lid 3610 to serve as a working area or equipment lay down area inside of the containment vessel 3200.

The lid 3610 can be formed of any desired material, including without limitation concrete, metal, metallic alloys, wood, or the like. The lid 3610 need not shield radiation in all embodiments because radiation shielding, to the extent that such is necessary, is generally achieved by the body of liquid water 3605. Rather, the lid 3610 is intended to create the hermetically sealed vapor space 3611 between the lid 3610 and the surface level 3606 of the body of liquid water 3605. Any material capable of achieving such a hermetically sealed vapor space 3611 can be used for the lid 3610.

As noted above, the passive heat exchange sub-system 3340 is fluidly coupled to the spent nuclear fuel pool 3600. More specifically, the passive heat exchange sub-system 3340 is fluidly coupled to both the vapor space 3611 and to the body of liquid water 3605 of the spent nuclear fuel pool 3600. As noted above, the passive heat exchange sub-system 3340 comprises the downcomer conduits 3341, the inlet manifold 3343 and the outlet manifold 3344. Furthermore, the passive heat exchange sub-system 3340, in the exemplified embodiment, also includes a riser conduit 3370 and a return conduit 3380. As will be discussed in detail below, the passive heat exchange sub-system 3340 is configured to receive water vapor from the vapor space 3611, remove thermal energy from the received water vapor, thereby condensing the water vapor, and return the condensed water vapor to the body of liquid water 3605. As a result, the water vapor does not affect the humidity inside of the interior cavity 3260 of the containment vessel 3200 because it remains trapped in the hermetically sealed vapor space 3611 and then flows through the passive heat exchange sub-system 3340 without entering into the interior cavity 3260 of the containment vessel 3200. Furthermore, due to the flow of the water vapor and condensed water vapor through the passive heat exchange sub-system 3340, the spent nuclear fuel pool 3600, and specifically the body of liquid water 3605 therein, is passively cooled.

As will be discussed in more detail below, the passive heat exchange sub-system 3340 comprises or forms a closed-loop fluid flow circuit. Specifically, water vapor flows from the spent nuclear fuel pool 3700 (specifically from the vapor space 3611 of the spent nuclear fuel pool 3700) into the riser conduit 3370, from the riser conduit 3370 into the inlet manifold 3343, from the inlet manifold into the downcomers 3341, from the downcomers 3341 into the outlet manifold 3344, from the outlet manifold into the return conduit 3380, and from the return conduit 3380 back into the spent nuclear fuel pool 3700 (specifically into the body of liquid water 3705 within the spent nuclear fuel pool 3700). Thus, the passive heat exchange sub-system 3340 forms a closed-loop fluid flow circuit that takes heated vapor water from the spent nuclear fuel pool 3700, cools the heated vapor water to form a cooled condensed water vapor, and reintroduces the cooled condensed water vapor back into the spent nuclear fuel pool 3700 to passively cool the body of liquid water 3700 within the spent nuclear fuel pool 3700. The details of this system and the fluid flow through the system will be discussed in detail below.

In the exemplified embodiment, the riser conduit 3370 of the passive heat exchange sub-system 3340 has an inlet 3371 that is located within the vapor space 3611. Furthermore, the return conduit 3380 of the passive heat exchange sub-system 3340 has an outlet 3381 that is located within the body of liquid water 3605. Thus, as the body of liquid water 3605 becomes heated by the spent fuel rods 3607, the vapor space 3611 becomes filled with hot vapor water. The vapor water will flow into the passive heat exchange sub-system 3340 through the inlet 3371 of the riser conduit 3370. The vapor water will then flow upwards within the riser conduit 3370 in the direction indicated by the arrow A.

Although the downcomer conduits 3341 have been described above as being coupled to or in intimate surface contact (i.e., conformal surface contact) with the inner surface 3250 of the containment vessel 3200, in certain embodiments the riser conduit 3370 is not similarly coupled to the containment vessel 3200. Rather, it is desirable to ensure that the water vapor that flows through the riser conduit 3370 retains its thermal energy while within the riser conduit 3370 so that the water vapor does not cool as it rises within the riser conduit 3370. By retaining the thermal energy of the water vapor while the water vapor flows through the riser conduit 3370, thermosiphon flow can be facilitated by ensuring that the hot water vapor rises within the riser conduit 3370 and then cools within the downcomer conduits 3341. Thus, in certain embodiments the riser conduit 3370 is spaced from the inner surface 3250 and other surfaces of the containment vessel 3200 so that the riser conduit 3370 is not in thermal cooperation with the heat sink (i.e., the heat sink space 3313). In certain embodiments, the riser conduit 3370 may also include a thermal insulating layer. Such a thermal insulating layer will further ensure that the vapor water does not condense as it flows upwardly within the riser conduit 3370 by trapping the thermal energy of the water vapor within the riser conduit 3370 as the water vapor flows upwardly within the riser conduit 3370.

However, the invention is not to be limited by the above in all embodiments and in certain other embodiments it may be desirable to condense the water vapor as the water vapor rises within the riser conduit 3370. In such embodiments the riser conduit 3370 may be coupled to or in intimate surface contact with the inner surface 3250 of the containment vessel 3200. Alternatively, the thermal insulating layer may be omitted and the water vapor may condense as it rises due to natural thermal energy transfer and natural cooling that occurs over time due to the temperature in the interior cavity 3260 of the containment vessel 3200 being less than the temperature of the water vapor within the riser conduit 3370.

The vapor water will continue to flow within the riser conduit 3370 in the direction of the arrow A until it is fed into the inlet manifold 3343. In the exemplified embodiment, the inlet manifold 3343 fluidly couples the riser conduit 3370 to the one or more downcomer conduits 3341. Thus, after entering into the inlet manifold 3343, the vapor water will flow out of the inlet manifold 3343 and into the one or more downcomer conduits 3341. As noted above, the downcomer conduits 3341 in certain embodiments are coupled directly to the inner surface 3250 of the containment vessel 3200. As a result, the downcomer conduits 3341 are in thermal cooperation with the heat sink created by the liquid reservoir in the heat sink space 3313. Due to this thermal cooperation between the downcomer conduits 3341 and the heat sink, thermal energy is transferred from the water vapor carried within the downcomer conduits 3341 outwardly to the heat sink (i.e., to the liquid reservoir in the heat sink space 3313). Specifically, the thermal energy from the water vapor is transferred to the heat sink through the one or more downcomer conduits 3341 and through the containment vessel 3200. Thus, the heat sink space 3313 and the liquid reservoir therein serves as the heat sink for the decay heat in the spent nuclear fuel pool 3600 by rejecting the heat from the water vapor that flows within the downcomer conduits 3341 to the environment by natural evaporation. As the thermal energy is transferred from the water vapor to the heat sink, the water vapor condenses in the downcomer conduits 3341, cools, and forms a condensed water vapor.

The thermal energy transfer from the vapor water to the heat sink facilitates the natural, passive thermosiphon flow of the water vapor through the passive heat exchange sub-system 3340. Specifically, the hot water vapor rises within the riser conduit 3370 and cools within the downcomer conduits 3341. The hot water vapor will continually flow through the riser conduits 3370 and continue to passively push the water vapor through the closed-loop fluid circuit of the passive heat exchange sub-system 3340.

After the water vapor condenses within the downcomer conduits 3341 to form condensed water vapor (i.e., liquid water), the condensed water vapor continues to flow downwardly within the downcomer conduits 3341 in the direction of the arrows B. In some embodiments, this downward flow of the condensed water vapor can be achieved by gravity action. The condensed water vapor flows from the downcomer conduits 3341 and into the outlet manifold 3343. The outlet manifold 3344 fluidly couples the downcomer conduits 3341 to the return conduit 3380. Thus, from the outlet manifold 3343 the condensed water vapor flows into the return conduit 3380, through the return conduit 3380, and out through the outlet 3381 of the return conduit 3380 into the body of liquid water 3605. The condensed water vapor mixes with the body of liquid water 3605 in the spent nuclear fuel pool 3600.

In some embodiments, the condensed water vapor has a temperature that is lower than the average temperature of the body of liquid water 3605 within the spent nuclear fuel pool 3600 due to the thermal energy transfer discussed above. The hot water vapor is continually removed from the spent nuclear fuel pool 3600 and reintroduced into the spent nuclear fuel pool 3600 as cooled condensed water vapor. Thus, using the passive heat exchange sub-system 3340, the spent nuclear fuel pool 3600, and more specifically the body of liquid water 3605 within the spent nuclear fuel pool 3600, can be passively cooled by flowing the hot water vapor out of the spent nuclear fuel pool 3600 and returning the cooled condensed water vapor back into the body of liquid water 3605. The passive heat exchange sub-system 3340 facilitates thermosiphon flow of the water vapor as discussed above without the use of any pumps or motors.

In certain embodiments, the air in the vapor space 3611 can be partially evacuated (i.e., vacuumed) to a sub-atmospheric pressure so that the evaporation temperature of the body of liquid water 3605 is lowered to between about 3120° F. and 3180° F., more specifically between about 3135° F. and 3165° F., and still more specifically to about 3150° F. Evacuating the air in the vapor space 3611 ensures that the vapor space remains filled with vapor water so that the thermosiphon flow of the water vapor through the passive heat exchange sub-system 3340 can be achieved. Yet in certain other embodiments, the air in vapor space 3611 may be at atmospheric or above atmospheric pressure.

Figure 22:
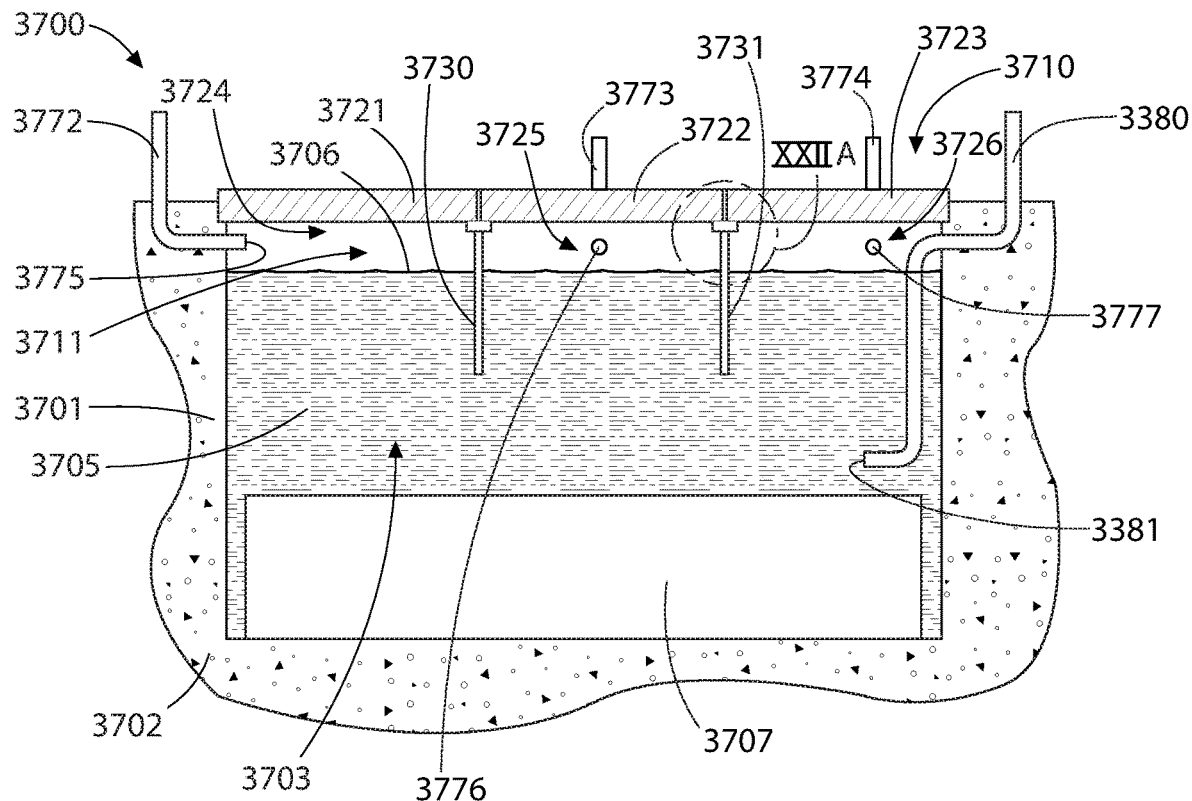
FIG. 22 is a schematic view of a cross-section of a spent nuclear fuel pool in accordance with an embodiment of the present invention.
Figure 23:
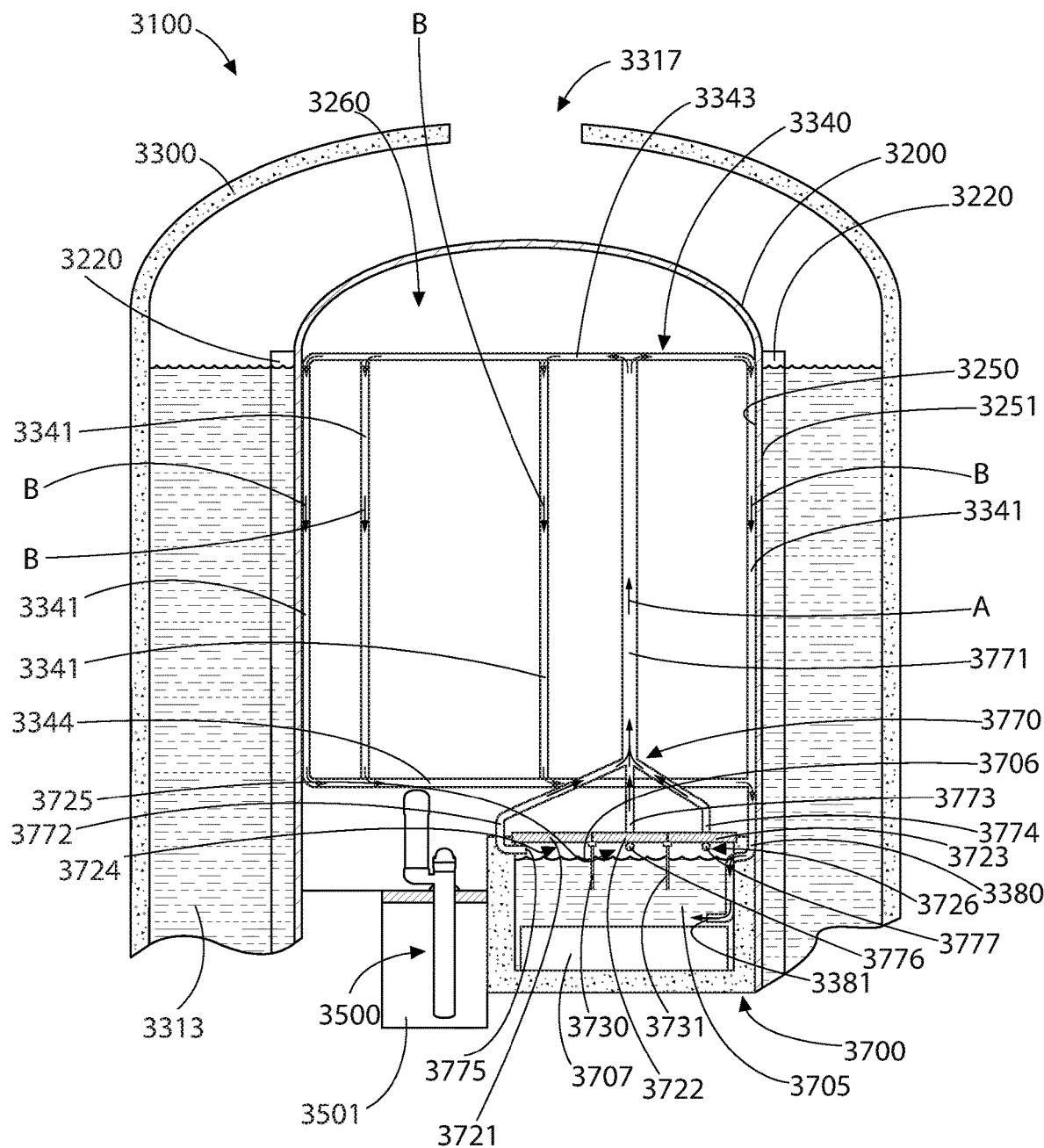
FIG. 23 is a schematic view of a generalized cross-section of a portion of a nuclear reactor containment enclosure and containment vessel in accordance with another embodiment of the present invention whereby the spent nuclear fuel pool of FIG. 22 is contained within the containment vessel.

Referring now to FIGS. 22 and 23, a spent nuclear fuel pool 3700 will be described in accordance with another embodiment of the present invention. Certain features of the spent nuclear fuel pool 3700 are similar to features described above with regard to the spent nuclear fuel pool 3600. Those similar features will be similarly numbered except that the 3700-series of numbers will be used.

The spent nuclear fuel pool 3700 comprises a peripheral sidewall 3701 and a floor 3702 that collectively define an interior cavity 3703. A body of liquid water 3705 having a surface level 3706 is positioned in the spent nuclear fuel pool 3700 within the interior cavity 3703. At least one spent nuclear fuel rod 3707 is submerged in the body of liquid water 3705. Because the spent nuclear fuel rod 3707 is extremely hot, the spent nuclear fuel rod 3707 heats the body of liquid water 3705. Thus, the body of liquid water 3705 is, in certain embodiments, continuously cooled to remove the heat produced by the spent nuclear fuel rod(s) 3707 by using the passive heat exchange sub-system 3340, as will be discussed in more detail below.

In the exemplified embodiment, a lid 3710 covers the spent nuclear fuel pool 3700 and forms a hermetically sealed vapor space 3711 between the surface level 3706 of the body of liquid water 3705 and the lid 3710. In the exemplified embodiment, the lid 3710 comprises a first lid section 3721, a second lid section 3722 and a third lid section 3723 that collectively cover the entire spent nuclear fuel pool 3700. Although three different lid sections are illustrated in the exemplified embodiment, the invention is not to be so limited in all embodiments. Thus, the lid 3710 may include only two lid sections or the lid 3710 may include more than three lid sections in other embodiments. The number of lid sections in certain embodiments corresponds with the number of dividers as discussed below (there will be one more lid section than there are dividers in certain embodiments).

Furthermore, in the exemplified embodiment a first divider 3730 extends from the lid 3710 a partial distance into the body of liquid water 3705 and a second divider 3731 extends from the lid 3710 a partial distance into the body of liquid water 3705. Each of the dividers 3730, 3731 is a partial depth wall that extends a partial depth into the body of liquid water 3705. The dividers 3730, 3731 can be formed of any desired material such as metal, metal alloys, concrete, and the like. The first divider 3730 extends from the lid 3710 at a position between the first and second lid sections 3721, 3722 and into the body of liquid water 3705 and the second divider 3731 extends from the lid 3710 at a position between the second and third lid sections 3722, 3723 and into the body of liquid water 3705. The dividers 3730, 3731 may be directly coupled to the lid 3710 in certain embodiments such as by welding, adhesive, fasteners, or the like, or may be indirectly coupled to the lid 3710 by intervening structures. Although two dividers are illustrated in the exemplified embodiment, the invention is not to be so limited. Thus, in certain other embodiments there may only be one divider, or there may be more than two dividers. In certain embodiments, if one divider is used, then the lid has two lid sections, if two dividers are used, then the lid has three lid sections, if three dividers are used, then the lid has four lid sections and so on.

Each of the first and second dividers 3730, 3731 extends from the lid 3710 and into the body of liquid water 3705, but not all the way to the floor of the spent nuclear fuel pool 3700. In certain embodiments, each of the dividers 3730, 3731 extends to between approximately ⅓ and ⅕ of a depth of the body of liquid water 3705, and more specifically to between approximately ¼ of a depth of the body of liquid water 3705. Thus, if the spent nuclear fuel pool 3700 has a depth of forty feet, each of the first and second dividers 3730, 3731 may extend to between 8 and 13 feet into the body of liquid water 3705, or more specifically to approximately 10 feet into the body of liquid water 3705. Of course, depths of extension of the first and second dividers 3730, 3731 can be greater or less than that noted above and the invention is not to be limited by the depth of extension of the dividers 3730, 3731 into the body of liquid water 3705 unless specifically recited in the claims.

Because the first and second dividers 3730, 3731 only extend partially into the body of liquid water 3705, the body of liquid water 3705 is able to flow beneath the first and second dividers 3730, 3731. Thus, the entire body of liquid water 3705 can flow freely within the spent nuclear fuel pool 3700 without any restrictions. However, the first and second dividers 3730, 3731 divide the vapor space 3711 into a first vapor space section 3724 located between the first lid section 3721 and the surface level 3706 of the body of liquid water 3705, a second vapor space section 3725 located between the second lid section 3722 and the surface level 3706 of the body of liquid water 3705, and a third vapor space section 3726 located between the third lid section 3723 and the surface level 3706 of the body of liquid water 3705. Each of the first, second and third vapor space sections 3724, 3725, 3726 are hermetically isolated from one another by the dividers 3730, 3731 and by the lid sections 3721, 3722, 3723 so that water vapor in the first vapor space section 3724 cannot flow into the second or third vapor space sections 3725, 3726, water vapor in the second vapor space section 3725 cannot flow into the first or third vapor space sections 3724, 3726, and water vapor in the third vapor space section 3726 cannot flow into the first or second vapor space sections 3724, 3725.

Figure 22A:
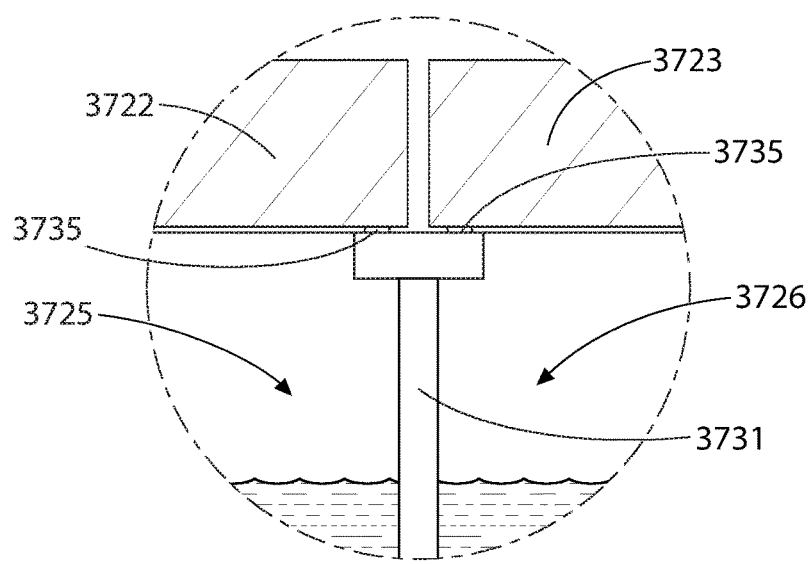
FIG. 22A is a close-up view of area XXIIA of FIG. 22.

In the exemplified embodiment, a gasket 3735 is coupled to each of the first, second and third lid sections 3721, 3722, 3723 (see FIG. 22A). The gasket 3735 may be an annular rubber gasket or any other type of known gasket that facilitates the creation of the hermetically sealed vapor space sections 3724, 3725, 3726. Thus, the spent fuel pool 3700 is covered by a set of heavy lid sections 3721, 3722, 3723 with peripheral seals so that the space (i.e., the vapor space sections 3724, 3725, 3726 underneath the lid sections 3721, 3722, 3723) is sequestered from the ambient environment above the lid sections 3721, 3722, 3723.

In the exemplified embodiment, water vapor from each of the first, second and third vapor space sections 3724, 3725, 3726 can be introduced into the passive heat exchange sub-assembly 3340. In that regard, a riser pipe 3770 (see FIG. 23) that carries the water vapor from the spent nuclear fuel pool 3700 to the downcomer conduits 3341 comprises a primary riser section 3771 (see FIG. 23), a first riser inlet section 3772, a second riser inlet section 3773 and a third riser inlet section 3774. In the exemplified embodiment, each of the first, second and third riser inlet sections 3772, 3773, 3774 extends into and through the concrete peripheral sidewall 3701 of the spent nuclear fuel pool 3700. This arrangement enables each of the lid sections 3721, 3722, 3723 to be removed/opened without affecting the intake/return piping of the passive heat exchange sub-system 3340.

The first riser inlet section 3772 has a first inlet 3775 positioned within the first vapor space section 3724, the second riser inlet section 3773 has a second inlet 3776 positioned within the second vapor space section 3725, and the third riser inlet section 3774 has a third inlet 3777 positioned within the third vapor space section 3726. Thus, each of the first, second and third inlets 3775, 3776, 3777 is located above the surface level 3706 (i.e., the maximum water surface) of the body of liquid water 3705 within a respective one of the vapor space sections 3724, 3725, 3726. The flow of the water vapor from each of the first, second and third vapor space sections 3724, 3725, 3726 through the passive heat exchange sub-system 3340 will be discussed in more detail below with reference to FIG. 23.

Furthermore, as discussed above the passive heat exchange sub-system 3340 comprises a return conduit 3380. In the exemplified embodiment, the return conduit 3380 extends through the concrete sidewall 3701 of the spent nuclear fuel pool 3700. The return conduit 3380 terminates at an outlet 3381 that is located within the body of liquid water 3705. Although only one return conduit 3380 is illustrated in the exemplified embodiment, more than one return conduit 3380 can be used in other embodiments, such as having one return conduit for each vapor space section.

In certain embodiments, the air in each of the first, second and third vapor space sections 3724, 3725, 3726 can be partially evacuated to a sub-atmospheric pressure, such as by vacuuming the air out of the vapor spaces 3724, 3725, 3726, so that the evaporation temperature of the body of liquid water 3705 is lowered to between about 120° F. and 180° F., more specifically between about 135° F. and 165° F., and still more specifically to about 150° F. Evacuating the air in the vapor space sections 3724, 3725, 3726 ensures that the vapor space sections 3724, 3725, 3726 remain filled with vapor water so that the thermosiphon flow of the water vapor through the passive heat exchange sub-system 3340 can be achieved. Yet in certain other embodiments, the air in vapor space 3611 may be at atmospheric or above atmospheric pressure.

Using the inventive spent nuclear fuel pool 3700, any one of the lid sections 3721, 3722, 3723 can be separately removed from the spent nuclear fuel pool 3700 as desired for installing or removing a new fuel cartridge or fuel assembly into the spent nuclear fuel pool 3700. When it is desired to remove one of the lid sections 3721, 3722, 3723, first the pressure within the particular vapor space section 3724, 3725, 3726 that is covered by the lid section 3721, 3722, 3723 to be removed is equalized to ambient. Then, the lid section 3721, 3722, 3723 is removed. While one of the lid sections 3721, 3722, 3723 is removed for fuel management activity, the other lid sections 3721, 3722, 3723 will remain covering the spent nuclear fuel pool 3700. Thus, if, for example without limitation, the first lid section 3721 is removed, the second and third lid sections 3722, 3723 will remain in place. Thus, the second and third vapor space sections 3725, 3726 will continue to be hermetically sealed vapor spaces, and the second and third riser inlet sections 3773, 3774 will continue to receive water vapor from the second and third vapor space sections 3725, 3726 and flow the received water vapor through the passive heat exchange sub-system 3340. Thus, in certain embodiments the pool cooling system will continue to work at all times, even during fuel management activity, unaided by any motors or pumps.

Referring solely to FIG. 23, flow of the water vapor through the passive heat exchange sub-system 3340 when the passive heat exchange sub-system is fluidly coupled to the spent nuclear fuel pool 3700 will be described. Because each of the first, second and third vapor space sections 3724, 3725, 3726 are hermetically isolated from one another, an inlet 3775, 3776, 3777 of one of the riser inlet sections 3772, 3773, 3774 is positioned within a respective one of each of the first, second and third vapor space sections 3724, 3725, 3726. In the exemplified embodiment, each of the first, second and third riser inlet sections 3772, 3773, 3774 converge into the primary riser section 3771 so that water vapor that flows through each of the first, second and third riser inlet sections 3772, 3773, 3774 will converge in the primary riser section 3771. The primary riser section 3771 of the riser conduit 3770 is fluidly coupled to the one or more downcomers 3341 by the inlet conduit 3343. More specifically, the primary riser section 3771 of the riser conduit 3770 is fluidly coupled to the inlet conduit 3343, and the inlet conduit 3343 is fluidly coupled to the downcomers 3341.

Although in the exemplified embodiment the first, second and third riser inlet sections 3772, 3773, 3774 converge into the primary riser section 3771, the invention is not to be so limited in all embodiments. In certain other embodiments each of the first, second and third riser inlet sections 3772, 3773, 3774 may extend separately from one of the vapor space sections 3724, 3725, 3726 to the inlet conduit 3343. Thus, the primary riser section 3771 may be omitted and the first, second and third riser inlet sections 3772, 3773, 3774 may not converge, but may instead each separately carry water vapor from the vapor space sections 3724, 3725, 3726 to the inlet manifold 3343 for dispersion into the downcomers 3341.

Each of the primary riser section 3771 and the first, second and third riser inlet sections 3772, 3773, 3774 may include a thermal insulating layer to prevent thermal energy from leaving the water vapor while the water vapor is flowing within the riser conduit 3770. Furthermore, each of the primary riser section 3771 and the first, second and third riser inlet sections 3772, 3773, 3774 may be spaced apart from the inner surface 3250 of the containment vessel 3200 to prevent the transfer of thermal energy from the water vapor to the heat sink while the water vapor is flowing within the riser conduit 3770.

As noted above, the inlet manifold 3343 is in fluid communication with the downcomers 3341. Thus, the water vapor flows from the riser conduit 3770 upwardly to the inlet manifold 3343, where the water vapor then flows into the downcomers 3341 and downwardly within the downcomers 3341. As discussed above, in certain embodiments the downcomers 3341 are in intimate surface contact or otherwise coupled to the inner surface 3250 of the containment vessel 3200. Thus, as the water vapor flows within the downcomers 3341, thermal energy is transferred from the water vapor, through the downcomers 3341, through the containment vessel 3200 and into the heat sink (i.e., into the liquid reservoir within the head sink space 3313). This thermal energy transfer cools and condenses the water vapor and turns the water vapor into a condensed water vapor.

The condensed water vapor then continues to flow downwardly through the downcomers 3341 by gravity action. The condensed water vapor flows into the outlet manifold 3344, and then from the outlet manifold 3344 into the return conduit 3380. From the return conduit 3380, the condensed water vapor flows through the outlet 3381 and into the body of liquid water 3705. Thus, using the passive heat exchange sub-system 3340, the body of liquid water 3705 in the spent nuclear fuel pool 3700 can be passively cooled by flowing heated vapor water out of the spent nuclear fuel pool 3700 and flowing cooled condensed water vapor back into the spent nuclear fuel pool 3700.

In certain embodiments, the present invention can be directed to a method of passively cooling a spent nuclear fuel pool using the components discussed herein above. The operation of the system has been discussed in detail above, and the method is achieved by the inventive system. Specifically, using the system components discussed above, the inventive system can passively cool a spent nuclear fuel pool, and thus the invention can be a method of passively cooling a spent nuclear fuel pool.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

Supplemental Non-Evaporative Cooling Features of the Spent Fuel Pool

In addition to the passive heat exchange sub-system described herein which cools the spent fuel pool via evaporative cooling and natural gravity-driven flow circuits, supplemental cooling of the body of water in the spent fuel pool is provided by heat transfer features which utilize convective and conductive processes to lower the temperature of the water, thereby not only cooling the body of water but reducing the rate of evaporation. Moreover, these heat transfer features serve as a passive heat exchange back-up mechanism for the heat exchange sub-system in the event that sub-system becomes unavailable for some reason. Therefore, cooling of spent fuel pool may continue for at least a limited period of time.

Figure 24:
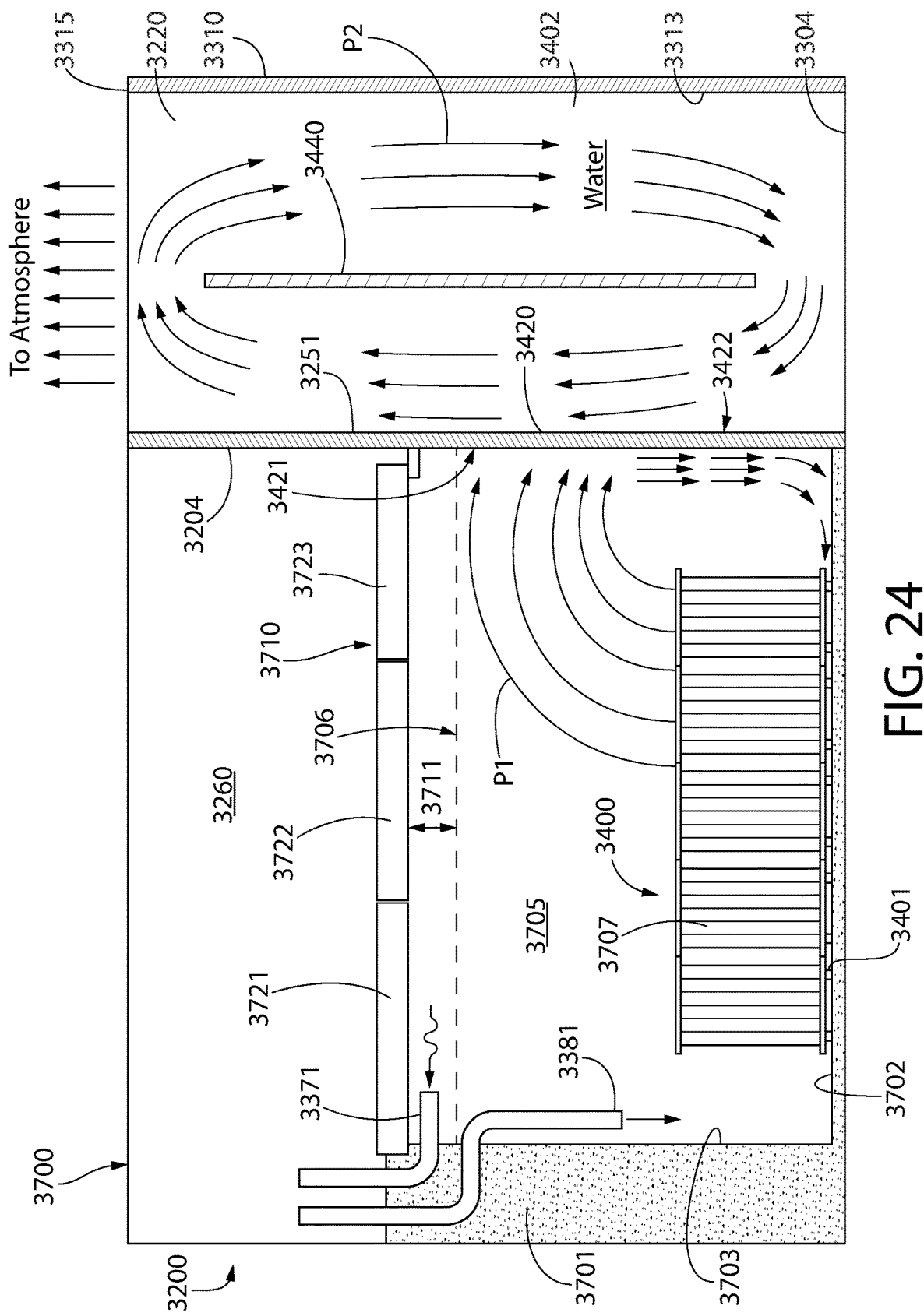
FIG. 24 is a cross-sectional elevation view of the spent nuclear fuel pool and annular reservoir showing additional features for cooling the fuel pool.

FIGS. 17 and 24-27 depict the non-25 based cooling features of spent fuel pool, which will now be described. FIGS. 24 and 11 show the spent fuel pool 3700 of FIGS. 21-23, but with some modifications discussed below. Similar elements are labeled similarly, and the description thereof previously provided above applies and will not be repeated in full detail here for the sake of brevity.

Referring now to FIGS. 17 and 24, the nuclear spent fuel pool 3700 includes a plurality of vertical peripheral sidewalls 3701 and a floor 3702 that collectively define an interior cavity 3703. Floor 3702 is preferably flat and horizontal in one embodiment. The body of water 3705 (liquid phase) having a surface level 3706 is shown contained in the spent nuclear fuel pool 3700 within the interior cavity 3703. At least one spent nuclear fuel rod 3707 is submerged in the body of liquid water 3705. In certain embodiment, multiple spent fuel rods 3707 may be stored in spent fuel racks 3400 which are configured to rest on the floor 3702, as further described herein. The racks 3400 may include legs 3401 designed to raise the racks off the floor and create a gap therebetween to allow the cooling water to flow beneath the racks and improve cooling.

Figure 25:
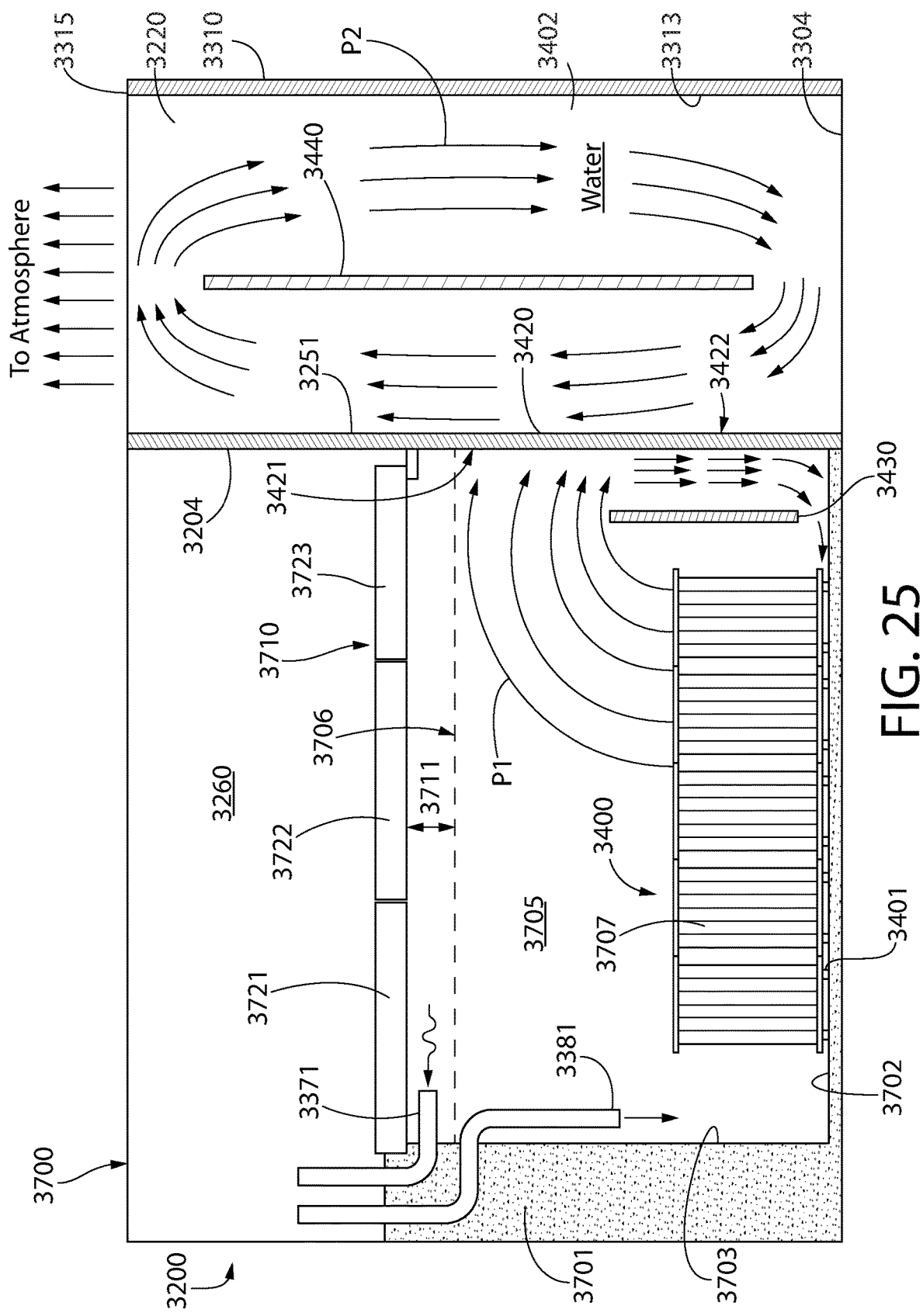
FIG. 25 is the same view thereof with addition of a flow partition wall in the spent fuel pool.

The spent fuel pool 3700 may include a lid 3710 as described herein which covers the spent nuclear fuel pool 3700 and forms a hermetically sealed vapor space 3711 between the surface level 3706 of the body of liquid water 3705 and the lid. The lid 3710 may be a single piece (see, e.g. FIG. 21), or include multiple sections such as first lid section 3721, second lid section 3722, and third lid section 3723 that collectively cover the entire spent nuclear fuel pool 3700 (see also FIGS. 22-23). Dividers, such as without limitation first divider 3730 and second divider 3731 which extend from the lid 3710 a partial distance into the body of liquid water 3705 as shown in FIGS. 22-23, may be provided in some embodiments to segment the vapor space 3711. Other embodiments as shown in FIGS. 24 and 25 may omit the dividers. The invention is not limited by the presence or absence of dividers.

In certain embodiments, the spent fuel pool 3700 may include provisions for the passive heat exchange sub-system 3340 already described in detail herein. Accordingly, riser conduit 3370 of the passive heat exchange sub-system 3340 may have an inlet 3371 located within the vapor space 3711, and the return conduit 3380 of the passive heat exchange sub-system 3340 may have an outlet 3381 that is located within the body of liquid water 3705 (see also FIG. 21). The passive heat exchange sub-system 3340 operates in the same manner described elsewhere herein.

With continuing reference to FIGS. 17 and 24, the peripheral sidewalls 3701 may be formed of concrete except for one wall adjacent the annular reservoir 3402. In the illustrated embodiment, a portion of the metal cylindrical shell 3204 of the containment vessel 3200 forms a shared vertical heat transfer wall 3420 common to both the containment vessel and spent fuel pool. The heat transfer wall 3420 is arranged between the spent fuel pool 3700 and the annular reservoir 3402 defined by the heat sink 3313 disposed between the containment vessel and the inner shell 3310 of the containment enclosure 3300 already described herein (see e.g. FIGS. 16, 17, 21, and 23 also). There are no intervening structures between the spent fuel pool 3700 and annular reservoir 3402 other than the heat transfer wall 3420. Accordingly, the body of water 3705 in the spent fuel pool wets an interior surface 3421 of the heat transfer wall and the liquid coolant (water) impounded in the annular reservoir 3402 wets an exterior surface 3422 of the heat transfer wall. Advantageously, this allows heat to be conducted through the heat transfer wall 3420 between the higher temperature body of water 3705 in the spent fuel pool 3700 (heated by the spent fuel rods 3707) and the lower temperature water in the reservoir 3402. In addition to the evaporative losses from the body of water 3705 which cools the water in the spent fuel pool, the heat transfer wall 3420 also acts to cool the water in the pool via conductive heat transfer. This provides a dual cooling mechanism for the spent fuel pool 3700 for effective passive heat dissipation.

Heat transfer wall 3420 may have an arcuate shape in top plan view (see, e.g. FIG. 17) being formed from a portion of the cylindrical shell 3204 of the containment vessel 3200. The heat transfer wall 3420 preferably extends vertically from the floor 3702 of the spent fuel pool 3700 to at least the surface level 3706 of the body of water 3705 in the spent fuel pool 3700, alternatively to approximately the lid 3710 or higher. This ensures that portion of the spent fuel pool containing the body of water 3705 will benefit from the conductive cooling action of the heat transfer wall. The containment vessel cylindrical shell 3204, and heat transfer wall 3700 comprising a portion thereof, may be made of any suitable conductive metal with sufficient structural strength such as without limitation carbon or low alloy steel, or other metals and alloys.

In operation, the water adjacent the spent fuel racks 3400 and spent fuel rods 3707 therein is heated via decay heat. The density of the heated water decreases, thereby causing it to rise in the spent fuel pool 3700 towards the body of water surface defined by surface level 3706. A portion of the heated water near the top of the body of water 3705 contacts the inner surface 3421 of the heat transfer wall 3420 and is cooled by the relatively cooler heat transfer wall (wetted on the outer surface 3422 by the colder water in the annular reservoir 3402). This causes the now cooler and denser water to sink towards the floor 3702. This is sometimes referred to as the "chimney effect." The now cooled water flows back towards the fuel racks 3400 where it is heated again and repeats the cycle to form a first recirculating flow pattern P1 as shown by the directional flow arrows.

To increase the chimney effect and flow pattern P1 produced in the spent fuel pool 3700, a first vertical flow partition wall 3430 may be disposed in the spent fuel pool 3700 between a spent fuel rack storage area 3403 and heat transfer wall 3420 as shown in FIGS. 17 and 25. The flow partition wall 3430 is spaced apart from the heat transfer wall 3420 and spent fuel storage racks 3400. The flow partition wall improves the cooling performance of the heat transfer wall 3420. The partition wall 3430 may be formed of metal plate, preferably a corrosion resistance metal such as stainless steel in some non-limiting embodiments. Other materials such as concrete may be used in certain embodiments. In one configuration, partition wall 3430 may have an arcuate shape in top plan view to complement the shape of the containment vessel shell 3204 and heat transfer wall 3420. Other shapes may be used.

In operation, the flow partition wall 3430 creates a recirculating flow pattern P1 in the spent fuel pool wherein the heated water flows upward from the spent fuel rack 3400 along a first side of the flow partition wall, over the flow partition wall, downward along a second side of the flow partition wall contacting the thermally-conductive heat transfer wall 3420, and under the flow partition wall back towards the spent fuel rack.

The height of the flow partition wall 3430 may be adjusted based on the increase in chimney effect required. The partition wall 3430 is configured to allow the recirculating water in the body of water 3705 to flow beneath the wall as shown. Accordingly, the wall 3430 may be supported from the sidewalls 3701 of the spent fuel pool 3700 so that the bottom of the wall is spaced vertically apart from the floor 3702, flow openings may be formed in the bottom of the wall adjacent to the floor, or vertical standoffs/supports may be attached to the wall to raise the bottom of the wall off the floor. Any suitable method for enabling flow beneath the wall may be used and is not limiting of the invention.

It will be noted that in some embodiments, a flow partition wall 3430 may not be used as shown in FIG. 24.

Referring now to FIGS. 17, 24, and 25, a chimney effect is created within the water filled annular reservoir 3402 due to the changing densities of the coolant water occurring in a similar manner to the water in the spent fuel pool 3700 as described above. The coolant water adjacent the heat transfer wall 3420 and inner surface 3422 formed thereon is heated as heat is conducted through the heat transfer wall to the reservoir 3402 from the body of water 3705 in the spent fuel pool 3700. The coolant water in the annular reservoir adjacent the heat transfer wall 3420 is initially at a temperature lower than the temperature of the wall and heated body of water 3705 in the spent fuel pool 3700. The heated less dense water in the annular reservoir 3402 rises and cools due to evaporative losses to atmosphere at the water level. The cooled less dense coolant water which is now near the surface of the coolant water in the reservoir sinks back towards the base mat 3304. This creates a second recirculating flow pattern P2 in the annular reservoir 3402 due to the chimney effect.

In some embodiments, a vertical flow partition plate 3440 may be disposed in the annular reservoir 3402 between the containment vessel shell 3204 and inner shell 3310 of the containment enclosure 3300 to increase the chimney effect and cooling performance in the heat sink 3313. Partition plate 3440 is preferably disposed at least adjacent to the heat transfer wall 3420. This partition plate 3440 may preferably be formed of a metal plate in some embodiments or other materials. In one configuration, partition plate 3440 may have a substantially arcuate shape in top plan view to conform to the annular shape of the annular reservoir 3402. The partition plate 3440 may be located at the mid-section of the annular reservoir 3402 between the heat transfer wall 3420 (and containment vessel shell 3204) and the inner shell 3310 of the containment enclosure 3300. Preferably, the partition plate 3440 has an angular extent or width at least coextensive with the angular extent or width of the heat transfer wall 3420 to maximize heat removal from the spent fuel pool 3700. Accordingly, partition plate 3440 may extend less than 3360 degrees throughout the annular reservoir 3402 in some embodiments. In other embodiments, the partition plate 3440 may extend a complete 360 degrees throughout the entire annular reservoir 3402 forming an annular shaped flow structure.

In operation, the flow partition plate 3440 creates a recirculating flow pattern in the annular reservoir 3402 wherein the heated coolant water flows upward along a first side of the flow partition plate, over the flow partition plate, downward along a second side of the flow partition plate, and under the flow partition plate back towards the thermally-conductive common wall.

The height of the flow partition plate 3440 in the annular reservoir 3402 may be adjusted based on the increase in chimney effect required. The partition plate 3440 is configured to allow the recirculating water in the body of water 3705 to flow beneath the wall as shown. Accordingly, the plate 3440 may be supported from any available structure within the annular reservoir 3402 such as the fins 3220 so that the bottom of the wall is spaced vertically apart from the base mat 3304. Alternatively, vertical standoffs/supports may be attached to the plate 3440 to raise the bottom of the wall off the base mat 3304, or flow openings may be formed in the bottom of the plate 3440 adjacent to the base mat. Any suitable method for enabling flow to pass beneath the wall may be used and is not limiting of the invention.

As best shown in FIG. 17, the flow partition plate 3440 may be comprised of a plurality of individual segments 3442 which collectively form the partition wall structure. The segments 3442 may each be mounted between pairs of the adjacent circumferentially spaced apart heat exchange fins 3220 which serve to support the plate 3440. Depending on the circumferential spacing of the fins 3220, the segments 3442 in certain embodiments may each be comprised of flat metal plates welded or otherwise attached between the fins which collectively approximates an arcuately shape in top plan view (hence the shape may be referred to as substantially arcuate). In other embodiments, the segments 3442 may comprise arcuately curved plates attached between the fins.

The segments 3442 form a plurality of or wedge shaped isolated pie flow regions 3441 between the fins. Flow through-holes may be provided which extend completely through the fins 3220 in some embodiments to allow mixing of the flow and reservoir coolant water between these regions. Alternatively, the fins 3220 may not extend all the way to the base mat 3304 to allow flow to mix between the regions 3441. In certain embodiments, fins 3220 may not be provided in the annular reservoir 3402 in which case the partition plate 3440 will be supported from the base mat 3340 and upper portions of the plate 3440 may be braced by lateral struts attached to the cylinder shell 3204 of the containment vessel 3200 and/or inner shell 3310 of the containment enclosure 3300 for rigidity.

It will be appreciated that the decay heat released by the spent fuel rods 3707 in the spent fuel pool 3700 is the motive force that drives both the natural circulation and the passive cooling in both the spent fuel pool and the annular reservoir 3402.

Figure 26:
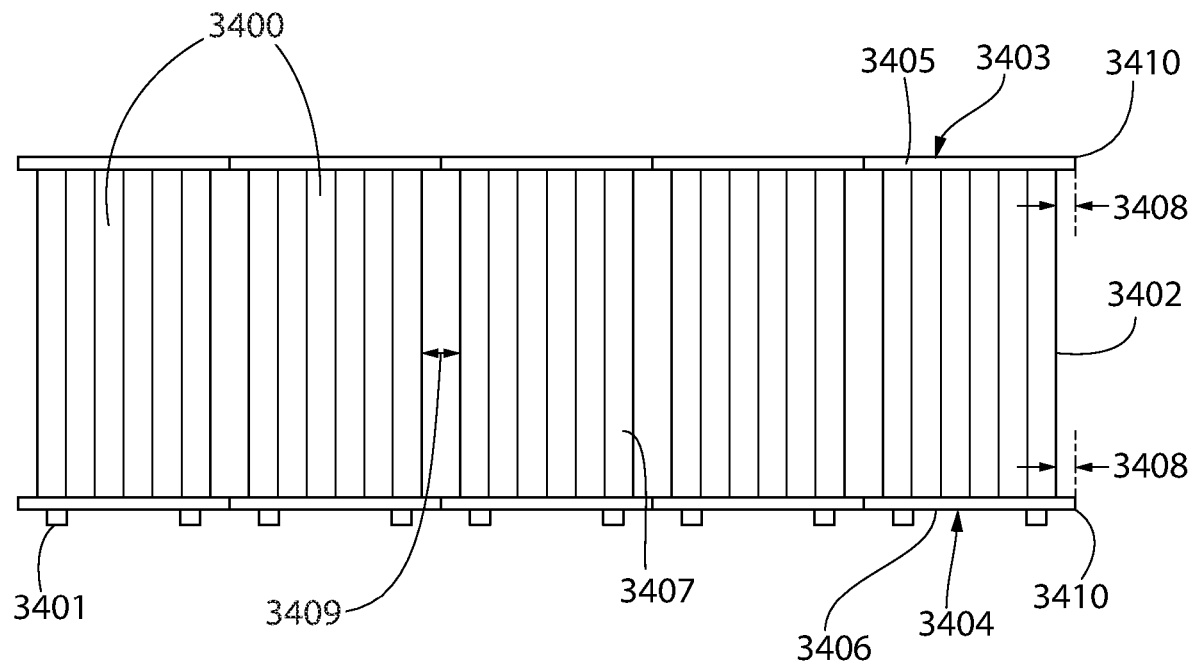
FIG. 26 is a side elevation of a spent fuel rack configured for holding spent nuclear fuel rods which incorporates cooling features.
Figure 27:
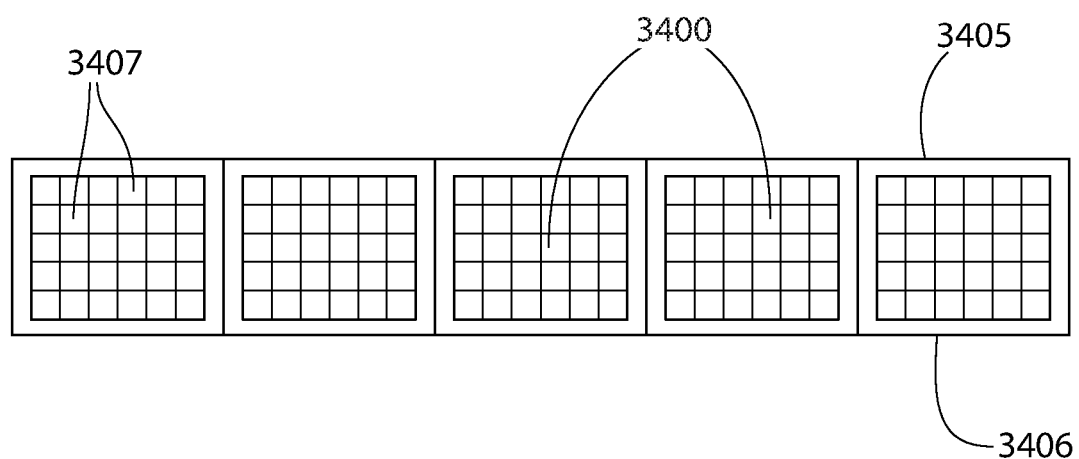
FIG. 27 is a top plan view thereof.
Figure 28:
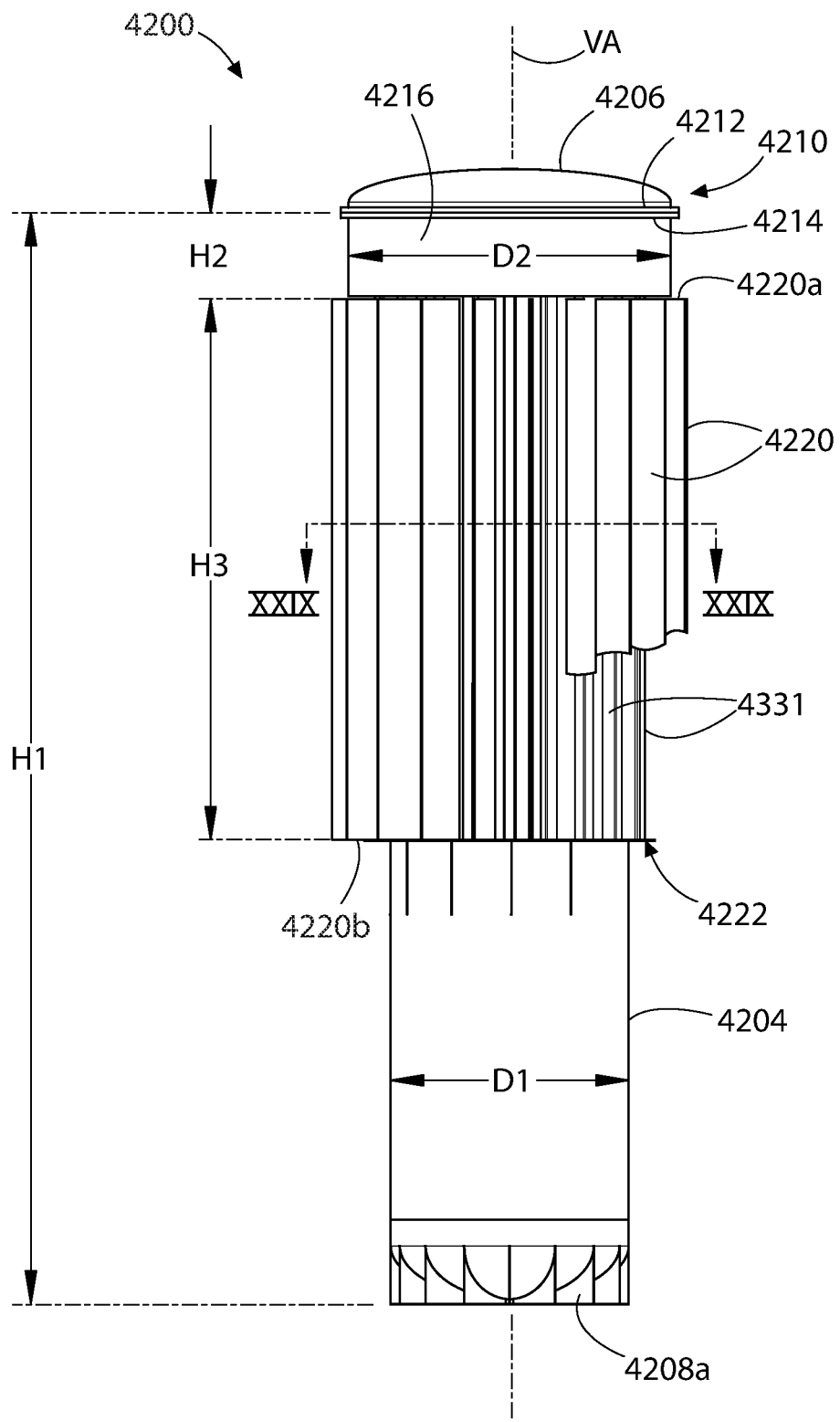
FIG. 28 is side elevation view of a finned primary reactor containment vessel according to the present disclosure which forms part of a nuclear reactor containment system, the lower portions of some fins being broken away in part to reveal vertical support columns and circumferential rib.

According to another aspect of the invention, each individual spent fuel rack 3400 is further configured to facilitate and increase heat dissipation from the spent fuel rods for effective cooling. FIGS. 26 and 27 are side elevation and top plan views respectively of a plurality of fuel racks 3400 which may be grouped together in close proximity on the fuel rack storage area 3403 portion of the spent fuel pool floor 3702.

Referring to FIGS. 25-27, each spent fuel rack 3400 includes an elongated body comprised of a plurality of hollow tubes 3407, a top plate 3405, and bottom plate 3406. The tubes 3407 include open tops 3403 which allow insertion and storage of spent fuel rods in each tube. The bottoms 3404 of the tubes may be closed except for a drainage hole to enable removal of water from the tubes when the racks are lifted out of the spent fuel pool 3700. In one embodiment configuration, the tubes 3407 may have rectilinear transverse cross sections forming square or rectangular tube shapes in top plan view. This allows dense packing of the tubes in each rack to maximize spent fuel rod capacity. A plurality of legs 3401 are attached to the bottom plate 3406 to raise the racks off the spent fuel pool floor 3702 to permit cooling water in the pool to flow beneath the bottom plate 3406 for improved cooling.

The tubes 3407, top plate 3405, and bottom plate 3406 may be formed of metal to efficiently conduct heat away from the spent fuel rods 3707. In some embodiments, the tubes may be formed of a metal-matrix composite material, such as a discontinuously reinforced aluminum/boron carbide metal matrix composite material or boron impregnated aluminum for neutron absorption.

To maximize cooling of the racks 3400 and spent fuel rods 3707 contained in the tubes 3407, the top and bottom plates 3405, 3406 may each extend laterally beyond the tubes on all four sides of the rack by a distance 3408 forming peripheral extension portions 3410. The extension portions 3410 are bare exposed metal and provide additional heat transfer surface area for increasing heat removal from the spent fuel racks. An example of a fuel rack with such an extended bottom plate is disclosed in commonly owned U.S. patent application Ser. No. 14/3,673,705, which is incorporated herein by reference in its entirety.

In one embodiment, the top plate 3405 may be configured as a perimeter frame allowing access to the open tops of the tubes. By contrast, the bottom plate 3406 may cover the entire bottom area of the tubes forming a floor for each tube. The top and bottom plates 3405, 3406 of each spent fuel rack 3400 may have the same lateral width and length (in top plan view) to allow multiple racks to be efficiently abutted when emplaced on the fuel rack storage area 3403 of the spent fuel pool floor 3702. The extension portions 3410 of the racks further create horizontal gaps 3409 between adjacent spent fuel racks 3400 to allow the cooling water in the spent fuel pool 3700 to flow between the racks for additional cooling.

Inventive Concept #4

Reference is made generally to FIGS. 28-52 which are relevant to Inventive Concept #4 described below.

Referring to FIGS. 28-42, a nuclear reactor containment system 4100 according to the present disclosure is shown. The system 4100 generally includes an inner containment structure such as containment vessel 4200 and an outer containment enclosure structure (CES) 4300 collectively defining a containment vessel-enclosure assembly 4200-4300. The containment vessel 4200 and containment enclosure structure (CES) 4300 are vertically elongated and oriented, and defines a vertical axis VA.

Figure 33:
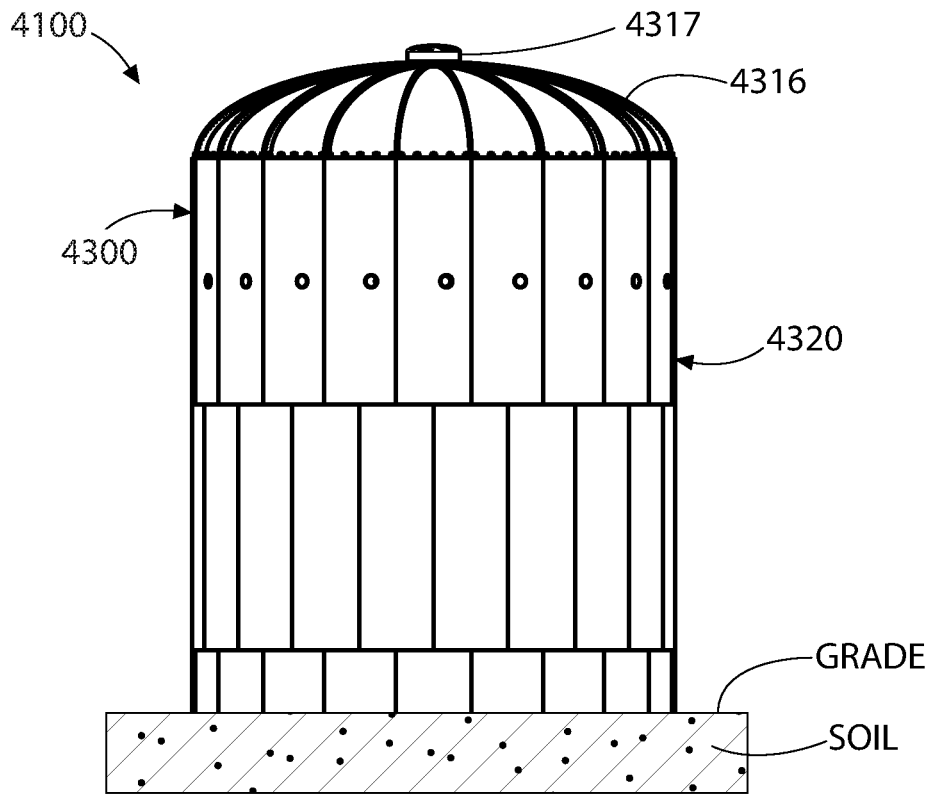
FIG. 33 is a side elevation view of nuclear reactor containment system as installed with the outer containment enclosure structure (CES) being visible above grade.
Figure 34:
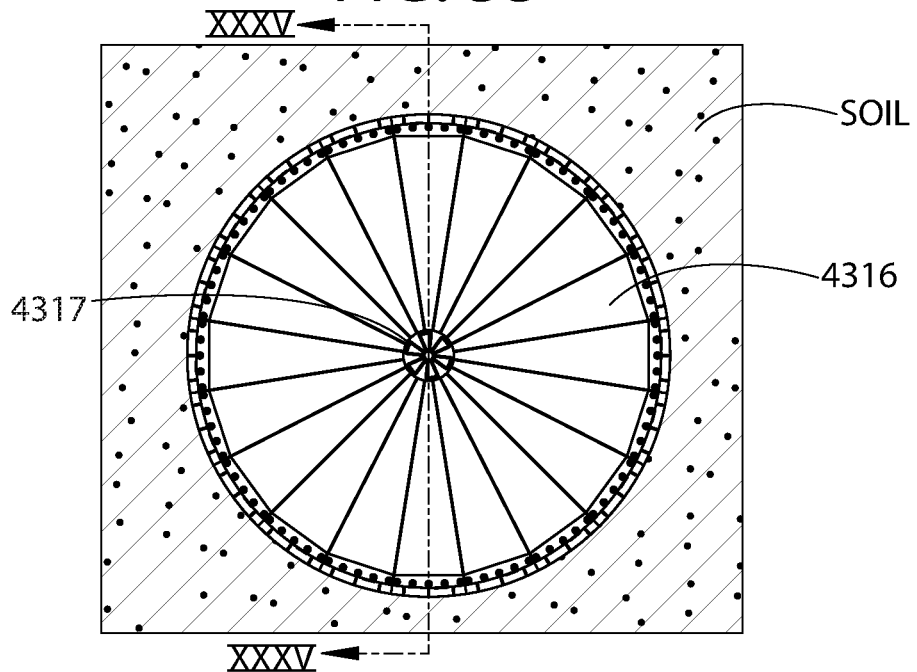
FIG. 34 is a top plan view thereof.
Figure 35:
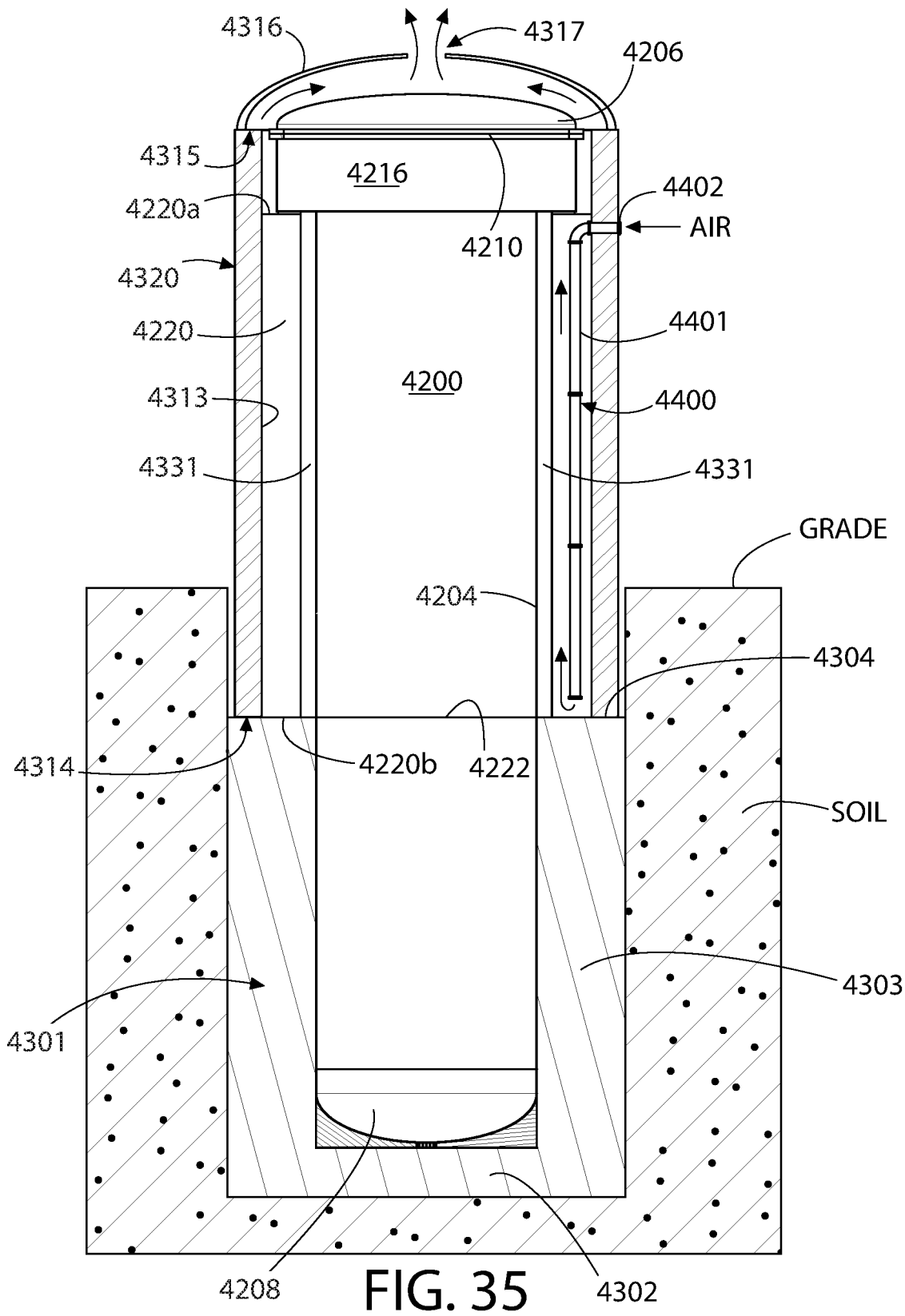
FIG. 35 is longitudinal cross-sectional view thereof taken along line XXXV in FIG. 34 showing both above and below grade portions of the nuclear reactor containment system.
Figures 36, 37:
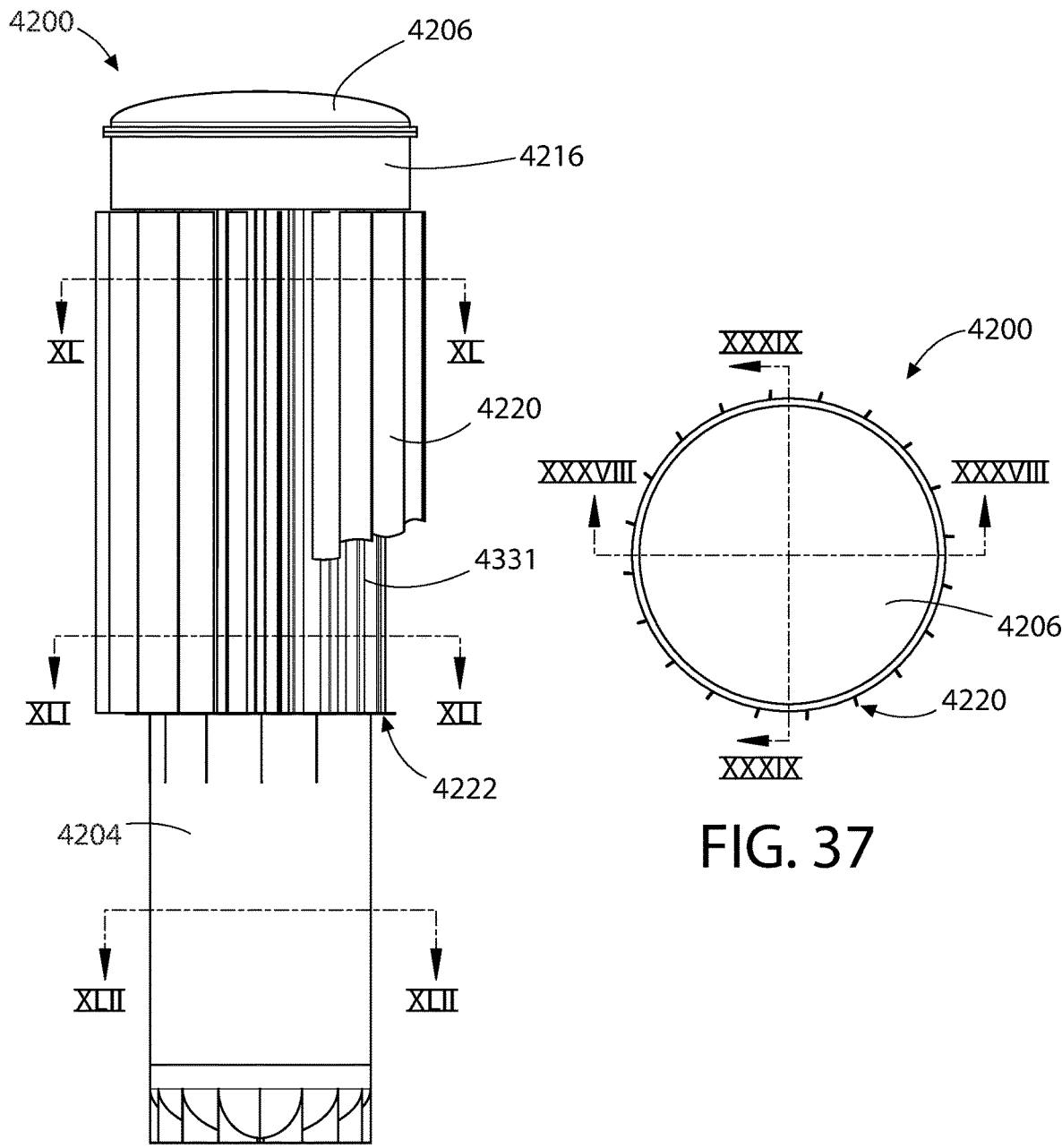
FIG. 36 is side elevation view of the primary reactor containment vessel showing various cross-section cuts to reveal equipment housed in and additional details of the containment vessel.
FIG. 37 is a top plan view thereof.
Figure 38:
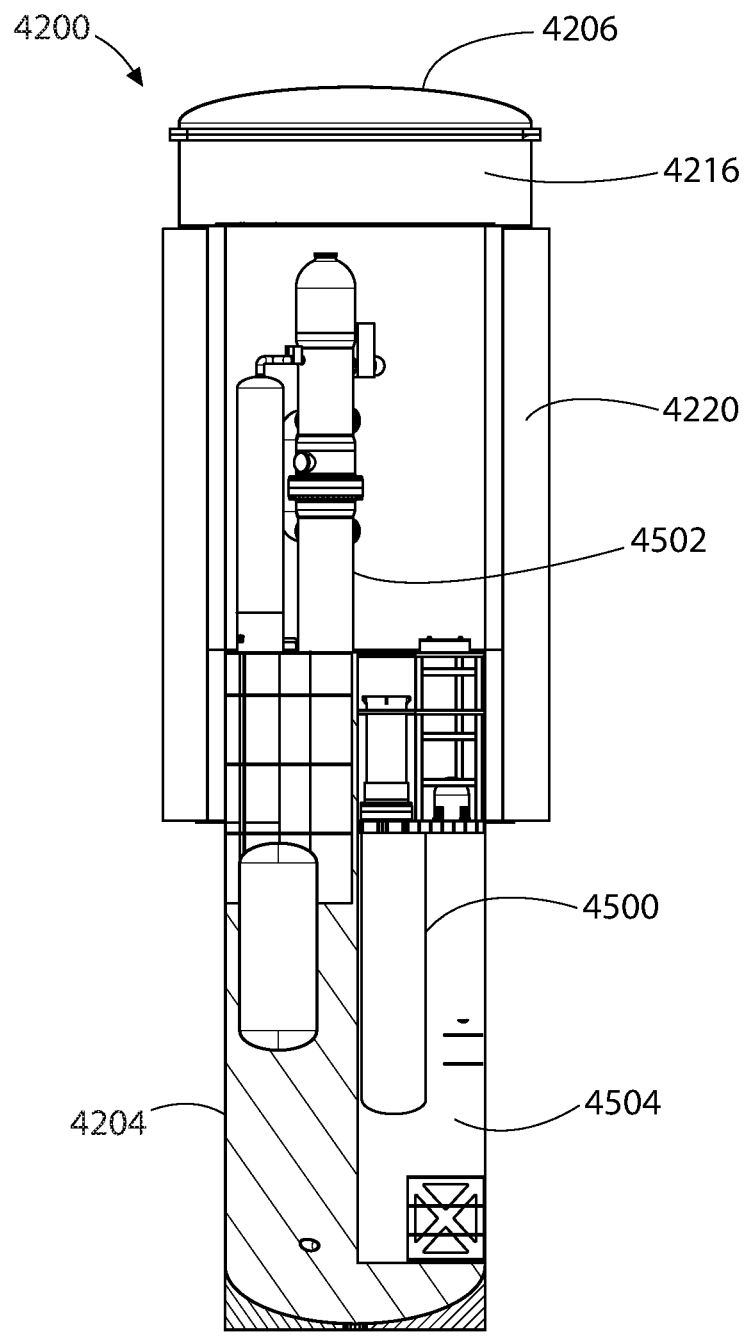
FIG. 38 is a longitudinal cross-sectional view thereof taken along line XXXVIII in FIG. 37.
Figure 39:
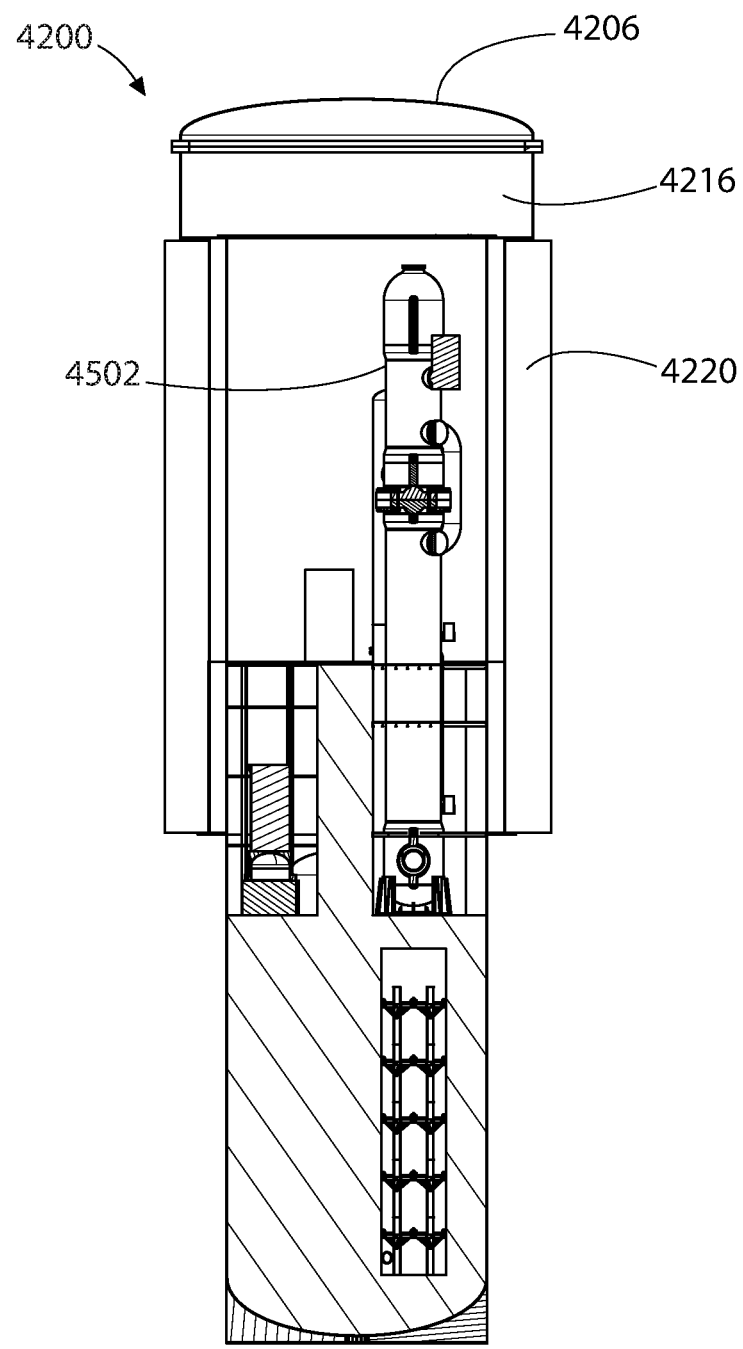
FIG. 39 is a longitudinal cross-sectional view thereof taken along line XXXIX in FIG. 37.
Figure 40:
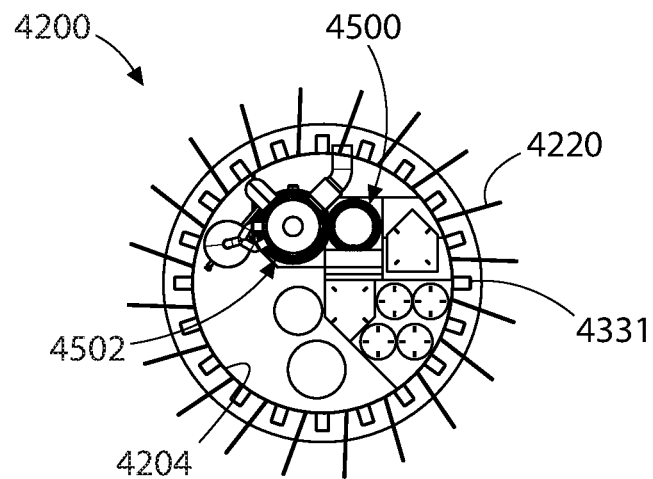
FIG. 40 is a transverse cross-sectional view thereof taken along line XL in FIG. 36.
Figure 41:
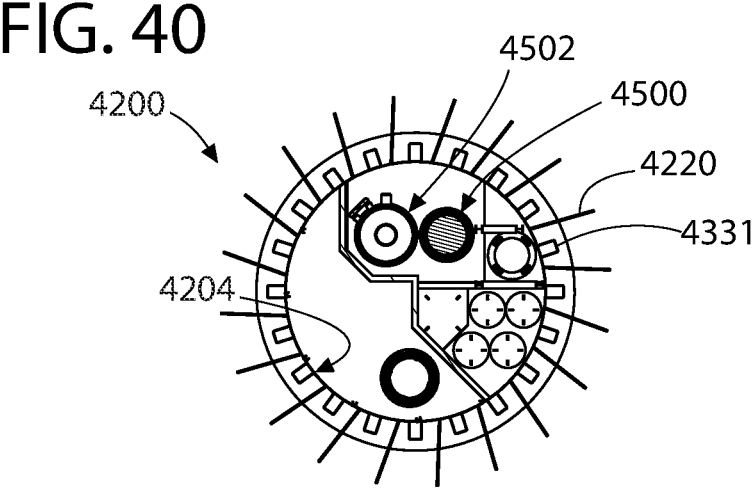
FIG. 41 is a transverse cross-sectional view thereof taken along line XLI in FIG. 36.
Figure 42:
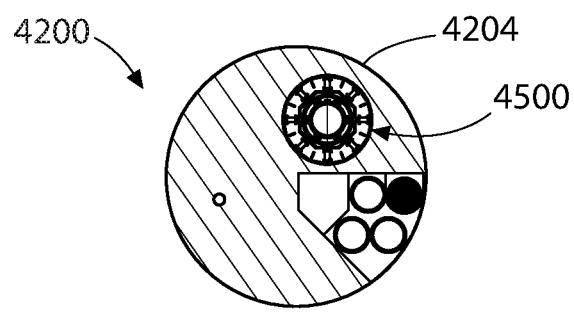
FIG. 42 is a transverse cross-sectional view thereof taken along line XLII in FIG. 36.

In one embodiment, the containment vessel-enclosure assembly 4200-4300 is configured to be buried in the subgrade at least partially below grade (see also FIGS. 33-35). The containment vessel-enclosure assembly 4200-4300 may be supported by a concrete foundation 4301 comprised of a bottom slab 4302 and vertically extending sidewalls 4303 rising from the slab forming a top base mat 4304. The sidewalls 4303 may circumferentially enclose containment vessel 4200 as shown wherein a lower portion of the containment vessel may be positioned inside the sidewalls. In some embodiments, the sidewalls 4303 may be poured after placement of the containment vessel 4200 on the bottom slab 4302 (which may be poured and set first) thereby completely embedding the lower portion of the containment vessel 4200 within the foundation. The foundation walls 4303 may terminate below grade in some embodiments as shown to provide additional protection for the containment vessel-enclosure assembly 4200-4300 from projectile impacts (e.g. crashing plane, etc.). The foundation 4301 may have any suitable configuration in top plan view, including without limitation polygonal (e.g. rectangular, hexagon, circular, etc.).

In one embodiment, the weight of the containment vessel 4200 may be primarily supported by the bottom slab 4302 on which the containment vessel rests and the containment enclosure structure (CES) 4300 may be supported by the base mat 4304 formed atop the sidewalls 4303 of the foundation 4301. Other suitable vessel and containment enclosure structure (CES) support arrangements may be used.

With continuing reference to FIGS. 28-42, the containment structure 4200 may be an elongated vessel 4202 including a hollow cylindrical shell 4204 with circular transverse cross-section defining an outer diameter D1, a top head 4206, and a bottom head 4208. In one embodiment, the containment vessel 4200 (i.e. shell and heads) may be made from a suitably strong and ductile metallic plate and bar stock that is readily weldable (e.g. low carbon steel). In one embodiment, a low carbon steel shell 4204 may have a thickness of at least 1 inch. Other suitable metallic materials including various alloys may be used.

The top head 4206 may be attached to the shell 4204 via a flanged joint 4210 comprised of a first annular flange 4212 disposed on the lower end or bottom of the top head and a second mating annular flange 4214 disposed on the upper end or top of the shell. The flanged joint 4210 may be a bolted joint, which optionally may further be seal welded after assembly with a circumferentially extending annular seal weld being made between the adjoining flanges 4212 and 4214.

The top head 4206 of containment vessel 4200 may be an ASME (American Society of Mechanical Engineers) dome-shaped flanged and dished head to add structural strength (i.e. internal pressure retention and external impact resistance); however, other possible configurations including a flat top head might be used. The bottom head 4208 may similarly be a dome-shaped dished head or alternatively flat in other possible embodiments. In one containment vessel construction, the bottom head 4208 may be directly welded to the lower portion or end of the shell 4204 via an integral straight flange (SF) portion of the head matching the diameter of shell. In one embodiment, the bottom of the containment vessel 4200 may include a ribbed support stand 4208a or similar structure attached to the bottom head 4208 to help stabilize and provide level support for the containment vessel on the slab 4302 of the foundation 4301, as further described herein.

In some embodiments, the top portion 4216 of the containment vessel shell 4204 may be a diametrically enlarged segment of the shell that forms a housing to support and accommodate a polar crane (not shown) for moving equipment, fuel, etc. inside the containment vessel. This will provide crane access to the very inside periphery of the containment vessel and enable placement of equipment very close to the periphery of the containment vessel 4200 making the containment vessel structure compact. In one configuration, therefore, the above grade portion of the containment vessel 4200 may resemble a mushroom-shaped structure.

In one possible embodiment, the enlarged top portion 4216 of containment vessel 4200 may have an outer diameter D2 that is larger than the outer diameter D1 of the rest of the adjoining lower portion 4218 of the containment vessel shell 4204. In one non-limiting example, the top portion 4216 may have a diameter D2 that is approximately 10 feet larger than the diameter D1 of the lower portion 4218 of the shell 4204. The top portion 4216 of shell 4204 may have a suitable height H2 selected to accommodate the polar crane with allowance for working clearances which may be less than 50% of the total height H1 of the containment vessel 4200. In one non-limiting example, approximately the top ten feet of the containment vessel 4200 (H2) may be formed by the enlarged diameter top portion 4216 in comparison to a total height H1 of 200 feet of the containment vessel. The top portion 4216 of containment vessel 4200 may terminate at the upper end with flange 4214 at the flanged connection to the top head 4206 of the containment vessel.

Figure 31:
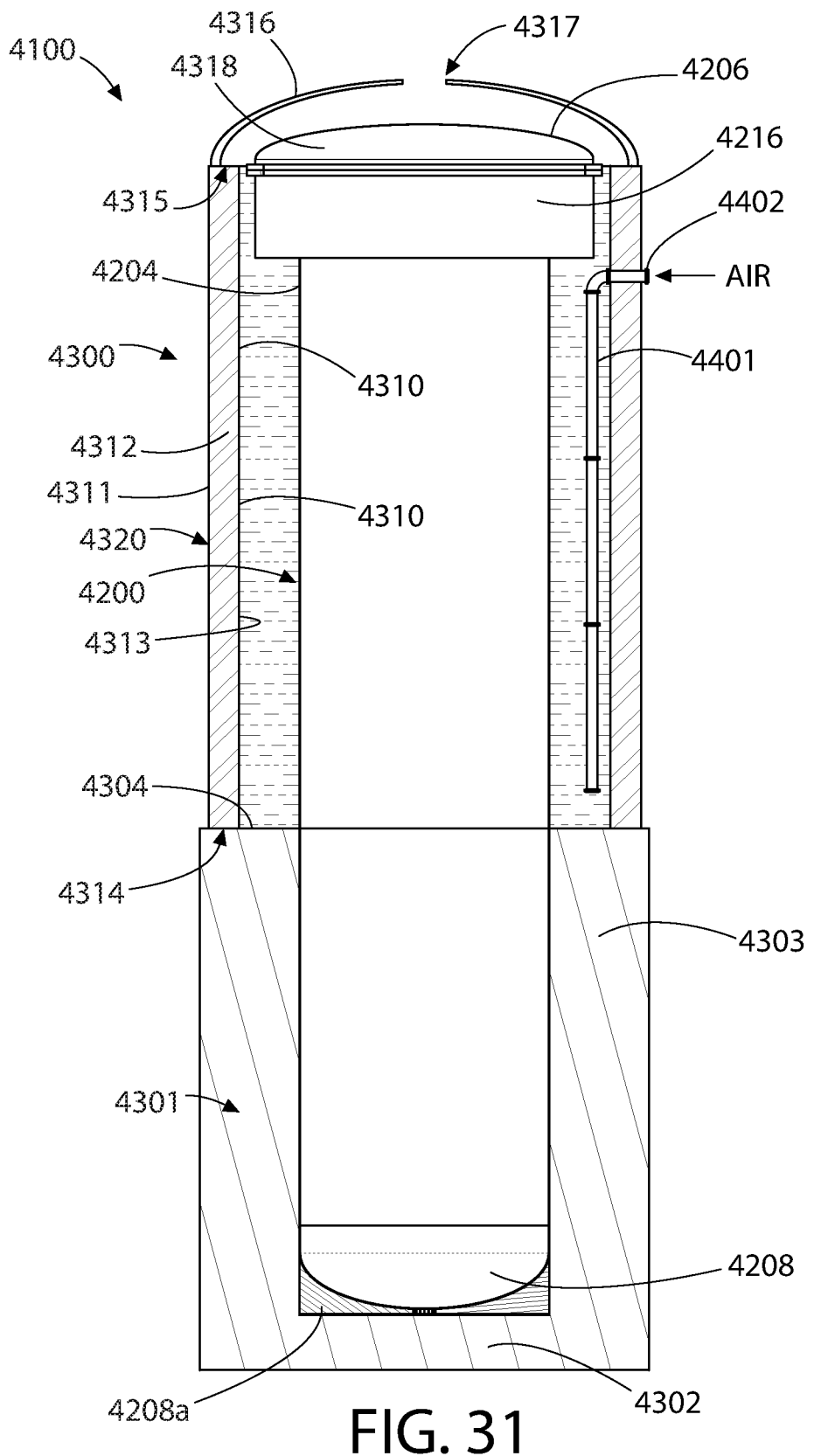
FIG. 31 is a longitudinal cross-sectional view of the nuclear reactor containment system showing the containment vessel of FIG. 28 and outer containment enclosure structure (CES) with water filled annular reservoir formed between the vessel and enclosure.

In one embodiment, the diametrically enlarged top portion 4216 of containment vessel 4200 has a diameter D2 which is smaller than the inside diameter D3 of the containment enclosure structure (CES) 4300 to provide a (substantially) radial gap or secondary annulus 4330 (see, e.g. FIG. 31). This provides a cushion of space or buffer region between the containment enclosure structure (CES) 4300 and containment vessel top portion 4216 in the advent of a projectile impact on the containment enclosure structure (CES). Furthermore, the annulus 4330 further significantly creates a flow path between primary annulus 4313 (between the shells of the containment enclosure structure (CES) 4300 and containment vessel 4200) and the head space 4318 between the containment enclosure structure (CES) dome 4316 and top head 4206 of the containment vessel 4200 for steam and/or air to be vented from the containment enclosure structure (CES) as further described herein. Accordingly, the secondary annulus 4330 is in fluid communication with the primary annulus 4313 and the head space 4318 which in turn is in fluid communication with vent 4317 which penetrates the dome 4316. In one embodiment, the secondary annulus 4330 has a smaller (substantially) radial width than the primary annulus 4313.

Referring to FIGS. 28-31, the containment enclosure structure (CES) structure (CES) 4300 may be double-walled structure in some embodiments having sidewalls 4320 formed by two (substantially) radially spaced and interconnected concentric shells 4310 (inner) and 4311 (outer) with plain or reinforced concrete 4312 installed in the annular space between them. The concentric shells 4310, 4311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure structure (CES) 4300 may have a concrete 4312 thickness of 6 feet or more which ensures adequate ability to withstand high energy projectile impacts such as that from an airliner.

The containment enclosure structure (CES) 4300 circumscribes the containment vessel shell 4204 and is spaced (substantially) radially apart from shell 4204, thereby creating primary annulus 4313. Annulus 4313 may be a water-filled in one embodiment (i.e. annular water reservoir) to create a heat sink for receiving and dissipating heat from the containment vessel 4200 in the case of a thermal energy release incident inside the containment vessel. This water-filled annular reservoir preferably extends circumferentially for a full 4360 degrees in one embodiment around the perimeter of upper portions of the containment vessel shell 4204 lying above the concrete foundation 4301. FIG. 31 shows a cross-section of the water-filled annulus 4313 without the external (substantially) radial fins 4221 in this figure for clarity. In one embodiment, the annulus 4313 is filled with water from the base mat 4304 at the bottom end 4314 to approximately the top end 4315 of the concentric shells 4310, 4311 of the containment enclosure structure (CES) 4300 to form an annular cooling water reservoir between the containment vessel shell 4204 and inner shell 4310 of the containment enclosure structure (CES). This annular reservoir may be coated or lined in some embodiments with a suitable corrosion resistant material such as aluminum, stainless steel, or a suitable preservative for corrosion protection. In one representative example, without limitation, the annulus 4313 may be about 10 feet wide and about 100 feet high.

In one embodiment, the containment enclosure structure (CES) 4300 includes a steel dome 4316 that is suitably thick and reinforced to harden it against crashing aircraft and other incident projectiles. The dome 4316 may be removably fastened to the shells 4310, 4311 by a robust flanged joint 4318. In one embodiment, the containment enclosure structure (CES) 4300 is entirely surrounded on all exposed above grade portions by the containment enclosure structure (CES) 4300, which preferably is sufficiently tall to provide protection for the containment vessel against aircraft hazard or comparable projectile to preserve the structural integrity of the water mass in the annulus 4313 surrounding the containment vessel. In one embodiment, as shown, the containment enclosure structure (CES) 4300 extends vertically below grade to a substantial portion of the distance to the top of the base mat 4304.

The containment enclosure structure (CES) 4300 may further include at least one rain-protected vent 4317 which is in fluid communication with the head space 4318 beneath the dome 4316 and water-filled annulus 4313 to allow water vapor to flow, escape, and vent to atmosphere. In one embodiment, the vent 4317 may be located at the center of the dome 4316. In other embodiments, a plurality of vents may be provided spaced (substantially) radially around the dome 4316. The vent 4317 may be formed by a short section of piping in some embodiments which is covered by a rain hood of any suitable configuration that allows steam to escape from the containment enclosure structure (CES) but minimizes the ingress of water.

In some possible embodiments, the head space 4318 between the dome 4316 and top head 4206 of the containment vessel 4200 may be filled with an energy absorbing material or structure to minimize the impact load on the containment enclosure structure (CES) dome 4316 from a crashing (falling) projecting (e.g. airliner, etc.). In one example, a plurality of tightly-packed undulating or corrugated deformable aluminum plates may be disposed in part or all of the head space to form a crumple zone which will help absorb and dissipate the impact forces on the dome 4316.

Referring primarily to FIGS. 28-32 and 35-44, the buried portions of the containment vessel 4200 within the concrete foundation 4301 below the base mat 4304 may have a plain shell 4204 without external features. Portions of the containment vessel shell 4204 above the base mat 4304, however, may include a plurality of longitudinal external (substantially) radial ribs or fins 4220 which extend axially (substantially) parallel to vertical axis VA of the containment vessel-enclosure assembly 4200-4300. The external longitudinal fins 4220 are spaced circumferentially around the perimeter of the containment vessel shell 4204 and extend (substantially) radially outwards from the containment vessel.

The ribs 4220 serve multiple advantageous functions including without limitation (1) to stiffen the containment vessel shell 4204, (2) prevent excessive "sloshing" of water reserve in annulus 4313 in the occurrence of a seismic event, and (3) significantly to act as heat transfer "fins" to dissipate heat absorbed by conduction through the shell 4204 to the environment of the annulus 4313 in the situation of a fluid/steam release event in the containment vessel.

Accordingly, in one embodiment to maximize the heat transfer effectiveness, the longitudinal fins 4220 extend vertically for substantially the entire height of the water-filled annulus 4313 covering the effective heat transfer surfaces of the containment vessel 4200 (i.e. portions not buried in concrete foundation) to transfer heat from the containment vessel 4200 to the water reservoir, as further described herein. In one embodiment, the external longitudinal fins 4220 have upper horizontal ends 4220*a* which terminate at or proximate to the underside or bottom of the larger diameter top portion 4216 of the containment vessel 4200, and lower horizontal ends 4220*b* which terminate at or proximate to the base mat 4304 of the concrete foundation 4301. In one embodiment, the external longitudinal fins 4220 may have a height H3 which is equal to or greater than one half of a total height of the shell of the containment vessel.

In one embodiment, the upper horizontal ends 4220*a* of the longitudinal fins 4220 are free ends not permanently attached (e.g. welded) to the containment vessel 4200 or other structure. At least part of the lower horizontal ends 4220*b* of the longitudinal fins 4220 may abuttingly contact and rest on a horizontal circumferential rib 4222 welded to the exterior surface of the containment vessel shell 4204 to help support the weight of the longitudinal fins 4220 and minimize stresses on the longitudinal rib-to-shell welds. Circumferential rib 4222 is annular in shape and may extend a full 360 degrees completely around the circumferential of the containment vessel shell 4204. In one embodiment, the circumferential rib 4222 is located to rest on the base mat 4304 of the concrete foundation 4301 which transfers the loads of the longitudinal fins 4220 to the foundation. The longitudinal fins 4220 may have a lateral extent or width that projects outwards beyond the outer peripheral edge of the circumferential rib 4222. Accordingly, in this embodiment, only the inner portions of the lower horizontal end 4220*b* of each rib 4220 contacts the circumferential rib 4222. In other possible embodiments, the circumferential rib 4222 may extend (substantially) radially outwards far enough so that substantially the entire lower horizontal end 4220*b* of each longitudinal rib 4220 rests on the circumferential rib 4222. The lower horizontal ends 4220*b* may be welded to the circumferential rib 4222 in some embodiments to further strengthen and stiffen the longitudinal fins 4220.

The external longitudinal fins 4220 may be made of steel (e.g. low carbon steel), or other suitable metallic materials including alloys which are each welded on one of the longitudinally-extending sides to the exterior of the containment vessel shell 4204. The opposing longitudinally-extending side of each rib 4220 lies proximate to, but is preferably not permanently affixed to the interior of the inner shell 4310 of the containment enclosure structure (CES) 4300 to maximize the heat transfer surface of the ribs acting as heat dissipation fins. In one embodiment, the external longitudinal fins 4220 extend (substantially) radially outwards beyond the larger diameter top portion 4216 of the containment vessel 4200 as shown. In one representative example, without limitation, steel ribs 4220 may have a thickness of about 1 inch. Other suitable thickness of ribs may be used as appropriate. Accordingly, in some embodiments, the ribs 4220 have a radial width that is more than 10 times the thickness of the ribs.

Figure 29:
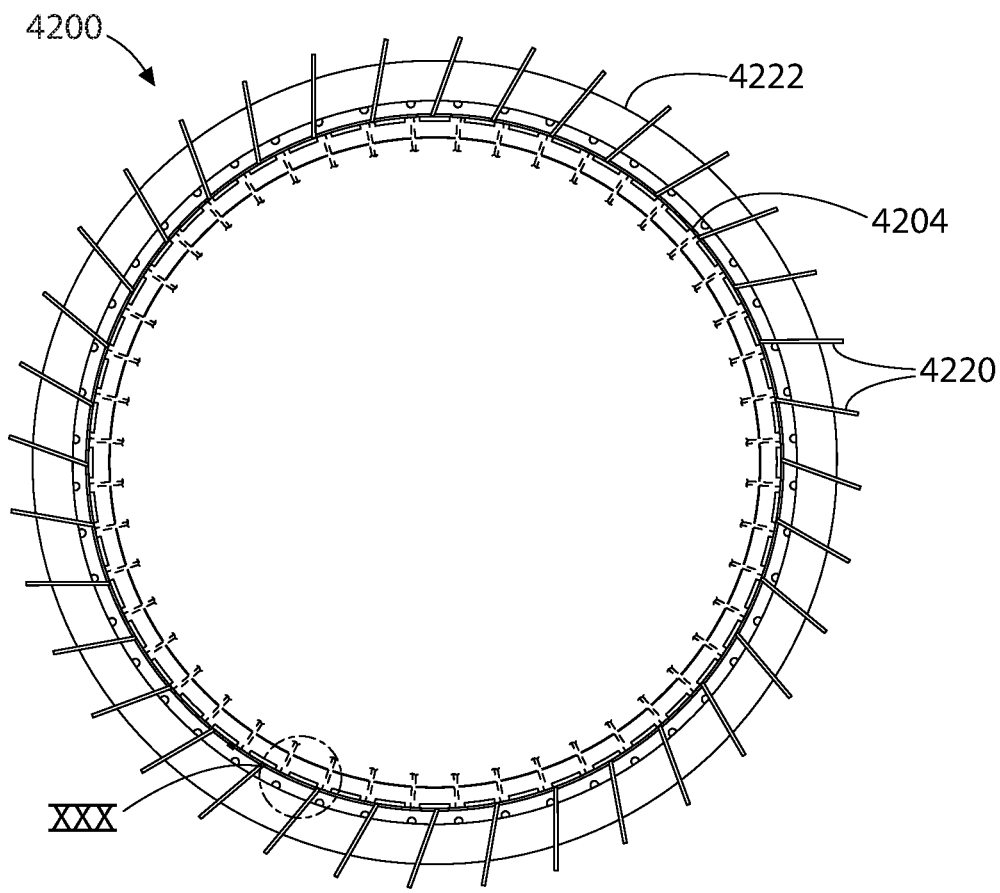
FIG. 29 is transverse cross-sectional view thereof taken along line XXIX IN FIG. 28.
Figure 30:
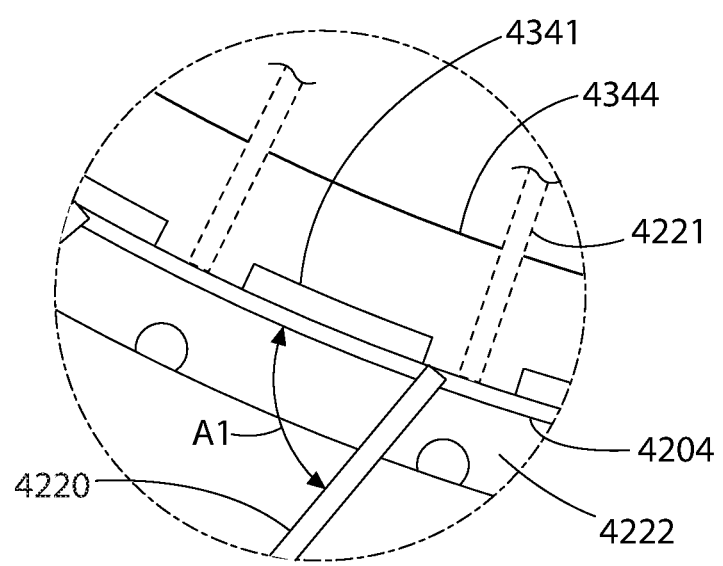
FIG. 30 is a detail of item XXX in FIG. 29.
Figure 32:
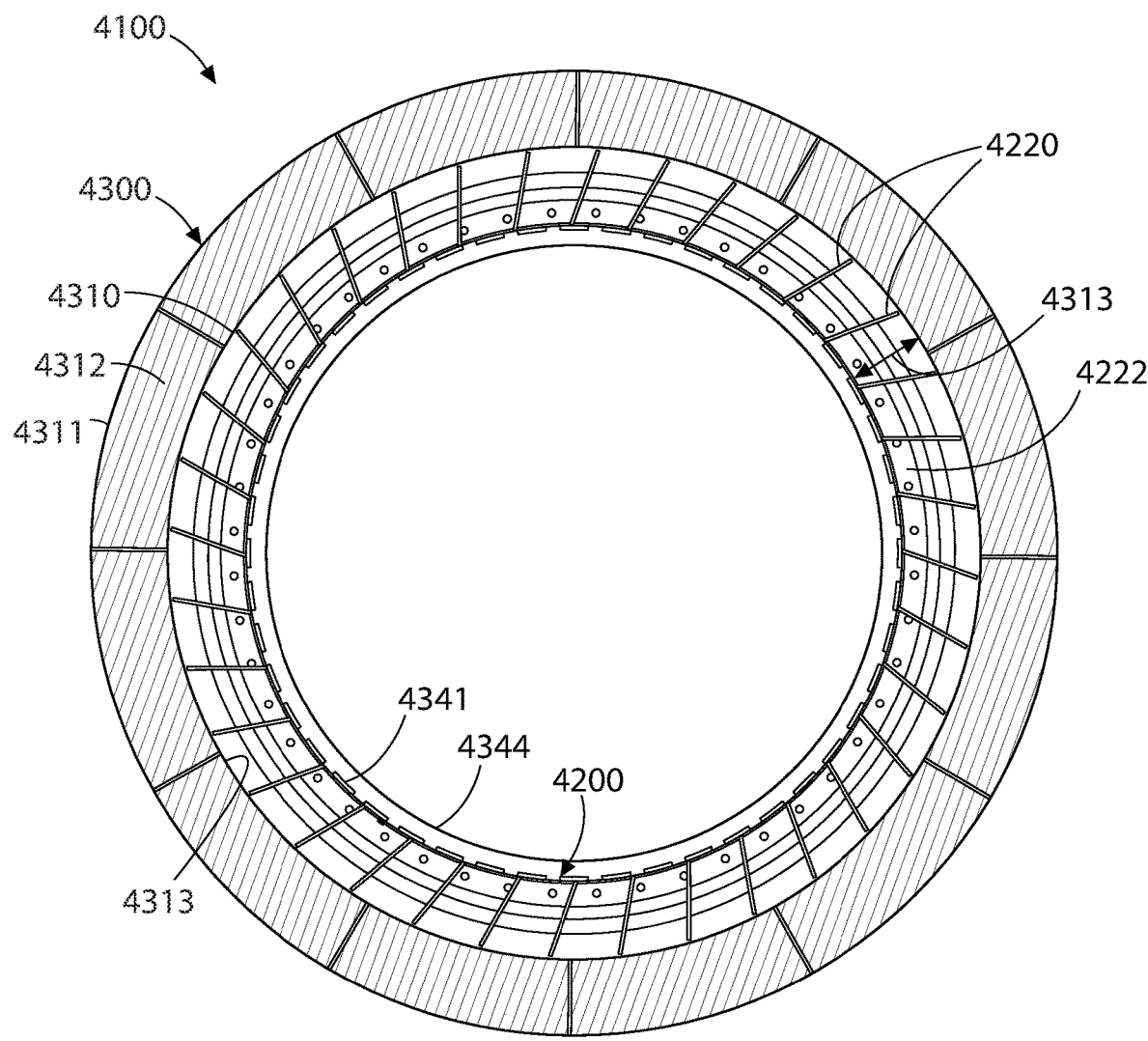
FIG. 32 is a longitudinal cross-sectional view through the containment vessel and containment enclosure structure (CES)

In one embodiment, the longitudinal fins 4220 are oriented at an oblique angle A1 to containment vessel shell 4204 as best shown in FIGS. 29-30 and 32. This orientation forms a crumple zone extending 360 degrees around the circumference of the containment vessel 4200 to better resist projectile impacts functioning in cooperation with the outer containment enclosure structure (CES) 4300. Accordingly, an impact causing inward deformation of the containment enclosure structure (CES) shells 4210, 4211 will bend the longitudinal fins 4220 which in the process will distribute the impact forces preferably without direct transfer to and rupturing of the inner containment vessel shell 4204 as might possibly occur with ribs oriented 90 degrees to the containment vessel shell 4204. In other possible embodiments, depending on the construction of the containment enclosure structure (CES) 4300 and other factors, a perpendicular arrangement of ribs 4220 to the containment vessel shell 4204 may be appropriate.

In one embodiment, referring to FIGS. 33-35, portions of the containment vessel shell 4204 having and protected by the external (substantially) radial fins 4220 against projectile impacts may extend below grade to provide protection against projectile strikes at or slightly below grade on the containment enclosure structure (CES) 4300. Accordingly, the base mat 4304 formed at the top of the vertically extending sidewalls 4303 of the foundation 4301 where the fins 4220 terminate at their lower ends may be positioned a number of feet below grade to improve impact resistance of the nuclear reactor containment system.

In one embodiment, the containment vessel 4200 may optionally include a plurality of circumferentially spaced apart internal (substantially) radial fins 4221 attached to the interior surface of the shell 4204 (shown as dashed in FIGS. 29 and 30). Internal fins 4221 extend (substantially) radially inwards from containment vessel shell 4204 and longitudinally in a vertical direction of a suitable height. In one embodiment, the internal (substantially) radial fins 4221 may have a height substantially coextensive with the height of the water-filled annulus 4313 and extend from the base mat 4304 to approximately the top of the shell 4204. In one embodiment, without limitation, the internal fins 4221 may be oriented substantially perpendicular (i.e. 90 degrees) to the containment vessel shell 4204. Other suitable angles and oblique orientations may be used. The internal fins function to both increase the available heat transfer surface area and structurally reinforce the containment vessel shell against external impact (e.g. projectiles) or internal pressure increase within the containment vessel 4200 in the event of a containment pressurization event (e.g. LOCA or reactor scram). In one embodiment, without limitation, the internal fins 4221 may be made of steel.

Referring to FIGS. 28-42, a plurality of vertical structural support columns 4331 may be attached to the exterior surface of the containment vessel shell 4204 to help support the diametrically larger top portion 4216 of containment vessel 4200 which has peripheral sides that are cantilevered (substantially) radially outwards beyond the shell 4204. The support columns 4331 are spaced circumferentially apart around the perimeter of containment vessel shell 4204. In one embodiment, the support columns 4331 may be formed of steel hollow structural members, for example without limitation C-shaped members in cross-section (i.e. structural channels), which are welded to the exterior surface of containment vessel shell 4204. The two parallel legs of the channels may be vertically welded to the containment vessel shell 4204 along the height of each support column 4331 using either continuous or intermittent welds such as stitch welds.

The support columns 4331 extend vertically downwards from and may be welded at their top ends to the bottom/underside of the larger diameter top portion 4216 of containment vessel housing the polar crane. The bottom ends of the support columns 4331 rest on or are welded to the circumferential rib 4222 which engages the base mat 4304 of the concrete foundation 4301 near the buried portion of the containment. The columns 4331 help transfer part of the dead load or weight from the crane and the top portion 4216 of the containment vessel 4300 down to the foundation. In one embodiment, the hollow space inside the support columns may be filled with concrete (with or without rebar) to help stiffen and further support the dead load or weight. In other possible embodiments, other structural steel shapes including filled or unfilled box beams, I-beams, tubular, angles, etc. may be used. The longitudinal fins 4220 may extend farther outwards in a (substantially) radial direction than the support columns 4331 which serve a structural role rather than a heat transfer role as the ribs 4220. In certain embodiments, the ribs 4220 have a (substantially) radial width that is at least twice the (substantially) radial width of support columns.

FIGS. 38-42 show various cross sections (both longitudinal and transverse) of containment vessel 4200 with equipment shown therein. In one embodiment, the containment vessel 4200 may be part of a small modular reactor (SMR) system such as SMR-4160 by Holtec International. The equipment may generally include a nuclear reactor vessel 4500 with a reactor core and circulating primary coolant disposed in a wet well 4504, and a steam generator 4502 fluidly coupled to the reactor and circulating a secondary coolant which may form part of a Rankine power generation cycle. Other appurtenances and equipment may be provided to create a complete steam generation system.

Referring primarily now to FIGS. 29-30, 43, and 45, the containment vessel 4200 may further include an auxiliary heat dissipation system 4340 including a plurality of internal longitudinal ducts 4341 circumferentially spaced around the circumference of containment vessel shell 4204. Ducts 4341 extend vertically parallel to the vertical axis VA and in one embodiment are attached to the interior surface of shell 4204. The ducts 4341 may be made of metal such as steel and are welded to interior of the shell 4204. In one possible configuration, without limitation, the ducts 4341 may be comprised of vertically oriented C-shaped structural channels (in cross section) positioned so that the parallel legs of the channels are each seam welded to the shell 4204 for their entire height to define a sealed vertical flow conduit. Other suitably shaped and configured ducts may be provided so long the fluid conveyed in the ducts contacts at least a portion of the interior containment vessel shell 4204 to transfer heat to the water-filled annulus 4313.

Any suitable number and arrangement of ducts 4341 may be provided depending on the heat transfer surface area required for cooling the fluid flowing through the ducts. The ducts 4341 may be uniformly or non-uniformly spaced on the interior of the containment vessel shell 4204, and in some embodiments grouped clusters of ducts may be circumferentially distributed around the containment vessel. The ducts 4341 may have any suitable cross-sectional dimensions depending on the flow rate of fluid carried by the ducts and heat transfer considerations.

The open upper and lower ends 4341a, 4341b of the ducts 4341 are each fluidly connected to a common upper inlet ring header 4343 and lower outlet ring header 4344. The annular shaped ring headers 4343, 4344 are vertically spaced apart and positioned at suitable elevations on the interior of the containment vessel 4200 to maximize the transfer of heat between fluid flowing vertically inside ducts 4341 and the shell 4204 of the containment vessel in the active heat transfer zone defined by portions of the containment vessel having the external longitudinal fins 4220 in the primary annulus 4313. To take advantage of the primary water-filled annulus 4313 for heat transfer, upper and lower ring headers

4343, 4344 may each respectively be located on the interior of the containment vessel shell 4204 adjacent and near to the top and bottom of the annulus.

In one embodiment, the ring headers 4343, 4344 may each be formed of half-sections of steel pipe as shown which are welded directly to the interior surface of containment vessel shell 4204 in the manner shown. In other embodiments, the ring headers 4343, 4344 may be formed of complete sections of arcuately curved piping supported by and attached to the interior of the shell 4204 by any suitable means.

In one embodiment, the heat dissipation system 4340 is fluidly connected to a source of steam that may be generated from a water mass inside the containment vessel 4200 to reject radioactive material decay heat. The containment surface enclosed by the ducts 4341 serves as the heat transfer surface to transmit the latent heat of the steam inside the ducts to the shell 4204 of the containment vessel 4200 for cooling via the external longitudinal fins 4220 and water filled annulus 4313. In operation, steam enters the inlet ring header 4343 and is distributed to the open inlet ends of the ducts 4341 penetrating the header. The steam enters the ducts 4341 and flows downwards therein along the height of the containment vessel shell 4204 interior and undergoes a phase change from steam to liquid. The condensed steam drains down by gravity in the ducts and is collected by the lower ring header 4344 from which it is returned back to the source of steam also preferably by gravity in one embodiment. It should be noted that no pumps are involved or required in the foregoing process.

According to another aspect of the present disclosure, a secondary or backup passive air cooling system 4400 is provided to initiate air cooling by natural convection of the containment vessel 4200 if, for some reason, the water inventory in the primary annulus 4313 were to be depleted during a thermal reactor related event (e.g. LOCA or reactor scram). Referring to FIG. 35, the air cooling system 4400 may be comprised of a plurality of vertical inlet air conduits 4401 spaced circumferentially around the containment vessel 4200 in the primary annulus 4313. Each air conduit 4401 includes an inlet 4402 which penetrates the sidewalls 4320 of the containment enclosure structure (CES) 4300 and is open to the atmosphere outside to draw in ambient cooling air. Inlets 4402 are preferably positioned near the upper end of the containment enclosure structure's sidewalls 4320. The air conduits 4401 extend vertically downwards inside the annulus 4313 and terminate a short distance above the base mat 4304 of the foundation (e.g. approximately 1 foot) to allow air to escape from the open bottom ends of the conduits.

Using the air conduits 4401, a natural convection cooling airflow pathway is established in cooperation with the annulus 4313. In the event the cooling water inventory in the primary annulus 4313 is depleted by evaporation during a thermal event, air cooling automatically initiates by natural convection as the air inside the annulus will continue to be heated by the containment vessel 4200. The heated air rises in the primary annulus 4313, passes through the secondary annulus 4330, enters the head space 4318, and exits the dome 4316 of the containment enclosure structure (CES) 4300 through the vent 4317 (see directional flow arrows, FIG. 35). The rising heated air creates a reduction in air pressure towards the bottom of the primary annulus 4313 sufficient to draw in outside ambient downwards through the air conduits 4401 thereby creating a natural air circulation pattern which continues to cool the heated containment vessel 4200. Advantageously, this passive air cooling system and circulation may continue for an indefinite period of time to cool the containment vessel 4200.

It should be noted that the primary annulus 4313 acts as the ultimate heat sink for the heat generated inside the containment vessel 4200. The water in this annular reservoir also acts to maintain the temperature of all crane vertical support columns 4331 (described earlier) at essentially the same temperature thus ensuring the levelness of the crane rails (not shown) at all times which are mounted in the larger portion 4216 of the containment vessel 4200.

Figure 46:
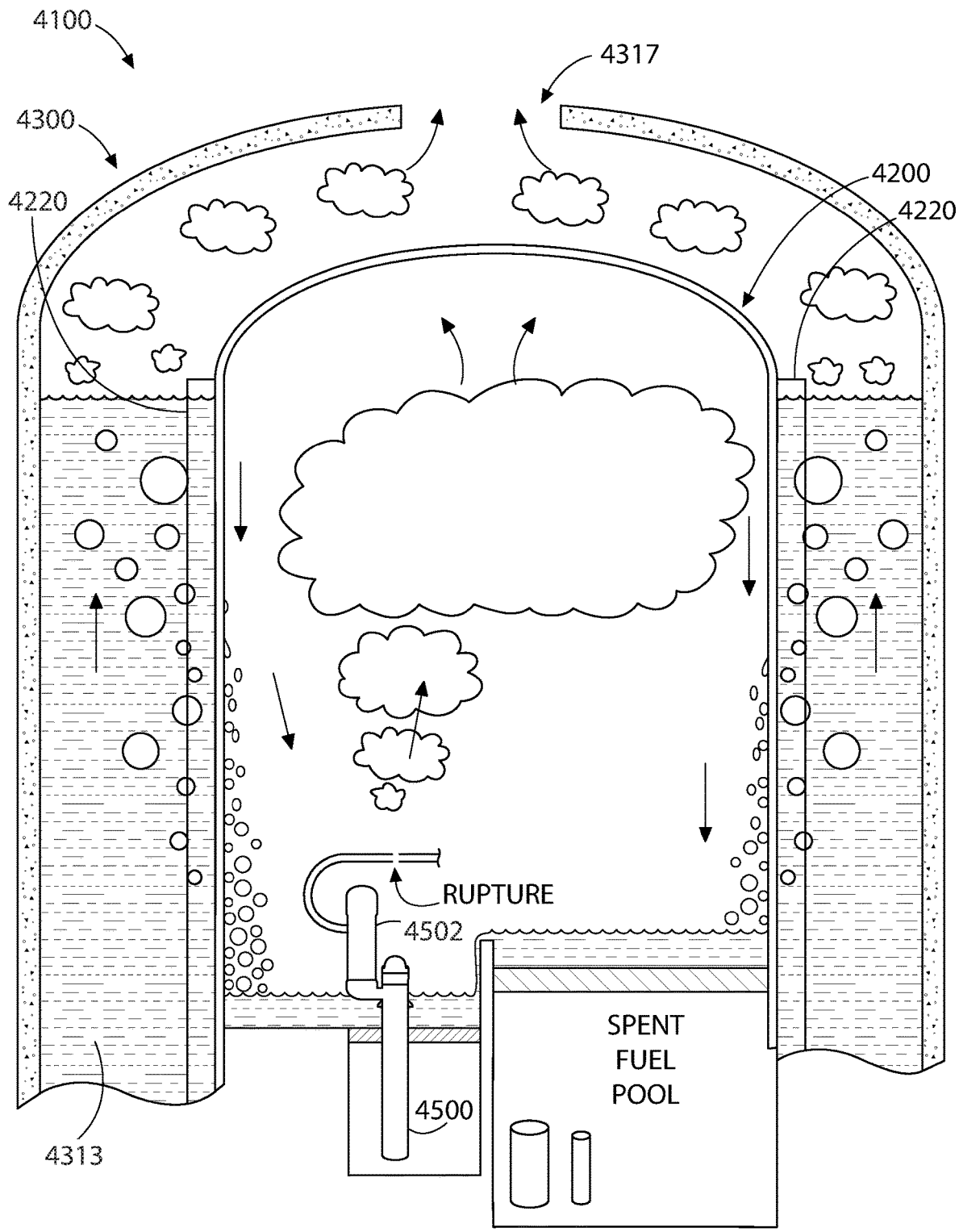
FIG. 46 is a schematic depiction of a generalized cross-section of the nuclear reactor containment system and operation of the water filled annular reservoir to dissipate heat and cool the containment vessel during a thermal energy release event.

Operation of the reactor containment system 4100 as a heat exchanger will now be briefly described with initial reference to FIG. 46. This figure is a simplified diagrammatic representation of the reactor containment system 4100 without all of the appurtenances and structures described herein for clarity in describing the active heat transfer and rejection processes performed by the system.

In the event of a loss-of-coolant (LOCA) accident, the high energy fluid or liquid coolant (which may typically be water) spills into the containment environment formed by the containment vessel 4200. The liquid flashes instantaneously into steam and the vapor mixes with the air inside the containment and migrates to the inside surface of the containment vessel 4200 sidewalls or shell 4204 (since the shell of the containment is cooler due the water in the annulus 4313). The vapor then condenses on the vertical shell walls by losing its latent heat to the containment structure metal which in turn rejects the heat to the water in the annulus 4313 through the longitudinal fins 4220 and exposed portions of the shell 4204 inside the annulus. The water in the annulus 4313 heats up and eventually evaporates forming a vapor which rises in the annulus and leaves the containment enclosure structure (CES) 4300 through the secondary annulus 4330, head space 4318, and finally the vent 4317 to atmosphere.

As the water reservoir in annulus 4313 is located outside the containment vessel environment, in some embodiments the water inventory may be easily replenished using external means if available to compensate for the evaporative loss of water. However, if no replenishment water is provided or available, then the height of the water column in the annulus 4313 will begin to drop. As the water level in the annulus 4313 drops, the containment vessel 4200 also starts to heat the air in the annulus above the water level, thereby rejecting a portion of the heat to the air which rises and is vented from the containment enclosure structure (CES) 4300 through vent 4317 with the water vapor. When the water level drops sufficiently such that the open bottom ends of the air conduits 4401 (see, e.g. FIG. 35) become exposed above the water line, fresh outside ambient air will then be pulled in from the air conduits 4401 as described above to initiate a natural convection air circulation pattern that continues cooling the containment vessel 4200.

In one embodiment, provisions (e.g. water inlet line) are provided through the containment enclosure structure (CES) 4300 for water replenishment in the annulus 4313 although this is not required to insure adequate heat dissipation. The mass of water inventory in this annular reservoir is sized such that the decay heat produced in the containment vessel 4200 has declined sufficiently such that the containment is capable of rejecting all its heat through air cooling alone once the water inventory is depleted. The containment vessel 4200 preferably has sufficient heat rejection capability to limit the pressure and temperature of the vapor mix inside the containment vessel (within its design limits) by rejecting the thermal energy rapidly.

Figure 43:
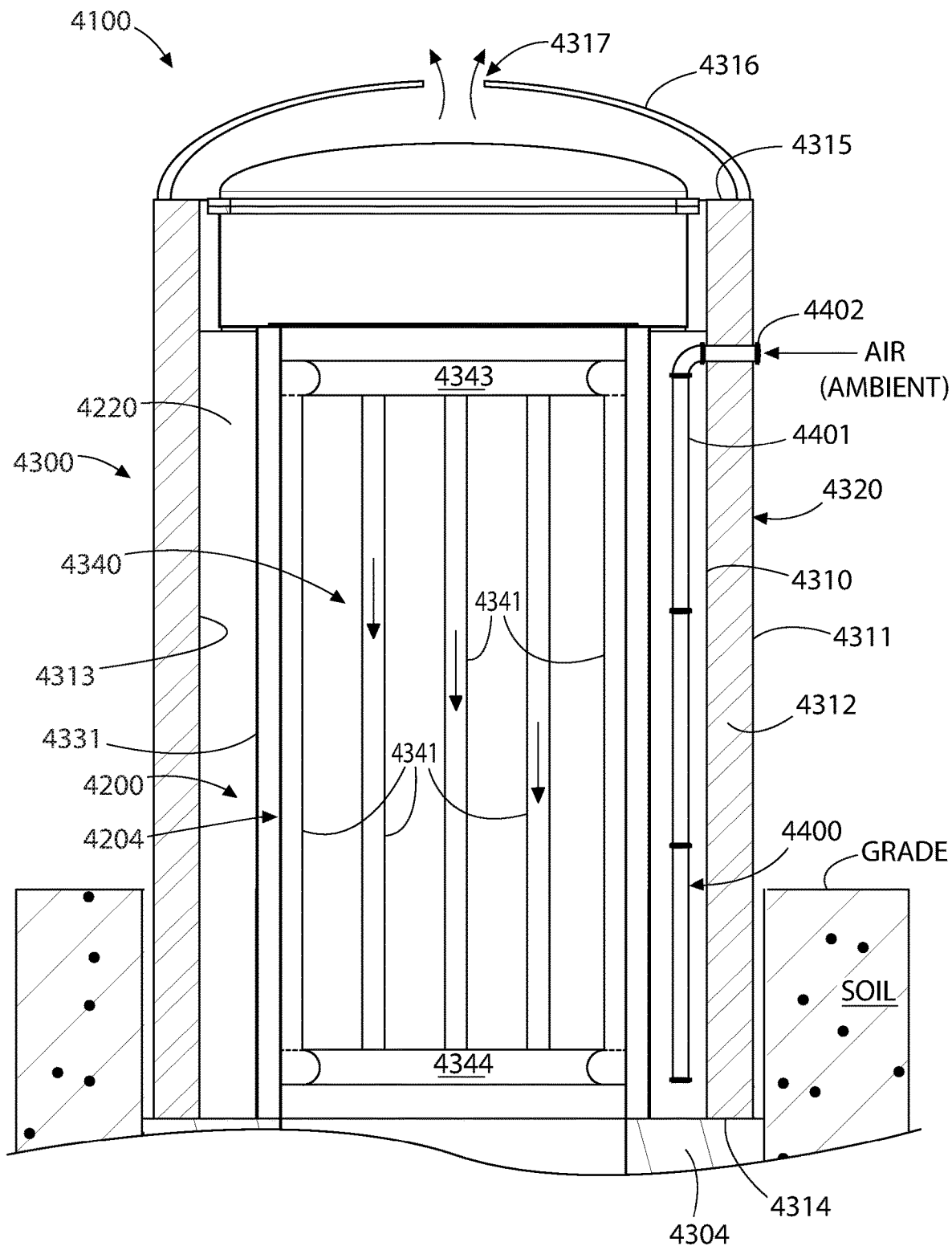
FIG. 43 is a partial longitudinal cross-sectional view of the nuclear reactor containment system showing an auxiliary heat dissipation system.
Figure 44:
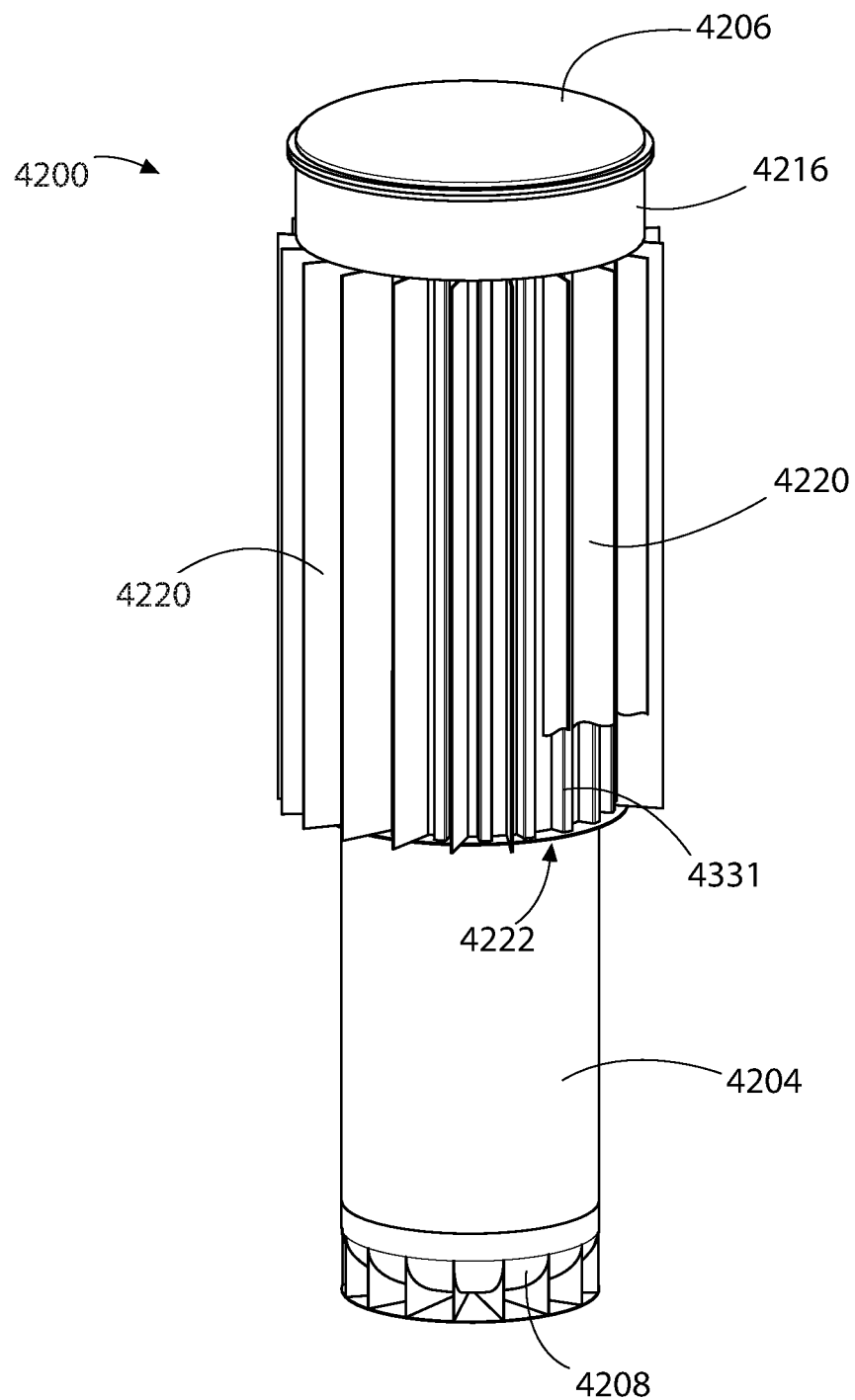
FIG. 44 is an isometric view of the containment vessel with lower portions of the (substantially) radial fins of the containment vessel broken away in part to reveal vertical support columns and circumferential rib.
Figure 45:
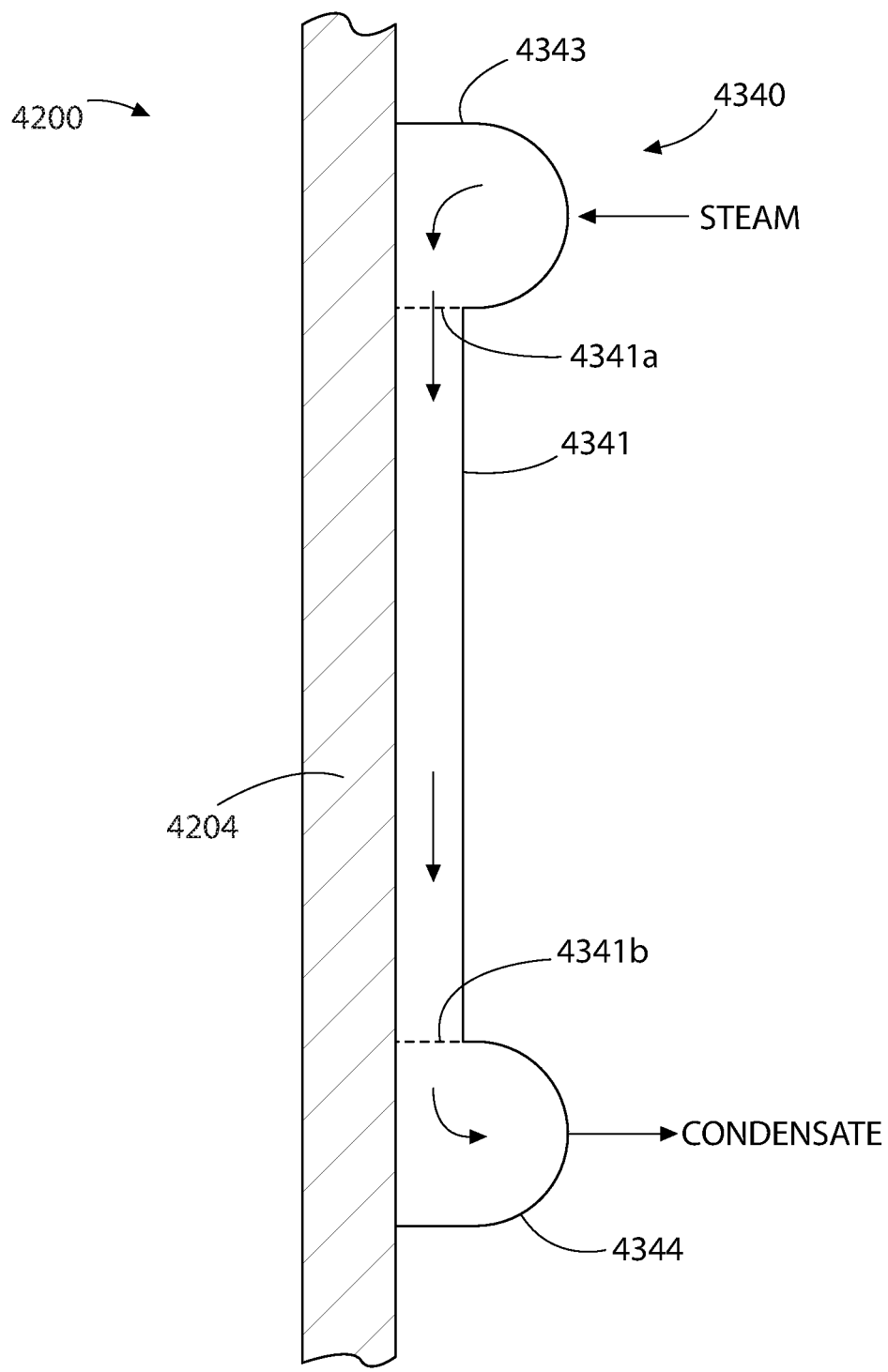
FIG. 45 is a longitudinal cross-sectional view of a portion of the heat dissipation system of FIG. 43 showing upper and lower ring headers and ducts attached to the shell of the containment vessel.

In the event of a station blackout, the reactor core is forced into a "scram" and the passive core cooling systems will reject the decay heat of the core in the form of steam directed upper inlet ring header 4343 of heat dissipation system 4340 already described herein (see, e.g. FIGS. 43 and 45). The steam then flowing downwards through the network of internal longitudinal ducts 4341 comes in contact with the containment vessel shell 4204 interior surface enclosed within the heat dissipation ducts and condenses by rejecting its latent heat to the containment structure metal, which in turn rejects the heat to the water in the annulus via heat transfer assistance provide by the longitudinal fins 4220. The water in the annular reservoir (primary annulus 4313) heats up eventually evaporating. The containment vessel 4200 rejects the heat to the annulus by sensible heating and then by a combination of evaporation and air cooling, and then further eventually by natural convection air cooling only as described herein. As mentioned above, the reactor containment system 4100 is designed and configured so that air cooling alone is sufficient to reject the decay heat once the effective water inventory in annulus 4313 is entirely depleted.

In both these foregoing scenarios, the heat rejection can continue indefinitely until alternate means are available to bring the plant back online. Not only does the system operate indefinitely, but the operation is entirely passive without the use of any pumps or operator intervention.

Component Cooling Water System

According to another aspect of the present invention shown in FIGS. 47-52, an improved component cooling water (CCW) system 4600 is provided. The component cooling water system 4600 generally includes a heat exchanger 4610 and one or more component cooling water pumps 4601 which are fluidly connected via a substantially closed recirculating cooling water piping loop 4636 as opposing to prior once-through cooling systems which may utilize raw water from a natural body of water for cooling. A majority of the cooling water piping loop 4636 may be situated in the nuclear power generation plant external to the nuclear reactor containment vessel 4200 and containment enclosure structure 4300 surrounding the containment vessel (see, e.g. FIG. 52). The cooling water piping loop 4636 collects and distributes heated and cooled cooling water from and to balance of plant equipment (represented by the CCW box in FIG. 52) fluidly connected to the piping loop and component cooling water system 4600. The pumps 4601 provide the motive force for driving the flow through the piping loop 4636 and heat exchanger 4610. Pump 4601 may be any suitable type of pump (e.g. centrifugal, etc.) having an appropriate suction and discharge head for the application conditions and desired flow rate. Any number or arrangement of pumps 4601 may be provided to circulate cooling water through the piping loop 4636.

In one embodiment according to the present disclosure, component cooling water system 4600 advantageously utilizes the water in the water-filled annulus 4313 (alternatively referred to herein as annular water reservoir 4313) formed between the inner containment vessel 4200 and outer containment enclosure structure 4300 (previously described herein) as a functional heat transfer medium or sink for transferring heat to/from the annular water reservoir and component cooling water system 4600. Accordingly, in this embodiment heat exchanger 4610 may be physically located within and immersed/submerged in the annular water reservoir for direct transfer of heat to the reservoir. In general, the cooling water piping loop 4636 recirculates component cooling water within a closed flow loop between the annular water reservoir 4313 and plant equipment for cooling, as further described herein.

Figure 51:
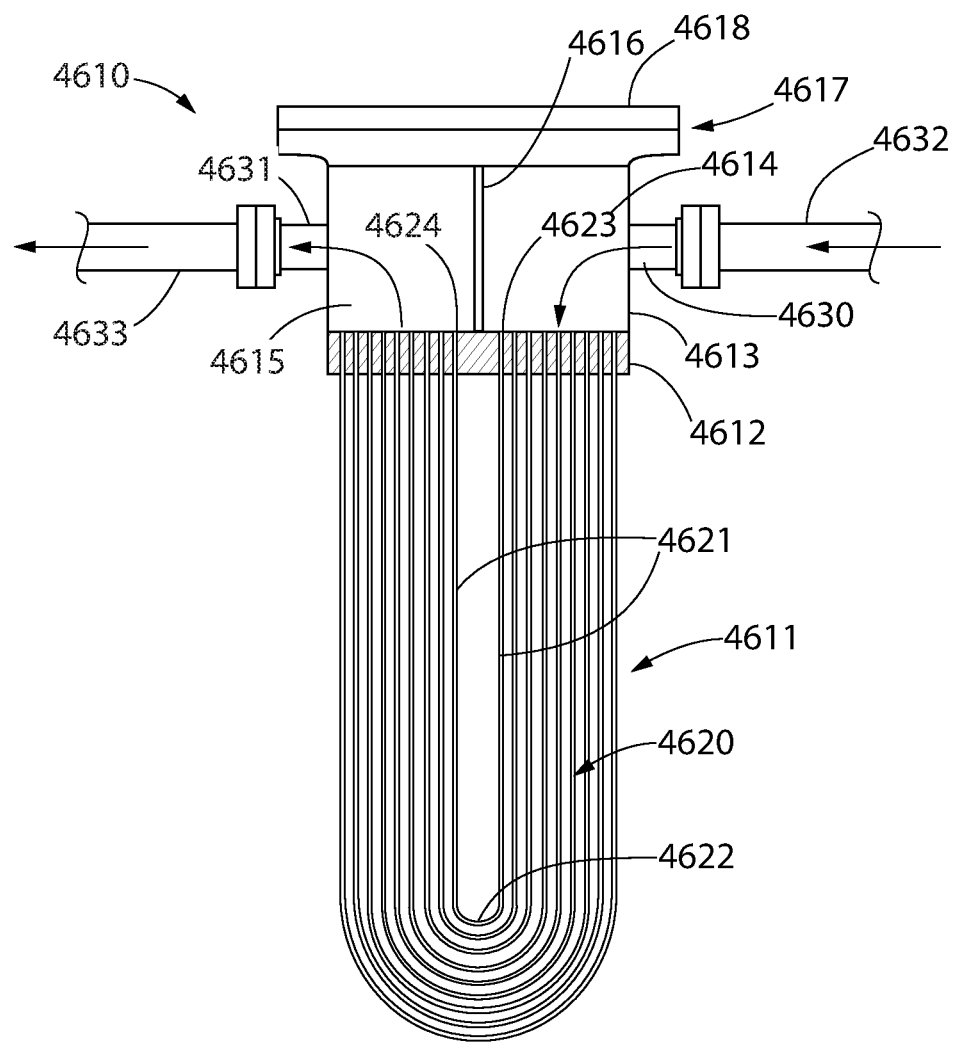
FIG. 51 is side cross-sectional elevation view of the heat exchanger of FIG. 47.

Referring initially to FIG. 51, heat exchanger 4610 of the component cooling water system 4600 in one non-limiting configuration is a shell-less heat exchanger including a vertically elongated and oriented channel-up U-tube bundle 4611 comprising a plurality of U-shaped heat transfer tubes 4620 attached at both ends to a tube sheet 4612 formed adjacent channel 4613. Channel 4613 defines an interior space which may be divided into an inlet chamber 4614 and outlet chamber 4615 by a vertical partition plate 4616. The bottom of inlet/outlet chambers 4614, 4615 are formed by an upper side of the tube sheet 4612. The top of inlet/outlet chambers 4614, 4615 may be closed by a top cover 4618 removably attached to the upper end of the channel 4613.

Heat exchanger 4610 includes an inlet nozzle 4630 fluidly connected to inlet chamber 4614 through a sidewall of channel 4613 and an outlet nozzle 4631 fluidly connected to outlet chamber 4615 through a sidewall of the channel. The inlet and outlet nozzles 4630, 4631 are may be positioned in opposing relationship to each other on channel 4613 in one embodiment; however, other suitable arrangements are possible. Inlet and outlet nozzles 4630, 4631 fluidly connect the heat exchanger 4610 to the inlet cooling water piping 4632 and outlet cooling water piping 4633 of the component cooling water system 4600. The inlet and outlet cooling water piping 4632, 4633 in turn are fluidly coupled to the closed cooling water piping loop 4636 of the component cooling water system 4600 (see also FIG. 52). In one embodiment, inlet and outlet nozzles 4630, 4631 may be flanged for coupling to mating flanges formed on the ends of the inlet and outlet cooling water piping 4632, 4633. The flanged joints 4617 between the nozzles and piping may be bolted in one embodiment, or welded in other embodiments. It will be appreciated, however, that inlet and outlet cooling water piping 4632, 4633 may be directly welded to inlet and outlet nozzles 4630, 4631 without the use of flanges. Any suitable type of fluid connection type may be used.

Figure 49:
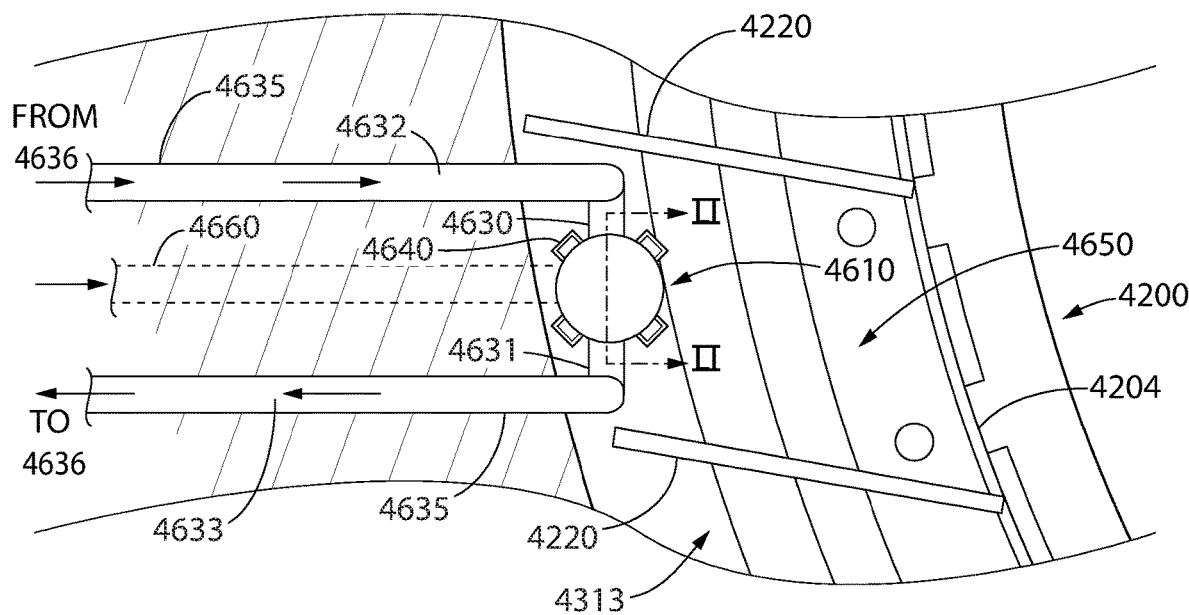
FIG. 49 is top plan view taken from a first elevation of the component cooling water system in FIG. 47.

Inlet and outlet cooling water piping 4632, 4633 may be arranged to extend through suitably configured penetrations 4635 formed through outer containment enclosure structure 4300 in some embodiments (see, e.g. FIG. 49). Penetrations 4635 may be located at any suitable elevation to allow connection of the cooling water piping to inlet and outlet nozzles 4630, 4631 of heat exchanger 4610. The piping may be any suitable metallic or non-metallic piping.

In one embodiment, a bolted flange joint 4617 may be used to removably fasten the top cover 4618 to channel 4613. Other suitable approaches, however, may be used for attaching top cover 4616 to channel 4613. The top cover 4618 provides a leak-proof enclosure of the channel 4613 and may include suitable gaskets and/or seals to form a water-tight connection as will be well known to these skilled in the art. Preferably, partition plate 4616 is configured and arranged to engage and form a seal with the tube sheet 4612 and underside of top cover 4618. This is intended to prevent or minimize leakage of cooling water between the inlet chamber 4614 and outlet chamber 4615 on opposing sides of the partition plate 4616. In one possible arrangement, the partition plate 4616 may have a linear bottom end or edge which may be fixedly welded to the upper side of tube sheet 4612 and a linear top end or edge detachably engageable with the underside of top cover 4618 via a suitable gasket and/or seal when the top cover is mounted on the channel 4613. The removable top cover 4618 provides access to the tube sheet 4612 inside the channel for plugging leaking tubes, conducting non-destructive examination and inspection of the tube sheet and tubes, or for other purposes.

Referring generally to FIGS. 47-52, and particularly FIG. 51, the heat exchanger 4610 in one exemplary embodiment may be shell-less heat exchanger wherein the U-shaped tubes 4620 are not enclosed and exposed for direct immersion or submersion in the water-filled annulus 4313 of the nuclear reactor containment system 4100 formed between the inner containment vessel 4200 and outer containment enclosure structure 4300. Tubes 4620 may each include two straight portions 4621 and a U-shaped bend 4622 disposed distal to and opposite the tube sheet 4612. Each tube 4620 has a first end 4623 of a straight portion 4621 connected through the tube sheet 4612 to inlet chamber 4614 and a second end 4624 of a straight portion connected through the tube sheet to outlet chamber 4615. In one embodiment, the end portions of the tubes 4620 adjacent the tube ends may extend completely through vertical through holes formed in the tube sheet 4612 from the underside to the top side of the tube sheet. The tubes may be secured to the tube sheet 4612 via any suitable means, including without limitation welding, explosive expansion of the tube end portions to the tube sheet, or other methods known in the art.

The U-shaped tubes 4620 may be bare or optionally include fins (e.g. axial or spiral) depending on the heat transfer rate requirements of the intended application and other technical considerations. Tubes 4620 may be made of any suitable ferrous or non-ferrous metal or metal alloys such as, for example without limitation, aluminum or steel tubes attached to an aluminum clad or solid stainless steel tube sheet 4612, respectively. Preferably, tubes 4620 may be selected for corrosion resistance. Tubes 4620 may have any suitable outside diameter and wall thickness.

Referring to FIGS. 47-52, heat exchanger 4610 is shown installed in the water-filled annulus (annular water reservoir) 4313 that girdles the inner containment vessel 4200. The water inside the annular water reservoir may be kept in a non-quiescent state by recirculation pumps 4663 of a reservoir recirculation system 4662 (see FIG. 50) that that draw water from and returns it to the annulus 4313 which agitates the water thereby preventing the growth of algae. These pumps may also serve to filter the reservoir water on an ongoing basis to maintain its cleanliness. The movement of water in the annular water reservoir 4313 also helps promote evaporation, which helps any cooling function ascribed to it, such as removal of the Loss-of-Coolant Accident (LOCA) thermal energy as discussed elsewhere herein or removing heat from the cooling water of the component cooling water system via the heat exchanger 4610 submerged in the water reservoir during normal operation of the reactor.

Figure 47:
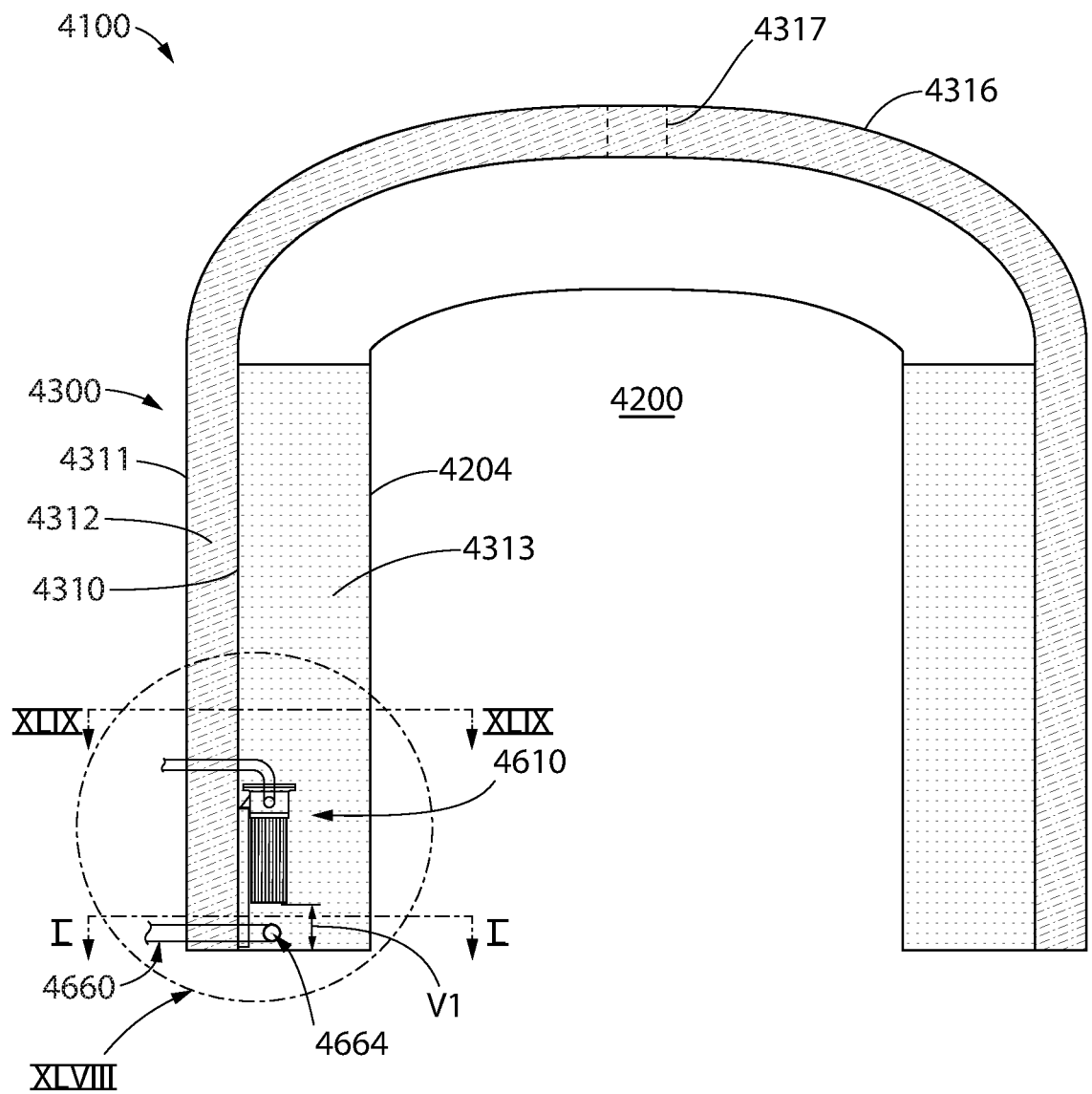
FIG. 47 is a schematic side cross-sectional view of a portion of a component cooling water system according to another aspect of the present disclosure.
Figure 48:
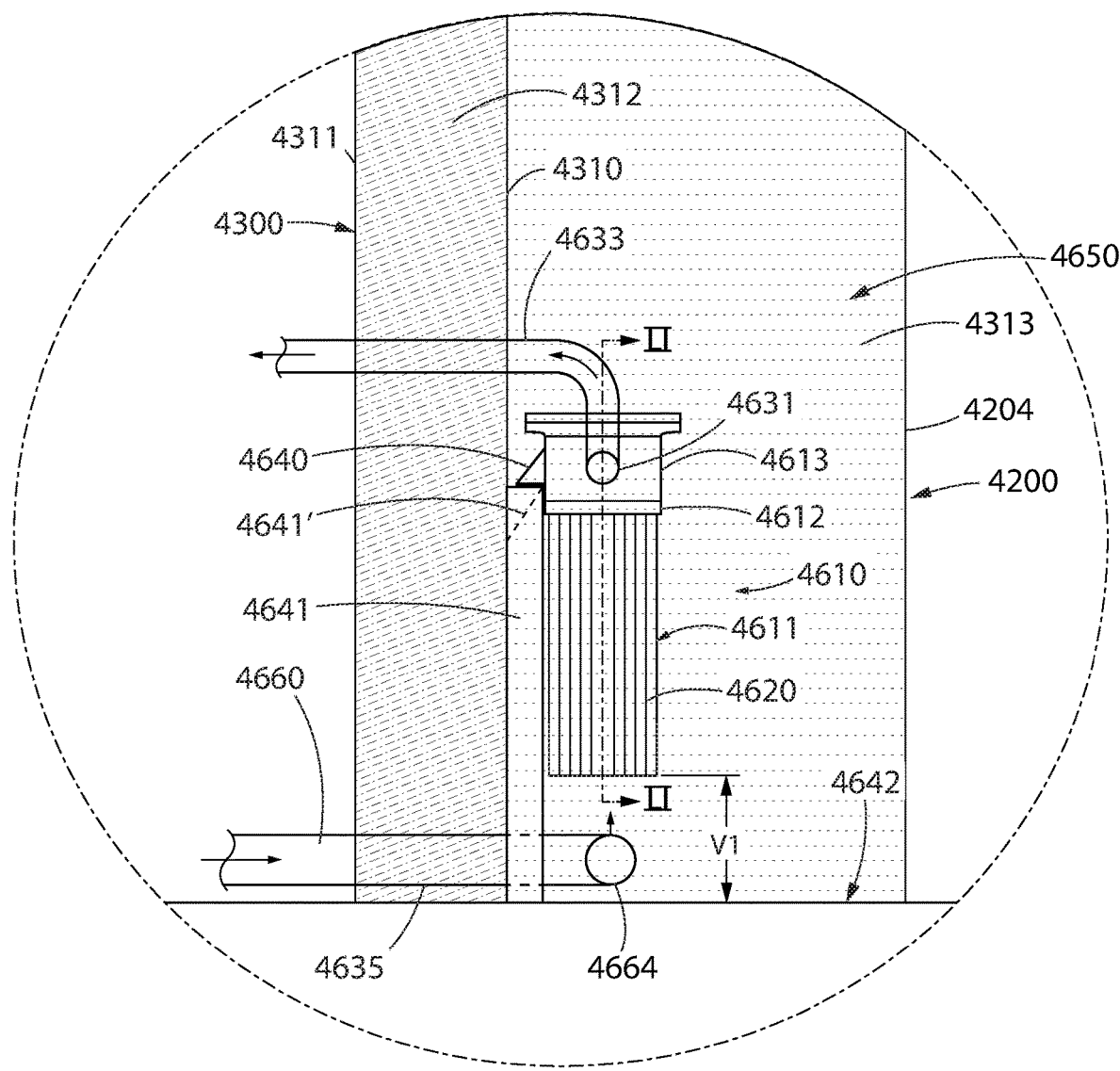
FIG. 48 is an enlarged detail taken from FIG. 47.

In one embodiment, heat exchanger 4610 is suspended in water-filled annulus 4313 (with appropriate seismic restraints) and positioned so that a bottom end of the tube bundle 4611 (defined by the U-shaped bends 4622) is spaced above the bottom 4642 of the annular water reservoir by a vertical distance V1, as shown in FIGS. 47 and 48. In one non-limiting arrangement, the heat exchanger 4610 includes one or more radially extending anchors or supports 4640 preferably attached to channel 4613 in a rigid manner to restrict movement of the channel when connected to a structural members (described below) inside the annular water reservoir. This arrangement restrains the channel 4613, but advantageously allows the tube bundle 4611 to freely grow and contract vertically in length in an unrestrained manner with respect to the channel 4613 as the tubes 4620 heat up or cool down depending on variations in temperature of the component cooling water flowing inside the tubes 4620 during operation of the component cooling water system 4600. In one exemplary embodiment, supports 4640 may be formed of a horizontally oriented structural steel plate reinforced by a vertical gusset plate welded between the horizontal plate and side of channel 4613. Numerous other variations and configurations of heat exchanger supports 4640 are possible and may be used.

The supports 4640 may be mounted to the containment vessel-enclosure assembly 4200-4300 inside the water-filled annular 4313 in numerous ways. In one example, the supports 4640 may be bolted or welded to corresponding structural stands 4641 located inside the water-filled annulus 4313 and attached to the containment vessel-enclosure assembly 4200-4300. In various embodiments, the stands 4641 may be of the pedestal-type as shown rising from bottom 4642 of the annular water reservoir, cantilevered from the interior surface of steel inner shell 4310 of the outer containment enclosure structure 4300 (see 4641 in FIG. 48), or a combination thereof in some non-limiting examples. Numerous other variations of stands 4641 may alternatively be provided. The stands 4641 may be made of any suitable material or combination of materials, including steel, concrete, or other. The heat exchanger supports and stands preferably are designed and arranged to provide a seismically stable mounting of the heat exchanger 4610 in the water-filled annular 4313.

Referring to FIGS. 47-52, the heat exchanger 4610 may be disposed and hung at a suitable location in one of the "bays" 4650 formed in water-filled annulus 4313 between a pair of adjacent spaced apart fins 4220. In one arrangement, the heat exchanger 4610 may be located near the bottom 4642 of the annular water reservoir so that heat transfer may continue as long as possible in situations such as a scram event when the water level in the annular 4313 may be dropping due to evaporation if makeup water to the reservoir is not readily available.

The bay 4650 in which the heat exchanger 4610 is mounted in one embodiment preferably may be the place where at least one recirculating pump 4663 of the annular water reservoir recirculation piping system 4662 (see, e.g. FIG. 50) delivers its flow through a well-placed discharge sparger 4664 to agitate the water mass around the exposed tube bundle 4611. This arrangement is intended to improve flow through and between the tubes to enhance heat transfer performance, as opposed to possible locations in other bays 4650 in which flow conditions may be relatively more stagnant by comparison. The recirculation pump 4663 draws water from the annular water reservoir 4313 through outlet piping 4661 fluidly coupled to the reservoir at a suitable location and discharges the water through inlet piping 4660 fluidly coupled to the sparger 4664 immersed/submerged in the reservoir. Inlet and outlet piping 4660 and 4661 may extend through suitable penetrations 4635 formed through sidewalls of outer containment enclosure structure 4300 in some embodiments; however, in other possible arrangements the inlet piping may introduce recirculated water into the sparger 4664 from locations other than through the sidewall such as from the top of the annular water reservoir 4313 (e.g. from piping running vertically downwards inside the annular water reservoir from the top). Outlet piping 4661 may take suction from annular water reservoir 4313 at any suitable location such as without limitation either in the same bay 4650 containing sparger 4664 or a different bay.

Recirculation pump 4663 may be any suitable type of pump (e.g. centrifugal, etc.) having an appropriate suction and discharge head for the application conditions and desired flow rate. The piping may be any suitable metallic or non-metallic piping. More than one reservoir recirculation piping systems 4662 and/or sparger 4664 may be provided in various embodiments.

Figure 50:
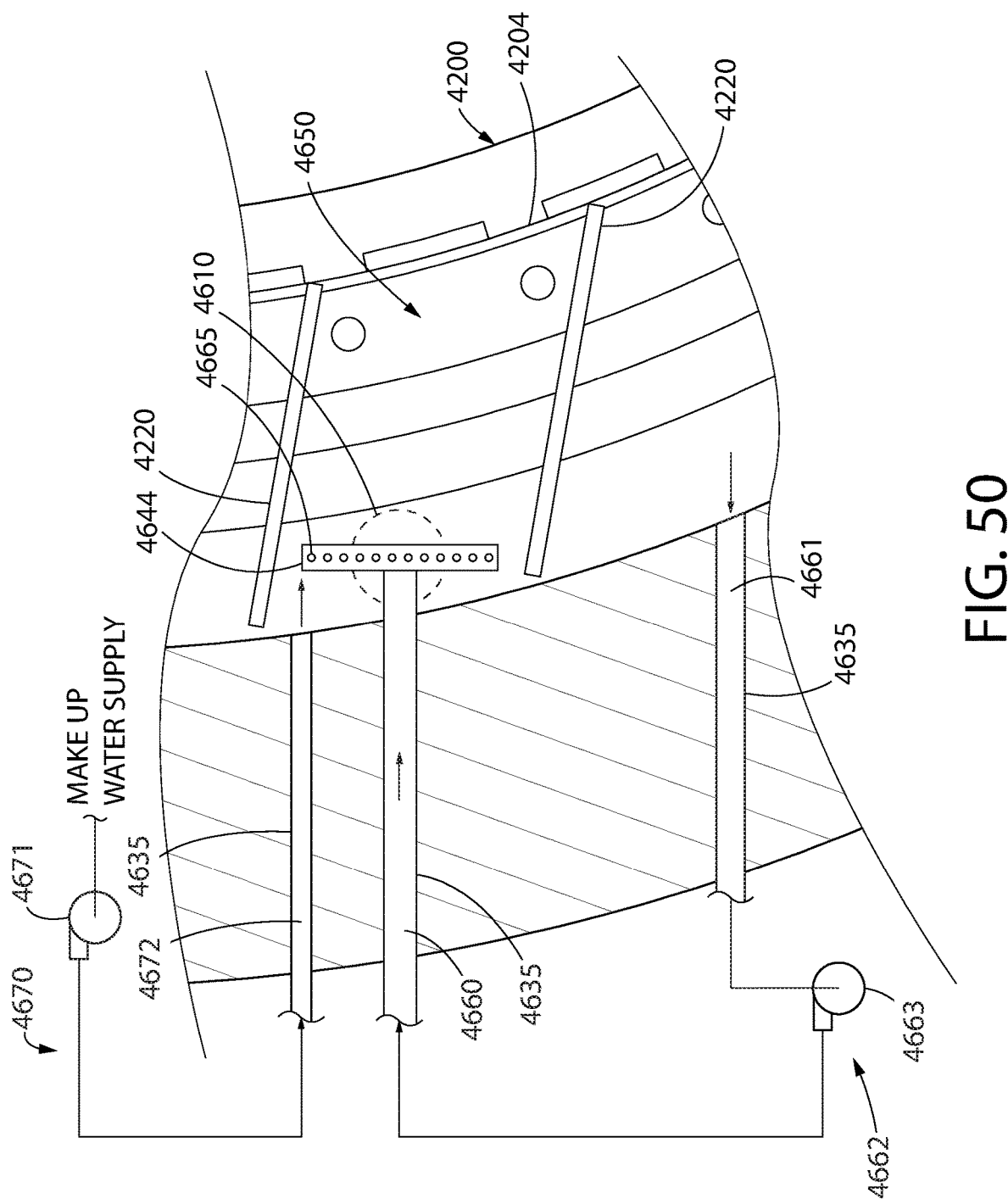
FIG. 50 is a second top plan view taken form a second elevation of the component cooling water system in FIG. 47, and also schematically showing an annular water reservoir recirculation and makeup water systems.

Referring to FIGS. 48 and 50, the sparger 4664 may be formed of a generally horizontally oriented piping header in some embodiments having a plurality of upward facing outlet holes 4665 separated by any suitable spacing. In one preferred embodiment, the sparger 4664 is located vertically beneath the heat exchanger tube bundle 4611 and discharges recirculation water upwards at the tube bundle. Sparger 4664 may be spaced at any suitable distance below the bottom of tube bundle 4611. The sparger creates a localized upward flow of reservoir water in the area above and helps draws additional water from the reservoir into the recirculation upward flow pattern. Alternative sparger layouts are possible in accordance with the teachings discussed herein.

In some embodiments, the bay 4650 in which the heat exchanger 4610 is mounted preferably may further be the place where "cold" makeup water is injected into the annular water reservoir 4313 to replenish water lost through evaporation from the reservoir. The localized makeup water flow into the bay 4650 in the proximity of the heat exchanger 4610 enhances heat transfer performance and cooling of heated component cooling water. As shown in FIG. 50, a makeup water system 4670 may include a makeup water pump 4671 that takes suction from any suitable makeup water supply source external to the annular water reservoir 4313 and discharges the makeup water through inlet piping 4672 into the annular water reservoir. The inlet piping 4672 may be located at any suitable position in bay 4650 which does not interfere with the flow pattern produced by sparger 4664, but close enough to the heat exchanger 4610 to obtain the thermal heat transfer performance benefit of the generally cooler water in comparison to the water held in annular water reservoir 4313. Inlet piping 4672 may extend through a suitable penetration 4635 formed through a sidewall of outer containment enclosure structure 4300 in some embodiments; however, in other possible arrangements the inlet piping may introduce makeup water from locations other than through the sidewall such as from the top of the annular water reservoir 4313 (e.g. from piping running vertically downwards inside the annular water reservoir from the top). Pump 4671 may be any suitable type of pump (e.g. centrifugal, etc.) having an appropriate suction and discharge head for the application conditions and desired flow rate. The piping 4672 may be any suitable metallic or non-metallic piping.

It will be appreciated that the term "cold" with reference to the makeup water is a comparative expression that generally refers to the fact that the makeup water is obtained from an external source other than the annular water reservoir, and preferably will have a temperature generally lower than water held in the annular water reservoir 4313. The water in the annular water reservoir may typically have a temperature greater than ambient due to the operation of the nuclear reactor inside the reactor vessel which converts some of the water into water vapor which is vented to atmosphere from the reactor vessel, as described herein. Under certain plant operating conditions, it may be possible that the makeup water may have a temperature the same as or even higher than water in the annular water reservoir which is replacing. Accordingly, the term "cold" is used here for descriptive purposes to better describe the makeup water system and not as a term of limitation.

Figure 52:
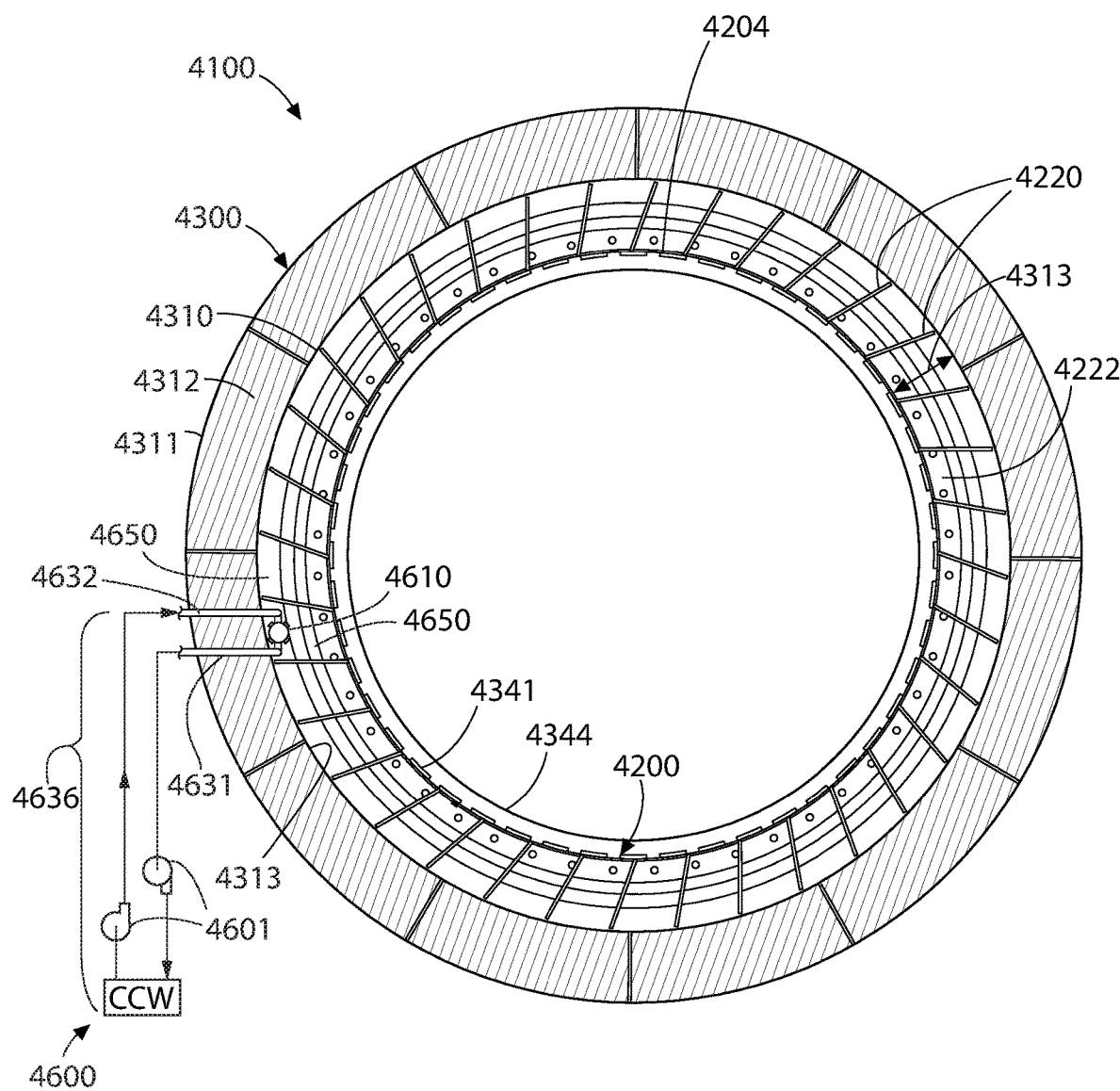
FIG. 52 is an overall top cross-sectional view of the nuclear reactor containment and component cooling water systems.
Figure 53:
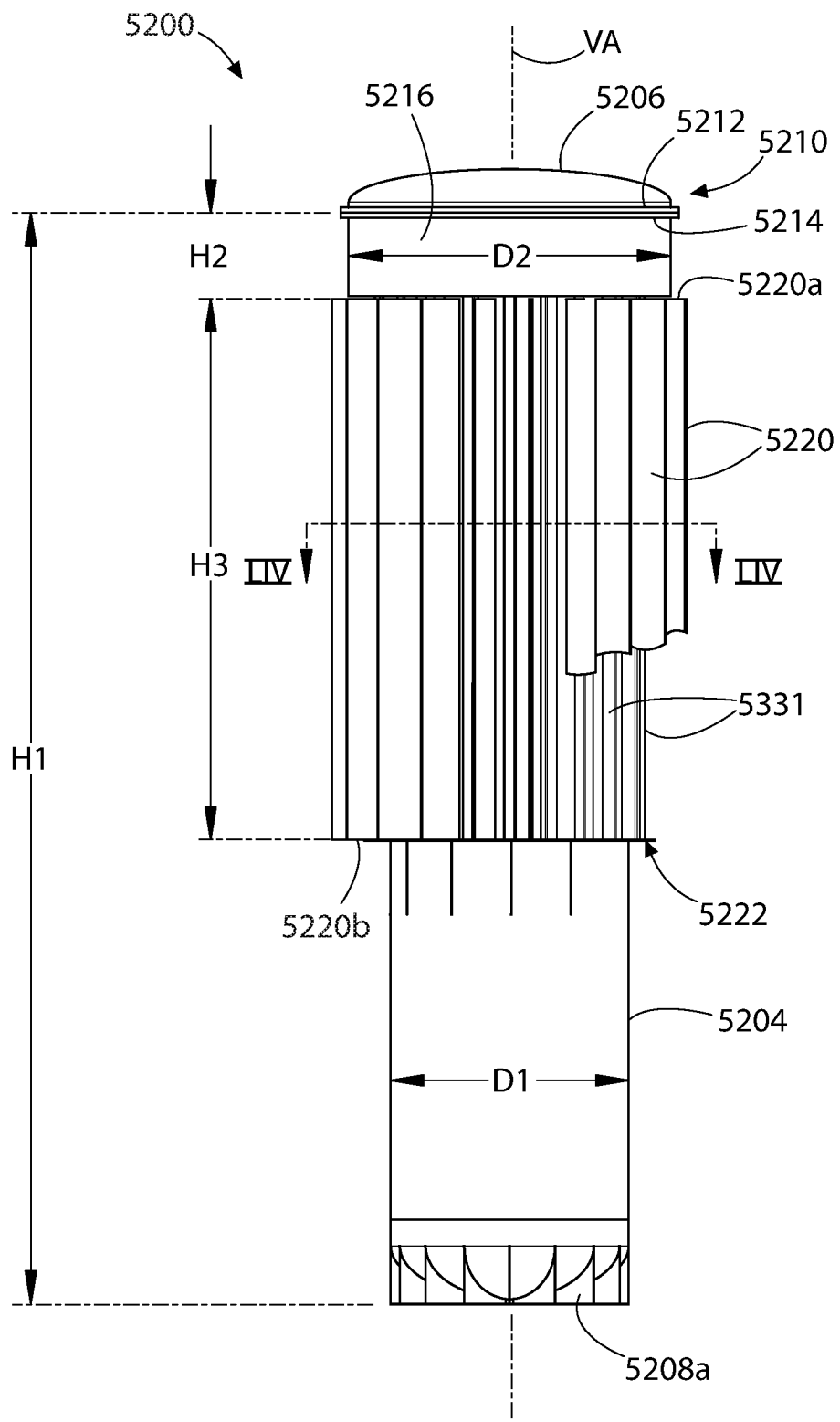
FIG. 53 is side elevation view of a finned primary reactor containment vessel according to the present disclosure which forms part of a nuclear reactor containment system, the lower portions of some fins being broken away in part to reveal vertical support columns and circumferential rib.

In normal operational mode of the reactor and component cooling water system 4600, heated water received by component cooling water pump 4601 from various plant equipment fluidly coupled to the component cooling water system is pumped through cooling water inlet piping 4632 to heat exchanger 4610 (reference FIGS. 49, 51, and 52). The heated cooling water flows through inlet nozzle 4630 into inlet chamber 4614 of heat exchanger 4610. The heated cooling water then flows downward through the tube sheet 4612 and tubes 4620 of tube bundle 4610, reverses direction via tube bends 4622, and flows upward through the tubes into outlet chamber 4615 in channel 4613. The heated cooling water flowing inside the tubes 4620 is cooled by transferring heat across the tube walls to the water held in the water-filled annulus 4313 (annular water reservoir). The now cooled cooling water then flows from the outlet chamber 4615 through outlet piping 4635 connected to the heat exchanger 4610 and is returned to the component cooling water system 4600 for distribution to cool various plant equipment. The heat deposited into the annular water reservoir by the heat exchanger 4610 is diffused into and heats the body of the reservoir water, and ultimately is dissipated to the environment by evaporation action from the reactor containment system 4100 to the environment, as already described herein. In one embodiment, the heated water vapor from the annular water reservoir 4313 may flow in a path through vent 4317 in the dome 4316 of the containment enclosure structure 4300 to the environment.

The directional arrows shown in the figures represent the flow paths of the fluids discussed herein with respect to each figure. It will be appreciated by those skilled in the art that the fluid piping systems described herein may include the various auxiliary components and appurtenances such as valving, filters, pressure regulators, flow and pressure instructions, piping supports, etc. necessary to provide a fully functional system.

Heat exchanger 4610 has been described with respect to an exemplary, but non-limiting shell-less heat exchanger having a U-tube bundle configuration which provides advantages such as a compact configuration, economical construction (materials and fabrication) due to only a single partitioned channel 4613, and maximum exposure of the heat transfer tubes along the vertical sides and bottom to the annular water reservoir 4313 to optimize flow through the tube bundle. However, it will be appreciated that other tube configurations may be used having the tubes which are exposed to the water held in the annular water reservoir 4313 (i.e. shell-less heat exchanger). Other possible configurations may include straight tube bundles connected at each tube end between spaced apart and opposed inlet and outlet channels. It will further be appreciated that other tube bundle orientations besides vertical may be used such as horizontal or angled between vertical and horizontal. Accordingly, the invention is not limited by the heat exchanger configuration or its orientation.

Advantages of the new invention include: long water intake lines that feed the component cooling heat exchanger in present day nuclear plants and are known to vulnerable to corrosion and degradation from the elements are eliminated, and the heat exchanger tube bundle is not subject to fouling of its heat transfer surfaces caused by prolonged contact with raw water that afflicts state of the art. I will be appreciated that in some embodiments, multiple heat exchangers 4610 can be arrayed in parallel to increase the cooling capacity of the component cooling water system 4600 as necessary. If multiple units are used, then maintenance work on any one unit can be performed while the reactor is on line.

Inventive Concept #5

Reference is made generally to FIGS. 53-76 which are relevant to Inventive Concept #5 described below.

Referring to FIGS. 53-67, a nuclear reactor containment system 5100 according to the present disclosure is shown. The system 5100 generally includes an inner containment structure such as containment vessel 5200 and an outer containment enclosure structure (CES) 5300 collectively defining a containment vessel-enclosure assembly 5200-5300. The containment vessel 5200 and containment enclosure structure (CES) 5300 are vertically elongated and oriented, and define a vertical axis VA.

Figure 58:
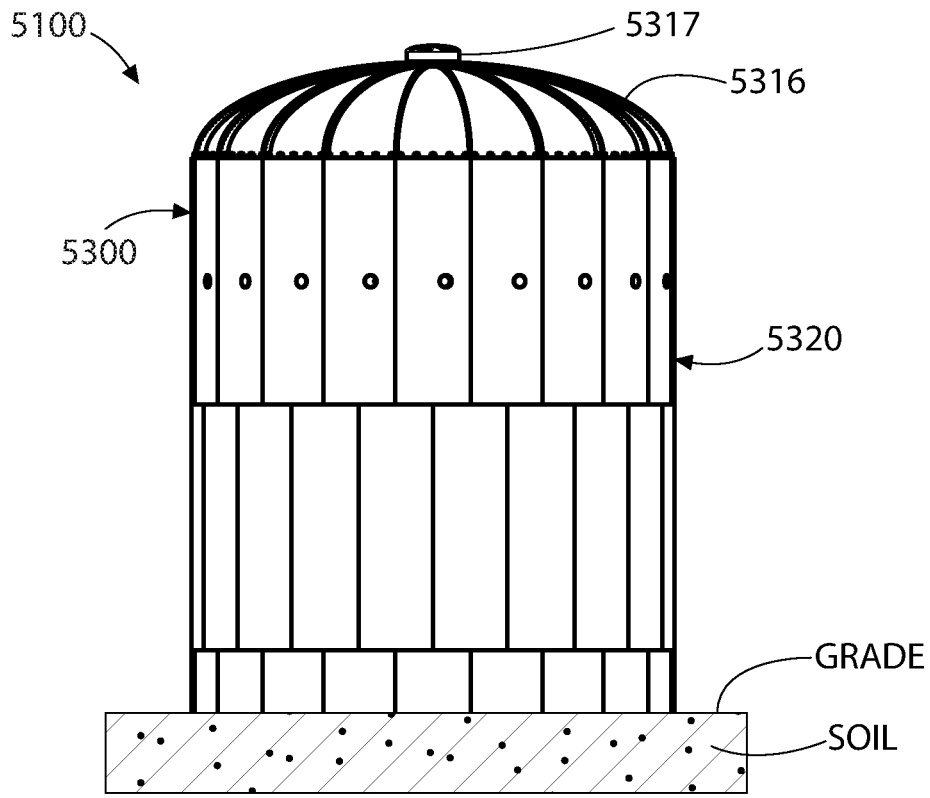
FIG. 58 is a side elevation view of nuclear reactor containment system as installed with the outer containment enclosure structure (CES) being visible above grade.
Figure 59:
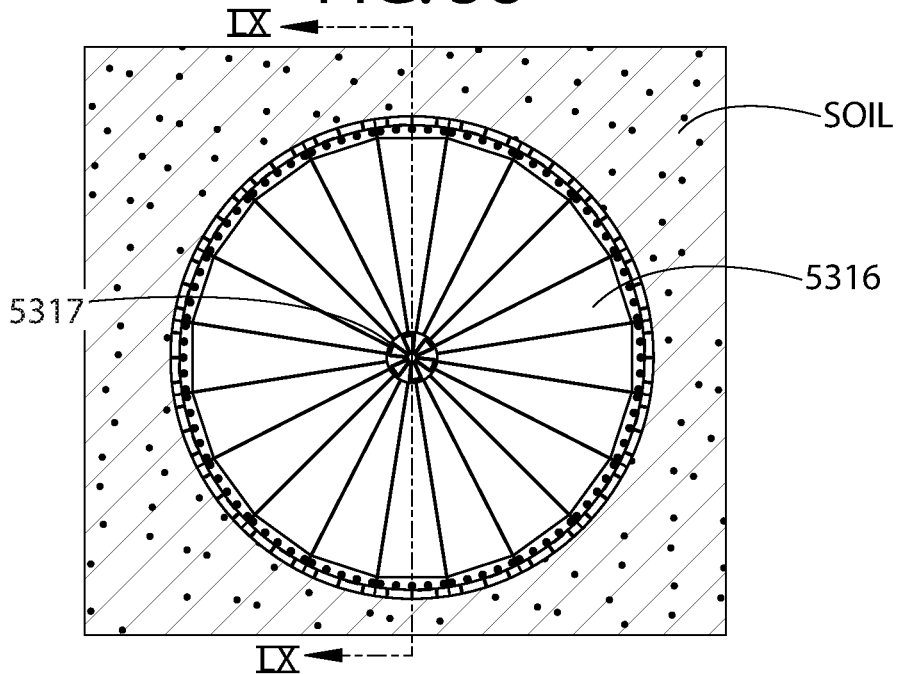
FIG. 59 is a top plan view thereof.
Figure 60:
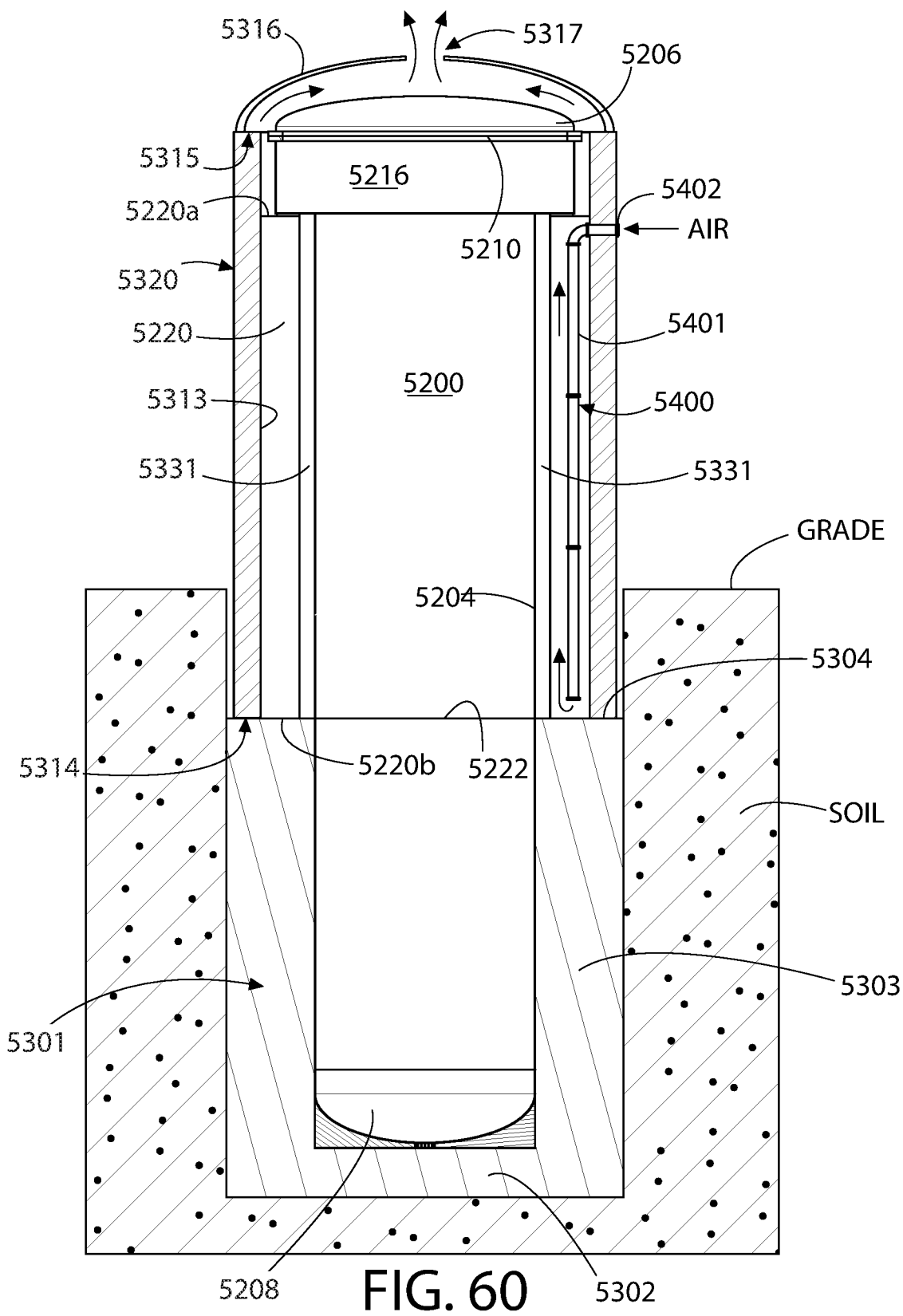
FIG. 60 is longitudinal cross-sectional view thereof taken along line LX in FIG. 59 showing both above and below grade portions of the nuclear reactor containment system.

In one embodiment, the containment vessel-enclosure assembly 5200-5300 is configured to be buried in the subgrade at least partially below grade (see also FIGS. 58-60). The containment vessel-enclosure assembly 5200-5300 may be supported by a concrete foundation 5301 comprised of a bottom slab 5302 and vertically extending sidewalls 5303 rising from the slab forming a top base mat 5304. The sidewalls 5303 may circumferentially enclose containment vessel 5200 as shown wherein a lower portion of the containment vessel may be positioned inside the sidewalls. In some embodiments, the sidewalls 5303 may be poured after placement of the containment vessel 5200 on the bottom slab 5302 (which may be poured and set first) thereby completely embedding the lower portion of the containment vessel 5200 within the foundation. The foundation walls 5303 may terminate below grade in some embodiments as shown to provide additional protection for the containment vessel-enclosure assembly 5200-5300 from projectile impacts (e.g. crashing plane, etc.). The foundation 5301 may have any suitable configuration in top plan view, including without limitation polygonal (e.g. rectangular, hexagon, circular, etc.).

In one embodiment, the weight of the containment vessel 5200 may be primarily supported by the bottom slab 5302 on which the containment vessel rests and the containment enclosure structure (CES) 5300 may be supported by the base mat 5304 formed atop the sidewalls 5303 of the foundation 5301. Other suitable vessel and containment enclosure structure (CES) support arrangements may be used.

With continuing reference to FIGS. 53-67, the containment structure vessel 5200 may be an elongated vessel including a hollow cylindrical shell 5204 with circular transverse cross-section defining an outer diameter D1, a top head 5206, and a bottom head 5208. In one embodiment, the containment vessel 5200 (i.e. shell and heads) may be made from a suitably strong and ductile metallic plate and bar stock that is readily weldable (e.g. low carbon steel). In one embodiment, a low carbon steel shell 5204 may have a thickness of at least 1 inch. Other suitable metallic materials of corresponding appropriate thickness including various alloys may be used.

The top head 5206 may be attached to the shell 5204 via a flanged joint 5210 comprised of a first annular flange 5212 disposed on the lower end or bottom of the top head and a second mating annular flange 5214 disposed on the upper end or top of the shell. The flanged joint 5210 may be a bolted joint, which optionally may further be seal welded after assembly with a circumferentially extending annular seal weld being made between the adjoining flanges 5212 and 5214.

The top head 5206 of containment vessel 5200 may be an ASME (American Society of Mechanical Engineers) dome-shaped flanged and dished head to add structural strength (i.e. internal pressure retention and external impact resistance); however, other possible configurations including a flat top head might be used. The bottom head 5208 may similarly be a dome-shaped dished head or alternatively flat in other possible embodiments. In one containment vessel construction, the bottom head 5208 may be directly welded to the lower portion or end of the shell 5204 via an integral straight flange (SF) portion of the head matching the diameter of shell. In one embodiment, the bottom of the containment vessel 5200 may include a ribbed support stand 5208a or similar structure attached to the bottom head 5208 to help stabilize and provide level support for the containment vessel on the slab 5302 of the foundation 5301, as further described herein.

In some embodiments, the top portion 5216 of the containment vessel shell 5204 may be a diametrically enlarged segment of the shell that forms a housing to support and accommodate a polar crane (not shown) for moving equipment, fuel, etc. inside the containment vessel. This will provide crane access to the very inside periphery of the containment vessel and enable placement of equipment very close to the periphery of the containment vessel 5200 making the containment vessel structure compact. In one configuration, therefore, the above grade portion of the containment vessel 5200 may resemble a mushroom-shaped structure.

In one possible embodiment, the enlarged top portion 5216 of containment vessel 5200 may have an outer diameter D2 that is larger than the outer diameter D1 of the rest of the adjoining lower portion 5218 of the containment vessel shell 5204. In one non-limiting example, the top portion 5216 may have a diameter D2 that is approximately 10 feet larger than the diameter D1 of the lower portion 5218 of the shell 5204. The top portion 5216 of shell 5204 may have a suitable height H2 selected to accommodate the polar crane with allowance for working clearances which may be less than 50% of the total height H1 of the containment vessel 5200. In one non-limiting example, approximately the top ten feet of the containment vessel 5200 (H2) may be formed by the enlarged diameter top portion 5216 in comparison to a total height H1 of 200 feet of the containment vessel. The top portion 5216 of containment vessel 5200 may terminate at the upper end with flange 5214 at the flanged connection to the top head 5206 of the containment vessel.

Figure 56:
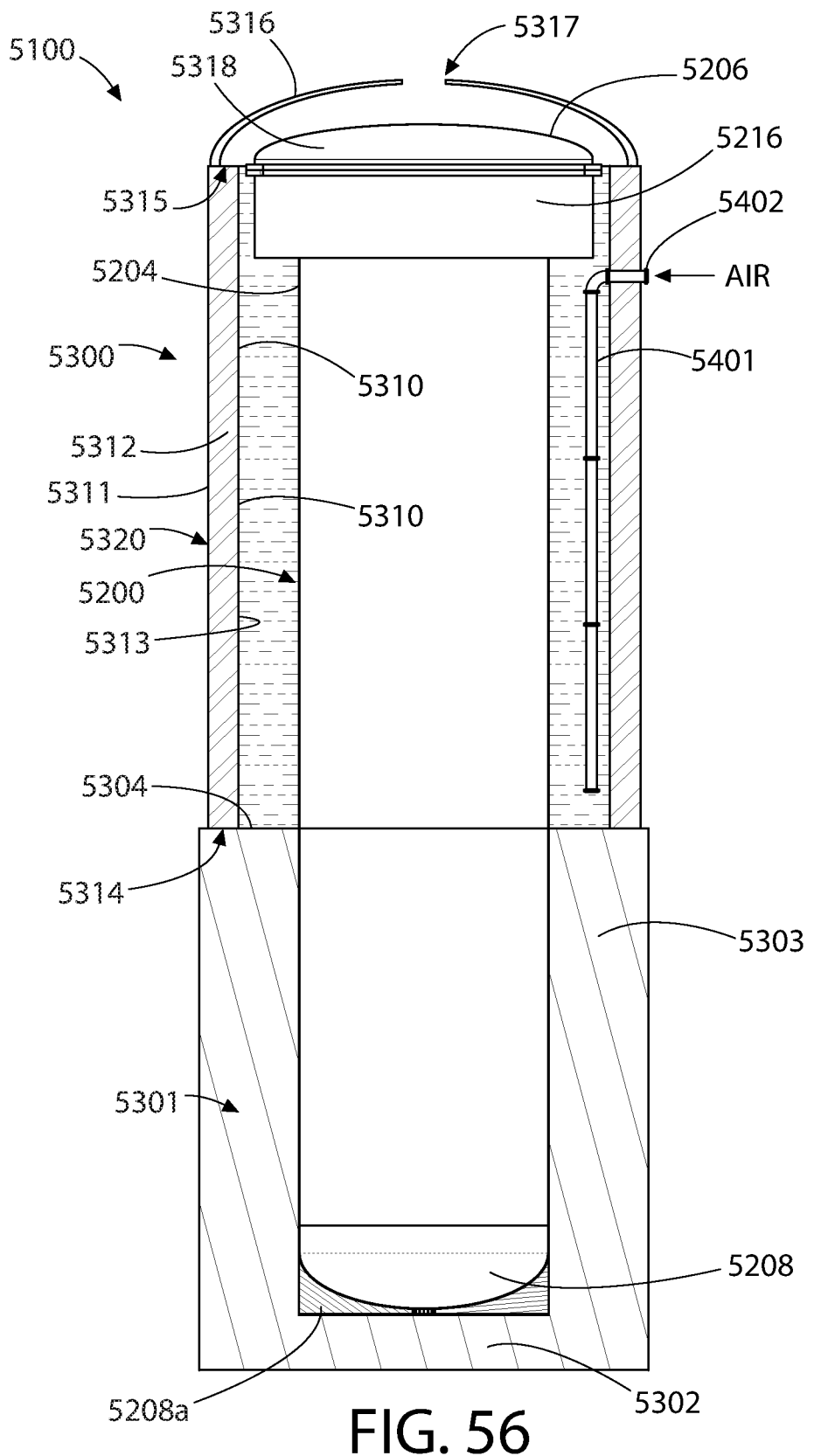
FIG. 56 is a longitudinal cross-sectional view of the nuclear reactor containment system showing the containment vessel of FIG. 53 and outer containment enclosure structure (CES) with water filled annular reservoir formed between the vessel and enclosure.

In one embodiment, the diametrically enlarged top portion 5216 of containment vessel 5200 has a diameter D2 which is smaller than the inside diameter D3 of the containment enclosure structure (CES) 5300 to provide a (substantially) radial gap or secondary annulus 5330 (see, e.g. FIG. 56). This provides a cushion of space or buffer region between the containment enclosure structure (CES) 5300 and containment vessel top portion 5216 in the advent of a projectile impact on the containment enclosure structure (CES). Furthermore, the annulus 5330 further significantly creates a flow path between primary annulus 5313 (between the shells of the containment enclosure structure (CES) 5300 and containment vessel 5200) and the head space 5318 between the containment enclosure structure (CES) dome 5316 and top head 5206 of the containment vessel 5200 for steam and/or air to be vented from the containment enclosure structure (CES) as further described herein. Accordingly, the secondary annulus 5330 is in fluid communication with the primary annulus 5313 and the head space 5318 which in turn is in fluid communication with vent 5317 which penetrates the dome 5316. In one embodiment, the secondary annulus 5330 has a smaller (substantially) radial width than the primary annulus 5313.

Referring to FIGS. 53-56, the containment enclosure structure (CES) 5300 may be double-walled structure in some embodiments having sidewalls 5320 formed by two (substantially) radially spaced and interconnected concentric shells 5310 (inner) and 5311 (outer) with plain or reinforced concrete 5312 installed in the annular space between them. The concentric shells 5310, 5311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure structure (CES) 5300 may have a concrete 5312 thickness of 6 feet or more which ensures adequate ability to withstand high energy projectile impacts such as that from an airliner.

The containment enclosure structure (CES) 5300 circumscribes the containment vessel shell 5204 and is spaced (substantially) radially apart from shell 5204, thereby creating primary annulus 5313. Annulus 5313 may be a water-filled in one embodiment to create a heat sink for receiving and dissipating heat from the containment vessel 5200 in the case of a thermal energy release incident inside the containment vessel. This water-filled annular reservoir preferably extends circumferentially for a full 5360 degrees in one embodiment around the perimeter of upper portions of the containment vessel shell 5204 lying above the concrete foundation 5301. FIG. 56 shows a cross-section of the water-filled annulus 5313 without the external (substantially) radial fins 5221 in this figure for clarity. In one embodiment, the annulus 5313 is filled with water from the base mat 5304 at the bottom end 5314 to approximately the top end 5315 of the concentric shells 5310, 5311 of the containment enclosure structure (CES) 5300 to form an annular cooling water reservoir between the containment vessel shell 5204 and inner shell 5310 of the containment enclosure structure (CES). This annular reservoir may be coated or lined in some embodiments with a suitable corrosion resistant material such as aluminum, stainless steel, or a suitable preservative for corrosion protection. In one representative example, without limitation, the annulus 5313 may be about 10 feet wide and about 100 feet high.

In one embodiment, the containment enclosure structure (CES) 5300 includes a steel dome 5316 that is suitably thick and reinforced to harden it against crashing aircraft and other incident projectiles. The dome 5316 may be removably fastened to the shells 5310, 5311 by a robust flanged joint 5318. In one embodiment, the containment enclosure structure (CES) 5300 is entirely surrounded on all exposed above grade portions by the containment enclosure structure (CES) 5300, which preferably is sufficiently tall to provide protection for the containment vessel against aircraft hazard or comparable projectile to preserve the structural integrity of the water mass in the annulus 5313 surrounding the containment vessel. In one embodiment, as shown, the containment enclosure structure (CES) 5300 extends vertically below grade to a substantial portion of the distance to the top of the base mat 5304.

The containment enclosure structure (CES) 5300 may further include at least one rain-protected vent 5317 which is in fluid communication with the head space 5318 beneath the dome 5316 and water-filled annulus 5313 to allow water vapor to flow, escape, and vent to atmosphere. In one embodiment, the vent 5317 may be located at the center of the dome 5316. In other embodiments, a plurality of vents may be provided spaced (substantially) radially around the dome 5316. The vent 5317 may be formed by a short section of piping in some embodiments which is covered by a rain hood of any suitable configuration that allows steam to escape from the containment enclosure structure (CES) but minimizes the ingress of water.

In some possible embodiments, the head space 5318 between the dome 5316 and top head 5206 of the containment vessel 5200 may be filled with an energy absorbing material or structure to minimize the impact load on the containment enclosure structure (CES) dome 5316 from a crashing (falling) projecting (e.g. airliner, etc.). In one example, a plurality of tightly-packed undulating or corrugated deformable aluminum plates may be disposed in part or all of the head space to form a crumple zone which will help absorb and dissipate the impact forces on the dome 5316.

Referring primarily to FIGS. 53-57 and 60-69, the buried portions of the containment vessel 5200 within the concrete foundation 5301 below the base mat 5304 may have a plain shell 5204 without external features. Portions of the containment vessel shell 5204 above the base mat 5304, however, may include a plurality of longitudinal external (substantially) radial ribs or fins 5220 which extend axially (substantially) parallel to vertical axis VA of the containment vessel-enclosure assembly 5200-5300. The external longitudinal fins 5220 are spaced circumferentially around the perimeter of the containment vessel shell 5204 and extend (substantially) radially outwards from the containment vessel.

The ribs 5220 serve multiple advantageous functions including without limitation (1) to stiffen the containment vessel shell 5204, (2) prevent excessive "sloshing" of water reserve in annulus 5313 in the occurrence of a seismic event, and (3) significantly to act as heat transfer "fins" to dissipate heat absorbed by conduction through the shell 5204 to the environment of the annulus 5313 in the situation of a fluid/steam release event in the containment vessel.

Accordingly, in one embodiment to maximize the heat transfer effectiveness, the longitudinal fins 5220 extend vertically for substantially the entire height of the water-filled annulus 5313 covering the effective heat transfer surfaces of the containment vessel 5200 (i.e. portions not buried in concrete foundation) to transfer heat from the containment vessel 5200 to the water reservoir, as further described herein. In one embodiment, the external longitudinal fins 5220 have upper horizontal ends 5220a which terminate at or proximate to the underside or bottom of the larger diameter top portion 5216 of the containment vessel 5200, and lower horizontal ends 5220b which terminate at or proximate to the base mat 5304 of the concrete foundation 5301. In one embodiment, the external longitudinal fins 5220 may have a height H3 which is equal to or greater than one half of a total height of the shell of the containment vessel.

In one embodiment, the upper horizontal ends 5220a of the longitudinal fins 5220 are free ends not permanently attached (e.g. welded) to the containment vessel 5200 or other structure. At least part of the lower horizontal ends 5220b of the longitudinal fins 5220 may abuttingly contact and rest on a horizontal circumferential rib 5222 welded to the exterior surface of the containment vessel shell 5204 to help support the weight of the longitudinal fins 5220 and minimize stresses on the longitudinal rib-to-shell welds. Circumferential rib 5222 is annular in shape and may extend a full 5360 degrees completely around the circumferential of the containment vessel shell 5204. In one embodiment, the circumferential rib 5222 is located to rest on the base mat 5304 of the concrete foundation 5301 which transfers the loads of the longitudinal fins 5220 to the foundation. The longitudinal fins 5220 may have a lateral extent or width that projects outwards beyond the outer peripheral edge of the circumferential rib 5222. Accordingly, in this embodiment, only the inner portions of the lower horizontal end 5220b of each rib 5220 contacts the circumferential rib 5222. In other possible embodiments, the circumferential rib 5222 may extend (substantially) radially outwards far enough so that substantially the entire lower horizontal end 5220b of each longitudinal rib 5220 rests on the circumferential rib 5222. The lower horizontal ends 5220b may be welded to the circumferential rib 5222 in some embodiments to further strengthen and stiffen the longitudinal fins 5220.

The external longitudinal fins 5220 may be made of steel (e.g. low carbon steel), or other suitable metallic materials including alloys which are each welded on one of the longitudinally-extending sides to the exterior of the containment vessel shell 5204. The opposing longitudinally-extending side of each rib 5220 lies proximate to, but is preferably not permanently affixed to the interior of the inner shell 5310 of the containment enclosure structure (CES) 5300 to maximize the heat transfer surface of the ribs acting as heat dissipation fins. In one embodiment, the external longitudinal fins 5220 extend (substantially) radially outwards beyond the larger diameter top portion 5216 of the containment vessel 5200 as shown. In one representative example, without limitation, steel ribs 5220 may have a thickness of about 1 inch. Other suitable thickness of ribs may be used as appropriate. Accordingly, in some embodiments, the ribs 5220 have a radial width that is more than 10 times the thickness of the ribs.

Figure 54:
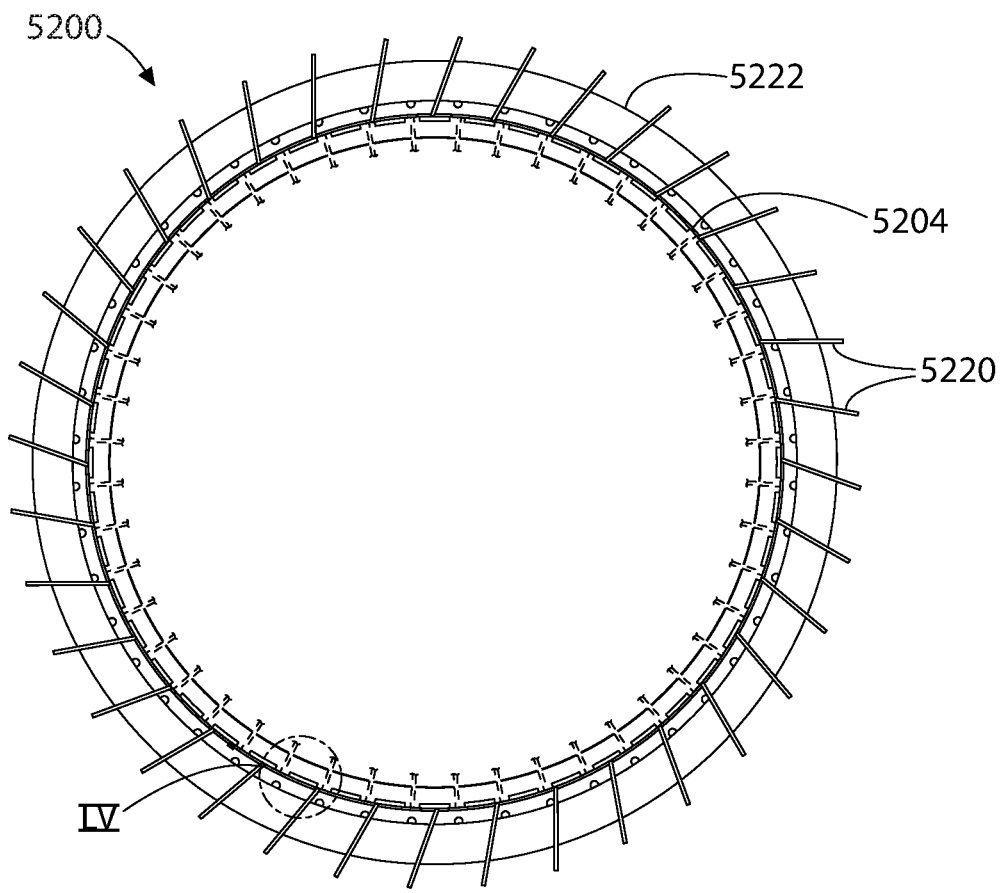
FIG. 54 is transverse cross-sectional view thereof taken along line LIV in FIG. 53.
Figure 55:
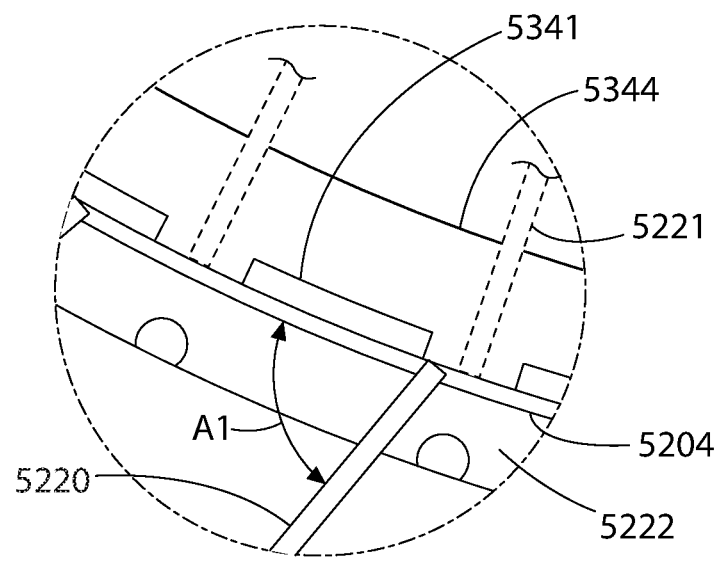
FIG. 55 is a detail of item LV in FIG. 54.
Figure 57:
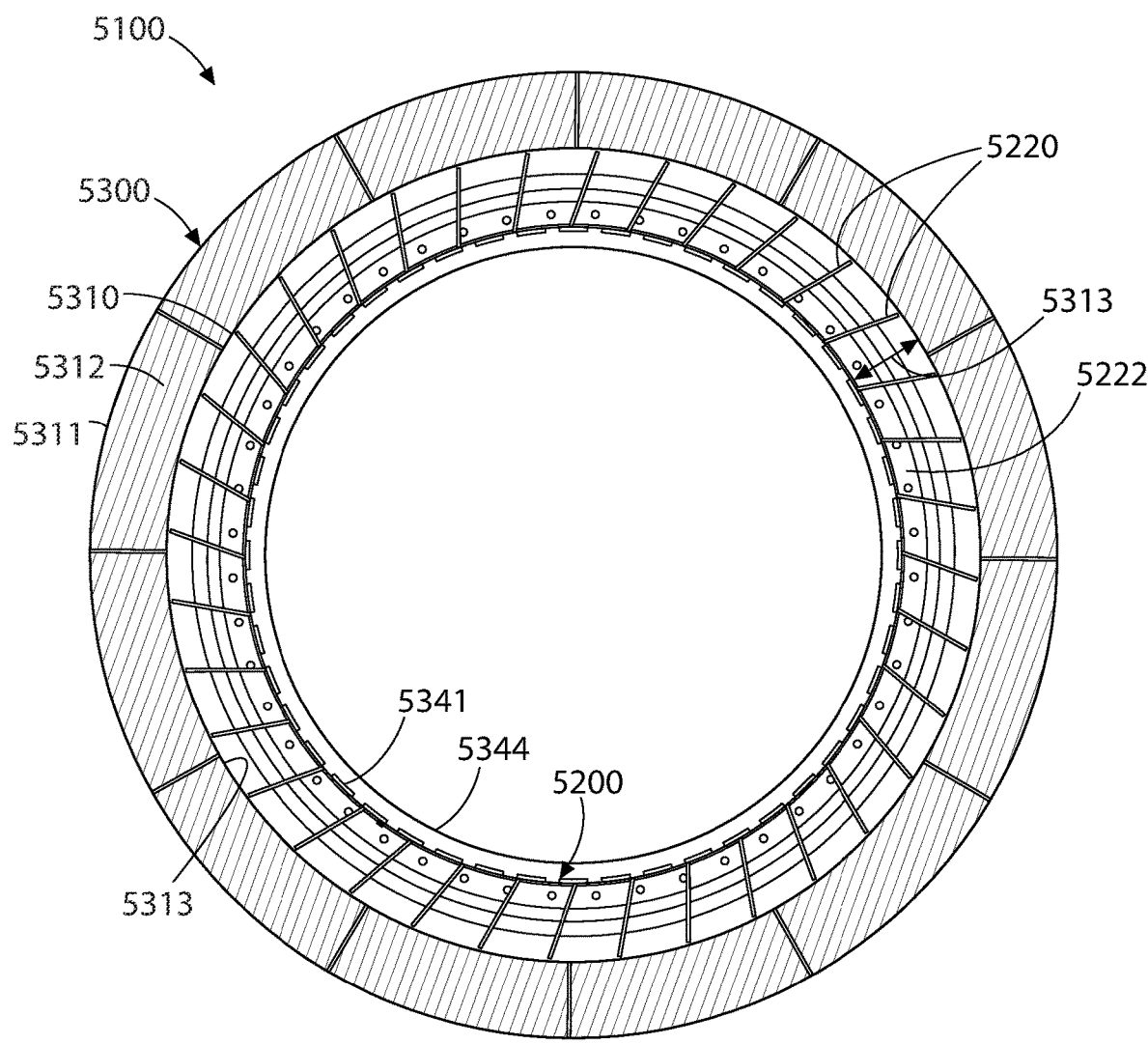
FIG. 57 is a longitudinal cross-sectional view through the containment vessel and containment enclosure structure (CES)

In one embodiment, the longitudinal fins 5220 are oriented at an oblique angle A1 to containment vessel shell 5204 as best shown in FIGS. 54-55 and 57. This orientation forms a crumple zone extending 5360 degrees around the circumference of the containment vessel 5200 to better resist projectile impacts functioning in cooperation with the outer containment enclosure structure (CES) 5300. Accordingly, an impact causing inward deformation of the containment enclosure structure (CES) shells 5210, 5211 will bend the longitudinal fins 5220 which in the process will distribute the impact forces preferably without direct transfer to and rupturing of the inner containment vessel shell 5204 as might possibly occur with ribs oriented 90 degrees to the containment vessel shell 5204. In other possible embodiments, depending on the construction of the containment enclosure structure (CES) 5300 and other factors, a perpendicular arrangement of ribs 5220 to the containment vessel shell 5204 may be appropriate.

In one embodiment, referring to 58-60, portions of the containment vessel shell 5204 having and protected by the external (substantially) radial fins 5220 against projectile impacts may extend below grade to provide protection against projectile strikes at or slightly below grade on the containment enclosure structure (CES) 5300. Accordingly, the base mat 5304 formed at the top of the vertically extending sidewalls 5303 of the foundation 5301 where the fins 5220 terminate at their lower ends may be positioned a number of feet below grade to improve impact resistance of the nuclear reactor containment system.

In one embodiment, the containment vessel 5200 may optionally include a plurality of circumferentially spaced apart internal (substantially) radial fins 5221 attached to the interior surface of the shell 5204 (shown as dashed in FIGS. 54 and 55). Internal fins 5221 extend (substantially) radially inwards from containment vessel shell 5204 and longitudinally in a vertical direction of a suitable height. In one embodiment, the internal (substantially) radial fins 5221 may have a height substantially coextensive with the height of the water-filled annulus 5313 and extend from the base mat 5304 to approximately the top of the shell 5204. In one embodiment, without limitation, the internal fins 5221 may be oriented substantially perpendicular (i.e. 90 degrees) to the containment vessel shell 5204. Other suitable angles and oblique orientations may be used. The internal fins function to both increase the available heat transfer surface area and structurally reinforce the containment vessel shell against external impact (e.g. projectiles) or internal pressure increase within the containment vessel 5200 in the event of a containment pressurization event (e.g. LOCA or reactor scram). In one embodiment, without limitation, the internal fins 5221 may be made of steel.

Referring to FIGS. 53-67, a plurality of vertical structural support columns 5331 may be attached to the exterior surface of the containment vessel shell 5204 to help support the diametrically larger top portion 5216 of containment vessel 5200 which has peripheral sides that are cantilevered (substantially) radially outwards beyond the shell 5204. The support columns 5331 are spaced circumferentially apart around the perimeter of containment vessel shell 5204. In one embodiment, the support columns 5331 may be formed of steel hollow structural members, for example without limitation C-shaped members in cross-section (i.e. structural channels), which are welded to the exterior surface of containment vessel shell 5204. The two parallel legs of the channels may be vertically welded to the containment vessel shell 5204 along the height of each support column 5331 using either continuous or intermittent welds such as stitch welds.

The support columns 5331 extend vertically downwards from and may be welded at their top ends to the bottom/underside of the larger diameter top portion 5216 of containment vessel housing the polar crane. The bottom ends of the support columns 5331 rest on or are welded to the circumferential rib 5222 which engages the base mat 5304 of the concrete foundation 5301 near the buried portion of the containment. The columns 5331 help transfer part of the dead load or weight from the crane and the top portion 5216 of the containment vessel 5300 down to the foundation. In one embodiment, the hollow space inside the support columns may be filled with concrete (with or without rebar) to help stiffen and further support the dead load or weight. In other possible embodiments, other structural steel shapes including filled or unfilled box beams, I-beams, tubular, angles, etc. may be used. The longitudinal fins 5220 may extend farther outwards in a (substantially) radial direction than the support columns 5331 which serve a structural role rather than a heat transfer role as the ribs 5220. In certain embodiments, the ribs 5220 have a (substantially) radial width that is at least twice the (substantially) radial width of support columns.

63-67 show various cross sections (both longitudinal and transverse) of containment vessel 5200 with equipment shown therein. In one embodiment, the containment vessel 5200 may be part of a small modular reactor (SMR) system such as SMR-5160 by Holtec International. The equipment may generally include a nuclear reactor vessel 5500 disposed in a wet well 5504 and defining an interior space housing a nuclear fuel core inside and circulating primary coolant, and a steam generator 5502 fluidly coupled to the reactor and circulating a secondary coolant which may form part of a Rankine power generation cycle. Such a system is described for example in PCT International Patent Application No. PCT/US13/566,777 filed Oct. 25, 2013, which is incorporated herein by reference in its entirety. Other appurtenances and equipment may be provided to create a complete steam generation system.

Auxiliary Heat Dissipation System

Referring primarily now to 54-55, 68, and 70, the containment vessel 5200 may further include an auxiliary heat dissipation system 5340 comprising a discrete set or array of heat dissipater ducts 5610 (HDD). In one embodiment, the auxiliary heat dissipation system 5340 and associated heat dissipater ducts 5610 may form part of a passive reactor core cooling system described in further detail below and shown in FIGS. 74 and 75.

Heat dissipater ducts 5610 include a plurality of internal longitudinal ducts 5341 (i.e. flow conduits) circumferentially spaced around the circumference of containment vessel shell 5204. Ducts 5341 extend vertically parallel to the vertical axis VA and in one embodiment are attached to the interior surface of shell 5204. The ducts 5341 may be made of metal such as steel and are welded to interior of the shell 5204. In one possible configuration, without limitation, the ducts 5341 may be comprised of vertically oriented C-shaped structural channels (in cross section) or half-sections of pipe/tube positioned so that the parallel legs of the channels or pipe/tubes are each seam welded to the shell 5204 for their entire height to define a sealed vertical flow conduit. The fluid (liquid or steam phase) in the heat dissipater ducts in this embodiment therefore directly contacts the reactor containment vessel 5200 to maximize heat transfer through the vessel to the water in the annular reservoir (primary annulus 5313) which forms a heat sink for the reactor containment vessel 5200 and the heat dissipater ducts. Other suitably shaped and configured heat dissipater ducts 5341 may be provided for this type construction so long as the fluid conveyed in the ducts contacts at least a portion of the interior containment vessel shell 5204 to transfer heat to the water-filled annulus 5313.

In other possible but less preferred acceptable embodiments, the heat dissipater ducts 5341 may be formed from completely tubular walled flow conduits (e.g. full circumferential tube or pipe sections rather than half sections) which are welded to the interior containment vessel shell 5204. In these type constructions, the fluid conveyed in the ducts 5341 will transfer heat indirectly to the reactor containment vessel shell 5204 through the wall of the ducts first, and then to the water-filled annulus 5313.

Any suitable number and arrangement of ducts 5341 may be provided depending on the heat transfer surface area required for cooling the fluid flowing through the ducts. The ducts 5341 may be uniformly or non-uniformly spaced on the interior of the containment vessel shell 5204, and in some embodiments grouped clusters of ducts may be circumferentially distributed around the containment vessel. The ducts 5341 may have any suitable cross-sectional dimensions depending on the flow rate of fluid carried by the ducts and heat transfer considerations.

The open upper and lower ends 5341*a*, 5341*b* of the ducts 5341 are each fluidly connected to a common upper inlet ring header 5343 and lower outlet ring header 5344. The annular shaped ring headers 5343, 5344 are vertically spaced apart and positioned at suitable elevations on the interior of the containment vessel 5200 to maximize the transfer of heat between fluid flowing vertically inside ducts 5341 and the shell 5204 of the containment vessel in the active heat transfer zone defined by portions of the containment vessel having the external longitudinal fins 5220 in the primary annulus 5313. To take advantage of the primary water-filled annulus 5313 for heat transfer, upper and lower ring headers 5343, 5344 may each respectively be located on the interior of the containment vessel shell 5204 adjacent and near to the top and bottom of the annulus.

In one embodiment, the ring headers 5343, 5344 may each be formed of half-sections of arcuately curved steel pipe as shown which are welded directly to the interior surface of containment vessel shell 5204 in the manner shown. In other embodiments, the ring headers 5343, 5344 may be formed of complete sections of arcuately curved piping supported by and attached to the interior of the shell 5204 by any suitable means.

In one embodiment, the heat dissipation system 5340 is fluidly connected to a source of steam that may be generated from a water mass inside the containment vessel 5200 to reject radioactive material decay heat from the reactor core. The containment surface enclosed by the ducts 5341 serves as the heat transfer surface to transmit the latent heat of the steam inside the ducts to the shell 5204 of the containment vessel 5200 for cooling via the external longitudinal fins 5220 and water filled annulus 5313. In operation, steam enters the inlet ring header 5343 and is distributed to the open inlet ends of the ducts 5341 penetrating the header. The steam enters the ducts 5341 and flows downwards therein along the height of the containment vessel shell 5204 interior and undergoes a phase change from steam (vapor) to liquid. The condensed steam drains down by gravity in the ducts and is collected by the lower ring header 5344 from which it is returned back to the source of steam also preferably by gravity in one embodiment. It should be noted that no pumps are involved or required in the foregoing process.

It will be appreciated that in certain embodiments, more than one set or array of heat dissipater ducts 5610 may be provided and arranged on the inside surface of the inner containment vessel 5200 within the containment space defined by the vessel.

Auxiliary Air Cooling System

According to another aspect of the present disclosure, a secondary or backup passive air cooling system 5400 is provided to initiate air cooling by natural convection of the containment vessel 5200 if, for some reason, the water inventory in the primary annulus 5313 were to be depleted during a thermal reactor related event (e.g. LOCA or reactor scram). Referring to FIG. 60, the air cooling system 5400 may be comprised of a plurality of vertical inlet air conduits 5401 spaced circumferentially around the containment vessel 5200 in the primary annulus 5313. Each air conduit 5401 includes an inlet 5402 which penetrates the sidewalls 5320 of the containment enclosure structure (CES) 5300 and is open to the atmosphere outside to draw in ambient cooling air. Inlets 5402 are preferably positioned near the upper end of the containment enclosure structure's sidewalls 5320. The air conduits 5401 extend vertically downwards inside the annulus 5313 and terminate a short distance above the base mat 5304 of the foundation (e.g. approximately 1 foot) to allow air to escape from the open bottom ends of the conduits.

Using the air conduits 5401, a natural convection cooling airflow pathway is established in cooperation with the annulus 5313. In the event the cooling water inventory in the primary annulus 5313 is depleted by evaporation during a thermal event, air cooling automatically initiates by natural convection as the air inside the annulus will continue to be heated by the containment vessel 5200. The heated air rises in the primary annulus 5313, passes through the secondary annulus 5330, enters the head space 5318, and exits the dome 5316 of the containment enclosure structure (CES) 5300 through the vent 5317 (see directional flow arrows, FIG. 60). The rising heated air creates a reduction in air pressure towards the bottom of the primary annulus 5313 sufficient to draw in outside ambient downwards through the air conduits 5401 thereby creating a natural air circulation pattern which continues to cool the heated containment vessel 5200. Advantageously, this passive air cooling system and circulation may continue for an indefinite period of time to cool the containment vessel 5200.

It should be noted that the primary annulus 5313 acts as the ultimate heat sink for the heat generated inside the containment vessel 5200. The water in this annular reservoir also acts to maintain the temperature of all crane vertical support columns 5331 (described earlier) at essentially the same temperature thus ensuring the levelness of the crane rails (not shown) at all times which are mounted in the larger portion 5216 of the containment vessel 5200.

Figure 71:
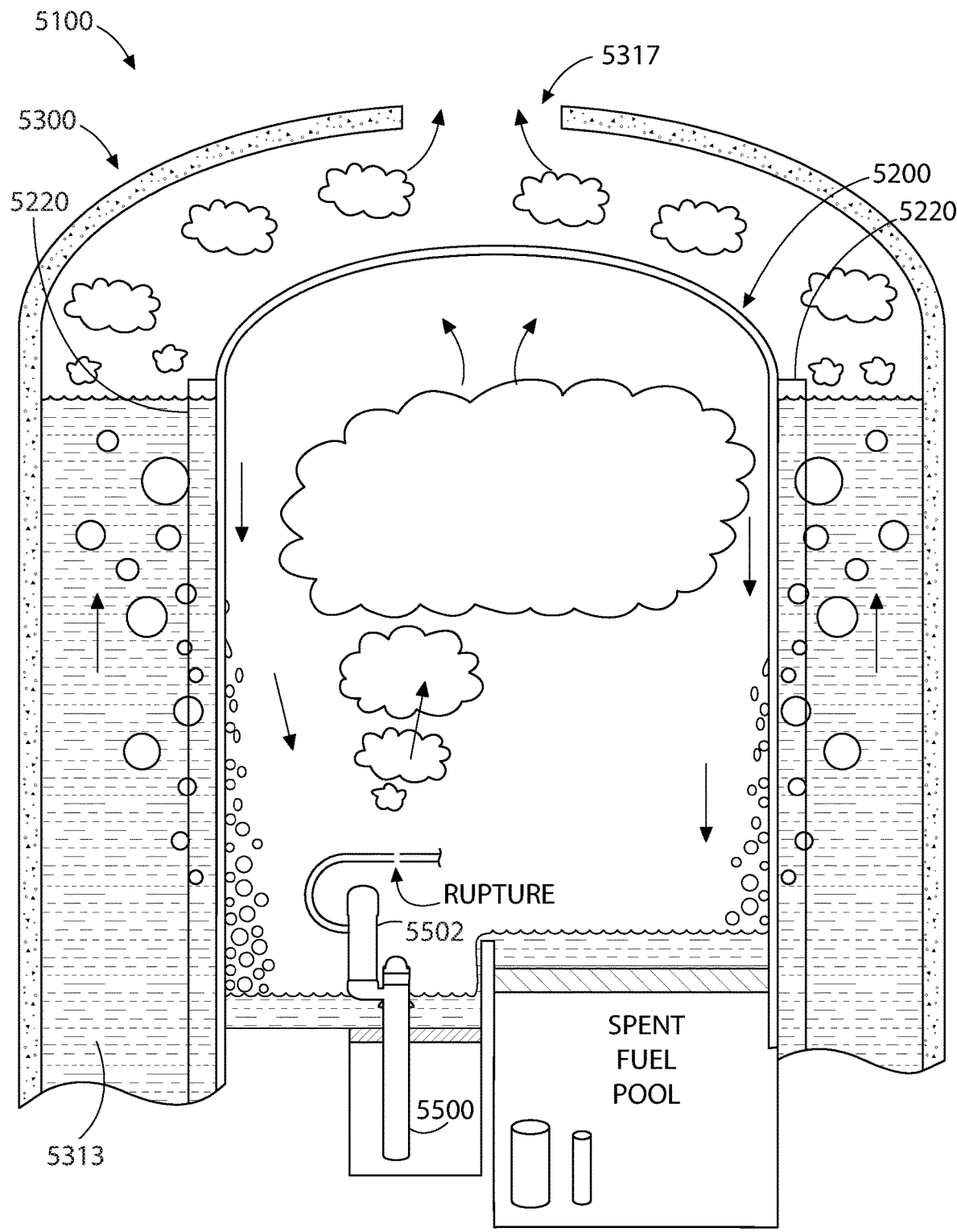
FIG. 71 is a schematic depiction of a generalized cross-section of the nuclear reactor containment system and operation of the water filled annular reservoir to dissipate heat and cool the containment vessel during a thermal energy release event.
Figure 72:
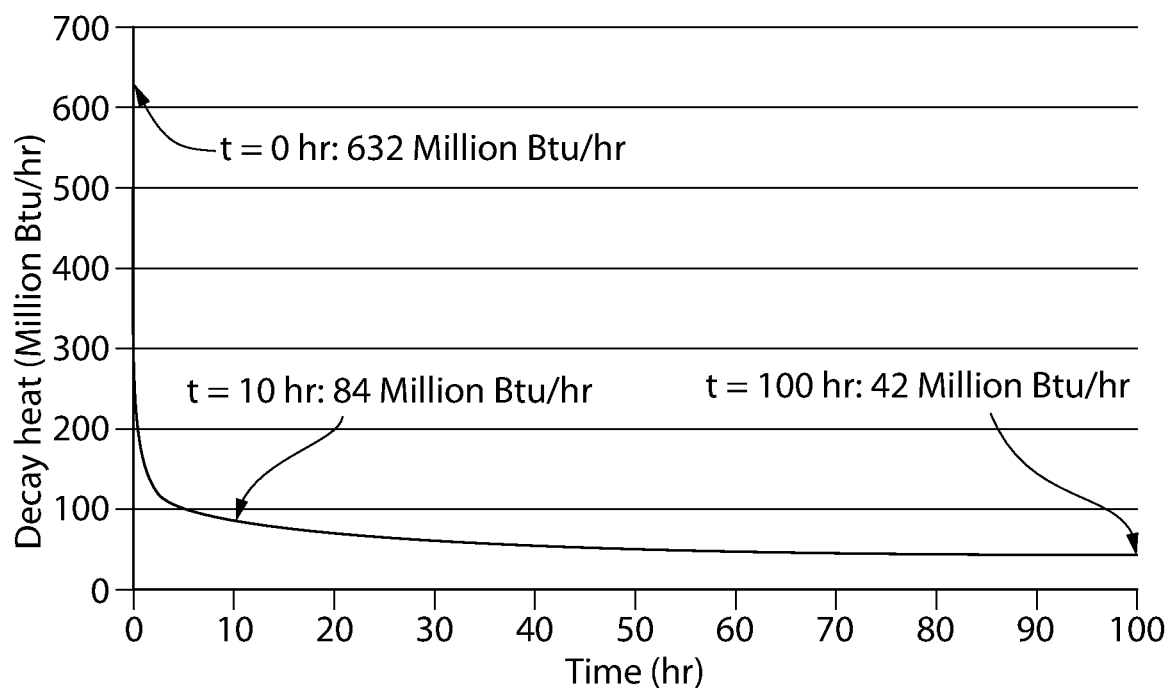
FIG. 72 is a graph showing a typical heat generation curve of a light water reactor subsequent to a scram event.

Operation of the reactor containment system 5100 as a heat exchanger will now be briefly described with initial reference to FIG. 71. This figure is a simplified diagrammatic representation of the reactor containment system 5100 without all of the appurtenances and structures described herein for clarity in describing the active heat transfer and rejection processes performed by the system.

In the event of a loss-of-coolant (LOCA) accident, the high energy fluid or liquid coolant (which may typically be water) spills into the containment environment formed by the containment vessel 5200. The liquid flashes instantaneously into steam and the vapor mixes with the air inside the containment and migrates to the inside surface of the containment vessel 5200 sidewalls or shell 5204 (since the shell of the containment is cooler due the water in the annulus 5313). The vapor then condenses on the vertical shell walls by losing its latent heat to the containment structure metal which in turn rejects the heat to the water in the annulus 5313 through the longitudinal fins 5220 and exposed portions of the shell 5204 inside the annulus. The water in the annulus 5313 heats up and eventually evaporates forming a vapor which rises in the annulus and leaves the containment enclosure structure (CES) 5300 through the secondary annulus 5330, head space 5318, and finally the vent 5317 to atmosphere.

As the water reservoir in annulus 5313 is located outside the containment vessel environment, in some embodiments the water inventory may be easily replenished using external means if available to compensate for the evaporative loss of water. However, if no replenishment water is provided or available, then the height of the water column in the annulus 5313 will begin to drop. As the water level in the annulus 5313 drops, the containment vessel 5200 also starts to heat the air in the annulus above the water level, thereby rejecting a portion of the heat to the air which rises and is vented from the containment enclosure structure (CES) 5300 through vent 5317 with the water vapor. When the water level drops sufficiently such that the open bottom ends of the air conduits 5401 (see, e.g. FIG. 60) become exposed above the water line, fresh outside ambient air will then be pulled in from the air conduits 5401 as described above to initiate a natural convection air circulation pattern that continues cooling the containment vessel 5200.

In one embodiment, provisions (e.g. water inlet line) are provided through the containment enclosure structure (CES) 5300 for water replenishment in the annulus 5313 although this is not required to insure adequate heat dissipation. The mass of water inventory in this annular reservoir is sized such that the decay heat produced in the containment vessel 5200 has declined sufficiently such that the containment is capable of rejecting all its heat through air cooling alone once the water inventory is depleted. The containment vessel 5200 preferably has sufficient heat rejection capability to limit the pressure and temperature of the vapor mix inside the containment vessel (within its design limits) by rejecting the thermal energy rapidly.

Figure 68:
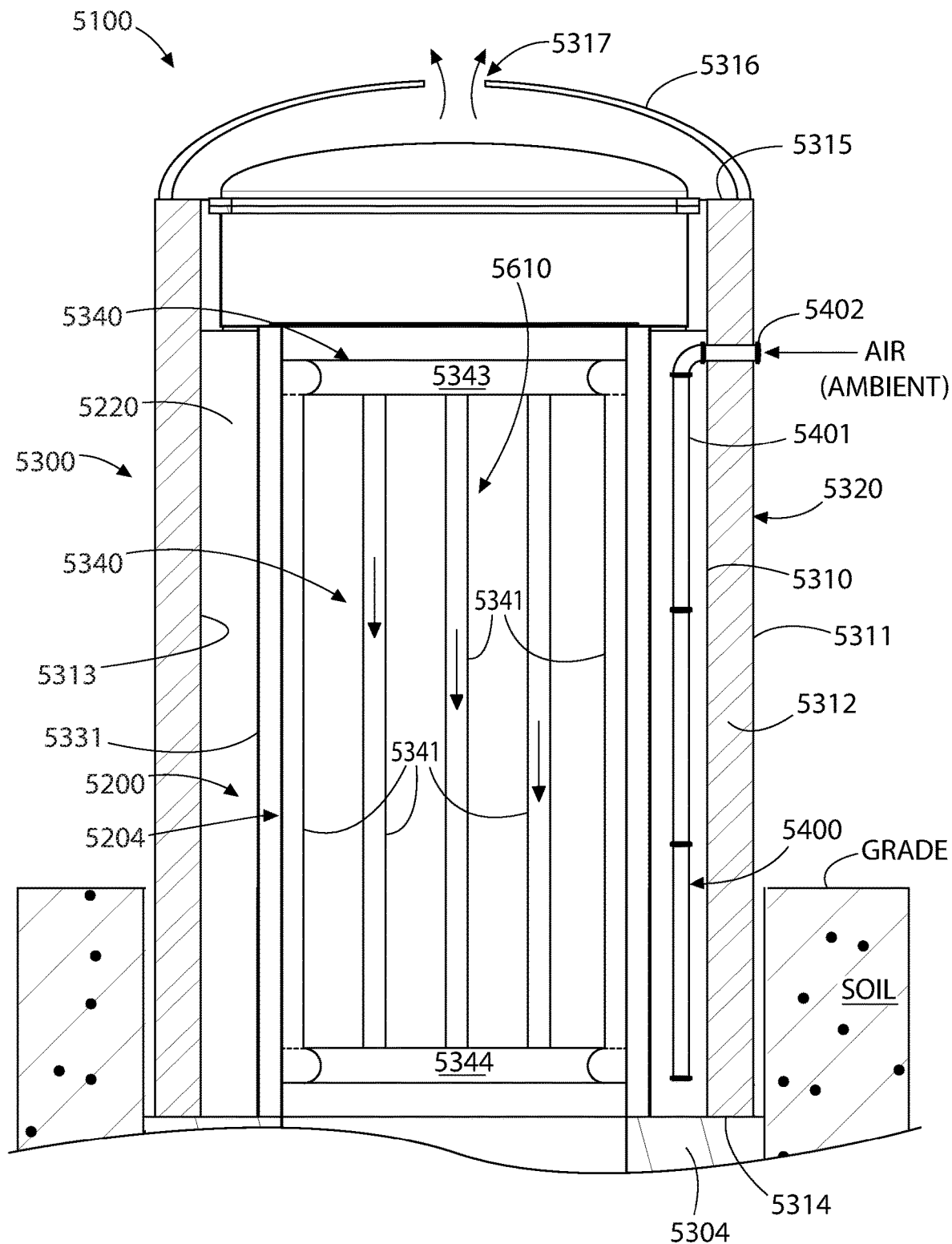
FIG. 68 is a partial longitudinal cross-sectional view of the nuclear reactor containment system showing an auxiliary heat dissipation system.
Figure 69:
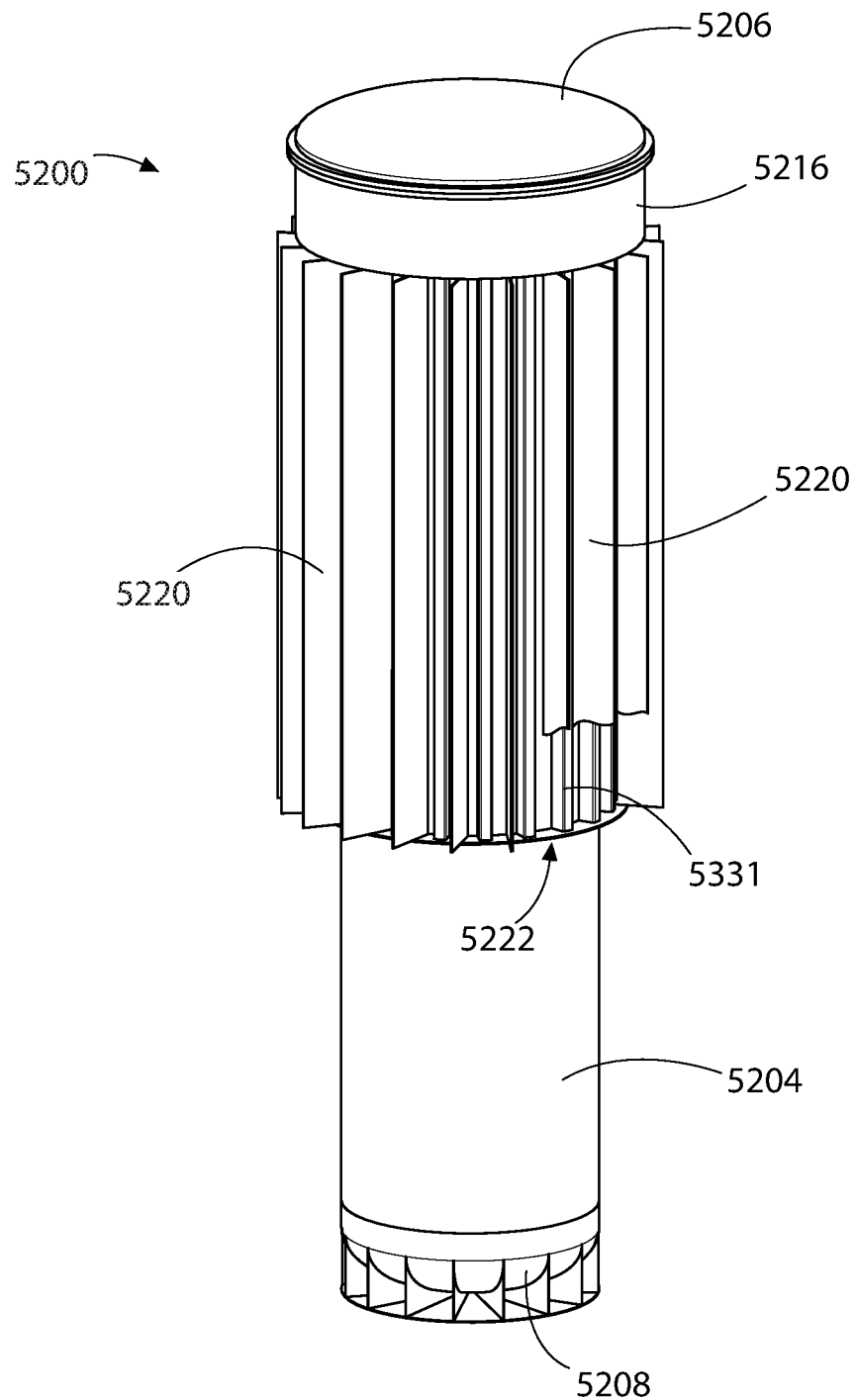
FIG. 69 is an isometric view of the containment vessel with lower portions of the (substantially) radial fins of the containment vessel broken away in part to reveal vertical support columns and circumferential rib.
Figure 70:
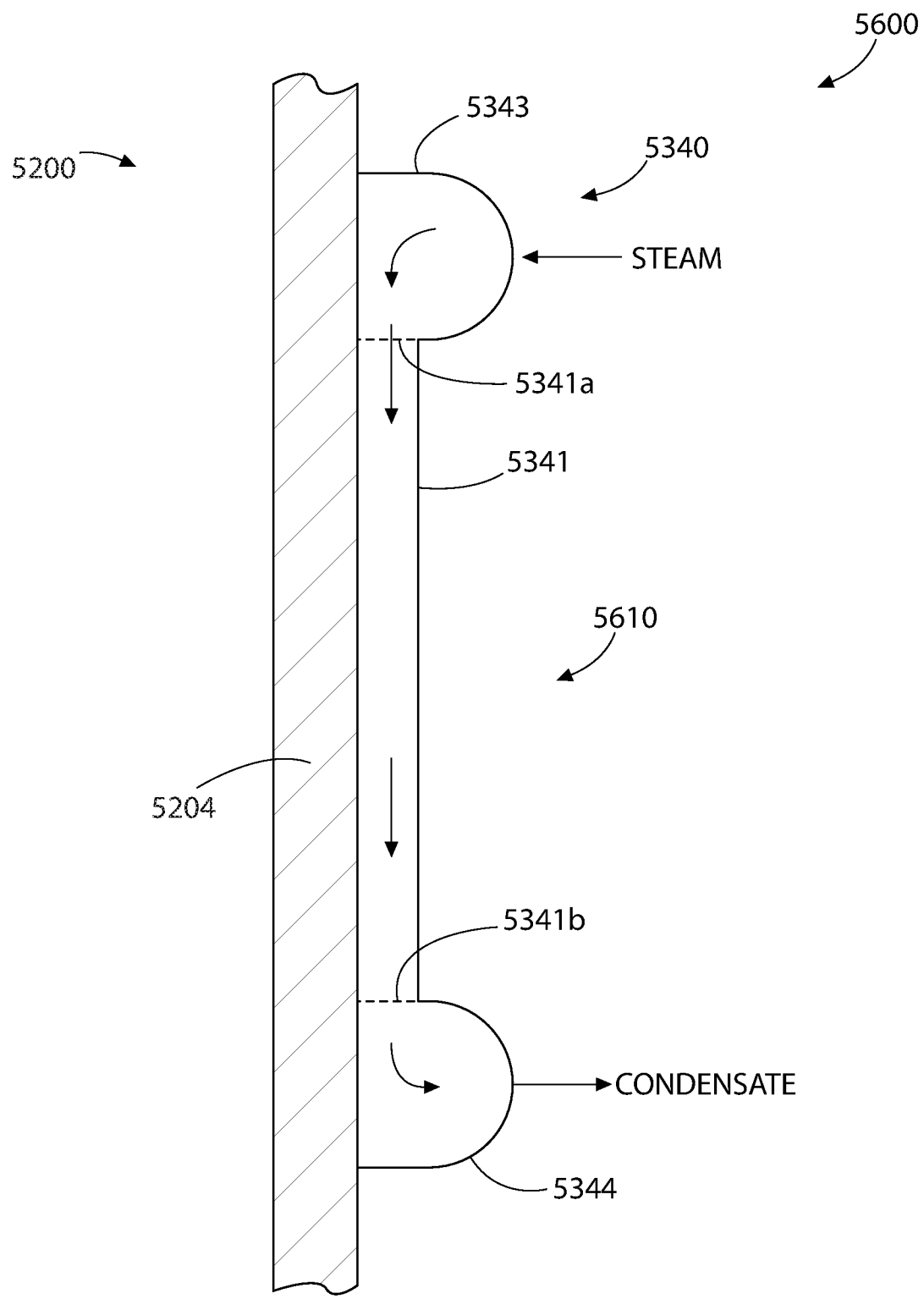
FIG. 70 is a longitudinal cross-sectional view of a portion of the heat dissipation system of FIG. 68 showing upper and lower ring headers and ducts attached to the shell of the containment vessel.

In the event of a station blackout, the reactor core is forced into a "scram" and the passive core cooling systems will reject the decay heat of the core in the form of steam directed to upper inlet ring header 5343 of heat dissipation system 5340 already described herein (see, e.g. FIGS. 68 and 70). The steam then flowing downwards through the network of internal longitudinal ducts 5341 comes in contact with the containment vessel shell 5204 interior surface enclosed within the heat dissipation ducts and condenses by rejecting its latent heat to the containment structure metal, which in turn rejects the heat to the water in the annulus via heat transfer assistance provide by the longitudinal fins 5220. The water in the annular reservoir (primary annulus 5313) heats up eventually evaporating. The containment vessel 5200 rejects the heat to the annulus by sensible heating and then by a combination of evaporation and air cooling, and then further eventually by natural convection air cooling only as described herein. As mentioned above, the reactor containment system 5100 is designed and configured so that air cooling alone is sufficient to reject the decay heat once the effective water inventory in annulus 5313 is entirely depleted.

In both these foregoing scenarios, the heat rejection can continue indefinitely until alternate means are available to bring the plant back online. Not only does the system operate indefinitely, but the operation is entirely passive without the use of any pumps or operator intervention.

Passive Reactor Cooling System

According to another aspect of the invention, a passive gravity-driven nuclear reactor cooling system is provided to reject the reactor's decay heat during a reactor shutdown (e.g. "scram") without any reliance on and drawbacks of pumps and motors. In one embodiment, a passive nuclear reactor shutdown cooling system 5600 may comprise a submerged bundle cooling system 5602 (SBCS) including components generally shown in FIGS. 73-75.

The submerged bundle cooling system 5602 is preferably a closed loop pressurized flow system comprised of three major parts or sub-systems, namely (i) a submerged bundle heat exchanger 5620 (SBHX), (ii) a discrete set or array of heat dissipater ducts 5610 (HDD) integrally connected to the inner wall of the containment structure (described in detail above), and (iii) the steam generator 5502 with superheater or reactor pressure vessel 5500 as further described herein. Steam and condensate flow paths are established between these components as described below. The submerged bundle cooling system 5602 is configured to utilize the secondary steam in the steam generator to extract the thermal energy generated by the fuel core in a closed loop process during a reactor shutdown that can continue indefinitely in the absence of a ready source of electric power.

Steam generator 5502 is more fully described in International PCT Application No. PCT/US13/538,289 filed Apr. 25, 2013, which is incorporated herein by reference in its entirety. As described therein and shown in FIGS. 63, 64, and 76 of the present application, the steam generator 5502 may be vertically oriented and axially elongated similarly to submerged bundle heat exchanger 5620. The steam generator 5502 may be comprised of a set of tubular heat exchangers arranged in a vertical stack configured to extract the reactor's decay heat from the primary coolant by gravity-driven passive flow means.

Figure 76:
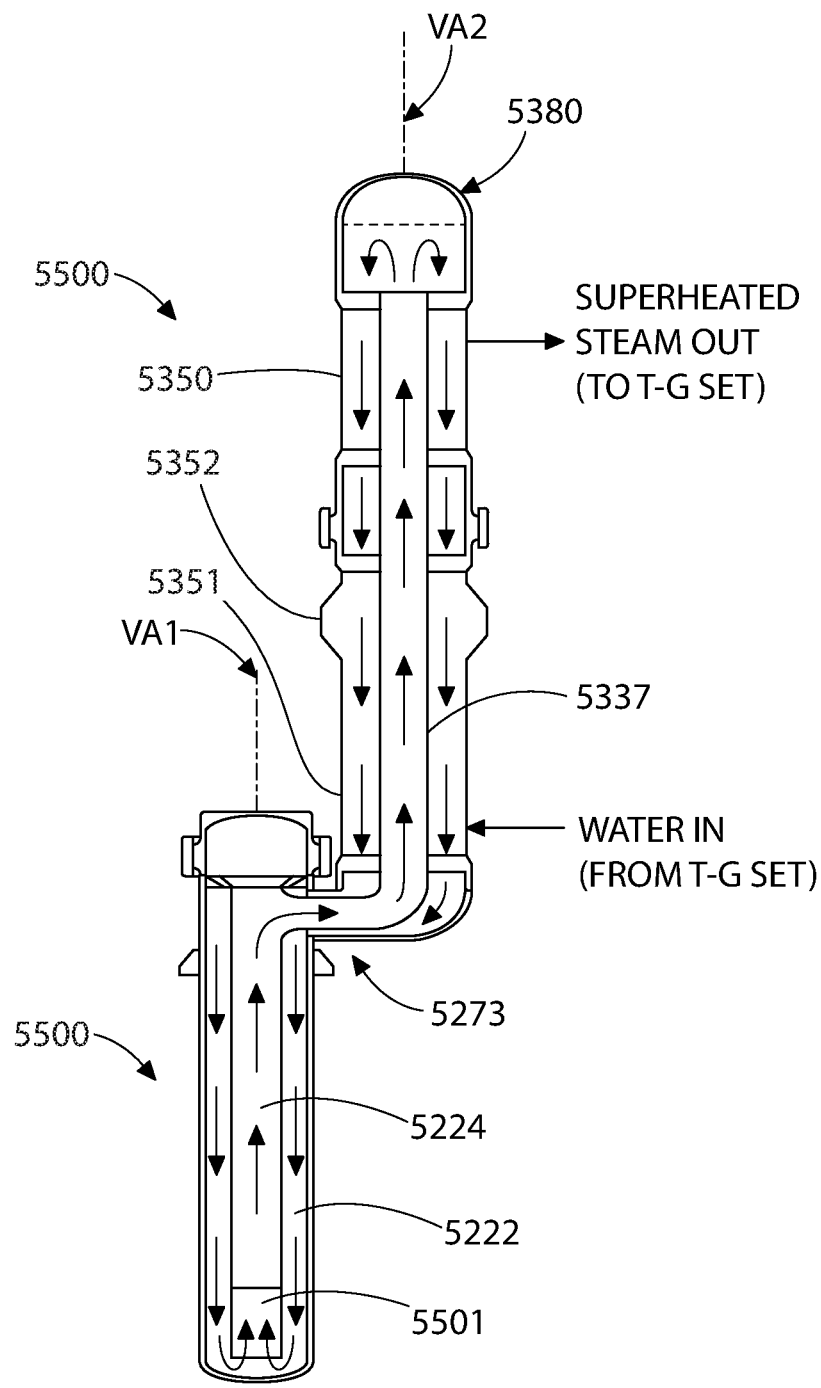
FIG. 76 is a schematic diagram showing the flow of primary and secondary coolant through the reactor vessel and steam generator.

The circulation flow loops of primary coolant (liquid water) and secondary coolant (liquid feedwater and steam) through the reactor vessel and steam generator during normal operation of the reactor and power plant with an available electric supply produced by the station turbine-generator (T-G) set is shown in FIG. 76 herein. The primary coolant flow between the fluidly coupled steam generator 5502 and reactor vessel 5500 forms a first closed flow loop for purposes of the present discussion. In one embodiment, the primary coolant flow is gravity-driven relying on the change in temperature and corresponding density of the coolant as it is heated in the reactor vessel 5500 by nuclear fuel core 5501, and then cooled in the steam generator 5502 as heat is transferred to the secondary coolant loop of the Rankine cycle which drives the turbine-generator set. The pressure head created by the changing different densities of the primary coolant (i.e. hot—lower density and cold—higher density) induces flow or circulation through the reactor vessel-steam generating vessel system as shown by the directional flow arrows.

In general, with respect to the first closed flow loop, the primary coolant is heated by the nuclear fuel core 5501 and flows upwards in riser column 5224. The primary coolant from the reactor vessel 5500 then flows through the primary coolant fluid coupling 5273 between the reactor vessel 5500 and steam generator 5502 and enters the steam generator. The primary coolant flows upward in the centrally located riser pipe 5337 to a pressurizer 5380 at the top of the steam generator. The primary coolant reverses direction and flows down through the tube side of the steam generator 5502 and returns to the reactor vessel 5500 through the fluid coupling 5273 where it enters an annular downcomer 5222 to complete the primary coolant flow loop.

Figure 63:
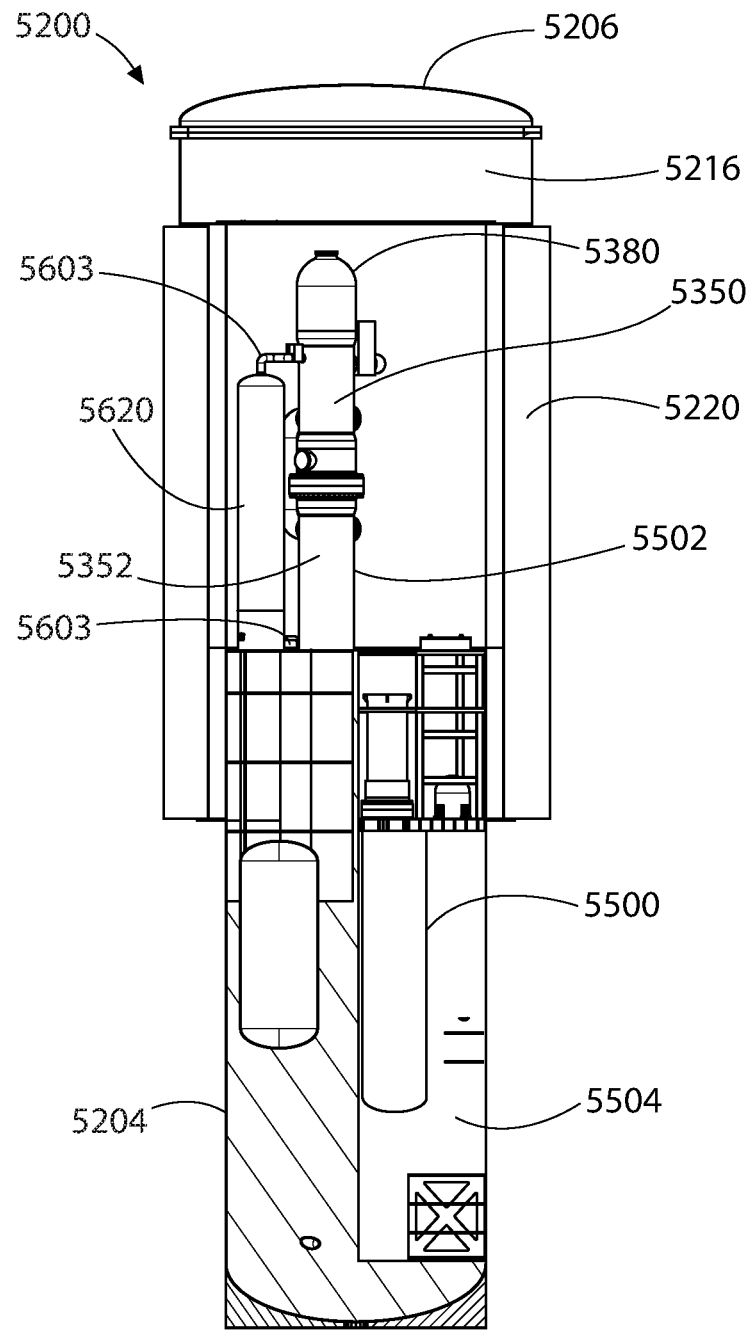
FIG. 63 is a longitudinal cross-sectional view thereof taken along line LXIII in FIG. 62.
Figure 64:
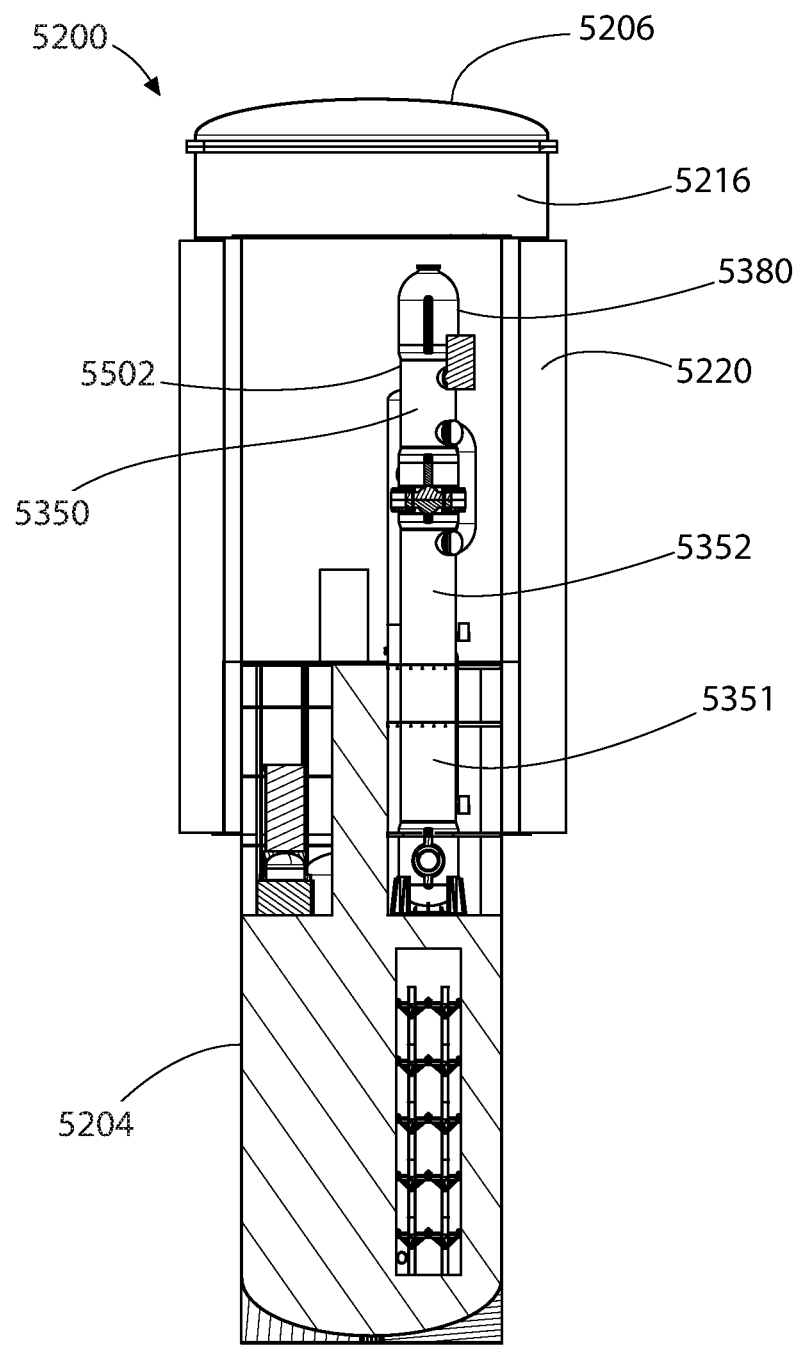
FIG. 64 is a longitudinal cross-sectional view thereof taken along line XII-XII LXIV in FIG. 10 62.
Figure 65:
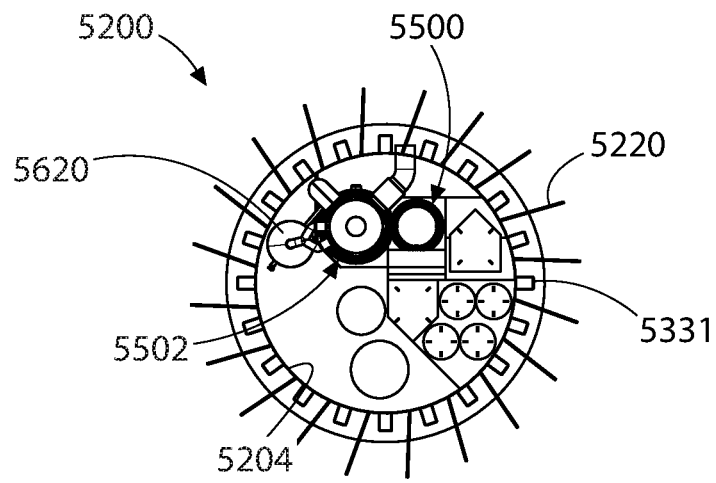
FIG. 65 is a transverse cross-sectional view thereof taken along line LXV in FIG. 61.
Figure 66:
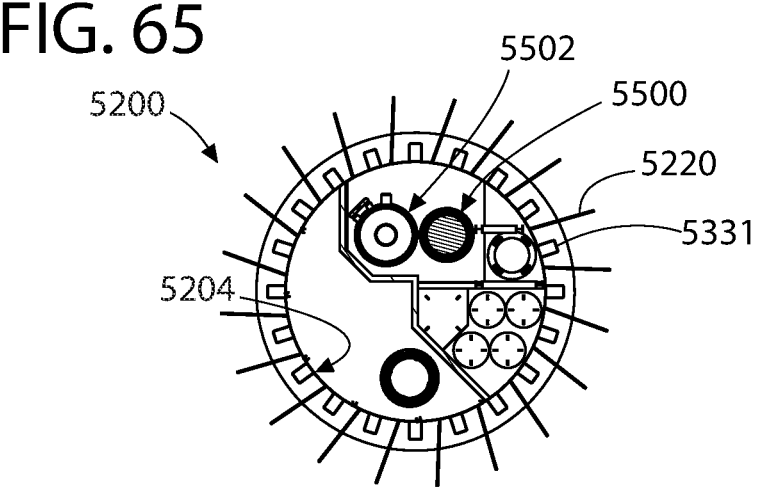
FIG. 66 is a transverse cross-sectional view thereof taken along line LXVI in FIG. 61.
Figure 67:
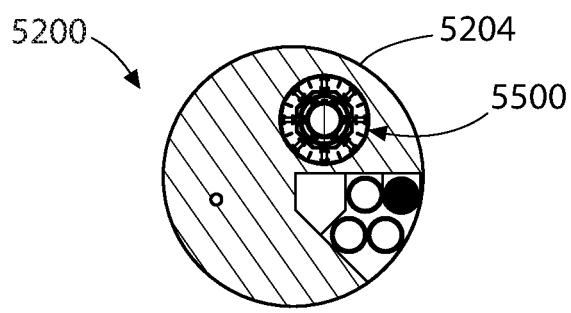
FIG. 67 is a transverse cross-sectional view thereof taken along line LXVII in FIG. 61.

The steam generator 5502 may include three vertically stacked heat transfer sections—from bottom up a preheater section 5351, steam generator section 5352, and superheater section 5350 (see, e.g. FIGS. 63, 64, and 76). Secondary coolant flows on the shellside of the steam generator 5502 vessel. Secondary coolant in the form of liquid feedwater from the turbine-generator (T-G) set of the Rankine cycle enters the steam generator at the bottom in the preheater section 5351 and flows upwards through the steam generator section 5352 being converted to steam. The steam flows upwards into the superheater section 5350 and reaches superheat conditions. From there, the superheated steam is extracted and flows to the T-G set to produce electric power.

Figure 73:
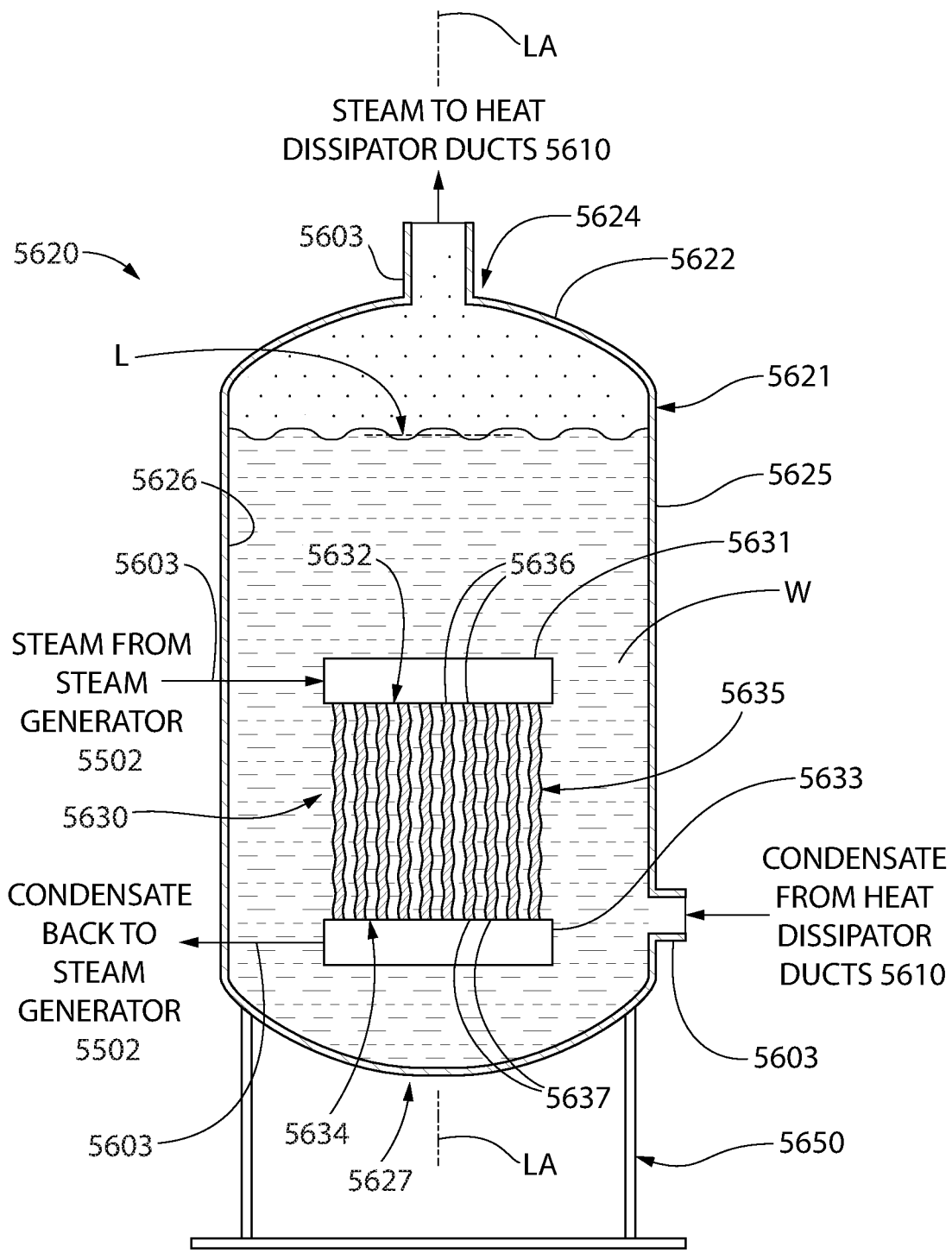
FIG. 73 is a schematic diagram of a submerged bundle heat exchanger (SBHX) according to the present disclosure.
Figure 74:
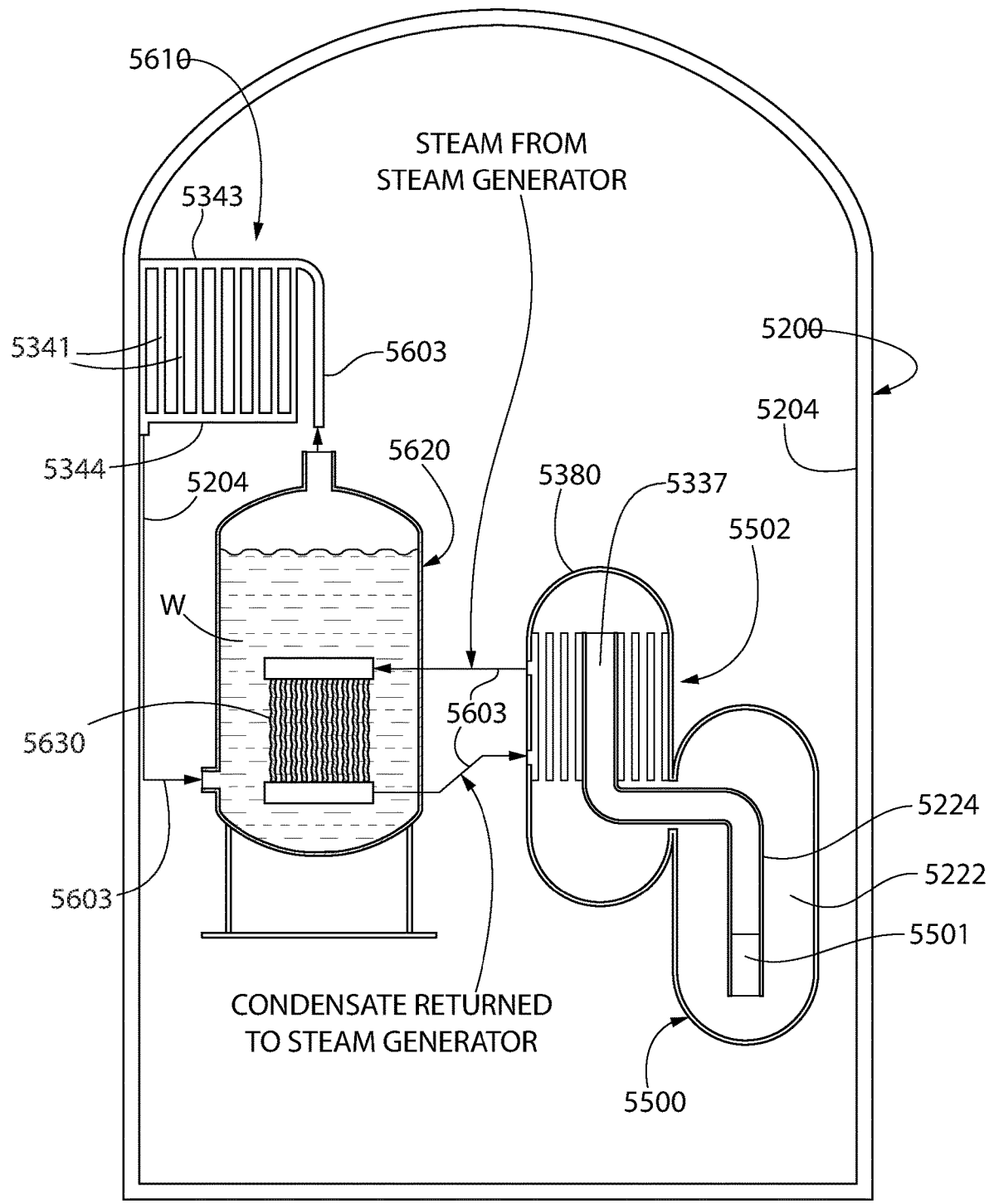
FIG. 74 is schematic diagram showing a first embodiment of a reactor cooling system and corresponding method for cooling a reactor core.
Figure 75:
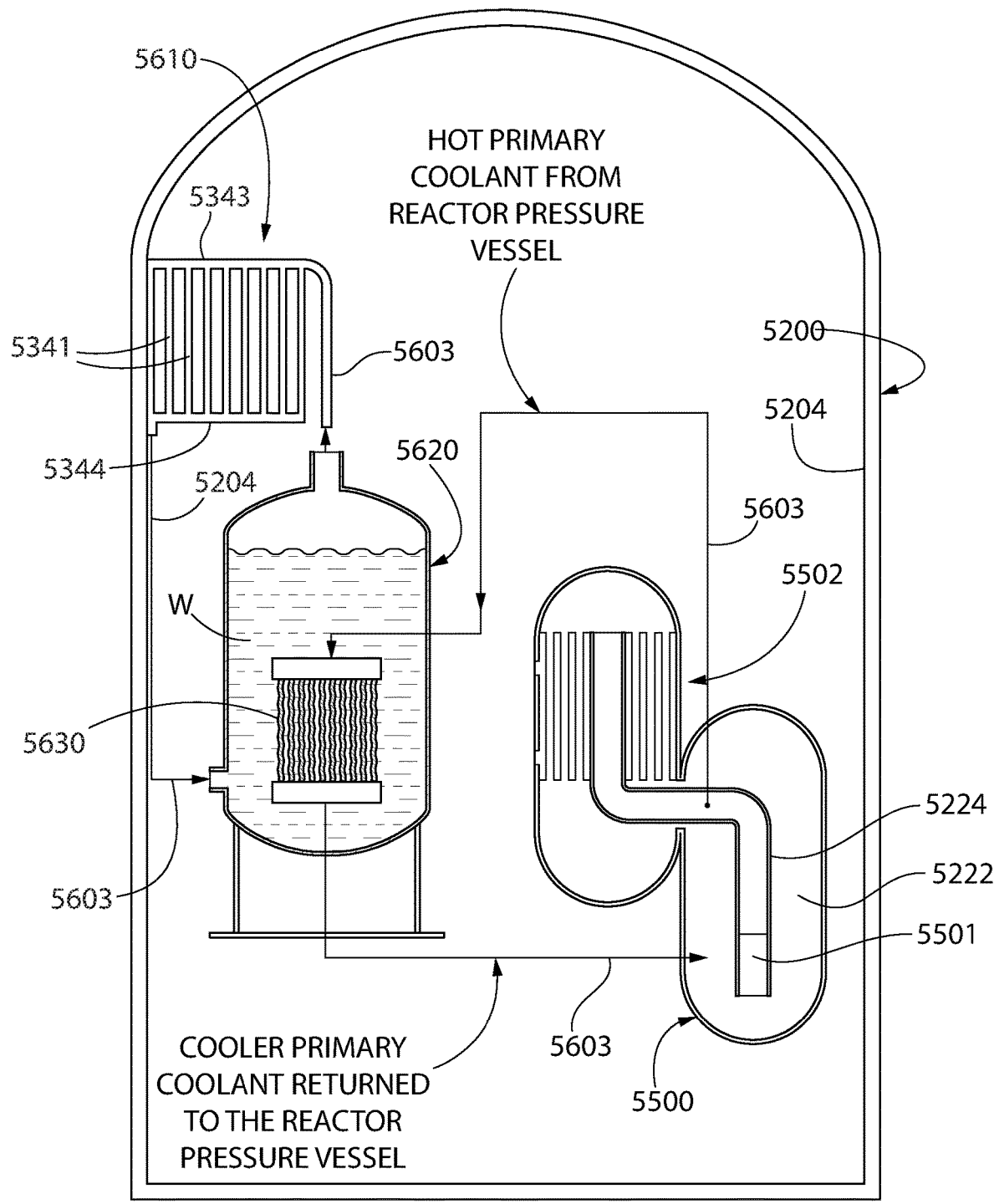
FIG. 75 is a schematic diagram showing a second embodiment of a reactor cooling system and corresponding method for cooling a reactor core.

Referring now to FIGS. 73-75, the submerged bundle heat exchanger 5620 includes a pressure vessel 5621 defining a longitudinal axis LA and having a hollow cylindrical shell 5625 defining an internal cavity 5626 and opposing top and bottom heads 5622, 5623 on opposite ends 5624, 5627 of the shell. The heads 5622, 5623 may be any suitable type and configuration, including flat, spherical, hemi-spherical, etc. Internal cavity 5626 extends completely between the top and bottom heads 5622, 5623. The pressure vessel 5621 may be axially elongated in shape and have a vertical orientation in one embodiment as shown to promote gravity flow. Preferably, the heat exchanger 5620 is mounted and disposed inside the inner vessel 5202 of the containment structure 5200 above the reactor vessel 5500 and in relatively close proximity to the steam generator 5502. The close coupling of the heat exchanger 5620 and steam generator 5502 minimizes steam and condensate piping run lengths (see also FIGS. 63 and 65) and conserves horizontal space thereby minimizing the diameter needed for the containment vessel 5200 to house the reactor vessel 5500, steam generator 5502, and heat exchanger. Any suitable structural base 5650 may be provided to mount and support the heat exchanger 5620 from the inner containment vessel 5200 preferably from a structural steel and/or concrete platform or floor in the vessel to adequately support the weight of the heat exchanger.

A reserve or inventory (i.e. volume) of cooling water W (liquid) is held in the heat exchanger pressure vessel 5621 which acts as a heat sink for cooling the secondary coolant during reactor shutdown event, as further described herein. Accordingly, the cooling water W serves as a heat sink of a third coolant which has an initial temperature which is less than the initial temperature of the secondary coolant during a shutdown.

The submerged bundle heat exchanger 5620 may be a relatively a large cylindrical pressure vessel 5621 housing a comparatively smaller heat exchanger tube bundle 5630 disposed inside as shown in FIG. 73. In one example, without limitation, pressure vessel 5621 may have an outer diameter of approximately 10 feet and a height of approximately 20 feet whereas the tube bundle 5630 housed therein may be circular in transverse shape having a diameter of approximately 4 feet and a height less than the height of the pressure vessel. Other suitable dimensions may be provided. Accordingly, the tube bundle 5630 in this embodiment does not substantially fill the entire cavity 5626 of the pressure vessel 5621.

Preferably, the tube bundle 5630 may be positioned closer to the bottom end 5627 and head 5623 than the top end 5624 and head 5622 (see, e.g. FIG. 73). This positioning helps ensure that the tube bundle 5630 remains substantially submerged for a majority or preferably all of its height in the inventory of liquid water W stored in the pressure vessel 5621. Accordingly, in some embodiments the tube bundle 5630 is completely surrounded by and immersed in the liquid condensate on all sides and parts. The tube bundle 5630 may be elevated and spaced apart above the bottom head 5623 of the heat exchanger pressure vessel 5625 to provide a sufficient depth of water beneath the bundle to permit flow beneath the tube bundle on the shellside of the vessel. Any suitable arrangement of structural supports and brackets inside the pressure vessel 5625 to fixedly support the tube bundle assembly 5630 may be used.

Pressure vessel 5621 may be made of any suitable metal capable of withstanding the steam and operating pressures anticipated from the steam generator 5502. In some embodiments, pressure vessel 5621 may be formed of a corrosion resistant material such as without limitation stainless steel. Other corrosion resistant metallic materials may be used.

The tube bundle 5630 is disposed in cavity 5626 of the pressure vessel 5621. In one non-limiting configuration, tube bundle 5630 assembly may include an inlet flow plenum 5631 defining a top tube sheet 5632, an outlet flow plenum 5633 defining a bottom tube sheet 5634 and spaced apart from the top tube sheet, and a plurality of tubes 5635 extending between and fluidly coupled to the top and bottom tube sheets. The tube sheets 5632, 5634 each include a plurality of flow openings 5636, 5637 respectively which are in fluid communication with the inlet and outlet flow plenums 5631, 5633 and tubes 5635. In operation and description of the flow path, flow enters the inlet flow plenum 5631 and through openings 5636 into one end of the tubes 5635, exits the opposite end of the tubes 5635 through openings 5637 into outlet plenum 5633, and leaves the outlet plenum.

In one embodiment, the tubes 5635 of tube bundle 5630 may be axially elongated and vertically oriented as shown. Other orientations are possible however such as horizontal, and angled between horizontal and vertical. The tubes 5635 may have any suitable shape including without limitation straight, curvilinear such as helically coiled (see, e.g. FIG. 73) or another curvilinear configuration, or other appropriate shape. In one preferred embodiment, the tubes may have a curvilinear shape which maximizes available heat transfer surface area without requiring as much height as straight tubes having the same surface area. Any suitable diameter tubes and tube arrangement/pattern may be used. For example, single or multiple rows of tubes 5635 may be provided; the number being dependent at least in part on the heat transfer requirements for the heat exchanger 5620. In one embodiment, the tube bundle 5630 may have a generally circular shape in transverse cross section.

Tubes 5635 may be formed of any suitable preferably corrosion resistant metal having conductive heat transfer properties suitable for a given application. Some non-limiting examples of the tube materials that may be used include stainless steel, aluminum, titanium, corrosion resistant steel alloys, Inconel®, Monel®, or others.

The inlet and outlet flow plenums 5631 and 5633 each comprise a substantially hollow outer body of any suitable shape forming a pressure boundary and an open interior plenum. The tube sheets 5632, 5634 may have any suitable thickness and shape in plane including planar and arcuate (e.g. if the plenums are shapes as pipe sections) and in top plan view (e.g. circular for a round cross-sectional tube bundle). The tube sheets and plenums may be formed of any suitable corrosion resistant metal or metal alloy, some examples of which are mentioned above with respect to possible materials for tubes 5635.

The submerged bundle heat exchanger 5620 may variously be fluidly interconnected with and coupled to the steam generator 5502, rector vessel 5500, and heat dissipater ducts 5610 by suitable steam and condensate piping 5603 shown in FIGS. 74 and 75. The piping 5603 is configured to establish the flow paths shown in these figures. Any suitable type of piping and materials may be used for piping 5603 which may depend in part on whether the piping run is for conveying condensate or steam and their associated service temperatures and pressures anticipated. In some embodiments, for example without limitation, the piping preferably may be made of a corrosion resistant metal such as stainless steel or steel alloy. It is well within the ambit of those skilled in the art to select and design appropriate piping and related appurtenances such as valving. Notably, no pumps are involved to establish the flow paths shown in FIGS. 74 and 75 which are gravity driven.

Operation of the reactor cooling system 5600 will now be briefly described. During the postulated reactor shutdown event such as a station black-out or similar event wherein power generation from the turbo-generator ceases and the normal non-safety active systems are unavailable, the main steam and main feedwater isolation valves (not shown) are first closed to isolate the steam generator 5502 from the extra-containment power generation portion of Rankine cycle. Accordingly, the isolation valves shut off steam flow from the steam generator 5502 to the turbine-generator (T-G) set and feedwater flow back to the steam generator returned from the T-G set in a well-known manner to those skilled in the art without further elaboration. Excess steam may first be dumped to the atmosphere before closing the main isolation valves. Closing the main isolation valves activates the reactor core cooling system 5600. Two potential operating scenarios or methods for employing the cooling system 5600 are disclosed and described in further detail below which passively (i.e. without electric power) continue cooling the reactor in the event of a shutdown to remove decay heat using the submerged bundle cooling system 5602.

In a first operating scenario or method for cooling the reactor shown in FIG. 74, the steam produced in the steam generator 5502 on the shellside in the upper half of the steam generator vessel (by residual decay heat generated from the now shut down reactor) is extracted and routed to the submerged bundle heat exchanger 5620 where it condenses inside the tubes 5635 of the submerged bundle heat exchanger 5620 (see also FIG. 73). The condensing steam gives up its latent heat to the volume or inventory of water W (the third coolant) stored in the shellside of the submerged bundle heat exchanger pressure vessel 5621 surrounding the tube bundle 5630.

In one embodiment, the tube bundle 5630 may be completely submerged in the inventory of water W inside the heat exchanger 5620 so that the water provides the cooling medium on the outside of the tubes 5635 for condensing the steam. In one embodiment, the tube bundle 5630 preferably may be positioned near the longitudinal axis LA coinciding with the axial centerline of the submerged bundle heat exchanger 5620 to evenly surround the tube bundle with water W on all sides to promote uniform cooling of all tubes 5635 in bundle. Other mounting positions of the tube bundle however are possible. The inflow of steam and outflow of collected condensate may be controlled and maintained passively by appropriate design of the valving, piping, or other flow control devices (e.g. orifices, etc.) that do not rely on electric or another power source for operation.

On the tube side of the heat exchanger tube bundle 5630, steam extracted from the steam generator 5502 may enter the heat exchanger pressure vessel 5621 at any convenient location. In one embodiment, the steam inlet piping 5603 may penetrate laterally through the pressure vessel shell 5625 and piping may extend inside the heat exchanger pressure vessel 5621 to the inlet plenum 5631 of tube bundle 5630 to which it is fluidly coupled. Other steam inlet locations may be used such as without limitation through the top head 5622.

The condensate collected in the lower plenum 5633 of the tube bundle 5630 is then returned to the shellside of the steam generator 5502 via piping 5603, purely by natural gravity flow. The condensate outlet piping 5503 may be located in the general vicinity towards or near the bottom 5627 of the heat exchanger pressure vessel 5621 and is reintroduced back into the steam generator 5502 at an injection point (e.g. preheater 5351 section) lower than the extraction point of steam from the steam generator (e.g. superheater section 5350) which is supplied to the submerged bundle heat exchanger 5620. A second closed flow loop is established between the steam generator 5502 and tube side of the submerged bundle heat exchanger 5620 (i.e. tube bundle 5630). Appropriate piping may be routed inside the pressure vessel 5621 between the lower plenum 5633 and shell 5625 of the vessel which is then coupled to the condensate outlet piping 5503 connected to the steam generator 5503.

With continuing reference to the first operating scenario or method shown in FIG. 74, the inventory of water W outside the tubes 5635 in the shellside of the submerged bundle heat exchanger pressure vessel 5621 (which is fluidly isolated and separated from condensate on the tube side of the tube bundle 5630) is heated by condensing steam inside the tube bundle which transfers it heat to the water. The water W acts as a heat sink for cooling the secondary coolant during reactor shutdown event. Accordingly, the water W serves as a third coolant which has an initial temperature that is less than the initial temperature of the secondary coolant during a shutdown. The water W gradually heats up during the reactor shutdown process. After a period of time, the water W reaches the boiling point temperature at which a portion of the water inventory is converted to steam. The steam accumulates in a steam space formed above the water line L in the pressure vessel 5621 beneath the top head 5622.

To cool the inventory of water W (third coolant) which provides the cooling fluid for condensing the secondary coolant steam inside the tube bundle 5630, the accumulated steam on the shellside is extracted and routed via suitable piping 5603 to the heat dissipater ducts 5610 of the auxiliary heat dissipation system 5340 described in detail above. The steam flows through the heat dissipater ducts 5610 and is condensed in the manner already described. Specifically, the water in the annular reservoir (primary annulus 5313) as a temperature lower than the temperature of the third coolant steam to form a heat sink for condensing the third coolant steam which transfers heat to the reservoir. The condensate is then returned to the submerged bundle heat exchanger 5620 via suitable piping 5603 and enters the shellside of the pressure vessel 5621 where it is reintroduced into the inventory of water W. This cooling system helps to substantially maintain the water level keeping the tube bundle 5630 submerged in water W beneath the water line L. This system further forms a third closed flow loop of steam and condensate using the heat dissipater ducts 5610 to condense the steam which is distinct and isolated from the second closed flow loop formed on the tube side of the submerged bundle heat exchanger 5620 and the steam generator 5502. In summary, the first and second closed flow loops described herein function to cool the primary coolant and secondary coolant, respectively. The third closed flow loop cools the cooling fluid of the submerged bundle heat exchanger 5620 (i.e. heat sink of water formed by inventory of water W) which indirectly contributes to cooling the secondary coolant vis-à-vis the tube bundle 5630.

In the alternative second operating scenario or method for cooling the reactor shown in FIG. 75, the primary coolant in the reactor vessel 5500 is directly cooled by the submerged bundle heat exchanger 5620 rather than using the steam continuing to be produced in the steam generator 5502 by the reactor decay heat. In this process arrangement, once the steam and feedwater isolation valves are closed, the hot primary coolant from the riser column 5224 of the reactor pressure vessel ("hot leg") is routed via piping 5603 directly to the tubeside of tube bundle 5630 in the submerged bundle heat exchanger 5620 (see FIGS. 75 and 24). The primary coolant will cool by rejecting its heat to the shellside water W in the submerged bundle heat exchanger 5620 in a very much similar manner shown in FIG. 74 and described above while flowing downwards inside the tubes 5635. A difference being that the primary coolant always remains substantially in liquid state during this entire cooling process and also when circulating through the reactor vessel 5500. This cooling creates a natural circulation flow due to the buoyancy head created by the density difference between the hot primary coolant at the inlet to the submerged bundle heat exchanger 5620 and the cold primary coolant at the outlet of the heat exchanger. The cooler primary coolant is routed via suitable piping 5603 and reintroduced back into the annular downcomer 5222 region of the reactor vessel 5500 ("cold leg"). The submerged bundle heat exchanger 5620 higher elevation with respect to the reactor vessel 5500 and the size of the piping 5603 that routes the primary coolant to the heat exchanger may be designed to ensure that there is adequate natural circulation flow to reject the heat from the core to the shellside water W in the heat exchanger.

In both the first and second methods for cooling the reactor described above, the quantity of water W in cavity 5626 of the submerged bundle heat exchanger 5620 is preferably sufficient to remove the decay heat from the reactor core (via the primary coolant) through sensible heating of shellside water in the early phase of the postulated reactor shutdown event when the decay heat generation is at its highest. This may be accomplished in part by adequately sizing the storage volume and size of the submerged bundle heat exchanger pressure vessel 5621.

The operational interaction of the reactor cooling system 5600 and air cooling system 5400 of the containment structure will be briefly described. As described above, the remainder of the heat not used in condensing steam inside the tube bundle 5630 of the heat exchanger 5620 leads to the production of steam in the shellside of the heat exchanger by heating the inventory of water W. This shellside steam is routed to the heat dissipater ducts 5610 where the steam condenses by rejecting its latent heat to the containment structure (e.g. inner containment vessel 5200). The containment vessel 5200 rejects the heat to the water in the annulus 5313 between the containment structure and the containment enclosure structure 5300 (and eventually to the ultimate heat sink or atmosphere) of the passive reactor containment protection system described herein. The condensed steam from the heat dissipater ducts 5610 then drains back to a collection manifold (lower outlet ring header 5344 shown in FIGS. 68 and 70) which in turn routes the condensate back to the submerged bundle heat exchanger 5620 purely by gravity. As the cooling water inventory in the annulus 5313 between the inner containment vessel 5200 and outer containment enclosure structure 5300 evaporates, the exposed inner containment vessel 5200 will heat reject heat to the air now occupying the annulus 5313 by natural convection. A fresh supply of air is provided by the inlet air conduits 5401 (through suction) spaced circumferentially around the containment vessel 5200 in the primary annulus 5313 (see, e.g. FIG. 68 and foregoing description). Once all the water in the annular 5313 has evaporated, the containment vessel 5200 will continue to reject heat by air cooling alone. Air cooling after a prolonged period of water cooling (which removes a significant portion of reactor decay heat) is sufficient to remove all the decay heat. Since the submerged bundle cooling system 5602 is a closed loop natural flow system, the cooling process can continue indefinitely.

It will be appreciated that variations and combinations of the foregoing two methods may be used to passively cool the reactor during a powerless reactor shutdown event.

Inventive Concept #6

Reference is made generally to FIGS. 77-88 which are relevant to Inventive Concept #6 described below.

Steam generators used in modern nuclear power plants fall into two categories: Recirculating Type and Once-Thru Type.

Recirculating Type Steam Generators:

The recirculating steam generator is the most commonly used design in the industry. It features a vertical U-bundle with a hemi-head integrally welded to the tubesheet and the primary fluid entering the up flow leg of the U-tubes and exiting through the same hemi-head after flowing down the other leg of the tubes. The hemi-head space is divided into two compartments to separate the "hot" and "cooled" primary streams. The secondary side features a shroud that enables the boiling water to recirculate by the thermo-siphon action. Most world suppliers of operating PWRs, including Westinghouse, Siemens, Combustion Engineering, Framatome, and Mitsubishi utilized the Recirculating type U-bundle steam generators in their PWRs. However, the recirculating type steam generators have suffered from massive tube failures in PWRs around the world well before the end of their design life, forcing utilities to spend billions of dollars in replacement costs. Some plants such as Maine Yankee, Trojan, and Connecticut Yankee have shutdown permanently because of the high cost of steam generator replacement.

Once-Thru Type Steam Generators:

This design employs straight tubes fastened to the tubesheets located at the top and bottom extremities of the tube bundle. The primary water (reactor coolant) and the secondary water (boiler water) flow in a counter-current arrangement with the latter boiling outside the tubes as it extracts heat from the former across the tube walls. The mixture of water and steam in the produced in the lower reaches of the tube bundle progressively becomes more dry steam as the secondary flow stream rises inside the steam generator. Babcock & Wilcox was the only reactor supplier who used the once-thru steam generator configuration in its Pressurized Water Reactor (PWR) designs. The disaster at Three Mile Island Unit 2 supplied by B&W in 1979 exposed the flaws of this design.

Figure 77:
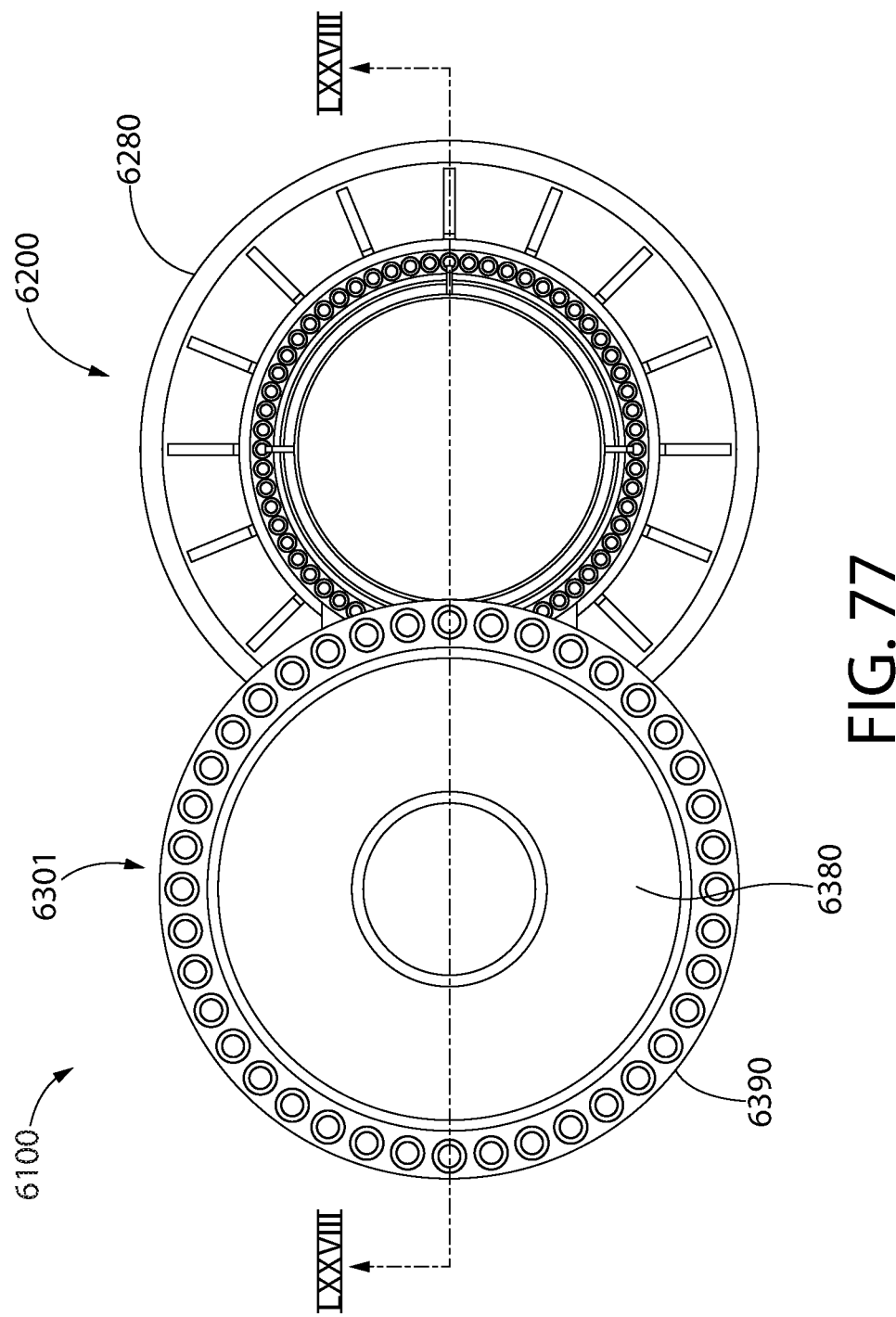
FIG. 77 is a top plan view of a nuclear steam supply system including a reactor vessel, pressurizer, and steam generator.
Figure 78:
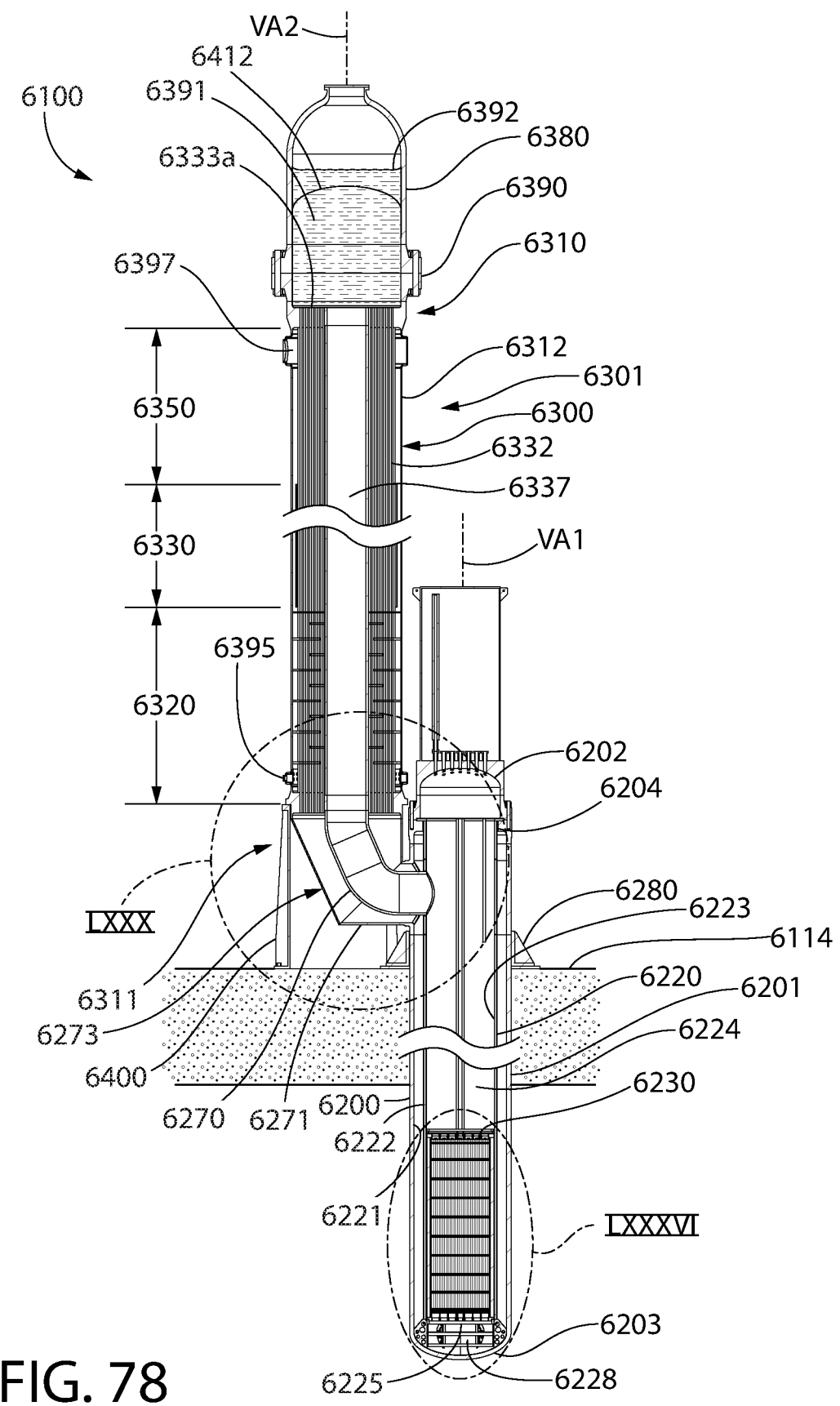
FIG. 78 is side cross-sectional view thereof.

As shown in FIGS. 77 and 78, a nuclear steam supply system 6100 (NSSS) of a safe modular underground reactor (SMR) according to the present disclosure comprises a vertical subterranean reactor vessel 6200 with the nuclear fuel cartridge (or core) 6210 containing the nuclear fuel source standing upright near its bottom. The basic flow or circulation path of the primary coolant or water (i.e. closed primary coolant loop) contained in the reactor vessel through the steam generating vessel 6300 and reactor vessel 6200 is shown schematically in FIG. 88 and functions as follows. The pressurized reactor primary coolant (at about 2250 psig) is heated by the fission in the core 6210, which reduces the coolant density causing it to rise within the tubular reactor shroud 6220. The heated reactor coolant (@ about 600 deg. F.) exits the reactor vessel and enters the steam generator 6301. Once inside the steam generator, the primary coolant or water flows upward and is delivered to the top distribution plenum 6391 by a centrally located tubular riser shell or pipe 6337. The primary coolant fluid reverses direction and descends the steam generator flowing inside the bank of tubes (tube side), progressively transmitting its heat energy to the secondary water that flows vertically upwards on the shell side of the steam generator in a countercurrent arrangement to the primary flow stream. The cooled (and thus densified primary stream) re-enters the reactor vessel and flows downward in the annular space between the shroud and reactor vessel walls, reaching the bottom of the fuel core. The primary fluid reverses direction and flows upward resuming its circulation in the primary coolant circuit or loop of the nuclear steam supply system as it is heated by nuclear fission occurring in the reactor. The rate of flow of the primary fluid is set by the balance in the hydrostatic head between its hot up-flowing segment and the cool down-flowing segment (both of which span the reactor vessel and the steam generator) and the hydrodynamic pressure loss governed by what engineers know as the classic Bernoulli's equation. The closed primary coolant flow loop is therefore configured to produce and maintain natural gravity-driven circulation of primary coolant without the assistance of pumps.

As the above summary indicates, the design objectives of the steam generator to fulfill the needs of primary side (i.e. primary coolant side) in one embodiment include:

Provide for the flow of the primary fluid in it with as little friction loss as possible. Reduced pressure loss will increase the rate of circulation and improve the in-tube heat transfer coefficient, which are both salutary effects.

Minimize the lateral distance between the reactor vessel and the steam generator so that the joint between them does not require a pipe (failure of such piping connections from events such as earthquakes, thermal fatigue, and other adverse mechanisms is a matter of safety concern in nuclear plants, which drives the decision to eliminate any large piping in the present SMR).

The secondary side (i.e. secondary coolant side) of the steam generator also has several needs that should be addressed to avoid reliability problems that have afflicted prior designs. The design objectives of the secondary side include:

In recirculating steam generators, the boiling of water in the shell side space has led to the accumulation of aggressive species on the tubesheet surface and in the crevices where the tubes emerge from the tubesheet, which over time, attack the tube walls causing leakage.

The accumulation of solids in the tube support plate crevices has resulted in choking of the tubes in recirculating steam generators.

In recirculating, the steam leaving the steam generator must be stripped of its entrained moisture by mechanical means. The effectiveness of the moisture separator (installed above the tube bundle of the steam generator) has been a source of operation problems in PWRs.

The once-through steam generators suffered from the demerit of having too little water inventory in the shell side space. In case of an interruption in the in-flow from the feedwater (secondary coolant) line, the steam generator would tend to go dry in a very short time, making it a safety risk. This risk actually materialized at Three Mile Island nuclear generating plant in April 1979.

The above deficiencies in the present day steam generator designs have guided the development of a new design disclosed herein. While the novel design features of the new present embodiment of a steam generator can be used in any steam producing boiler (i.e. non-nuclear), its anatomy and features are explained in the context of a nuclear SMR.

Referring initially to FIGS. 77-82, a steam supply system 6100 for a nuclear pressurized water reactor (PWR) according to the present disclosure is shown. From the thermal-hydraulic standpoint, the system includes reactor vessel 6200 and steam generator 6301 fluidly coupled thereto. The steam generating vessel 6300 and reactor vessel 6200 are vertically elongated and separate components which hydraulically and physically are closely coupled, but discrete vessels in themselves that are thermally isolated except for the exchange of primary loop coolant (i.e. reactor coolant) flowing between the vessels. The steam generating vessel 6300 is laterally adjacent to, but vertically offset from the reactor vessel 6200 to provide access to the reactor vessel internal components and control rods.

As further described herein, the steam generating vessel 6300 in one embodiment includes three heat transfer zones comprising (from bottom to top) a preheater section 6320, main steam generator section 6330, and a superheater section 6350 which converts a fluid such as water flowing in a secondary coolant loop from a liquid entering the steam generating vessel 6300 at feedwater inlet 6301 to superheated steam leaving the steam generating vessel at steam outlet 6302. The secondary coolant loop water may be a Rankine cycle fluid used to drive a turbine-generator set for producing electric power in some embodiments. Other uses of the steam are possible. The assemblage of the foregoing three heat exchangers may be referred to as a "stack."

Pressurizer 6380 maintains a predetermined pressure of the primary coolant fluid. The pressurizer is an all-welded pressure vessel mounted atop the steam generating vessel 6300 and engineered to maintain a liquid/gas interface (i.e. primary coolant water/inert gas) that operates to enable control of the primary coolant pressure in the steam generator. Pressurizer 6380 may be mounted directly on top of the steam generating vessel 6300 above the top tubesheet 6333*a* and hydraulically seals the vessel at the top end. The pressurizer 6380 is in fluid communication with the top tubesheet 6333*a* and primary coolant pooling above the tubesheet in the top distribution plenum 6391. The top head of the pressurizer 6390 may have a hemispherical or an ellipsoidal profile in cross section.

The pressurizer 6380 is an all-welded pressure vessel with an open flange at its bottom, a curved "false bottom" plate, and a combination of conical and cylindrical shell courses and a top head in the form of a surface of revolution.

In one embodiment, as shown, pressurizer 6380 has an open flange at its bottom and is removably mounted to the steam generating vessel 6300 via a bolted and flanged connection 6390 to provide access to the top tubesheet 6333*a* for maintenance, inspection, and/or repair of the tubes (e.g. plugging tubes, checking tubesheet-to-tube joints, etc.). The pressurizer 6380 in some embodiments includes a convexly curved false bottom plate 6412 that separates the turbulated primary flow underneath it in the top distribution plenum 6391 from the water mass in pressurizer space keeping the latter relatively quiescent (see, e.g. FIG. 78). Suitably located small holes or perforations in the false bottom plate 6412 provide for fluid communication between the water inventories in the two spaces.

Figure 87:
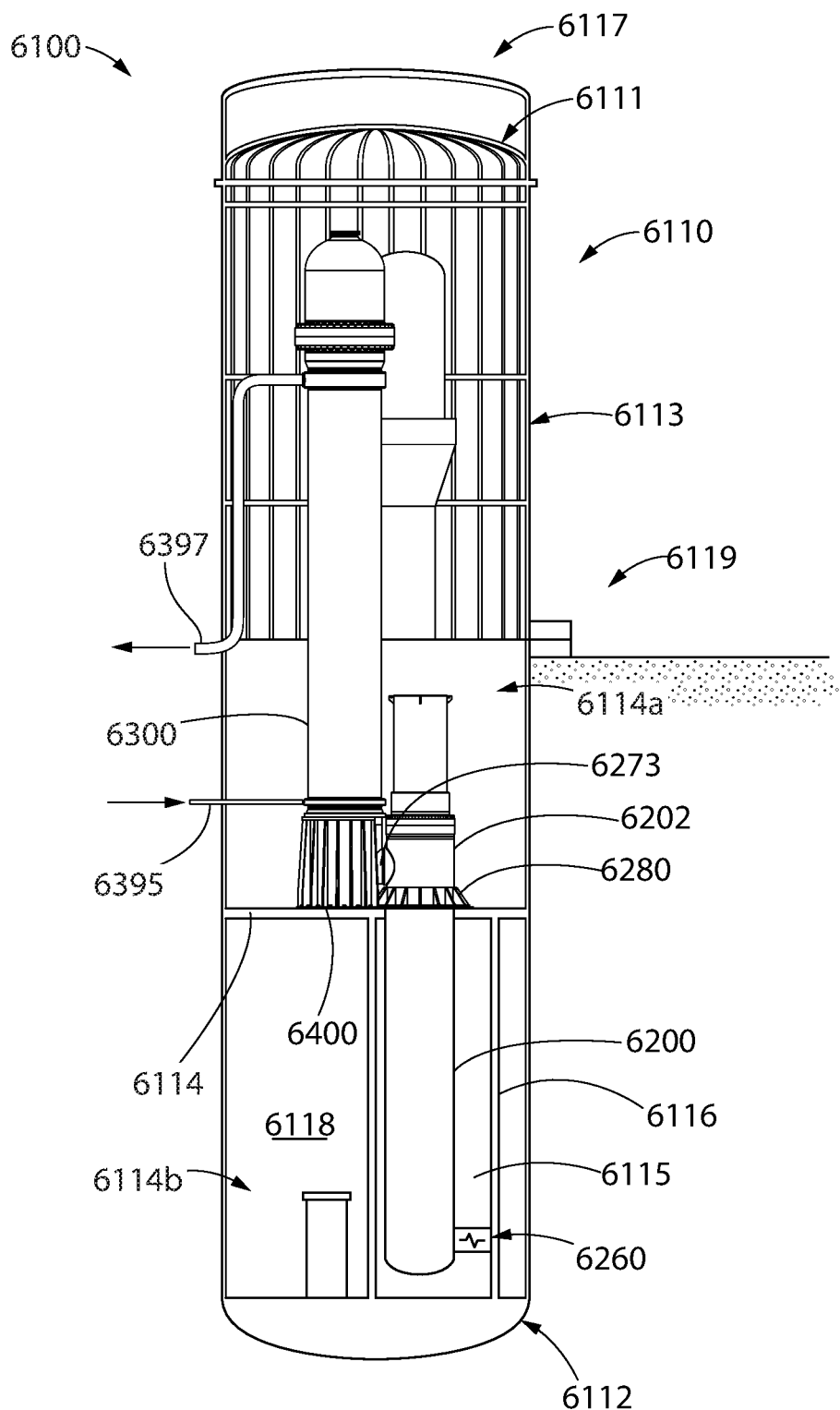
FIG. 87 is cross section of a containment vessel including a nuclear steam supply system according to the present disclosure which includes the steam generator assembly comprising the reactor vessel and steam generating vessel.

Referring to FIG. 87, reactor vessel 6200 and steam generating vessel 6300 may be housed in a containment vessel 6110. Containment vessel 6110 may be formed of a suitable shop-fabricated steel comprised of a top 6111, bottom 6112, and cylindrical sidewall 6113 extending therebetween. In some embodiments, portions of the containment vessel which may be located above ground level may be made of ductile ribbed steel to help withstand aircraft impact. A missile shield 6117 which is spaced above the top 6111 of the containment vessel 6110 may be provided as part of the containment vessel or a separate containment enclosure structure (not shown) which encloses the containment vessel 6110. A horizontal partition wall 6114 divides the containment vessel into an upper portion 6114*a* and a lower portion 6114*b*. Partition wall 6114 defines a floor in the containment vessel. In one embodiment, a majority of reactor vessel 6200 may be disposed in lower portion 6114*b* and steam generating vessel 6300 may be disposed in upper portion 6114*a* as shown. Partition wall 6114 may be formed of any suitable material, including without limitation for example concrete or metal.

In various embodiments, the containment vessel 6110 may be mounted above ground, partially below ground, or completely below ground. In certain embodiments, the containment vessel 6110 may be positioned so that at least part or all of lower portion 6114*b* that contains the nuclear fuel reactor core (i.e. fuel cartridge 6230) is located below ground level. In one embodiment, the entire reactor vessel 6200 and a portion of the steam generating vessel 6300 are located entirely below ground level for maximum security.

The cylindrical shell or sidewall 6113 of containment vessel 6110 may be horizontally split into an upper section and lower section which are joined together by a circumferential welded or bolted flanged joint 6119 as shown in FIG. 87 to provide a demarcation for portions of the containment vessel which are located essentially above and below ground level. In other embodiments, the upper and lower sections may be welded together without use of a flange.

In one embodiment, for example without limitation, the containment vessel 6110 may have a representative height of approximately 200 feet or more for a 160 MW (megawatt) modular nuclear electric generation facility. A non-limiting representative diameter for this power generation facility is about 45 feet. Any suitable height and diameter for the containment vessel may be provided depending on system component configuration and dimensions.

Containment vessel 6110 further includes a wet reactor well 6115 defined in one embodiment by a cylindrical circumscribing walled enclosure 6116 which is flooded with water to provide enhanced radiation shielding and a back-up reserve of readily accessible coolant for the reactor core. In one embodiment, the walled enclosure 6116 may be formed of stainless steel cylindrical walls which extend circumferentially around the reactor vessel 6200 as shown. Other suitable materials may be used to construct enclosure 6116. The wet reactor well 6115 is disposed in the lower portion 6114*b* of the containment vessel 6110. Lower portion 6114*b* may further include a flooded (i.e. water) used fuel pool 6118 adjacent to the enclosure 6116. In one embodiment, both the used fuel pool 6118 and walled enclosure 6116 are disposed below horizontal partition wall 6114 as shown in FIG. 77.

Both the reactor vessel 6200 and steam generating vessel 6300 preferably may be vertically oriented as shown to reduce the footprint and diameter of the containment vessel 6110. The containment vessel 6110 has a diameter large enough to house both the reactor vessel, steam generating vessel, and any other appurtenances. The containment vessel 6110 preferably has a height large enough to completely house the reactor vessel and steam generating vessel to provide a fully contained steam generator with exception of the water and steam inlet and outlet penetrations for second coolant loop fluid flow associated with the Rankine cycle for driving the turbine-generator set for producing electric power.

Figure 88:
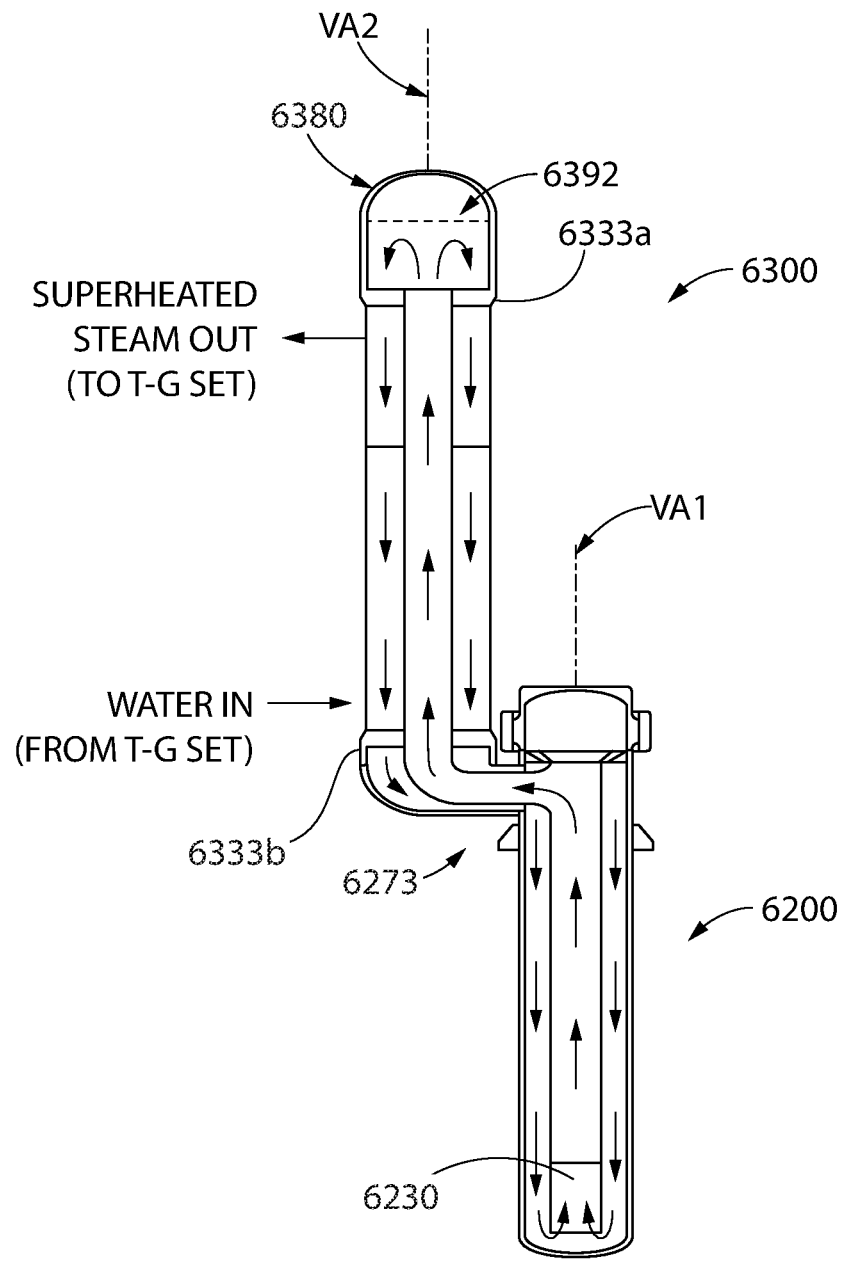
FIG. 88 is a schematic flow diagram of the nuclear steam supply system of FIG. 78 showing the closed flow path or circulation flow loop of primary coolant represented by the directional flow arrows.

FIG. 88 shows the circulation path of primary coolant (e.g. water) in the primary coolant flow loop (see directional arrows). In one embodiment, the primary coolant flow is gravity-driven relying on the change in temperature and corresponding density of the coolant as it is heated in the reactor vessel 6200, and then cooled in the steam generating vessel 6300 as heat is transferred to the secondary coolant loop of the Rankine cycle which drives the turbine-generator (T-G) set. The pressure head created by the changing different densities of the coolant (i.e. hot—lower density and cold—higher density) induces flow or circulation through the reactor vessel-steam generating vessel system as shown by the directional flow arrows. Advantageously, the gravity-driven primary coolant circulation requires no coolant pumps or machinery thereby resulting in cost (capital, operating, and maintenance) savings, reduced system power consumption thereby increasing energy conversion efficiency of the PWR system, in addition to other advantages as described herein.

Reactor Vessel

Reactor vessel 6200 may be similar to the reactor vessel with gravity-driven circulation system disclosed in commonly-owned U.S. patent application Ser. No. 13/577,163 filed Aug. 3, 2012, which is incorporated herein by reference in its entirety.

Figure 79:
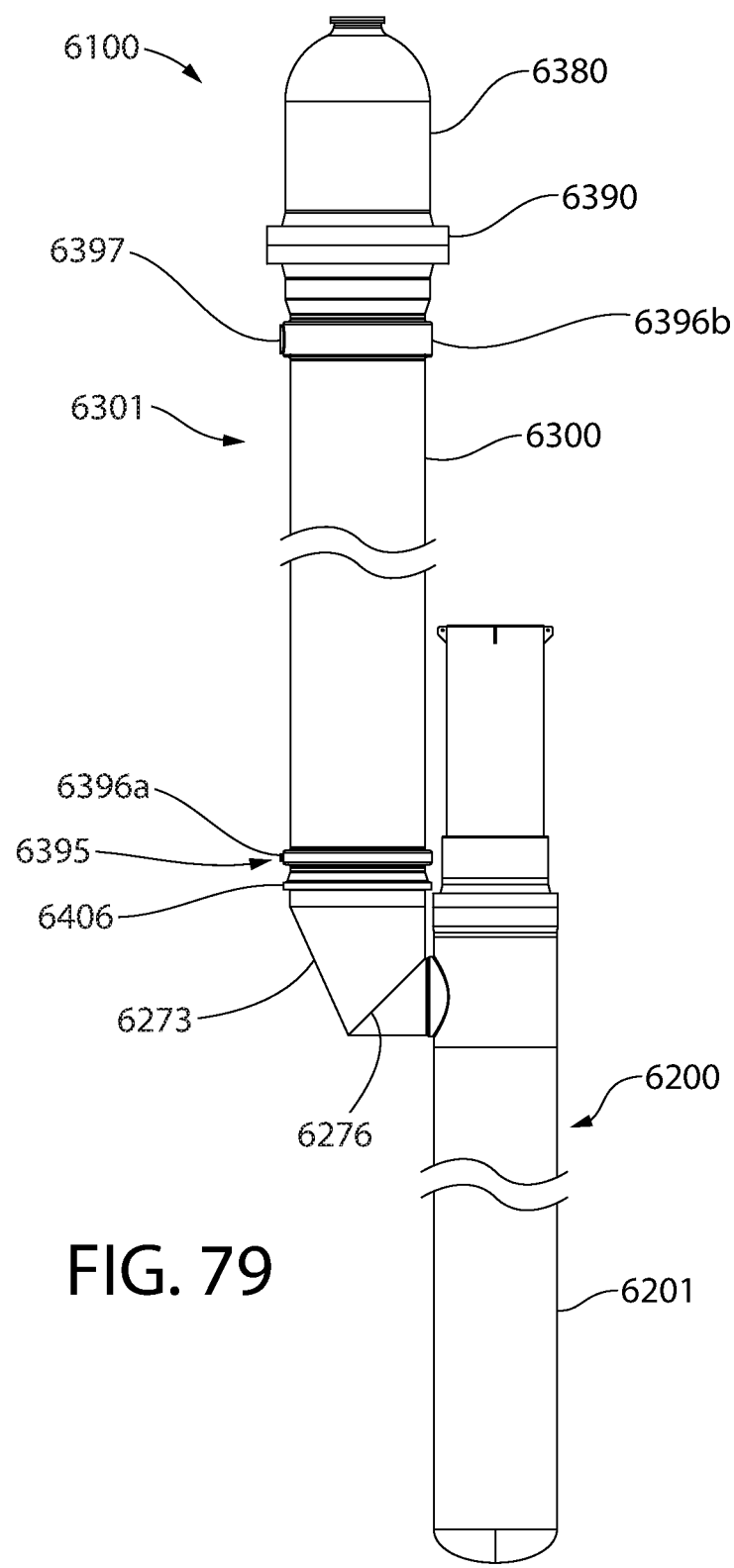
FIG. 79 is a side elevation view thereof; n elevation cross-sectional view of the reactor vessel of FIG. 77.

Referring to FIGS. 77-79, reactor vessel 6200 in one non-limiting embodiment is an ASME code Section III, Class 1 thick-walled cylindrical pressure vessel comprised of a cylindrical sidewall shell 6201 with an integrally welded hemispherical bottom head 6203 and a removable hemispherical top head 6202. Shell 6201 defines an internal cavity 6208 configured for holding the reactor core, reactor shroud, and other appurtenances as described herein. In one embodiment, the upper extremity of the reactor vessel shell 6201 may be equipped with a slightly tapered hub flange 6204 (also known as "welding neck" flange in the art) which is bolted to a similar mating flange 6205 welded to the top head 6202. The bolted connection of the top head 6202 provides ready access to the reactor vessel internals such as the reactor core.

Two concentric self-energizing gaskets 6206 compressed between the two mating flanges 6204, 6205 provide leak tightness of the reactor vessel 6200 at the connection between the top head 6202 and shell 6201. The leak tightness under operating conditions is assured by an axisymmetric heating of the flanged joint that is provided by the fluid flow arrangement of the primary coolant in the system, as further described herein. The top head 6202 may contain vertical penetrations 6207 for insertion of the control rods and further may serve as a base for mounting the associated control rod drives, both of which are not depicted but well known in the art without further elaboration.

With continuing reference to FIGS. 77-79, the reactor vessel 6200 includes a tubular cylindrical reactor shroud 6220 which contains the reactor core defined by fuel cartridge 6230. Reactor shroud 6220 transversely divides the shell portion of the reactor vessel into two concentrically arranged spaces: (1) an outer annulus 6221 defining an annular downcomer 6222 for primary coolant entering the reactor vessel which is formed between the outer surface of the reactor shroud and the inner surface of the shell 6201; and (2) an inner passageway 6223 defining a riser column 6224 for the primary coolant leaving the reactor vessel heated by fission in the reactor core. The reactor shroud 6220 is elongated and extends in an axial direction along vertical axis VA1 of the reactor vessel which defines a height and includes an open bottom 6225 and top 6226. In one embodiment, the bottom 6225 of reactor shroud 6220 is vertically spaced apart by a distance from the bottom head 6203 of reactor vessel 6200 and defines a bottom flow plenum 6228. Bottom flow plenum 6228 collects primary coolant from annular downcomer 6222 and directs the coolant flow into the inlet of the riser column 6224 formed by the open bottom 6225 of reactor shroud 6220 (see, e.g. FIG. 78). On the opposite top end, the top hub flange 6204 of reactor vessel 6200 ensures that the hot primary coolant water exiting the reactor vessel through outlet nozzle 6271 cannot flow back into the downcomer 6222 and mix with the incoming cooled primary coolant from the steam generator 6301.

Figure 86:
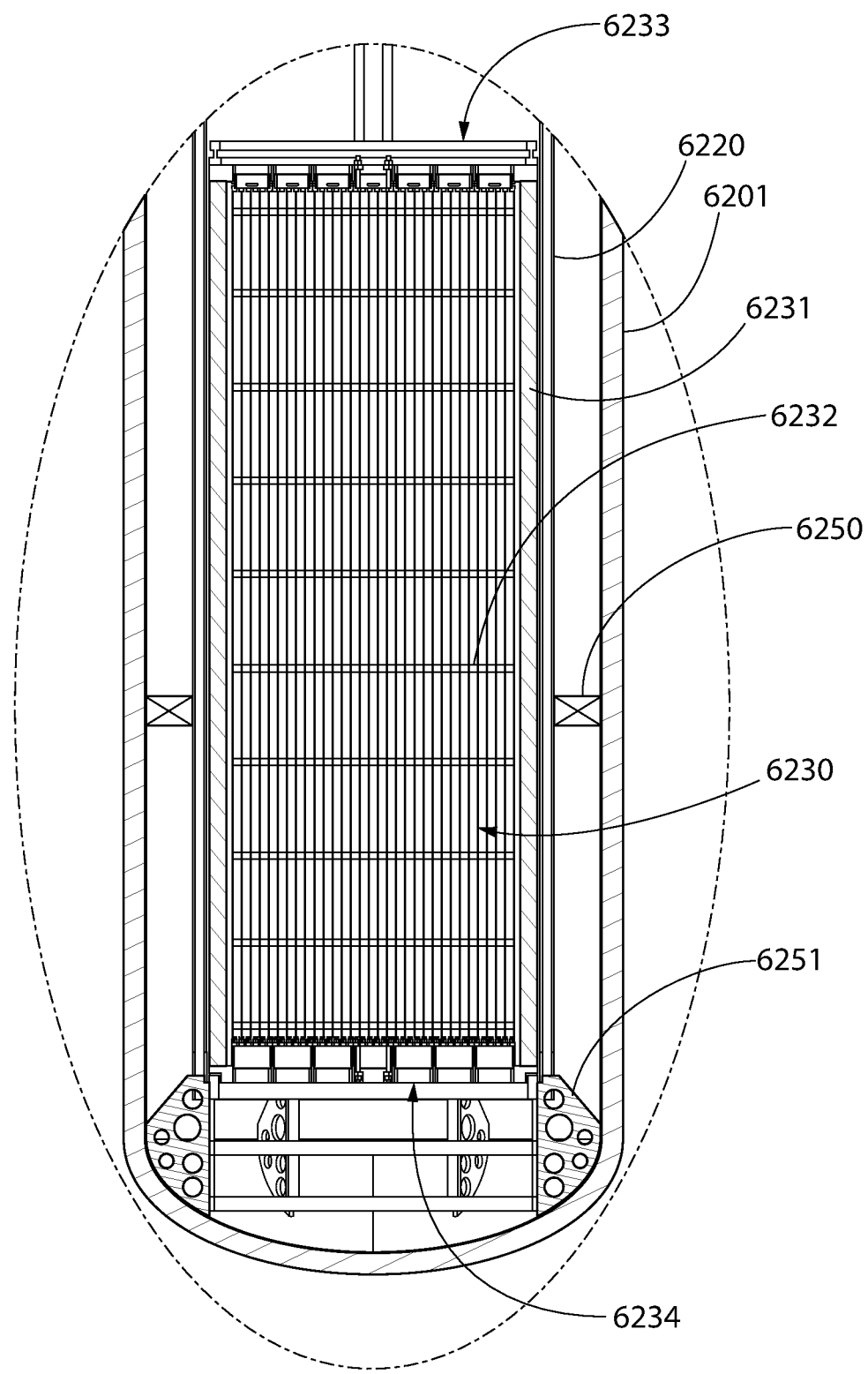
FIG. 86 is an enlarged detail from FIG. 78 showing the bottom of the reactor vessel and fuel core.

Both the fuel cartridge 6230 and reactor shroud 6220 are supported by a core support structure ("CSS"), which in one embodiment includes a plurality of lateral support members 6250 that span between and are attached to the reactor shroud and the shell 6201 of the reactor vessel 6200. Two support members 6250 are shown in FIG. 86 for brevity. A suitable number of supports members spaced both circumferentially and vertically apart are provided as needed to support the combined weight of the fuel cartridge 6230 and reactor shroud 6220. In one embodiment, the bottom of the reactor shroud 6220 is not directly attached to the reactor vessel 6200 to allow the shroud to grow thermally in a vertical axial direction (i.e. parallel to vertical axis VA1) without undue constraint. A plurality of circumferentially spaced apart flow baffles 6251 may be attached to the bottom of shroud 6220 which further support the dead weight of the shroud. Baffles 6251 are vertically oriented and have a shape configured to complement the curvature of the hemispherical bottom head 6203 of the reactor vessel 6200 as shown (see, e.g. FIG. 86) on which the baffles are seated. A plurality of lateral perforations 6252 may be provided in the baffles 6251 to aid in mixing the cooled primary coolant flow descending in the downcomer 6222 before rising to enter the fuel cartridge 6230.

The reactor shroud 6220 may be a single-walled open cylinder in one embodiment as shown. In an alternative construction, shroud 6220 may be a double-walled cylinder comprising two radially spaced apart single shells with a sealed air gap or insulating material therebetween. This double-wall construction of reactor shroud 6220 forms an insulated structure designed to retard the flow of heat across it and forms a smooth vertical riser column 6224 for upward flow of the primary coolant (i.e. water) heated by the fission in the fuel cartridge 6230 ("core"), which is preferably located at the bottom extremity and inside passageway 6224 of the shroud in one embodiment as shown in FIGS. 77-79. The reactor shroud 6220 is laterally supported by the reactor vessel by the lateral support members 6250 to prevent damage from mechanical flow-induced vibrations resulting in metal fatigue over a period of time. Shroud 6220 and other wetted parts of reactor vessel 6200 may be made of a corrosion resistant material, such as without limitation stainless steel. Other materials and/or corrosion resistant coatings may be used.

Referring to FIGS. 78 and 86, fuel cartridge 6230 in one embodiment is a unitary autonomous structure containing upright fuel assemblies, and is situated in a region of the reactor vessel 6200 that is spaced above bottom head 6203 so that a relatively deep plenum of water lies underneath the fuel cartridge. Fuel cartridge 6230 may be located inside reactor shroud 6230 at the bottom end of the shroud as shown. The fuel cartridge 6230 is insulated by reactor shroud 6220 so that a majority of the heat generated by the fission reaction in the nuclear fuel core is used in heating the primary coolant flowing through the fuel cartridge and adjoining upper portions of the riser column 6224. Fuel cartridge 6230 is an open cylindrical structure including cylindrically shaped sidewalls 6231, open top 6233, and open bottom 6234 to allow the primary coolant to flow upward completely through the cartridge (see directional flow arrows). In one embodiment, the sidewalls 6231 may be formed by multiple arcuate segments of reflectors which are joined together by suitable means. The open interior of the fuel cartridge 6230 is filled with a support grid 6232 for holding the nuclear fuel rods and for insertion of control rods into the core to control the fission reaction as needed.

Briefly, in operation, the hot reactor primary coolant exits the reactor vessel 6200 through a low flow resistance outlet nozzle 6270 to be cooled in the adjacent steam generating vessel 300 (see, e.g. FIGS. 78, 79, and 88). The cooled reactor primary coolant leaves the steam generating vessel 6300 and enters the reactor vessel 6200 through the inlet nozzle 6271. The internal plumbing and arrangement in the reactor vessel directs the cooled reactor coolant down through to the annular downcomer 6222. The height of the reactor vessel 6200 is preferably selected to support an adequate level of turbulence in the recirculating reactor primary coolant by virtue of the density differences in the hot and cold water columns which is commonly known as the thermo-siphon action (density difference driven flow) actuated by gravity. In one embodiment, the circulation of the reactor primary coolant is driven by over 8 psi pressure generated by the thermo-siphon action, which has been determined to ensure (with adequate margin) a thoroughly turbulent flow and stable hydraulic performance.

Figure 80:
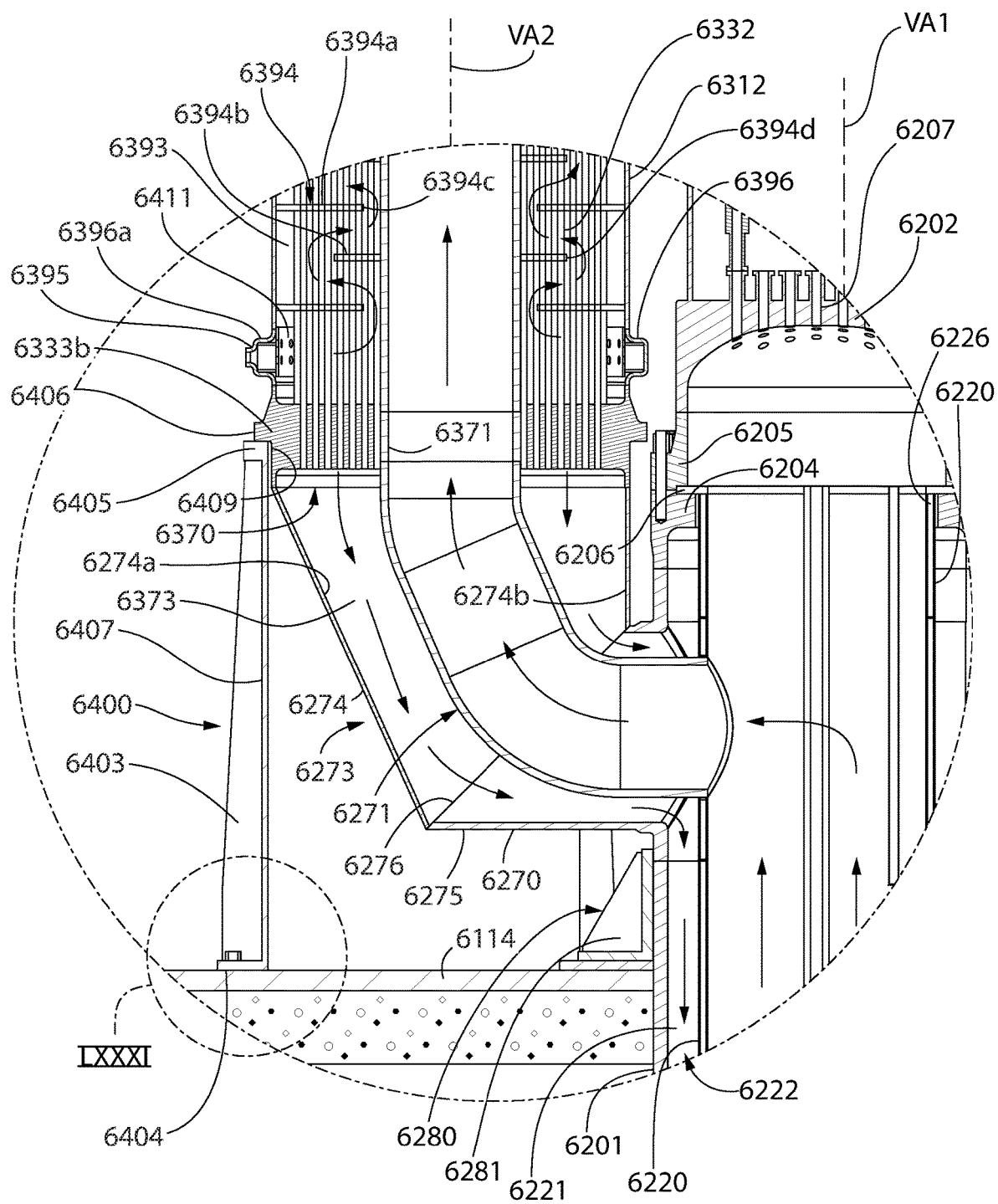
FIG. 80 is an enlarged detail from FIG. 78.

Referring to FIGS. 78 and 80, the top of the reactor vessel shell 6201 is welded to a massive upper support forging which may be referred to as a reactor support flange 6280. Support flange 6280 supports the weight of the reactor vessel 6200 and internal components above the wet reactor well 6115. In one embodiment, the support flange is structurally stiffened and reinforced by a plurality of lugs 6281 which are spaced circumferentially apart around the reactor vessel and welded to both the reactor vessel and flange, as shown. Support flange 6280 contacts and engages horizontal partition wall 6114 which transfers the dead weight of the reactor vessel 6200 to the containment vessel 6110. The reactor vessel's radial and axial thermal expansion (i.e. a majority of growth being primarily downwards from horizontal partition wall 6114) as the reactor heats up during operation is unconstrained. However, the portion of containment vessel 6110 which projects above partition wall 6114 is free to grow upwards in unison with the upwards growth of the steam generating vessel 6300 to minimize axial differential expansion between the steam generating vessel and reactor vessel. Because the reactor vessel and steam generating vessel are configured and structured to thermally grow in height at substantially the same rate when heated, this arrangement helps minimize potential thermal expansions stress in the primary coolant fluid coupling 6273 between the reactor vessel and steam generating vessel.

The support flange 6280 is spaced vertically downwards on reactor vessel shell 6201 by a distance from top head 6202 of reactor vessel 6200 sufficient to allow a fluid connection to be made to the steam generating vessel 6300 which is above partition wall 6114, as shown in FIGS. 78 and 87. When the reactor vessel 6200 is mounted inside containment vessel 6110, top head 6202 of the reactor vessel and the primary coolant fluid coupling 6273 (collectively formed by combined inlet-outlet flow nozzle 6270/6271) are located above reactor well 6115. This provides a location for connection to the steam generator plenums and for the engineered safety systems (e.g. control rods, etc.) to deal with various postulated accident scenarios. A majority of the reactor vessel shell 6201, however, may be disposed below partition wall 6114 and immersed in the wet reactor well 6115 as shown in FIG. 87.

The bottom region of the reactor vessel 6200 is restrained by a lateral seismic restraint system which may be comprised of a plurality of circumferentially and vertically spaced apart lateral restraint members 6260 (one of which is shown schematically in FIG. 87 for brevity). Restraint members 6260 span the space between the reactor shell 6201 and the reactor well 6115 inside surface of the cylindrical enclosure 6116 to withstand seismic events. The seismic restraint design is configured to allow for free axial (i.e. longitudinal along vertical axis VA1) and diametrical thermal expansion of the reactor vessel 6200. The reactor well 6115 is flooded during power operations to provide defense-in-depth against a (hypothetical, non-mechanistic) accident that is assumed to produce a rapid rise in the enthalpy of the reactor's contents. Because the reactor is designed to prevent loss of core water by leaks or breaks and the reactor well is flooded, burn-through of the reactor vessel by molten fuel (corium) is not likely.

Referring to 78-80, the reactor vessel combined inlet-outlet flow nozzle 6270/6271 (primary coolant fluid coupling 6273) is comprised of two concentric flow conduits including an outer inlet nozzle 6270 and inner outlet nozzle 6271. The outlet nozzle 6271 has one end welded to the reactor shroud 6220 (internal to the reactor vessel shell 6201) and an opposite end welded to the inlet nozzle 6371 of the steam generating vessel 6300 (at the bottom of riser pipe 6337). The reactor vessel inlet nozzle 6270 has one end welded to the reactor vessel shell 6201 and an opposite end welded to steam generator outlet nozzle 6370 defined at least in part by the bottom tubesheet 6333*b* of the steam generating vessel 6300. Accordingly, reactor vessel inlet nozzle 6270 is essentially welded to the perimeter of bottom tubesheet 6333*b* of the steam generator 6301 (best shown in FIG. 80).

It should be noted that the inlet nozzle 6371 of the steam generating vessel 6300 and riser pipe 6337 are contiguous in structure. The inlet nozzle 6371 is further contiguous with the outlet nozzle 6271 of the reactor vessel. Accordingly, the riser pipe 6337 may also be viewed from one perspective as physically extending and fluidly connected directly to the internal shroud 6220 of the reactor vessel as a single flow conduit in lieu of three separate flow conduit sections. In one embodiment, therefore, the riser pipe 6337 may have a constant diameter including portions which are considered to form the primary coolant inlet nozzle 6371 and reactor vessel outlet nozzle 6271.

An annular bottom collection plenum 6373 is formed between the inlet and outlet nozzles 6270, 6271 of primary coolant fluid coupling 6273 below the bottom tubesheet 6333*b* (see, e.g. FIG. 80). Collection plenum 6373 serves to collect the cooled primary coolant exiting the bottom ends of the tubes 6332 through the bottom tubesheet 6333*b* which flows back to the reactor vessel 6200 through inlet nozzle 6270 into the annular downcomer 6222.

In the present embodiment, the outlet nozzle 6271 of the reactor vessel and inlet nozzle 6371 of the steam generating vessel each have a smaller diameter than the inlet nozzle 6270 of the reactor vessel and outlet nozzle 6370 of the steam generating vessel. The combined inlet-outlet flow nozzle 6270/6271 is located above partition wall 6114 of the containment vessel 6110. The inlet nozzle 6371 and outlet nozzle 6370 of the steam generating vessel 6300 collectively define a mating concentrically arranged combined primary coolant inlet/outlet nozzle 6371/6370 for the steam generating vessel.

In one embodiment, the inlet flow nozzle 6270 and outlet flow nozzle 6271 of the reactor vessel 6200 are configured as 90 degree flow conduits or elbows as shown. This allows extremely close horizontal spacing of the reactor vessel and steam generator shells due to the closely coupled primary coolant combined inlet-outlet flow nozzle 6270/6271 to the steam generator, thereby eliminating a straight horizontal section of piping between the reactor vessel and steam generator. Advantageously, such close coupling of the reactor vessel 6200 and steam generator vessel 6300 avoids need for long loops of large piping in the reactor primary coolant which creates the potential for a "large break" Loss of Coolant Accident (LOCA) event.

Close coupling of the reactor vessel 6200 and steam generating vessel 6300 are achieved by the minimal radial projection of the combined inlet-outlet flow nozzle 6270/ 6271 beyond the reactor vessel shell. The total horizontal length of the inlet/outlet nozzle connection between the reactor vessel 6200 and steam generating vessel 6300 in certain embodiment is less than or equal to the diameter of the reactor vessel 6200, and/or the steam generating vessel 6300 to eliminate long runs of large coolant piping between the reactor and steam generating vessels. Concomitantly, the vertical centerline VA2 of the steam generating vessel 6300 may be less than two steam generator diameters apart horizontally from the vertical centerline VA1 of the reactor vessel 6200 in some embodiments.

To achieve the closest possible coupling of the reactor vessel 6200 and steam generating vessel 6300, the outer reactor vessel inlet nozzle 6270 of the primary coolant fluid coupling 6273 may be a mitered 90 degree elbow or bend comprising an eccentric cone section 6274 joined to a short horizontal stub pipe section 6275 using a miter joint 6276 (best shown in FIG. 80). The miter joint 6276 minimizes the lateral distance between the reactor vessel 6200 and steam generating vessel 6300. Miter joint 6276 is disposed an angle between 0 and 90 degrees (e.g. about 30-60 degrees in some embodiments) with respect to the horizontal plane at the joint. The stub pipe section 6275 is disposed at a 90 degree angle to the eccentric cone section 6274. The outer reactor vessel inlet nozzle 6270 therefore forms an asymmetrically-shaped outer flow jacket which surrounds the inner reactor vessel outlet nozzle 6271 as shown.

The eccentric cone section 6274 has a circular cross section and inside diameter which varies (i.e. narrows) from its inlet end at steam generator outlet nozzle 6370 adjacent bottom tubesheet 6333*b* to the stub pipe section 6275. Cone section 6274 is formed by a straight inner sidewall 6274*b* and an opposing inclined sidewall 6274*a* which is angled with respect to the inner sidewall as shown in FIG. 80. The outlet end of the eccentric cone section at the miter joint 6276 has a circular cross section as does the inlet to the stub pipe section 6275 which is coupled to the reactor vessel wall 6201 (e.g. welded).

Steam Generator

The steam generator 6301 will now be described in further detail. Referring to FIGS. 77-85, the steam generating vessel 6300 in one embodiment may a vertically oriented and elongated structure which defines a vertical axis VA2. In one embodiment, the vertical axis VA2 of the steam generating vessel is horizontally offset from the vertical axis VA2 of the reactor vessel 6200 so that the steam generating vessel is arranged laterally adjacent to the reactor vessel. In one embodiment, the steam generating vessel 6300 has a height which is at least as high as the height of the reactor vessel 6200 to achieve the thermo-hydraulic conditions necessary to induce gravity-driven primary coolant circulation through the steam generating vessel 6300 and reactor vessel 6200.

Structurally, steam generating vessel 6300 includes a top 6310, bottom 6311, and a vertically extending hollow cylindrical shell 6312 extending therebetween which defines an internal cavity 6393 for holding a plurality of heat exchange components. Steam generating vessel 6300 further includes a top tubesheet 6333*a*, bottom tubesheet 6333*b*, a plurality of heat transfer tubes 6332 extending vertically between the tubesheets, an internal riser pipe 6337, and pressurizer 6380 disposed on the top 6310 of the vessel. The top and bottom tubesheets 6333*a*, 6333*b* are circular in top plan view and of suitable thickness to withstand the operating pressure within the steam generating vessel 6300 without undue deformation which could adversely affect the integrity of the joints between the tubes 6332 and tubesheets. In one embodiment, the bottom tubesheet 6333*b* may have a convexly rounded top so that any debris accumulating within the steam generating vessel 6300 settles to the outside perimeter of the tubesheet inside the shell 6312. The tubesheets are preferably formed a thick corrosion resistant steel such as stainless steel in one embodiment.

In one embodiment, riser pipe 6337 is concentrically aligned with shell 6312 and lies on the vertical axis VA2 of the vessel. The tubes 6332 are circumferentially arranged around the outside of the riser pipe 6337 in any suitable pattern between the riser pipe and shell 6312 of steam generating vessel 6300.

In one embodiment, the tubes 6332 of the steam generating vessel 6300 may define three heat transfer zones arranged vertically for converting secondary coolant feedwater entering the bottom of the vessel from a liquid phase to a steam phase exiting the top of the vessel. In one embodiment, the steam phase is superheated steam. The three heat transfer zones may include (from bottom up) a preheater section 6320 for initial heating of the liquid secondary coolant, main steam generator section 6330 which serves as the boiler for heating the secondary coolant to the boiling point temperature where it changes phase to steam, and superheater section 6350 for heating the steam to superheated conditions. In certain arrangements and configurations of the steam generator 6300, the preheater 6320 may be omitted depending on the thermo-hydraulic design of the system.

The preheater section 6320, steam generator section 6330, and superheater section 6350 are tubular heat exchangers each including a plurality of parallel straight tubes 6332 (i.e. tube bundles) with the top and bottom tubesheets 6333*a*, 6333*b* disposed at the uppermost and lowermost extremities or ends of each tube 6332. In one embodiment, the tube bundles are contiguous in structure from top to bottom so that there are no intermediate structures formed between the three different heat transfer sections on the tubeside. Primary coolant therefore flows downwards through each of the tubes 6332 which have a continuous structure and height from the top tubesheet 6333*a* to bottom tubesheet 6333*b*. The preheater section 6320, steam generator section 6330, and superheater section 6350 therefore are defined by the phase of the secondary coolant within the three different heat transfer zones as the feedwater changes phase from a liquid state entering the steam generating vessel 6300 at the bottom to steam exiting from the top of the vessel. The internal cavity 6393 of the steam generating vessel 6300 may be contiguous and open between the tubesheets 6333*a* and 6333*b* on the shell side of the steam generating vessel 6300 without any intermediate structures which may interrupt the upward flow of secondary coolant.

The preheater 6320, steam generator 6330, and superheater 6350 are configured to form a parallel counter-flow type heat exchanger arrangement in which the secondary coolant (Rankine cycle) flows in an opposite, but parallel direction to the reactor primary coolant (see, e.g. 80, 81, and 85B).

In a certain embodiment, the preheater section 6320 may be configured to provide a combination of parallel counter-flow and cross-flow of the secondary coolant with respect to the primary coolant flow via the provision of flow baffles 6394 on the shell side of the steam generating vessel 6300. Referring to FIGS. 80, 83B, and 85B, two different configurations and sizes of baffle plates may be provided comprising a circular outer baffle 6394*a* attached to steam generator shell 6312 and having a central opening 6394*c*, and a circular inner baffle 6394*b* attached to riser pipe 6337 and having a central opening 6394*d*. Outer baffle 6394*a* has a central opening 6394*c* (i.e. circular) with a diameter larger than the diameter of the riser pipe 6337 forming a lateral outside gap between the riser pipe and baffle, and an outside diameter slightly smaller than the inside diameter of the shell 6312 for attachment thereto. Inner baffle 6394*b* has a central opening 6394*d* with a diameter slightly larger than the riser pipe 6337 for attachment thereto, and an outside diameter smaller than the inside diameter of the steam generator shell 6312 forming a lateral outside gap between the outer baffle. This arrangement advantageously causes the secondary coolant to flow through the preheater section 6320 in the circuitous path shown (see directional flow arrows in FIG. 80) which maximizes contact time and heat transfer between the tubes 6332 heated on the tube side by the primary coolant and the secondary coolant feedwater flowing on the shell side of the steam generating vessel 6300. The inner and outer baffles 6394*b*, 6394*a* are arranged in an alternating pattern in the vertical direction to produce a combination of a perpendicular cross-flow pattern and parallel counter-flow pattern of the liquid secondary coolant with respect to the primary coolant through the preheater section 6320 (see, e.g. directional arrows FIGS. 80 and 85B). The baffle plates 6394*a*, 6394*c* in the shell side space are therefore shaped to promote a combination of either radially symmetric cross flow or axially symmetric longitudinal flow of the shell side fluid.

In certain embodiments, the steam generator section 6330 and/or superheater section 6350 may include baffles similar to baffles 6394*a* and 6394*b* shown in FIGS. 80, 83B, and 85B. The tube support system (baffles) in each zone is configured to promote radially symmetric flow. Radially symmetric flow fields are desired to prevent bowing or bending of the steam generator shell 6312 from circumferential thermal gradients.

Figure 85:
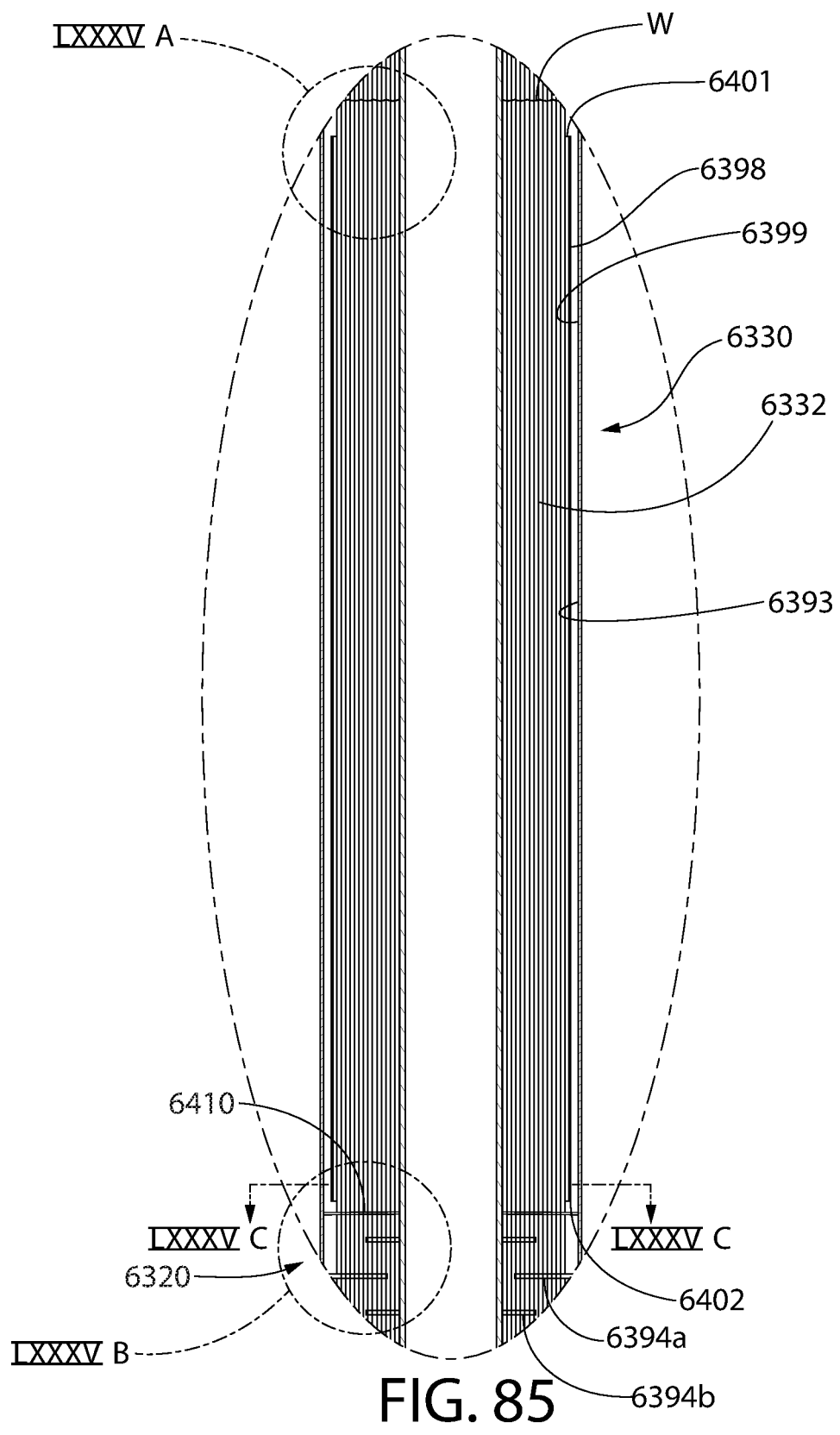
FIG. 85 is an enlarged detail from FIG. 83B showing primarily the steam generator section of the steam generator.
Figure 85B:
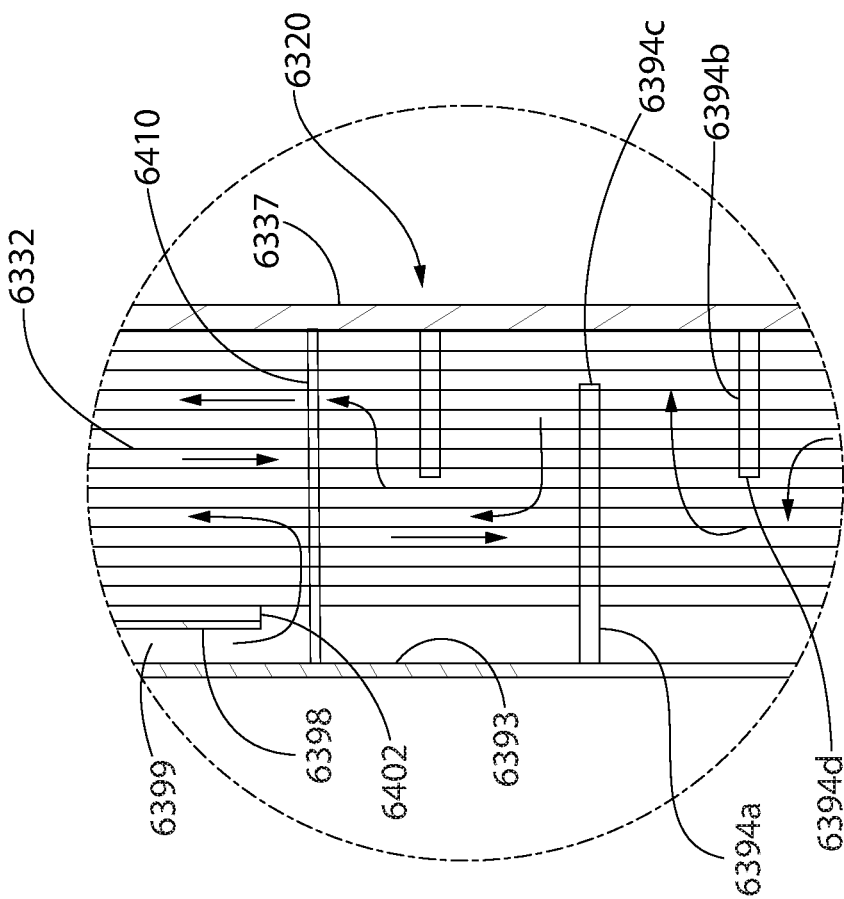
FIG. 85B is an enlarged detail from FIG. 85.
Figure 85A:
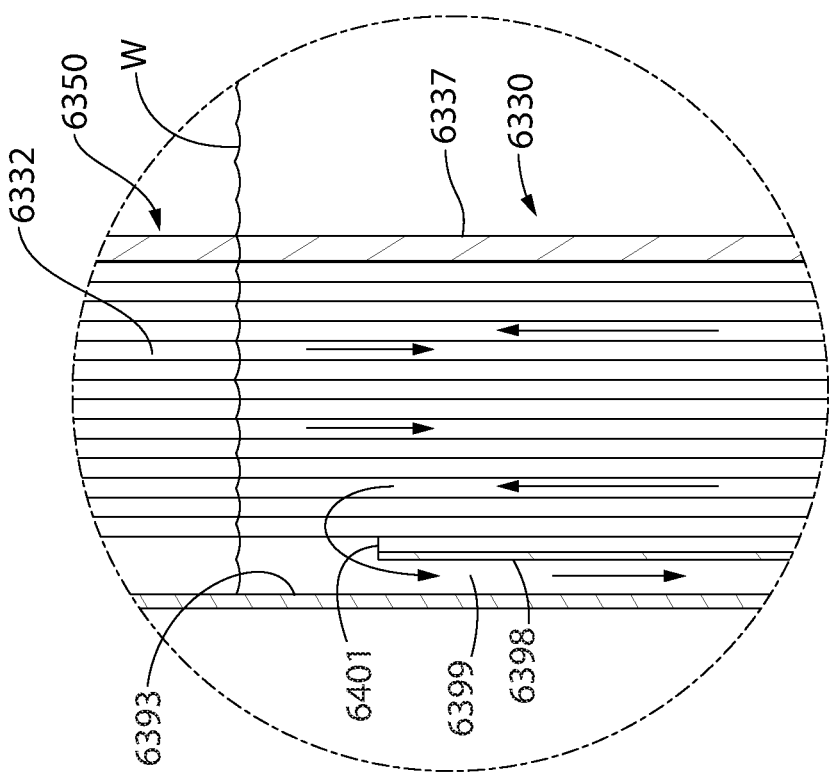
FIG. 85A is an enlarged detail from FIG. 85.
Figure 85C:
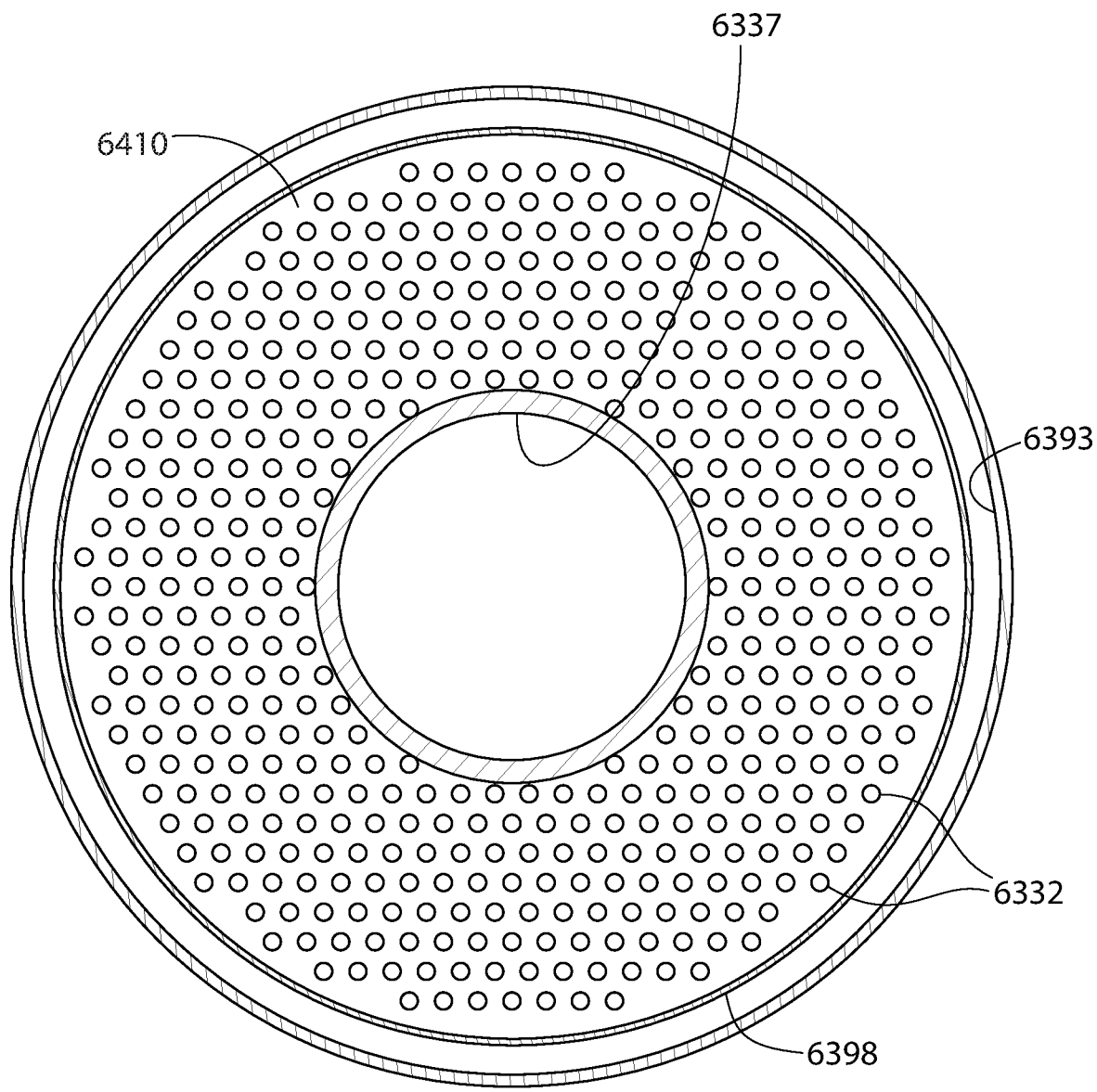
FIG. 85C is a cross-sectional view from FIG. 85.

Referring to FIGS. 85, 85B, and 85C, the interface between the preheater and the steam generator section 6320, 6330 zones in one embodiment may be demarcated by a relatively thick interface plate 6410 which has a plurality of drilled and polished holes to form an extremely tight fit around the tubes (e.g. radial gap to the tube less than 1/64 inch). In other configurations, the interface plate may be omitted.

Both the bottom tubesheet 6333*b* and the interface plate 6410 may have slightly convex top surfaces so that any contaminants or debris produced by boiling the secondary coolant that may tend to settle on them are swept to the outer periphery of the steam generating vessel 6300 from which they can be evacuated through suitably sized "blow down" openings in the steam generator shell 6312 (not shown) periodically.

The foregoing tubular heat exchangers (i.e. preheater, steam generator, and superheater) are hydraulically connected in series on both the tube side (reactor primary coolant) and the shellside (the secondary coolant forming the working fluid of the Rankine Cycle which changes phase from liquid to superheated gas).

Figure 83A:
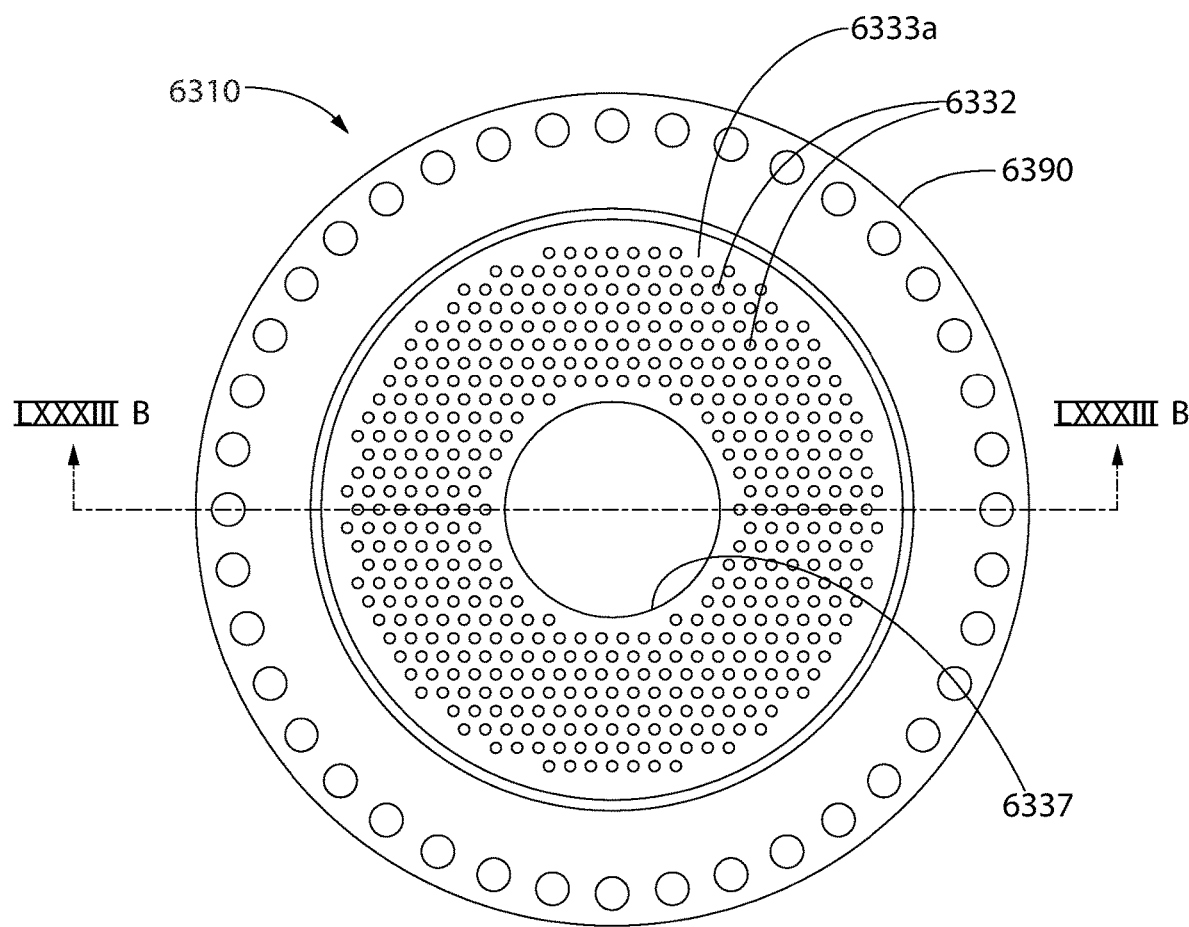
FIG. 83A is a top plan view of the steam generator with pressurizer removed.
Figure 83B:
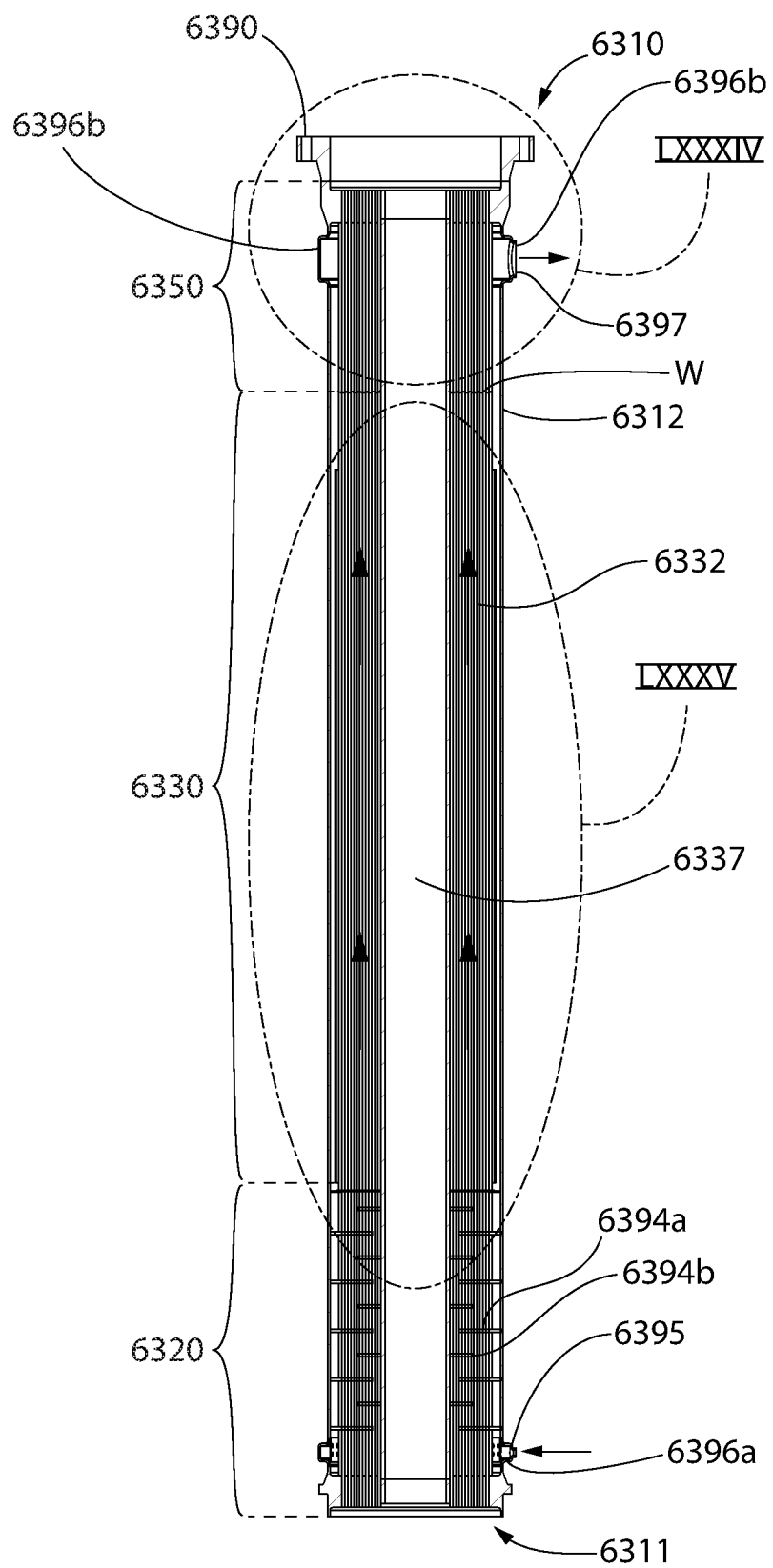
FIG. 83B is a side cross-sectional view thereof.

The top 6310 of the steam generating vessel 6300 may be terminated with flanged connection 6390 which couples the pressurizer 6380 to the vessel (see, e.g. FIGS. 83A, 7B, and 8). The bottom tubesheet 6333*b* forms the bottom 6311 of steam generating vessel 6300 and is directly connected to the steam generating vessel shell 6312 (see, e.g. FIG. 80).

Pressurizer 6380 is mounted to top 6310 of steam generating vessel 6300 and is in fluid communication with both the top or outlet of riser pipe 6337 and the inlet to superheater tubes 6332. Pressurizer 6380 which features a cylindrically-curved shell of revolution includes internal features to maintain a quiescent mass of water therein while ensuring a communicable relationship with the primary coolant water coursing through the top of the steam generating vessel 6300 in the top distribution plenum 6391 (see, e.g. FIG. 78). The pressurizer 6380 has conventional electric heaters and spray nozzles to control primary coolant pressure. The pressurizer 6380 may therefore generally include a heating/quenching element (i.e. water/steam) for pressure control of the reactor primary coolant. The element is comprised of a bank of electric heaters which are installed in the pressurizer section that serve to increase the pressure by boiling some of the primary coolant and creating a steam bubble that resides at the top of the pressurizer near the head (above the liquid/gas interface 6392 of the primary coolant). A water spray column is located near the top head of the pressurizer which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 6380 and heating/quenching element 6381 may be without limitation about 2,250 psi. In alternative embodiments, a liquid/gas interface may be formed between an inert gas, such as nitrogen (N2) supplied by supply tanks connected to the pressurizer 6380, and the liquid primary coolant.

The pressurizer 6380 defines a top distribution plenum 6391 which collects reactor primary coolant rising through riser pipe 6337 and distributes the primary coolant to the inlet of each of the tubes 6332 penetrating the top tubesheet 6333*a*. Plenum 6391 resides above the top tubesheet 6333*a* within the pressurizer forming a liquid reserve of primary coolant. Top tubesheet 6333*a* may be recessed below the top 6310 of steam generating vessel 6300 (best shown in FIG. 84) to facilitate formation of the plenum. The depth of the plenum 6391 may vary depending on the exact location of the liquid/gas interface 6392; however, the depth of primary coolant in the plenum is preferably sufficient to cover the tubes 6332 and tubesheet 6333*a* and evenly distribute the primary coolant from the riser pipe 6337 to the inlet ends of each of the tubes 6332 penetrating the tubesheet.

Referring to FIGS. 77, 80, and 83A-85C, steam generating vessel 6300 includes a secondary coolant inlet nozzle 6395 which is fluidly connected to steam generator shell 6312 for introducing liquid secondary coolant feedwater into the bottom of the preheater section 6320. In one embodiment, the inlet nozzle 6395 may be attached to shell 6312 at one of two radially projecting expansion joints 6396*a*, 6396*b* formed integrally with the shell in the preheater section 6320 as best shown in FIG. 80. The expansion joints may have a box-like configuration in cross-section as shown and encircle the shell 6312 of the steam generating vessel 6300 for accommodating thermal growth in length/height of the steam generating vessel 6300. The risk of high tube stresses due to differential expansion between the tubes 6332 and the steam generator shell 6312 advantageously is mitigated by the flanged and flued expansion joints 6396*a*, 6396*b* located near the top and bottom tubesheets 6333*a*, 6333*b*.

Figure 84:
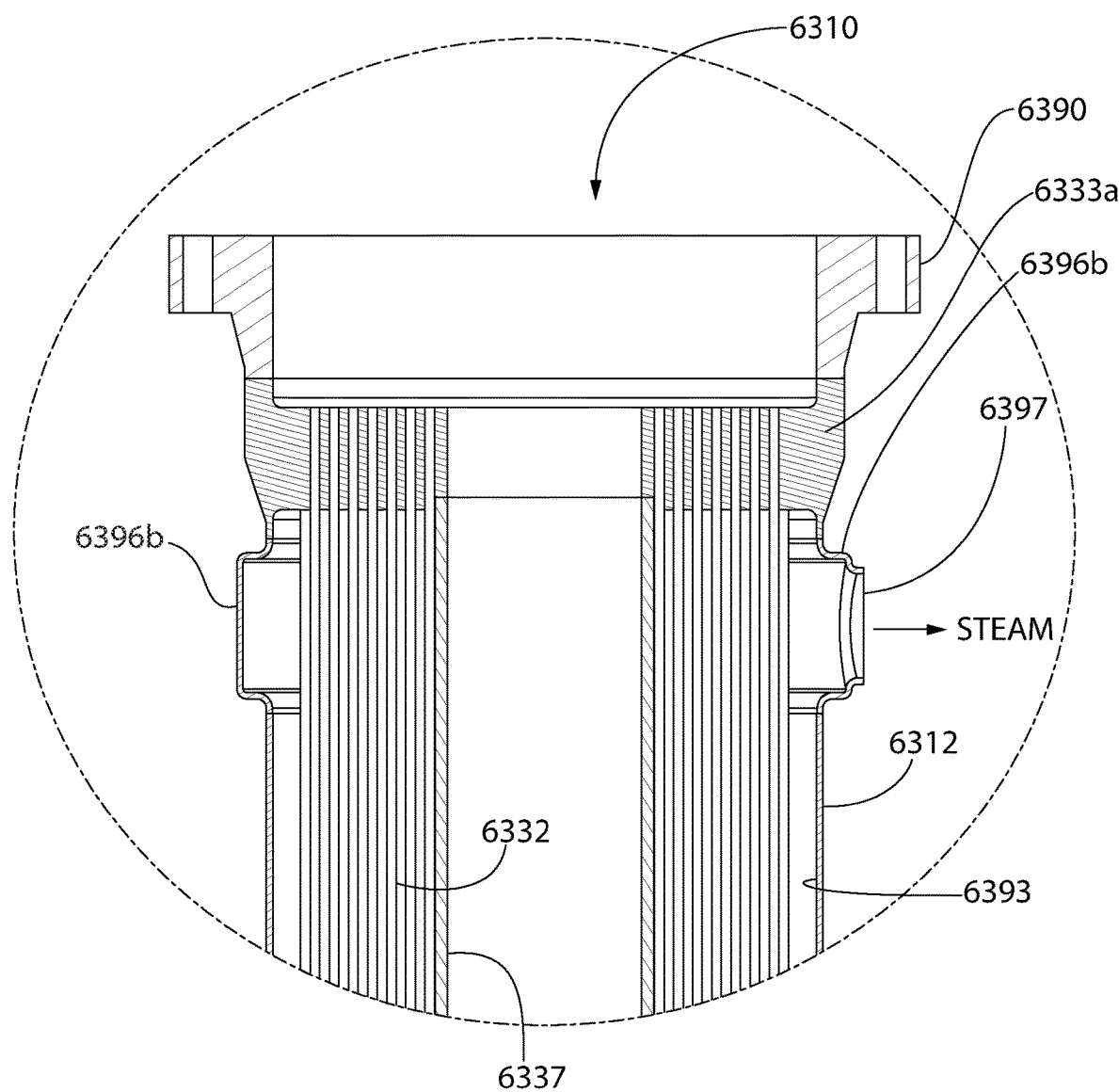
FIG. 84 is an enlarged detail from FIG. 83B showing the top of the steam generator and upper portion of the superheater section.

Steam generating vessel 6300 also includes a secondary coolant outlet nozzle 6397 which is fluidly connected to steam generator shell 6312 for withdrawing secondary coolant superheated steam from the superheater section 6350. In one embodiment, the outlet nozzle 6397 may be attached to shell 6312 at the second radially projecting expansion joints 6396*b* formed integrally with the shell in the superheater section 6350 as best shown in FIG. 84.

Although steam generator 6301 includes straight heat transfer tubes 6332, the steam generator vessel 6300 may be configured to form a recirculating type steam generator. Referring to FIGS. 78 and 83A-85C, the steam generator section 6330 in one embodiment of a steam generator 6301 includes a tubular recirculation shroud 6398 having a diameter smaller than the inside diameter of the steam generator vessel shell 6312 forming an annular downcomer 6399 between the shell and shroud for recirculating liquid secondary coolant. The bundle of heat transfer tubes 6332 is disposed inside the shroud 6398. The top 6401 of the shroud is spaced below the water level W in the steam generator 6301 forming the steam-liquid interface at the superheater section 6350 of the tube bundle (see, e.g. FIG. 85A). Accordingly, the shroud 6398 is wetted at all times during normal operation of the steam generator. The water level W may be maintained within a narrow range by a conventional level controller (not shown) such that the shroud 6398 in the steam generator section 6330 is submerged in water (primary coolant) at all times. The heat transfer surfaces, and flow areas are sized such that the re-circulation ratio (ratio of the re-circulation flow rate to the steam generation rate) is approximately 5 in one non-limiting embodiment. On the opposite end, the bottom 6402 of the recirculation shroud is disposed above and proximate to the top of the preheater section 6320 of the tube bundle above the interface plate 6410 (see, e.g. FIG. 85B).

In operation, liquid secondary coolant flows upward on the shell side inside the shroud 6398 towards the water lever W as it is heated by the tubes 6332 (primary coolant flowing downwards therein on the tube side). The fluid rises as it becomes less dense from heating and boils producing steam. The reserve of secondary coolant not converted into steam cools further and flows radially outwards into the top of the annular downcomer 6399 and flows downward towards the preheater section 6320. The secondary coolant in the downcomer 6399 then reverses direction and re-enters the bottom of the shroud mixing and flowing upwards again with the secondary coolant leaving the preheater section 6320 to complete the recirculation flow loop.

Figure 81:
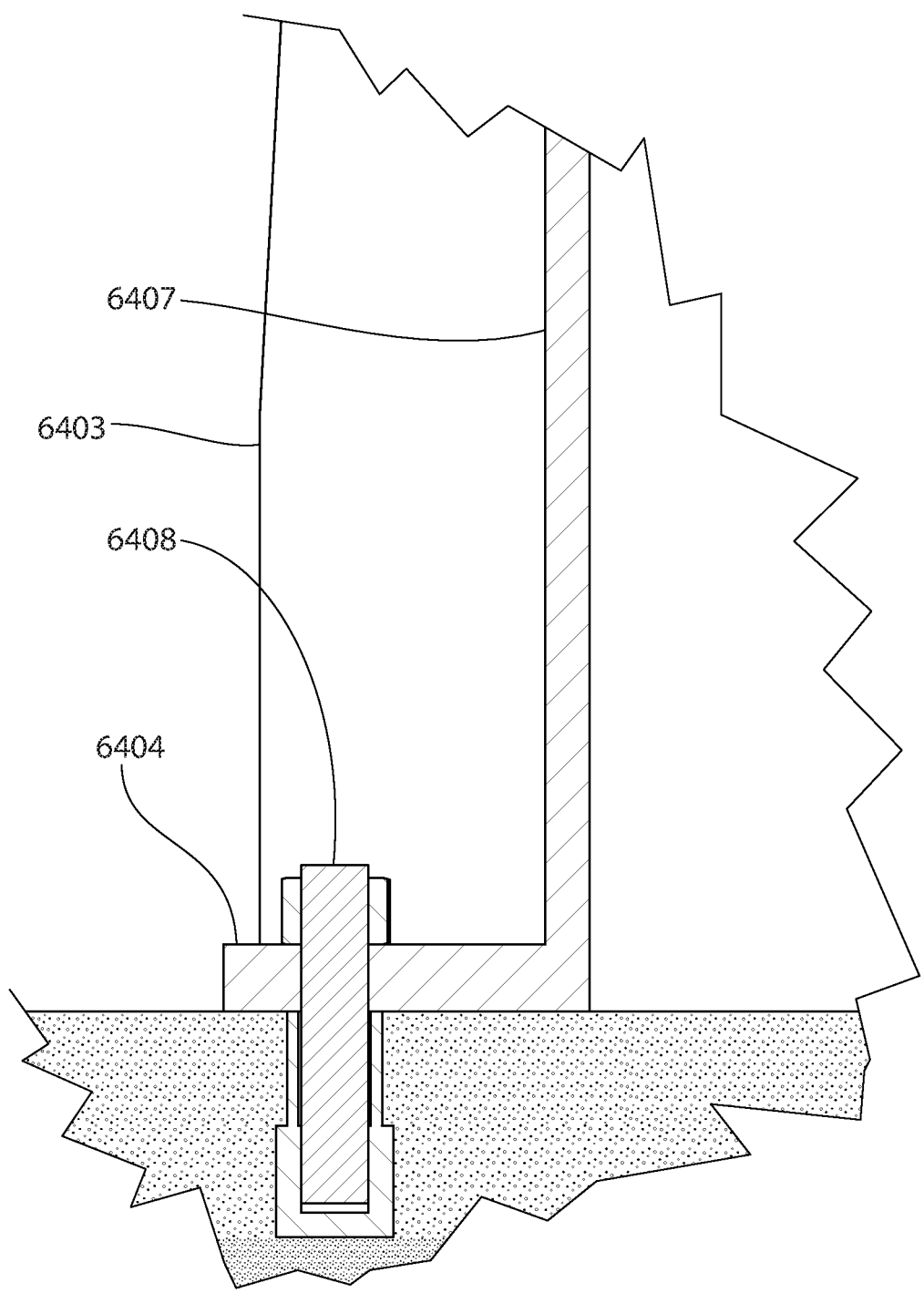
FIG. 81 is an enlarged detail from FIG. 80.

The steam generating vessel 6200 may be supported by a gusseted cylindrical flanged support skirt 6400. FIGS. 80 and 81 show the support skirt in greater detail. The support skirt 6400 is attached to the bottom 6311 of the steam generator vessel 6300 in one arrangement. Support skirt 6400 is structurally robust and may have a double-flanged arrangement comprising a radially projecting top bearing flange 6405, radially projecting bottom base flange 6404, and a circumferentially extending vertical wall 6407 extending between the flanges. Wall 6407 forms a circular enclosure (in transverse cross section) at least partially or fully surrounding the primary coolant fluid coupling 6273 as shown. In various configurations, the support skirt 6400 may be circumferentially continuous for 6360 degrees or extend circumferentially less than 6360 degrees.

The bearing flange 6405 and base flange 6404 are diametrically enlarged with respect to the wall 6407 thereby projecting beyond the wall. Base flange 6404 is configured for seating on and attachment to divider wall 6114 of the containment vessel 6110 to transfer the dead weight of the steam generator 6301 to the vessel (see also FIG. 87). Base flange 6404 may be attached to divider wall 6114 by any suitable means. In one embodiment, the base 6404 may be attached with bolting such as a plurality of anchor bolts 6408 spaced circumferentially apart. The base flange 6404 and vertical wall 6407 form an angled flanged arrangement.

In one embodiment, the bottom tubesheet 6333b includes a diametrically enlarged and radially projecting flange 6406 which is configured and dimensioned to engage the top bearing flange 6405 of the support skirt 6400. Flange 6406 is an integral unitary structural part of the tubesheet 6333b. Accordingly, the bottom tubesheet 33b serves a dual function as a flow and support device. The flange 6406 forms an annular stepped surface 6409 around the perimeter of tubesheet 6333b to positively engage the top bearing flange 6405 and prevent lateral movement of the bottom of the steam generating vessel 6300 during a seismic event. The bottom tubesheet flange 6406 is therefore machined or formed to serve as the transmission path for the weight of the steam generator unit to the support foundation (e.g. divider wall 6114) via the flanged support skirt 6400. In other possible embodiments, the tubesheet flange 6406 may be formed separately on the steam generating vessel 6300 from the tubesheet 6333b.

The steam generator support skirt 6400 further includes a plurality of vertically oriented stiffeners 6403 extending between the bearing and base flanges 6405, 6404. The stiffeners 6403 are circumferentially spaced apart and formed of structure plate which may be cut an angle as shown (see, e.g. FIGS. 80 and 81). The support skirt 6400 including stiffeners 6403, flanges 6404, 6405, and wall 6407 are preferably made of structural steel plate of suitable thickness to bear the weight of a steam generator 6301 containing secondary coolant during operating conditions.

In one non-limiting embodiment, the steam generating vessel 6300 and other components herein described exposed to moisture may be made of a corrosion resistant metal such as stainless steel and/or steel with a corrosion resistant liner or coating. Other types of metals may be used.

The flow path of the reactor primary coolant and secondary coolant for the Rankine cycle will now be described. FIG. 88 shows the reactor primary coolant flowpath via directional flow arrows (i.e. primary coolant flow loop). FIGS. 77-80 and 82-85C show the secondary coolant flowpath of the Rankine cycle through steam generating vessel 6300 via directional arrows. Primary coolant flows on the tube side of the steam generating vessel 6300 and secondary coolant flows on the shell side.

Cooled primary coolant ("cold") leaves steam generating vessel 6300 through outlet nozzle 6370 and enters reactor vessel 6200 through outer inlet nozzle 6270. The primary coolant flows downwards through annular downcomer 6222 enters the bottom of riser column 6224. The primary coolant flows upwards through fuel cartridge 6230 and is heated by convection and conduction in the fuel core. The now heated or "hot" primary coolant exits the reactor vessel 6200 through outer inlet nozzle 6270 and enters steam generating vessel 6300 through inlet nozzle 6371. The hot primary coolant flows vertically upwards in riser pipe 6337 and is directed to the top of the "stack" into the top distribution plenum 6391 formed by the pressurizer 6380. The hot primary coolant enters the tubes 6332 through penetrations in top tubesheet 6333a and reverses direction to begin the downwards journey through steam generating vessel 6200 in the tubes. The hot primary coolant first flows down through the superheater 6350 on the tube side of the tube bundle which has wet saturated steam (secondary coolant) flowing upwards on the shell side from the steam generator 6230 below in the stack. The saturated steam becomes superheated and is dried by the primary water inside the tubes, which is flowing in counter flow to the rising steam mass. The counter-flow arrangement permits the steam to be superheated to within a few degrees Fahrenheit of the reactor coolant's peak temperature, resulting in maximized thermodynamic efficiency. The superheated steam then leaves the steam generating vessel 6300 via outlet nozzle 6397.

Continuing the process, the now less hot coolant continues to flow down through the steam generating vessel 6300 next proceeding through the steam generator 6330 on the tube side. On the shell side, liquid secondary coolant undergoes a phase change and is turned to steam as the primary coolant is further cooled in giving up heat to the secondary coolant. The now further cooled primary coolant flows down through the preheater 6320 on the tube side which encounters and preheats the cold (e.g. sub-cooled) liquid secondary coolant entering the shell side through the feedwater inlet nozzle 6395 of the steam generator. The now cooled primary coolant has completed the closed flow loop through the steam generating vessel 6300 and reactor vessel 6200, and re-enters the reactor vessel through inlet nozzle 6270 to repeat the foregoing flow process in the closed primary coolant flow loop.

In one embodiment, an exemplary non-limiting reactor vessel "hot" outlet temperature may be in a range of about and including 6575 to 6600 degrees F. An exemplary non-limiting reactor vessel "cold" inlet temperature may be in a range of about and including 6350 to 6385 degrees F. An exemplary reactor vessel operating pressure may be about 2,6250 psi (pounds per square inch) which is maintained by pressurizer 6380. Other suitable flow temperatures and pressures may be used depending on the heat transfer requirements of the specific application and Rankine cycle side steam production operating parameters. In one embodiment, the reactor vessel primary coolant may be unborated demineralized water.

In one exemplary embodiment, the shell 6312 of steam generating vessel may be made of steel such as type 508 carbon steel. Tubesheets 6333a, 6333b may be made of the same steel with an Inconel cladding when the tubes 6312 are made of Inconel. In other embodiments, these components may be formed of other suitable metal materials including stainless steel.

Other features and aspects of the steam generator 6301 may include the following:

a. The tubes 6332 and the riser shell or pipe 6337 may be fastened to the two tubesheets 6333a, 6333b by conventional methods such as edge welding, butt welding, hydraulic expansion, roller expansion, or a combination thereof. In non-limiting preferred embodiments, the tubes 6332 are fastened to the two tubesheets 6333a, 6333b by a high integrity joining process such as hydraulic expansion or explosion bonding. Roller expansion is not necessarily favored in all situations because it has an adverse effect on the service life of the tubes due to work hardening of the tube material in the rolled zone.

b. Either or both the steam generating vessel shell 6312 and the riser pipe 6337 may incorporate one or more "flexible shell elements" to acquire axial flexibility.

c. The tubes 6332 and/or the riser pipe 6337 may be installed in the tubesheets 6333a, 6333b such that they are in a prescribed state of pre-tension.

d. The shell side inlet and outlet nozzles 6301, 6302 are located close to the bottom and top tubesheets 6333a, 6333b, preferably in the shell 6312 course of the "flexible shell elements" or expansion joints 6396a, 6396b.

e. A perforated impingement shell 6411 is installed in each of the two expansion joints 6396a, 6396b wherein the inlet and outlet nozzles are situated to provide for an essentially radially symmetric entrance of feedwater secondary coolant and exit of heated steam from the steam generating vessel 6300, respectively (see, e.g. FIG. 80).

Figure 82:
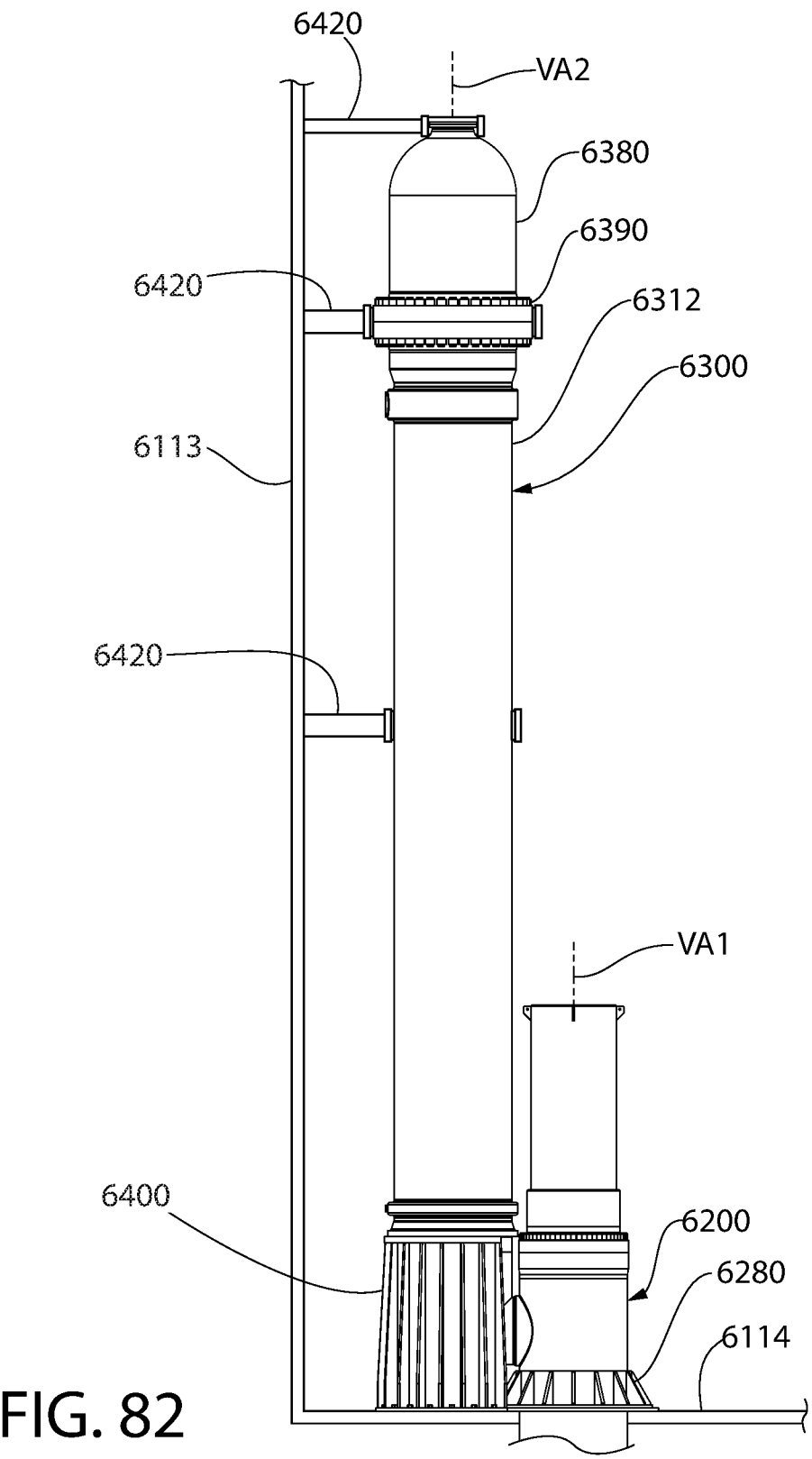
FIG. 82 is a side elevation view of the steam generator and reactor vessel showing a lateral restraint system.

The steam generator vessel 6300 and pressurizer 6380 may be laterally restrained at the four locations in one embodiment including proximate to the bottom tubesheet 6333b, tope tubesheet 6333a, near the mid-elevation of the steam generator shell 6312, and the top of the pressurizer by lateral supports 6420 (see, e.g. FIG. 82). In one embodiment, the support skirt 6400 may provide the lateral restraint near the bottom tubesheet 6333b. The lateral restraints 6420 may be lined with an insulating material at their interface with the steam generating vessel shell 6312 so as to prevent excessive heating of the structural material in the body of the restraints. The lateral restraints 6420 may be equipped with a spring/damper material to reliably distribute the load on each during a seismic or mechanical loading event. The lateral supports 6420 at mid-height of the steam generating vessel 6300 and at the top tubesheet 6333a location adjacent the flanged joint 6390 shown advantageously help increase the beam mode frequency of the steam generator 6301 in the rigid range. The lateral restraints further do not interfere with the axial vertical movement of the steam generator 6301 along vertical axis VA2 due to thermal expansion.

While the foregoing description and drawings represent some example systems, it will be understood that various additions, modifications, and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method of heating a primary coolant to a no-load operating temperature in a nuclear steam supply system, the method comprising:

a) filling a primary coolant loop within a reactor vessel and a steam generating vessel that are fluidly coupled together with a primary coolant;

b) drawing a portion of the primary coolant from the primary coolant loop and into a start-up sub-system;

c) heating the portion of the primary coolant within the start-up sub-system to form a heated portion of the primary coolant; and d) injecting the heated portion of the primary coolant into the primary coolant loop;

wherein step d) further comprises injecting the heated portion of the primary coolant directly into a riser pipe positioned within the steam generating vessel and fluidly coupled to the reactor vessel.

2. The method according to claim 1, wherein step d) further comprises injecting the heated portion of the primary coolant directly into the riser pipe through an injection nozzle fluidly coupled to an injection conduit of the start-up sub-system.

3. The method according to claim 2, wherein the injection nozzle has an outlet positioned within the riser pipe for injecting the heated portion of the primary coolant directly into the riser pipe.

4. The method according to claim 2, wherein the injection nozzle discharges the heated portion of the primary coolant into the riser pipe in a direction parallel to a flow of the primary coolant in the riser pipe.

5. The method according to claim 4, wherein the injection nozzle discharges the heated portion of the primary coolant in a vertically upwards direction.

6. The method according to claim 4, wherein the injection nozzle discharges the heated portion of the primary coolant into a bottom of the riser pipe.

7. The method according to claim 2, wherein step b) comprises pumping the portion of the primary coolant from a bottom portion of the reactor vessel and into the start-up sub-system.

8. The method according to claim 7, wherein step c) comprises flowing the portion of the primary coolant through the start-up sub-system and passed at least one heating element of a heat exchanger to convert the portion of the primary coolant into the heated portion of the primary coolant.

9. The method according to claim 1, wherein step d) results in the primary coolant flowing in the primary coolant loop in a first flow direction and wherein the primary coolant loop includes the riser pipe that is positioned within the steam generating vessel.

10. The method according to claim 9, wherein step d) comprises injecting the heated portion of the primary coolant into the riser pipe in the first flow direction of the primary coolant.

11. The method according to claim 10, wherein the primary coolant flows in the primary coolant loop at a first flow rate and wherein step d) comprises injecting the heated portion of the primary coolant into the primary coolant loop at a second flow rate, the second flow rate being greater than the first flow rate.

12. The method according to claim 10, wherein the heated portion of the primary coolant mixes with the primary coolant within the primary coolant loop to form a mixed primary coolant, and wherein steps b) through d) proceed continuously until the mixed primary coolant reaches the no-load operating temperature.

13. The method according to claim 12, wherein upon the mixed primary coolant reaching the no-load operating temperature, discontinuing steps b) through d) while the primary coolant passively flows in the primary coolant loop.

14. The method according to claim 12, further comprising:
positioning nuclear fuel and a plurality of control rods within an internal cavity of the reactor vessel; and
wherein the mixed primary coolant is heated to the no-load operating temperature prior to any withdrawal of the control rods.

15. The method according to claim 12, further comprising:
e) flowing a secondary coolant through a shell side of the steam generating vessel while the primary coolant flows through the primary coolant loop;
f) transferring heat from the primary coolant to the secondary coolant to change phase of the secondary coolant from liquid to steam; and
wherein the steam is retained within the shell side of the steam generating vessel until a desired pressure is reached.

16. The method according to claim 15, wherein upon the desired pressure being reached, flowing at least a portion of the steam from the steam generating vessel to a steam turbine for generating electricity.

17. A method of heating a primary coolant to a no-load operating temperature in a nuclear steam supply system, the method comprising:
a) filling a primary coolant loop within a reactor vessel and a steam generating vessel that are fluidly coupled together with a primary coolant;
b) drawing a portion of the primary coolant from the primary coolant loop and into a start-up sub-system;
c) heating the portion of the primary coolant within the start-up sub-system to form a heated portion of the primary coolant;
d) injecting the heated portion of the primary coolant into the primary coolant loop;
wherein upon injecting the heated portion of the primary coolant into the primary coolant loop, the injection causes the primary coolant to flow through the primary coolant loop which comprises:
e-1) flowing the primary coolant in a first vertical direction through a riser column within the reactor vessel;
e-2) flowing the primary coolant in a first lateral direction from the reactor vessel and into a riser pipe within the steam generating vessel;
e-3) flowing the primary coolant in the first vertical direction through the riser pipe within the steam generating vessel;
e-4) flowing the primary coolant in a second vertical direction through tubes in the steam generating vessel, the second vertical direction being opposite the first vertical direction;
e-5) flowing the primary coolant in a second lateral direction from the tubes in the steam generating vessel into a downcomer within the reactor vessel; and
e-6) flowing the primary coolant from the downcomer and into the riser column;
wherein the start-up sub-system comprises an intake pipe, a pump for pumping the portion of the primary coolant from the primary coolant loop and through the start-up sub-system, a heater for heating the portion of the primary coolant to form the heated primary coolant, and an injection nozzle positioned within the riser pipe in the steam generating vessel for injecting the heated primary coolant from the heater into the primary coolant loop.

18. The method according to claim 17, wherein the injection nozzle has an outlet positioned within the riser pipe for injecting the heated portion of the primary coolant directly into the riser pipe.

* * * * *